(12) United States Patent
Smith

(10) Patent No.: US 12,370,698 B2
(45) Date of Patent: Jul. 29, 2025

(54) ROBOTIC ARTICLE HANDLING END EFFECTOR WITH CAPTURE DEVICE HAVING A COMPLIANT DIAPHRAGM

(71) Applicant: Sarcos Corp., Salt Lake City, UT (US)

(72) Inventor: Fraser M. Smith, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 18/414,352

(22) Filed: Jan. 16, 2024

(65) Prior Publication Data

US 2024/0316789 A1    Sep. 26, 2024

Related U.S. Application Data

(60) Provisional application No. 63/621,101, filed on Jan. 15, 2024, provisional application No. 63/513,326, (Continued)

(51) Int. Cl.
*B25J 15/00* (2006.01)
*B25J 11/00* (2006.01)
(Continued)

(52) U.S. Cl.
CPC ........... *B25J 15/0095* (2013.01); *B25J 11/00* (2013.01); *B25J 13/085* (2013.01);
(Continued)

(58) Field of Classification Search
CPC .... B25J 15/0019; B25J 15/0616; B25J 17/00; B25J 18/025; B25J 19/02
See application file for complete search history.

(56) References Cited

U.S. PATENT DOCUMENTS

| 4,572,564 A | 2/1986 | Cipolla |
| 4,653,793 A | 3/1987 | Guinot et al. |

(Continued)

FOREIGN PATENT DOCUMENTS

| CN | 205033891 U | 2/2016 |
| CN | 205772108 U | 12/2016 |

(Continued)

OTHER PUBLICATIONS

JP 2022029756 A, Controller of Handling Robot (Year: 2022).*

(Continued)

*Primary Examiner* — Basil T. Jos
(74) *Attorney, Agent, or Firm* — Christopher L. Johnson

(57) ABSTRACT

This disclosure sets forth a robotic end effector for acquiring and managing an article, such as an item of luggage. The robotic end effector can include an extendable arm comprising a first support member, a capture device comprising a guide member having a plurality of apertures formed therein with a rod slideably supported in each aperture of the guide member. The capture device can further include a biasing member associated with one or more rods and being configured to bias the one or more rods in a first direction relative to the guide member. The article interface system can include an actuatable article engagement device. The actuatable article engagement device can itself include an article interface surface. The actuatable article engagement device can be operated to interface with an article to facilitate movement of the article toward the capture device.

30 Claims, 57 Drawing Sheets

Related U.S. Application Data filed on Jul. 12, 2023, provisional application No. 63/439,108, filed on Jan. 14, 2023.

(51) Int. Cl.
  *B25J 13/08* (2006.01)
  *B25J 15/06* (2006.01)
  *B25J 17/00* (2006.01)
  *B25J 18/02* (2006.01)
  *B25J 19/02* (2006.01)
  *B65G 47/90* (2006.01)

(52) U.S. Cl.
  CPC ....... *B25J 15/0019* (2013.01); *B25J 15/0616* (2013.01); *B25J 17/00* (2013.01); *B25J 18/025* (2013.01); *B25J 19/02* (2013.01); *B65G 47/90* (2013.01); *B65G 2201/0264* (2013.01); *B65G 2203/0283* (2013.01)

(56) References Cited

U.S. PATENT DOCUMENTS

| | | |
|---|---|---|
| 4,669,940 A | 6/1987 | Englehardt et al. |
| 5,711,565 A | 1/1998 | Smith et al. |
| 8,473,094 B2 | 6/2013 | Becker et al. |
| 8,733,810 B2 | 5/2014 | Oda |
| 10,016,902 B2 | 7/2018 | Podnar |
| 10,048,697 B1 | 8/2018 | Theobald |
| 10,661,986 B2 | 5/2020 | Price et al. |
| 10,723,019 B2 | 7/2020 | Wagner et al. |
| 11,460,845 B2 | 10/2022 | Levasseur |
| 11,667,476 B1 | 6/2023 | Gil et al. |
| 2002/0059942 A1 | 5/2002 | Neuner et al. |
| 2013/0033050 A1 | 2/2013 | Matsuoka et al. |
| 2015/0274447 A1 | 10/2015 | McCollum et al. |
| 2019/0126493 A1 | 5/2019 | Jonas et al. |
| 2020/0114523 A1 | 4/2020 | Knuepfel et al. |
| 2021/0011479 A1 | 1/2021 | Levasseur |
| 2021/0291384 A1 | 9/2021 | Chintalapalli Patta et al. |
| 2022/0080584 A1 | 3/2022 | Wicks et al. |
| 2022/0118629 A1 | 4/2022 | Payton et al. |
| 2022/0297312 A1 | 9/2022 | Baek et al. |
| 2024/0010356 A1 | 1/2024 | Klossek |
| 2024/0076143 A1 | 3/2024 | Bancroft et al. |
| 2024/0144141 A1 | 5/2024 | Cella et al. |
| 2024/0253246 A1 | 8/2024 | Smith |
| 2024/0261981 A1 | 8/2024 | Smith |

FOREIGN PATENT DOCUMENTS

| | | |
|---|---|---|
| CN | 108698238 A | 10/2018 |
| CN | 108698744 A | 10/2018 |
| CN | 110036162 A | 7/2019 |
| CN | 115535572 A | 12/2022 |
| DE | 102016220643 A1 | 4/2018 |
| JP | S60-213495 A | 10/1985 |
| JP | 2022029756 A * | 2/2018 |
| JP | 2020-171982 A | 10/2020 |
| JP | 2022-078539 A | 5/2022 |
| WO | WO 2012/053416 A1 | 4/2012 |
| WO | WO 2019/019090 A1 | 1/2019 |
| WO | WO 2019/023050 A2 | 1/2019 |
| WO | WO 2019/169419 A2 | 9/2019 |
| WO | WO 2020/210241 A1 | 10/2020 |
| WO | WO 2022/157465 A2 | 7/2022 |

OTHER PUBLICATIONS

JP-2022029756-A English Translation (Year: 2022).*
International Search Report for International Application No. PCT/US2024/011702 dated Aug. 27, 2024, 21 pages.
International Search Report for International Application No. PCT/US2023/073258 dated Jan. 24, 2024, 21 pages.
Invitation to Pay Additional Fees for International Application No. PCT/US2024/011702 dated May 15, 2024, 15 pages.
International Search Report for International Application No. PCT/US2024/011706 dated May 13, 2024, 11 pages.

* cited by examiner

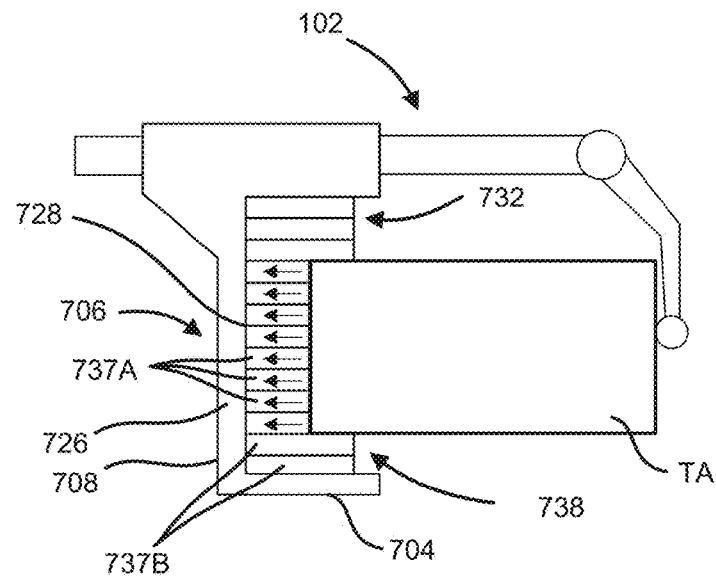
FIG. 13I
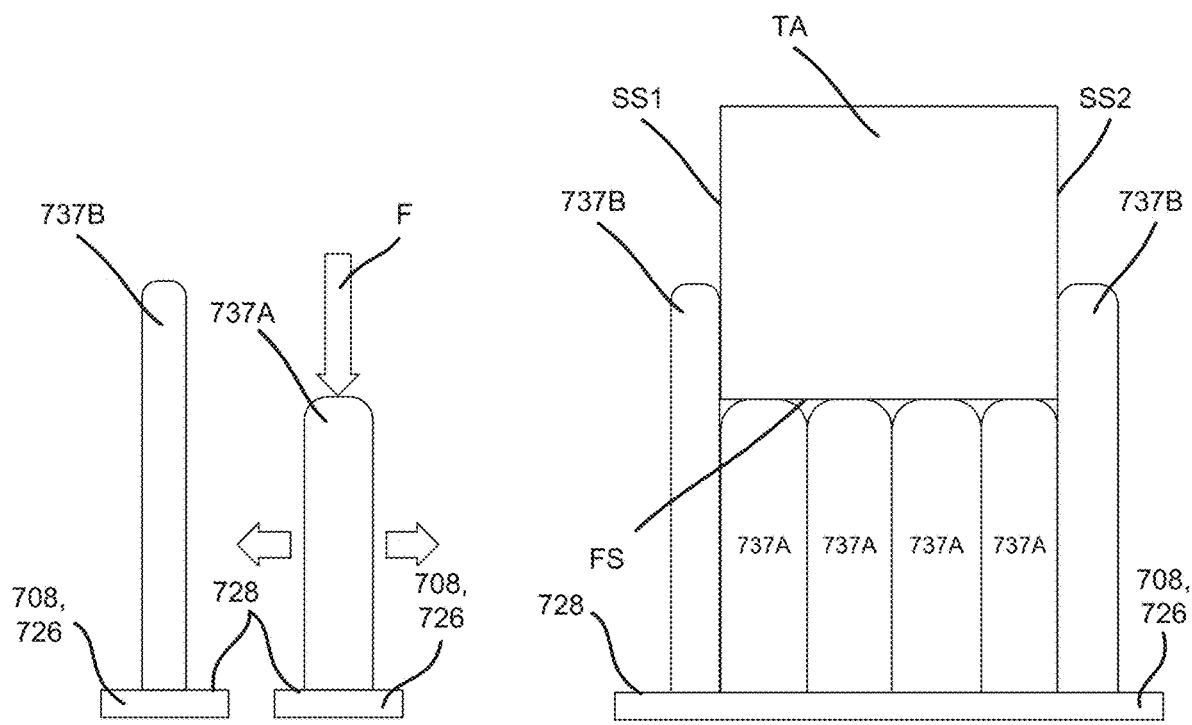
FIG. 13J
FIG. 13K

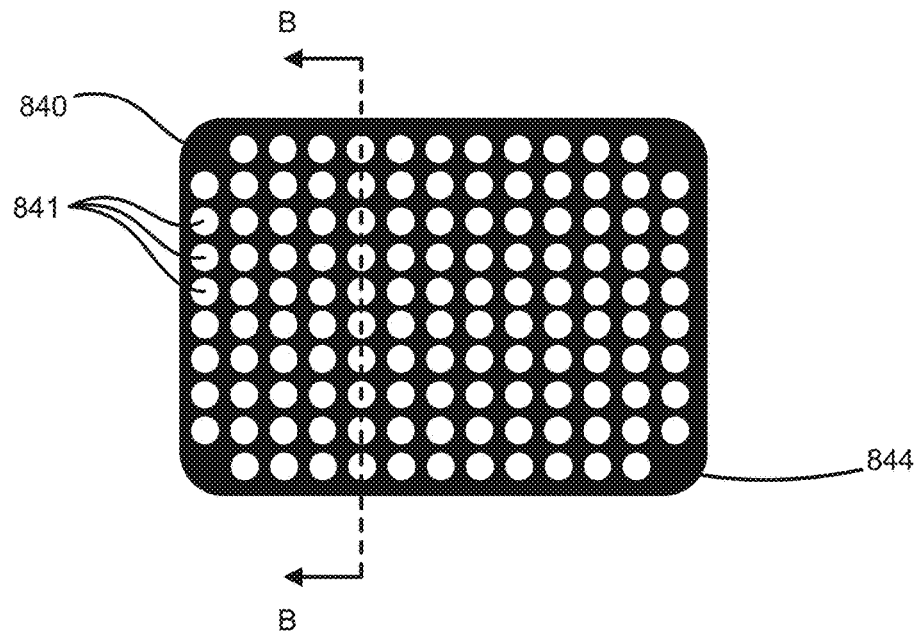
*FIG. 16A*
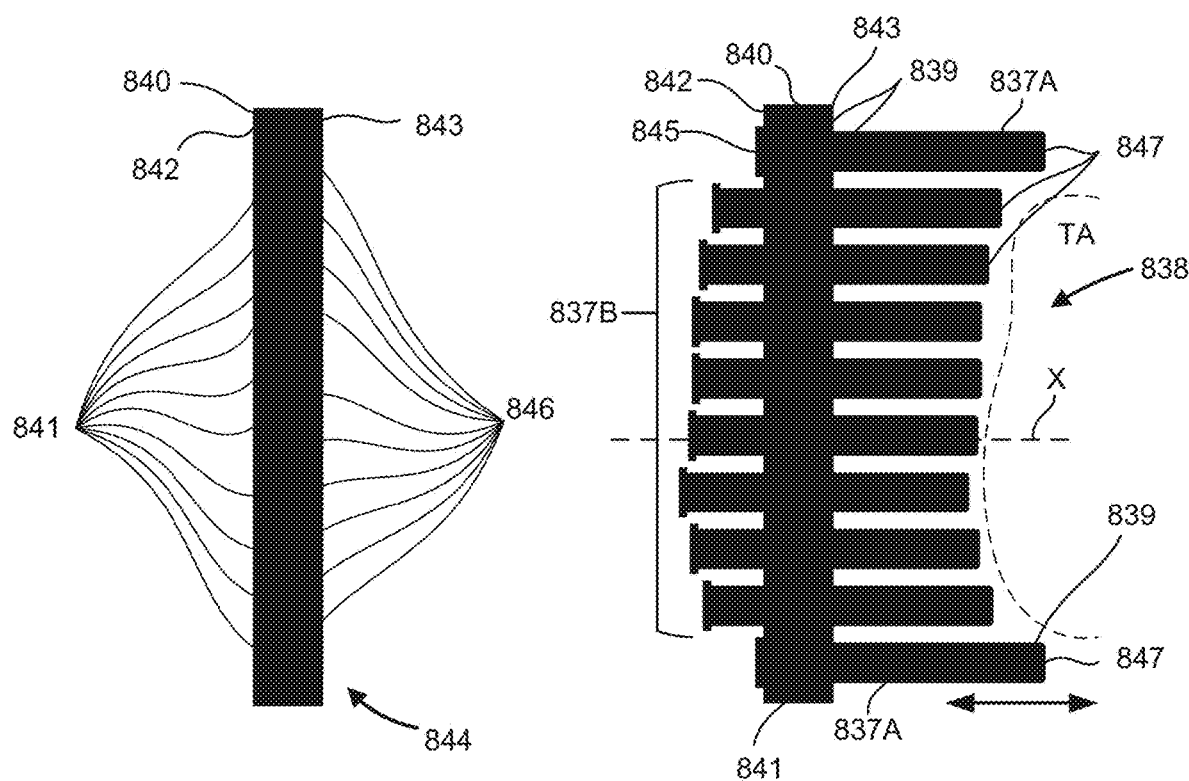
*FIG. 16B*  *FIG. 16C*

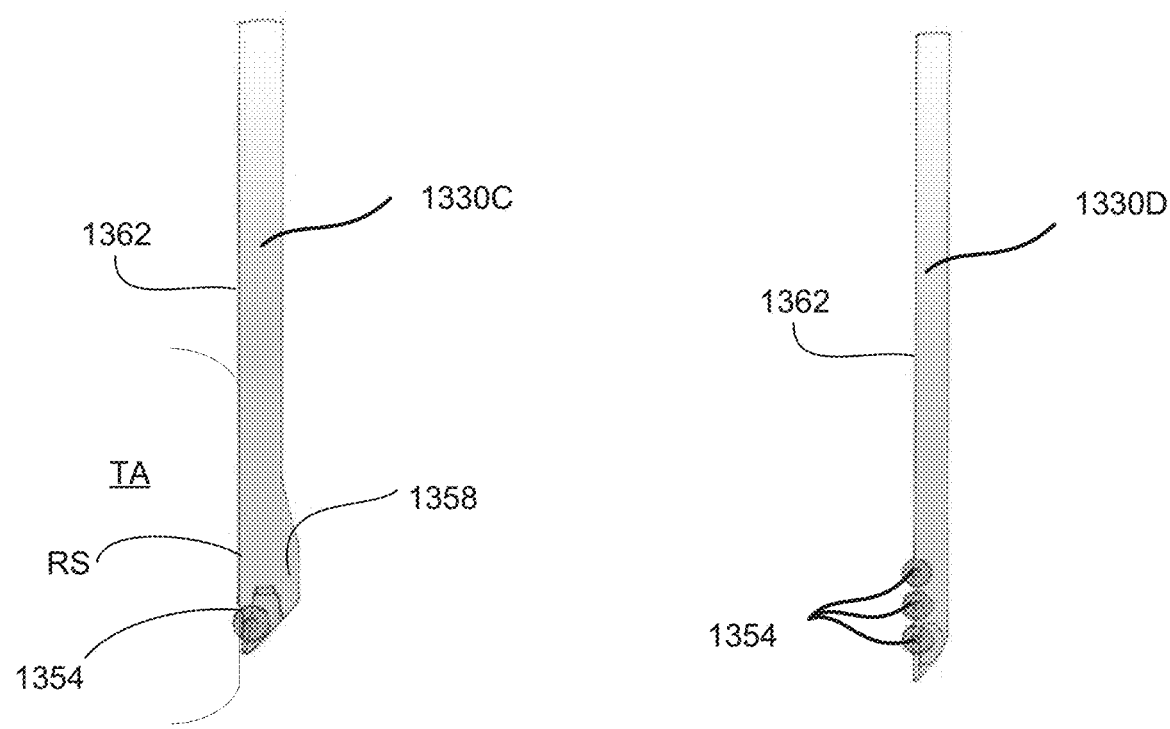
FIG. 34
FIG. 36
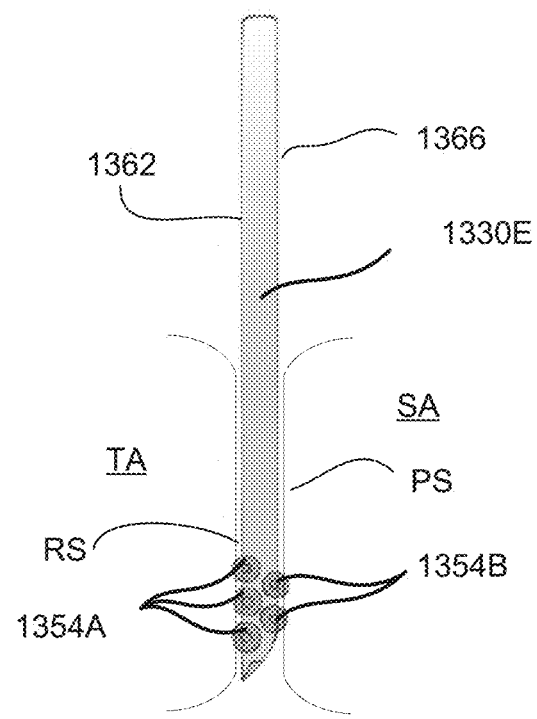
FIG. 37

6000

> 6002: moving an end effector with an article interface system into proximity with a target article by moving either the end effector and/or the target article.

> 6004: operating an article interface system supported by an arm (e.g., any of arms 12, 102, 402, and 602), the article interface system comprising an actuatable article engagement device comprising an article interface surface.

> 6006: moving the actuatable article engagement device from an initial position to a first position relative to the article in which the article interface surface engages with the article.

> 6008: actuating the actuatable article engagement device to move the article towards a capture device until state of acquisition is achieved, in which the forces acting on the article from the end effector are sufficient to counter collective forces acting on the article.

> 6010: moving the target article TA with the robotic end effector to a desired location by moving the robotic end effector.

> 6012: releasing the target article from the robotic end effector at the desired location by operating the article interface system.

*FIG. 60*

ROBOTIC ARTICLE HANDLING END EFFECTOR WITH CAPTURE DEVICE HAVING A COMPLIANT DIAPHRAGM

RELATED APPLICATIONS

This application claims the benefit of U.S. Provisional Application Ser. No. 63/439,108, filed Jan. 14, 2023, and entitled, "Robotic Baggage Handling End Effector," which is incorporated by reference in its entirety herein.

This application claims the benefit of U.S. Provisional Application Ser. No. 63/513,326, filed Jul. 12, 2023, and entitled, "Robotic Article Managing End Effector with Horizontal Support Platform," which is incorporated by reference in its entirety herein.

This application claims the benefit of U.S. Provisional Application Ser. No. 63/621,101, filed Jan. 15, 2024, and entitled, "Robotic Article Handling End Effector," which is incorporated by reference in its entirety herein.

This application is related to the following applications:
U.S. application Ser. No. 18/414,287, filed Jan. 16, 2024, entitled "Robotic Article Handling End Effector with Capture Device Having a Compliant Material"; and
U.S. application Ser. No. 18/414,314, filed Jan. 16, 2024, entitled "Robotic Article Managing End Effector with Capture Device Having",
each of which is incorporated by reference herein in its entirety.

BACKGROUND

Significant resources (e.g., people, machinery, fuel, electricity, etc.) and time are consumed in a process of transporting articles, such as luggage or packages. Handling articles can involve inefficiencies and delays that can complicate travel and supply chains. Such delays can also be costly, in both time and money, for travelers and suppliers. In addition, articles are often handled by laborers, which can lead to injuries, damage, errors and misdirection. In order to reduce delays, reduce costs, prevent damages, prevent injuries, and decrease errors, it is desirable to develop quicker, more efficient, safer, and less expensive methods, devices, and systems for collecting, transporting, handling, and loading of such articles.

Robots can be tasked with handling various different articles, such as luggage or packages, in various different situations, such as baggage handling for travel or package handling for shipping. Although some size limitations are placed upon luggage, individual bags can differ greatly with respect to surfaces, e.g. hard or soft, accessories, e.g. pockets or flat, etc. Similarly, although shipping containers can often have similar structure, such as cardboard, individual packages can have numerous different sizes and shapes. The handling of such luggage or packages can occur in airports, warehouses, shipping yards, rail yards, docks, on-board vehicles, ships, land vehicles, airborne vehicles, retail stores, storage facilities, etc. For example, a robot may be tasked with acquiring baggage from a cart and placing the baggage on a conveyor belt into an aircraft. As another example, a robot may be tasked with acquiring a package and transporting the package to a trailer. As another example, a robot may be tasked with moving an article from one location to another.

It is desirable to develop methods, devices, and systems for handling numerous similar, but different, article.

BRIEF DESCRIPTION OF THE DRAWINGS

Features and advantages of the invention will be apparent from the detailed description which follows, taken in conjunction with the accompanying drawings, which together illustrate, by way of example, features of the invention; and wherein:

FIG. 13I illustrates capture of a target article with the capture device of FIG. 13G a front view of the capture device of FIG. 13G.

FIG. 13J illustrates operation of compliant elements of the capture device of FIG. 13G.

FIG. 13K illustrates capture of a target article with compliant elements of the capture device of FIG. 13G.

FIG. 16A illustrates a front view of a guide member of the robotic end effector of FIG. 14.

FIG. 16B illustrates a cross-sectional view of the guide member of FIG. 16A taken along line BB of FIG. 16A.

FIG. 16C illustrates a cross-sectional view of the guide member of FIG. 16A taken along line BB of FIG. 16A with rods disposed within the guide member.

FIG. 34 illustrates a side view of a blade member for a robotic end effector, in accordance with at least one example of the present disclosure.

FIG. 36 illustrates a side view of a blade member for a robotic end effector, in accordance with at least one example of the present disclosure.

FIG. 37 illustrates a side view of a blade member for a robotic end effector, in accordance with at least one example of the present disclosure.

FIG. 60 illustrates a method of acquiring an article using an end effector in accordance with at least one example of the present disclosure.

Figure 1:
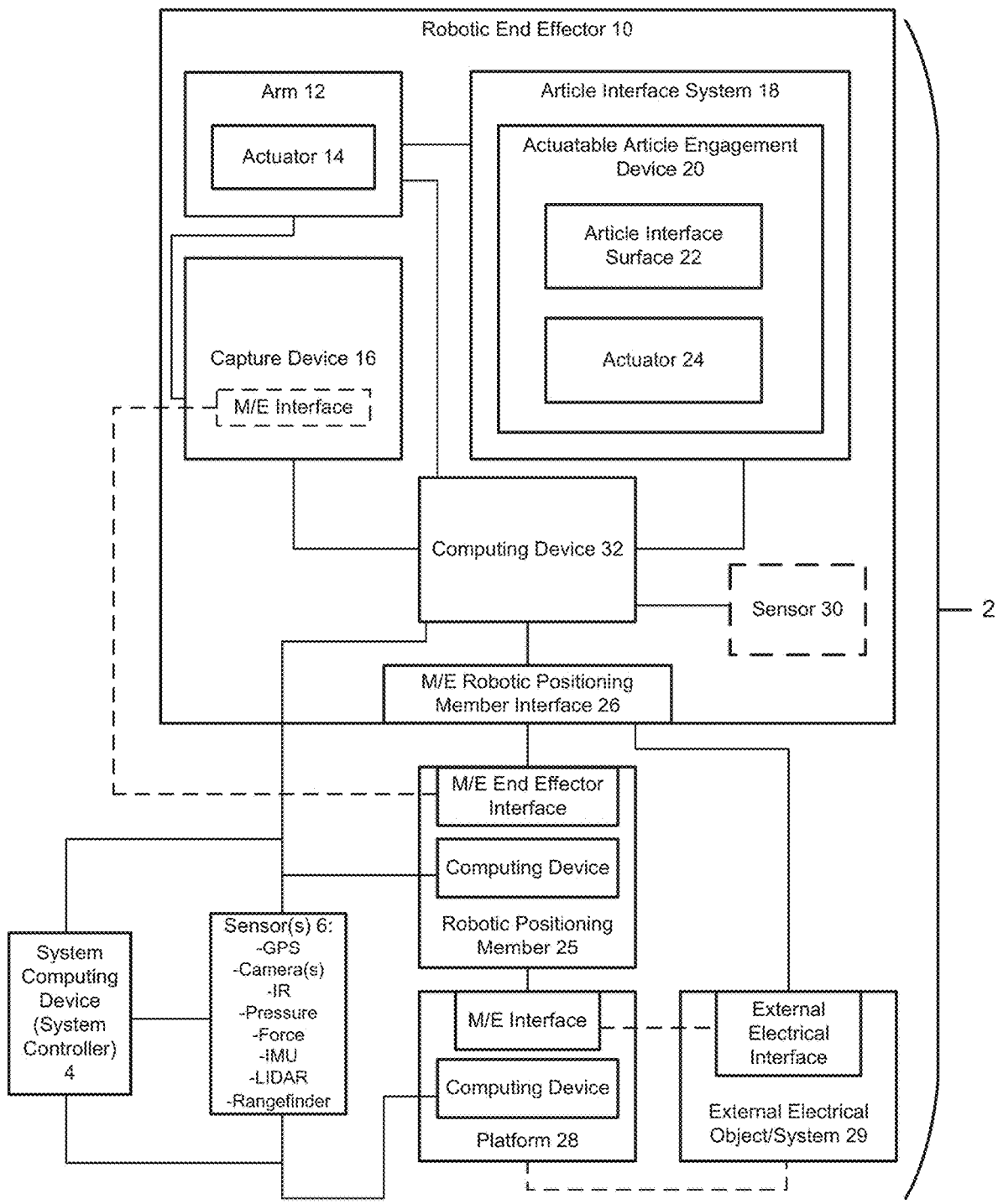
FIG. 1 illustrates a schematic diagram of a robotic end effector in accordance with at least one example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In contexts where elements are recited to be "substantially aligned with" another element recited herein, it is intended that the recited element is still "substantially aligned with" another element when the element is either in perfect alignment with, or out of alignment by +/−10 degrees with the other element. In contexts where elements are recited to be "substantially parallel" to another element recited herein, it is intended that the recited element is still "substantially parallel" to the other element when the element is either perfectly parallel with, or is angled away from parallel with the other element by +/−10 degrees.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

As used herein, the singular forms "a" and, "the" include plural referents unless the context clearly dictates otherwise.

As used herein, the terms "supported on," "supported by," or saying that the one element "supports" and/or "is supporting" another element of the devices or systems described herein can refer to direct support indicating direct contact between the two elements, or this can refer to indirect support in which one or more intermediate elements are provided between the elements.

As used herein, the term "end effector" or "robotic end effector" or "robotic article managing end effector" refers to any robotic end effector device, mechanism or system as taught herein, which can be actuatable to acquire and release an article. The end effector can be operable with a robotic positioning member to facilitate movement and spatial positioning of the end effector and an acquired article, which end effector and robotic positioning member can be operable with or part of a platform, and which end effector, robotic positioning member, and platform can be operable with or part of an overall robotic article management or handling system. The end effector can be coupled to a robotic positioning member in some examples. The end effector can comprise a configuration that is operable to acquire, grip, grab, grasp, hold, lift, support, release, and/or otherwise manipulate (or any combination of these) an article or object, such as luggage, baggage, a compliant or rigid bag, a suitcase, a duffle bag, a package, a box, or any other types of articles, objects or a collection of these. As example types, the end effector can comprise a vacuum gripper, a pneumatic gripper, a hydraulic gripper, a servo-electric gripper, an adhesive gripper, a magnetic gripper, an electrostatic, or any type of end effector operable to acquire and release an article.

As used herein, the term "actuator" refers to a component of a system that is operable to be actuated and moved in one or more linear and/or rotational degrees of freedom to cause movement of one or more other structures or components of the system, or any articles being handled by the system. Any actuator described herein can be an electric actuator (e.g., an electric motor), a pneumatic actuator, a hydraulic actuator, or any other known actuator type capable of causing movement of one or more structures or components. Example actuators are described below, and shown in the drawings.

As used herein, the term "rotational actuator" refers to a type of actuator that is operable to move any structure, component, or element in a rotational degree of freedom, whether or not the rotational actuator itself operates by linear motion or rotational motion. For example, linear motion within an actuator can be translated to rotational motion using intermediate elements. Therefore, even if the actuator moves linearly, it can be considered a rotational actuator if it is used to move a structure, component, or element rotationally.

As used herein, the term "linear actuator" refers to a type of actuator that is operable to move any structure, component, or element in a linear direction, whether or not the linear actuator itself operates by linear motion or rotational motion. For example, rotational motion within an actuator can be translated to linear motion using intermediate elements. Therefore, even if the actuator itself moves rotationally, it can be considered a linear actuator if it is used to move a structure, component, or element linearly.

As used herein, the term "extendable arm" refers to one or more structural support members of the robotic end effector in support of an article interface system of the robotic end effector, and that is/are extendable and retractable to facilitate movement of the article interface system between two or more spatially separated points in three-dimensional space. In one example, an extendable arm can be configured to extend and retract linearly (e.g., a structural support member can be caused to move or translate bi-directionally relative to another structural support member along an axis; or two or more jointed telescoping structural support members can be caused to extend and retract relative to one another along an axis; or other configurations). In another example, an extendable arm can comprise one more jointed structural support members coupled in series via joints that can be caused to rotate relative to one another about respective joint rotational axes to move the structural support members and the article interface system between the two or more spatially separated points. In another example, an extendable arm can comprise any combination of structural support members and linear and rotational joints that facilitate movement in multiple degrees of freedom to move the article interface system between the two or more spatially separated points. Depending upon the configuration of the extendable arm and the location of the two spatially separated points, movement of the article interface system between the two spatially separated points via the extendable arm can be along a line, a curve or arc, or any combination of these.

As used herein, the term "collective forces" refers to one or more forces acting on a target article, with such forces being separate from and outside of any forces acting on the article by the robotic end effector. Collective forces acting on the target article can include gravitational forces acting on the article, stiction between the article and adjacent articles or other surfaces in contact with one or more surfaces of the target article, friction between the article and other structures or elements in contact with one or more surfaces of the article, and/or compressive forces acting on the article from other articles, elements, or surfaces surrounding the article.

As used herein, the term "capture device" refers to a mechanism, device, component, element, or system of a robotic end effector that is operable to receive, interface with, or engage with an article and to provide sufficient support to the target article to counter collective forces acting on the article outside of the robotic end effector in order to facilitate capture, support, movement, and or manipulation of the article by the robotic end effector.

As used herein, the term "article interface system" refers to a system of a robotic end effector device/system that is operable to interface with an article and manipulate and/or move the article into engagement with a capture device. In one example, the article interface system can be supported by and moveable via an extendable arm of the robotic end effector.

As used herein, the term "actuatable article engagement device" refers to a component or element of an article interface system of a robotic end effector that is configured and operable to be actuated to interface with (i.e., come in contact with) an article and to facilitate manipulation and/or movement of the article into engagement with a capture device of the robotic end effector.

As used herein, the term "robotic positioning member interface" refers to that part of the robotic end effector that is operable to interface with the end effector interface of the robotic positioning member to facilitate coupling of the robotic end effector to the robotic positioning member. Generally speaking, the robotic positioning member interface can include both mechanical robotic positioning member interface components (e.g., one or more interfacing members having one or more interfacing surfaces) and electrical robotic positioning member interface components (e.g., wired (e.g., physical connector components) and/or wireless (e.g., wireless transmitting/receiving components) electrical connection components) that facilitate both mechanical and electrical operational functionality of the robotic end effector. The mechanical robotic positioning member interfaces can include any mechanical coupling devices, objects or systems that function and operate to facilitate the mechanical coupling of the end effector to the robotic positioning member, such that the end effector is suitably supported for its intended operation. The electrical robotic positioning member interfaces can include any type of electrical and/or electromechanical connections that function and operate to facilitate the electrical connection of any electrical devices, objects, systems, computers, controllers, electronics components, actuators, sensors, etc. that operate within (i.e., exist in or on) the end effector to any suitably configured external ("external" meaning not part of the end effector) electrical objects, devices, systems intended to enable electrical functionality of the end effector as intended. Such external electrical objects, devices, and/or systems can comprise one or more electrical interfaces that can be configured to interface with the electrical robotic positioning member interfaces of the end effector. Such electrical interfaces of the external electrical objects, devices and/or systems can include, but are not limited to, wired connections, wireless network connections, any others, and any combination of these. Such electrical interfaces can be supported on or be part of the robotic positioning member, the platform, and/or can be part of an external electrical object or system (e.g., a computer, server) remotely located from the end effector and any platform coupling the end effector, wherein the external or remote electrical object/system is in electrical communication with the robotic positioning member, the platform and/or the end effector (e.g., via a wired or wireless network).

As used herein, the term "support member" refers to a mechanism or structure operable to receive and couple to the robotic end effector.

As used herein, the term "friction enhancing element" refers to any element that is made part of, used on or added to a supporting surface for the purpose of enhancing friction (e.g., increasing a coefficient of static and/or kinetic friction) between the supporting surface and another surface upon being brought into contact with one another. In some examples, the friction enhancing element can comprise one or more protrusions, micro spines, teeth, or any other projecting structures, or any combination of these, formed into or extending from a supporting surface. These can be integrally formed with, applied to, or otherwise made part of the surface or substrate, and they can comprise the same material as or a different material from the supporting surface. In another example, the friction enhancing element can comprise a coating, adhesive, material, or other element applied to a surface. The friction enhancing element can be configured to mechanically interface with a surface of an article to increase friction and/or grip between the article and the surface in support of the friction enhancing element.

As used herein, the term "engagement force" refers to an axial force measured along the axis in the direction of the engagement of the article with a capture device and/or article interface system, or a component thereof. The engagement force can indicate a force applied between the article and the capture device and/or the article and the article interface system upon either of both of these being caused to come into contact with the article.

As used herein, the term "first stage engagement force" refers to an axial force measured along the axis in the direction of the engagement of the article with a capture device and/or article interface system, or a component thereof. The first stage engagement force refers to a force exerted on the article by the article interface system to urge the article in a direction toward the capture device, and prior to the article coming in contact with the capture device.

As used herein, the term "threshold first stage engagement force" refers to an axial force measured along the axis in the direction of the engagement of the article with a capture device and/or article interface system, or a component thereof. The threshold first stage engagement force refers to a force exerted on the capture device by the article indicating a level of engagement and/or support between the capture device and the article sufficient to facilitate movement of the article interface system about the article without terminating support of the article by the capture device.

As used herein, the term "second stage engagement force" refers to an axial force measured along the axis in the direction of the engagement of the article with a capture device and/or article interface system, or a component thereof. The second stage engagement force refers to a force exerted on the article by the article interface system to urge the article in a direction toward the capture device.

As used herein, the term "predetermined threshold of the second stage engagement force" refers to an axial force measured along the axis in the direction of the engagement of the article with a capture device and/or article interface system, or a component thereof. The predetermined threshold of the second stage engagement force refers to a force exerted on the capture device by the article indicating a level of engagement and/or support between the capture device and the article sufficient to counter the collective forces acting on the article. At a point at which the collective forces acting on the article are countered, the end effector has achieved captured support and a state of acquisition of the target article, and is sufficiently supporting the article enough to lift, move, transport, or otherwise manipulate the target article from its current position to a new position.

As used herein, the term "captured support" refers to at least partial support and/or constrained translational movement of an article by a capture device, compliant material, diaphragm, and/or rods in one or more of the +/−x directions, the +/−y directions, and/or the +/−z directions. The captured support can further refer to at least partial support and/or constrained positive/negative rotational movement about the x axis, the y axis, and/or the z axis. In short, captured support provided to an article refers to support in one or more, and in any combination, of the translational and/or rotational directions. Captured support can be achieved prior to a state of acquisition as the target article is caused to initially engage the capture device, between initial engagement and full engagement of the target article with the capture device, as well as in a state of acquisition of the target article as fully engaged with the capture device.

As used herein, the term "state of acquisition" refers to the state of the target article as it is fully engaged with the capture device and fully captured by the end effector, such that the acquired target article is fully supported by the end effector in that all collective external forces acting on the target article are overcome and countered that might otherwise cause the target article to inadvertently release from the end effector. In this state, the acquired target article can be moved and manipulated by the end effector from one location to another and intentionally released when needed or desired.

As used herein, the term "biasing member" refers to any type of device, member, system, mechanism, etc. having or providing a spring or spring-like function (i.e., that comprises an element of elasticity and that possess an elastic modulus (e.g., Young's modulus)) and that is capable of applying a force that acts on an object (e.g., a rod or an array of rods of a respective capture device), wherein the biasing member is capable of storing energy when compressed and releasing energy when the compressing force is removed, or at least partially decreased.

As used herein, the term "mobile platform" refers to a manned or unmanned vehicle operable to support and to facilitate controlled locomotion of a robotic positioning member and the robotic end effector coupled thereto within an environment.

As used herein, the term "rod" refers to a compliantly biased member, element, or structure, to a compliantly biased extensible/retractable member, element, or structure, or to a compressible element, member, or structure, these being part of a respective capture device, that is displaceable, slidable, moveable, translatable or compressible, and configured to receive, capture, and/or support a target article within the capture device. Structures of any size, shape, cross-section, material, or otherwise can be considered a rod for purposes of this disclosure.

An initial overview of the inventive concepts is provided below and then specific examples are described in further detail later. This initial summary is intended to aid readers in understanding the examples more quickly, but is not intended to identify key features.

Disclosed herein, according to at least one example, is a robotic end effector for acquiring and managing an article. The robotic end effector can include an extendable arm comprising a first support member. The robotic end effector can further include a capture device comprising a guide member, an array of rods, and a biasing member. The guide member can include a plurality of apertures extending through the guide member from a back surface to a front surface of the guide member. The array of rods can include a plurality of rods with each rod disposed in a respective aperture of the plurality of apertures of the guide member. Each rod of the array of rods can be slidably supported so as to be operable to move relative to the guide member. The biasing member can be associated with one or more rods of the array of rods and can be configured to bias the one or more rods in a first direction, or in other words an extended position, relative to the guide member. The article interface system can be supported by the extendable arm, and can itself include an actuatable article engagement device having an article interface surface. The actuatable article engagement device can be operable to interface with an article to facilitate movement of the article toward the capture device.

Additionally, disclosed herein, according to at least one example, is a method for acquiring an article. The method can include ensuring the article and a robotic end effector for acquiring and managing the article are in proximity with each other, the robotic end effector comprising an extendable arm having a first support member and a capture device. The capture device can include a guide member, an array of rods, and a biasing member. The guide member can include a plurality of apertures extending through the guide member from a back surface to a front surface of the guide member. The array of rods can include a plurality of rods with each rod disposed in a respective aperture of the plurality of apertures of the guide member. Each rod of the array of rods can be slidably supported so as to be operable to move relative to the guide member. The biasing member can be associated with one or more rods of the array of rods and can be configured to bias the one or more rods in a first direction, or in other words an extended position, relative to the guide member. The method can further include operating an article interface system supported by the extendable arm, the article interface system comprising an actuatable article engagement device comprising an article interface surface, the actuatable article engagement device being operable to interface with an article to facilitate movement of the article toward the capture device and/or the array of rods. Operating the article interface system can include moving the actuatable article engagement device from an initial position to a first position relative to the article in which the article interface surface engages with the article. Operating the article interface system can further include actuating the actuatable article engagement device to move the article against one or more rods of the array of rods to slide the one or more rods in respective apertures until a state of acquisition is achieved, in which the forces acting on the article from the end effector are sufficient to counter collective forces acting on the article.

To further describe the present technology, examples are now provided with reference to the figures. FIG. 1 illustrates a schematic of a robotic end effector 10 operable with a robotic positioning member 25 as part of an overall robotic article management system 2, the robotic end effector 10 being configured and operable to acquire and manage an article according to at least one example of the disclosure. FIG. 1 may comprise elements common to, and may be generic to, some or all of the embodiments discussed herein, although some embodiments may comprise additional elements. The article can be any object to be moved, manipulated, and/or captured, such as luggage, baggage, a suitcase, a bag, a duffle bag, package, box, other types of luggage, or any other similar objects. As illustrated, the end effector 10 can include an arm 12 comprising a first support member. The first support member can be a rigid structure or arm configured to support other structures. The arm 12 can also be an extendable arm comprising a plurality of links and associated joints that are extendable or moveable relative to each other by operation of one or more actuators, such as an actuator 14, operable to cause extension of the arm 12 in at least one degree of freedom. The arm 12 can have any structure without limitation and various example structures of the arm 12 are described herein.

The end effector 10 can further include a capture device 16 operable to receive and support an article being acquired by the end effector 10. The capture device 16 can comprise at least one support structure operable to receive and support the article. Various structures can operate as the capture device 16 and examples of such structures are described herein.

The end effector 10 can further include an article interface system 18 supported by the arm 12, such as on an end of the arm 12, and including an actuatable article engagement device 20 comprising an article interface surface 22. The actuatable article engagement device 20 can be operable to interface with the article to facilitate movement of the article, such as toward the capture device 16. The article interface system 18 can be actuated to move the actuatable article engagement device 20 with its article interface surface 22 into contact with the article to drive the article in a direction toward the capture device 16. Various examples of the article interface system 18, the actuatable article interface device 20, and the article interface surface 22 are described herein.

The end effector 10 can further include a robotic positioning member interface 26 that comprises at least one of a mechanical robotic positioning member interface or an electrical robotic positioning member interface (i.e., an M/E end effector interface, meaning at least one of these alone, or both of these in combination), and that facilitates the mechanical and/or electrical coupling of the end effector 10 to a robotic positioning member 25 supported by a platform 28, the robotic positioning member 25 having a suitably configured mechanical and/or electrical (i.e., M/E) end effector interface, thus facilitating and enabling the mechanical and/or electrical operational aspects of the end effector 10. In one example, the robotic positioning member 25 can comprise just a mechanical end effector interface that facilitates the mechanical coupling of the end effector 10 to the robotic positioning member 25 via the robotic positioning member interface 26 of the end effector 10. In another example, the robotic positioning member 25 can comprise both a mechanical end effector interface and an electrical end effector interface that facilitates both the mechanical and electrical coupling of the end effector 10 to the robotic positioning member 25 via the robotic positioning member interface 26 of the end effector 10. In some examples, the robotic positioning member interface 26 of the end effector 10 can alternatively or additionally facilitate the electrical connection or coupling of the end effector 10 to an external object or system 29 ("external" meaning the object or system 29 is not part of the end effector 10), such as a computer or server system, via an electrical interface of the external object or system 29. Such an external object or system 29 can further be electrically connected to or in electrical communication with the robotic positioning member 25 and/or the platform 28 via a similar electrical interface between these, wherein the end effector 10, the robotic positioning member 25, the platform 28, and the external electrical object/system 29 are all in electrical communication with one another. The term "electrical communication" refers to the potential for and the actual of at least one of signal transmission, data (e.g., text, audio, video data, or any combination of these) transmission, power transmission, or any others as will be recognized by those skilled in the art.

This can be accomplished over at least one of wired or wireless connections (i.e., one or the other alone, or both of these in combination).

The robotic positioning member interface of the end effector 10 and the end effector interface of the robotic positioning member 25 can each comprise respective one or more interfacing members having one or more interfacing surfaces that can come together to engage, join, connect, link, interlock, couple, or otherwise interface with one another. The robotic positioning member interface of the end effector 10 and the end effector interface of the robotic positioning member 25 can further comprise one or more actuatable joints that facilitate relative movement between these (e.g., a bi-directional rotational joint, a multi-degree of freedom translational and rotational joint, or others).

The robotic positioning member 25 can comprise any robotic system capable of being moved or manipulated (i.e., actuated) relative to the platform 28 to position the end effector 10 in a desired position (and thus the end effector 10 also being moveable relative to the platform 28), such as in a position to acquire an article, in one or more positions to move or manipulate the article, and a position to release an acquired article. In one example, the robotic positioning member 25 can comprise an actuatable robotic arm having one or more actuatable joints capable of facilitating movement of the robotic arm in more degrees of freedom, thereby being able to position the end effector 10 into any desired position. In another example, the robotic positioning member 25 can comprise an actuatable post or tower. The post or tower can comprise one or more moveable portions that facilitate positioning of the end effector 10 in multiple degrees of freedom, such as in one, two, three, four, five, and/or six degrees of freedom or any combination of these. For example, the post or tower can comprise a moveable portion that facilitates positioning of the end effector along a horizontal axis relative to ground (e.g., one or more rotational members supported about a second structural member, wherein the rotational member(s) is/are rotatable about an axis normal to ground), one or more moveable portions that facilitate positioning of the end effector along a vertical axis relative to ground (e.g., telescoping members, or one or more other extensible members), or a combination of these. The post or tower can further comprise one or more jointed structural members capable of providing rotation of the end effector in one or more rotational degrees of freedom (e.g., structural members that rotate relative to one another). Of course, other types of robotic positioning members 25 having different configurations will be apparent to those skilled in the art, and such are contemplated herein. In another example, the robotic positioning member can comprise a boom (e.g., a boom structure moveable in one or more degrees of freedom via a plurality of support members and actuatable joints), such as a telescoping boom, an articulating boom, or a combination of these, which boom can be supported about a platform similar to the robotic arm discussed above.

The platform 28 can be any object, structure, system, or machine operable to provide at least one of structural or electrical and general operational support for the robotic positioning member 25 and the end effector 10. In one example, the platform 28 can comprise a moveable object, structure, system, or machine having the robotic positioning member 25 supported thereby or thereon to which the end effector 10 is coupled, connected or otherwise attached, such as a moveable robot (e.g., a humanoid or other type of robot), a wearable exoskeleton, a mobile platform (e.g., a vehicle, cart, truck, water craft, etc. that is operable to move about an environment), or any other moveable object, structure, system or machine as will be apparent to those skilled in the art. In another example, the platform 28 can comprise a stationary object, structure, system or platform having the robotic positioning member 25 supported thereon or thereby to which the end effector 10 is coupled, connected or otherwise attached, such as a post, tower, a structure or floor or a building, a frame or other assembled structure, or any other stationary object, structure, system or platform as will be apparent to those skilled in the art. The end effector 10 can be coupled, joined, connected or otherwise attached to the robotic positioning member 25 supported by the platform 28 via the respective interfaces discussed above, and by any known coupling means (e.g., screws, bolts, adhesive, brackets, or more complex mechanical systems or mechanisms, etc.) without any intended limitation. More specifically, the robotic positioning member interface 26 of the end effector 10 and the end effector interface of the robotic positing member 25 can be operable with any type of coupling means operable to facilitate the coupling, connection, or otherwise attachment of the end effector 10 to the robotic positioning member 25 via their respective interfaces.

In one specific example, the end effector 10 can comprise a baggage managing end effector type that can be configured to acquire and manipulate or move articles in the form of bags or baggage used by passengers for air, ground and/or water travel, and the platform 28 can comprise a mobile vehicle or platform, such as a utility vehicle (e.g., tow tractor) operating on the tarmac of an airport configured for baggage handling and movement (e.g., the transport of baggage to and from one location to another). The utility vehicle can be in support of the robotic positioning member 25 in the form of an actuatable robotic arm, wherein the utility vehicle can transport the robotic arm and the baggage managing end effector 10 from location to location (macro positioning of the baggage managing end effector 10), and wherein the robotic arm can then further move and position the end effector 10 into any desired position, such as for baggage acquisition or release (micro positioning of the end effector 10).

The capture device 16 can be coupled to the arm 12, the article interface system 18, or a separate structure of the end effector 10. In another example, the capture device 16 can be coupled directly to the robotic positioning member 25 via the interfaces of these elements (see dotted lines between the interface of the capture device 16 and the robotic positioning member 25). This can be accomplished via a separate mechanical and/or electrical interface (see M/E interface of capture device 16) shown in dotted lines) designed and operable to mechanically and/or electrically couple the capture device 16 directly to the robotic positioning member 25.

The arm 12 and/or the article interface system 18 can be positionable to facilitate displacement of the article and to apply one or more engagement forces between the article and the capture device 16. The end effector 10 can optionally include one or more sensors, such as a sensor 30 (e.g., a load, pressure, position sensor or other type of sensor), operable with at least one of the capture device 16 or the arm 12, wherein the sensor 30 and any other sensors can be operable to measure or be used to derive an engagement force acting on the article, a pressure within a volume of a suitably configured capture device, or a position of one or more displaceable elements of a suitably configured end effector to indicate a state or condition of the article as acted upon by the end effector 10, and if/when a state of acquisition of the article within the capture device 16 has been achieved. The sensor 30 and any other sensors can be placed anywhere on the end effector 10 (e.g., on the article interface system 18, the arm 12, the capture device 16, the article interface surface 22, and/or any joints or actuators), where the sensor 30 and any other sensors can measure the engagement force between the article and the capture device 16, the pressure within the volume, or the position of any element of the end effector 10.

Using sensor 30 as an example, the sensor 30 can operate to sense certain levels of forces and loads between the article and the capture device 16 that indicate a state of the article relative to the capture device 16 in the end effector 10. For example, the article interface system 18 can be configured to transition from one position to another relative to the article upon the sensor 30 detecting a threshold first stage engagement force as the article is caused to engage the capture device. Furthermore, a state of acquisition of the article can be indicated to be achieved upon the sensor 30 detecting a predetermined threshold of a second stage engagement force where the forces acting on the article from the end effector 10 are sufficient to counter collective outside forces acting on the article.

The end effector 10 can further include a computing device 32 in communication with various components of the end effector 10 and comprising at least a processor, and a memory device configured to store instructions that can be carried out by the processor to operate the various functions of the end effector 10. The computing device 32 can be otherwise known as a controller. Additional disclosure regarding exemplary robotic end effectors (such as end effector 10) and the computing device 32 in control of the end effector 10 are found below.

Various examples of robotic end effectors based on the basic end effector 10 schematically shown in FIG. 1 are described below with reference to the figures.

Figure 2:
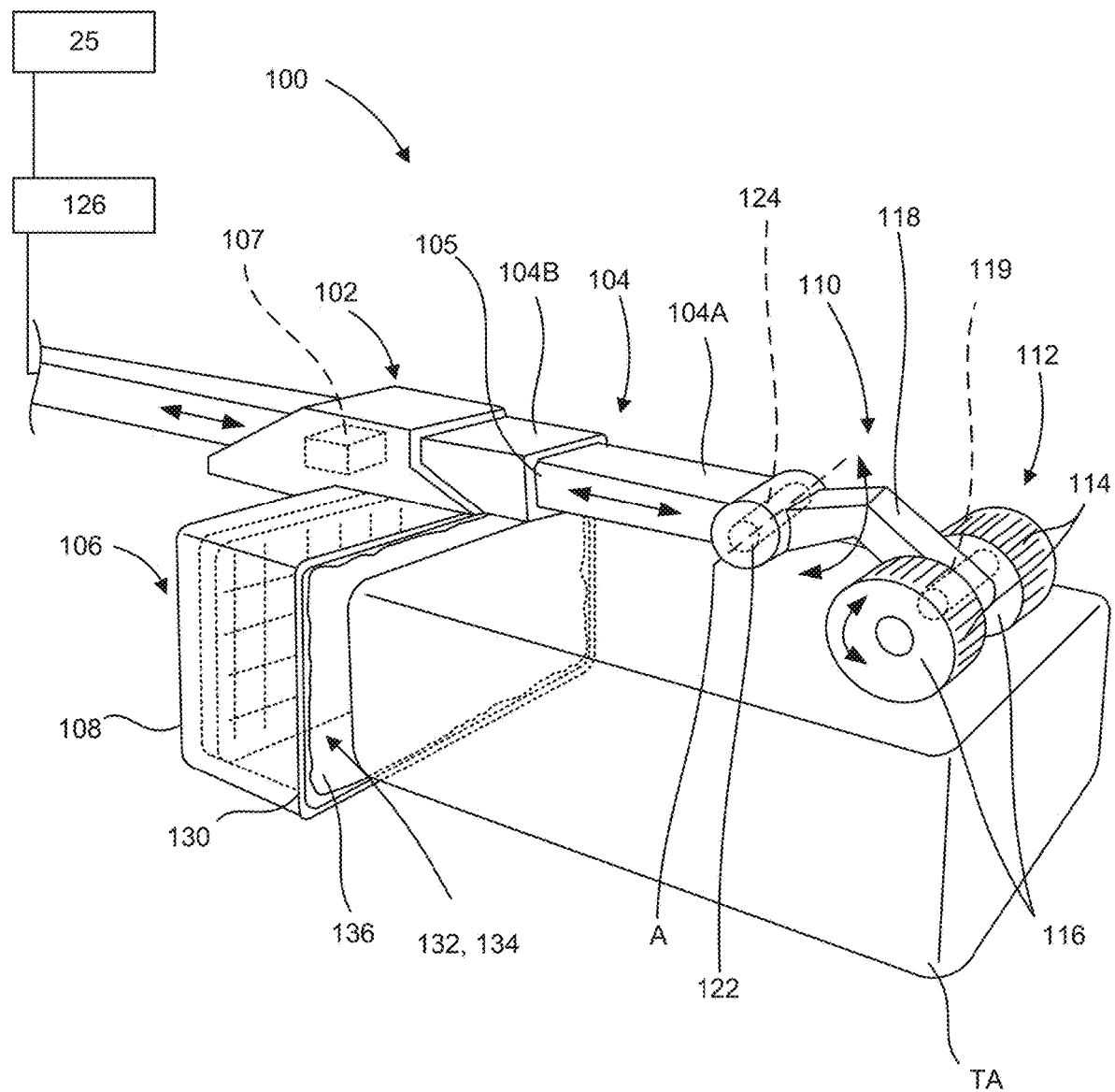
FIG. 2 illustrates a front elevation view of a robotic end effector in accordance with at least one example of the present disclosure.
Figure 3:
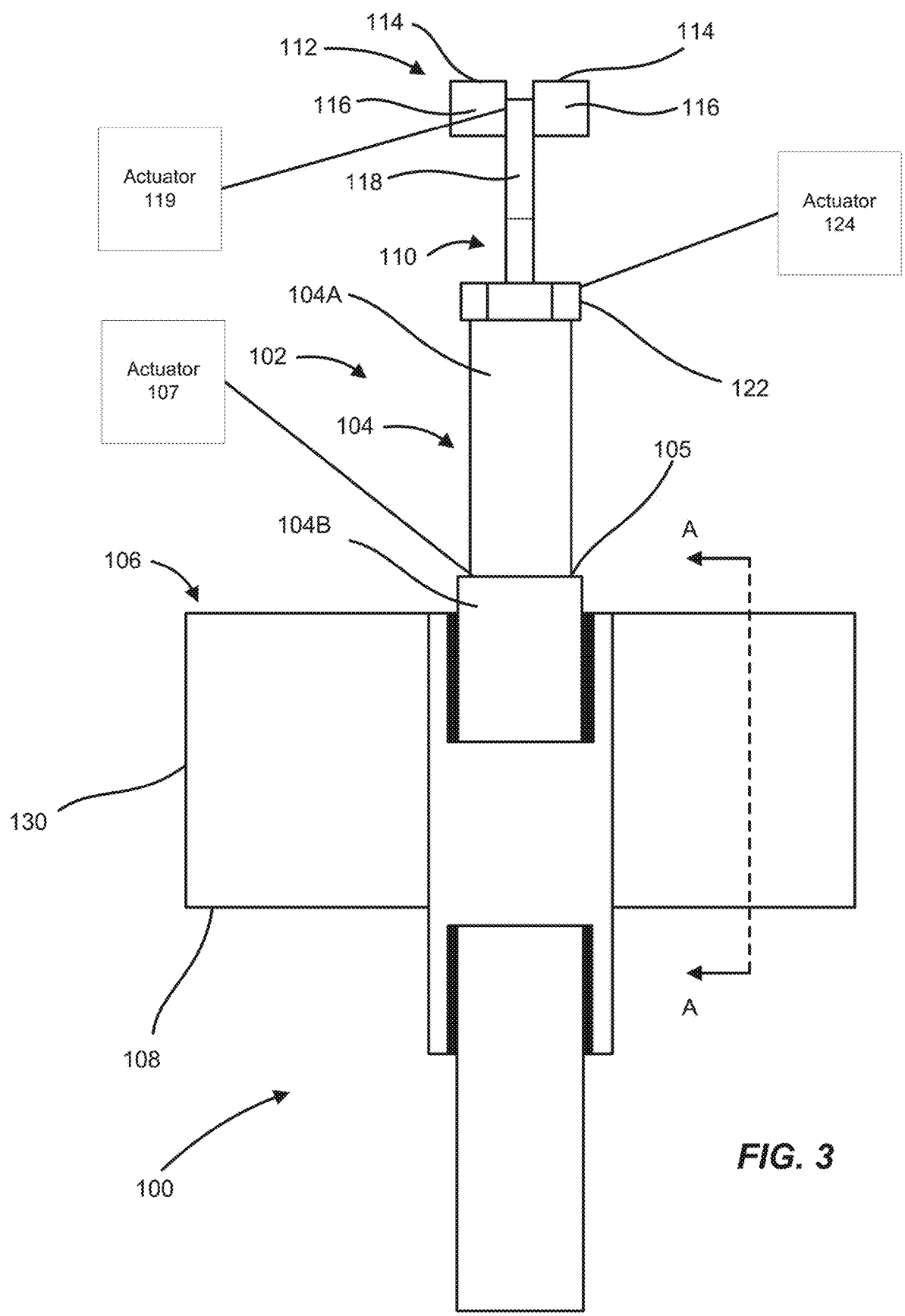
FIG. 3 illustrates a top view of the robotic end effector of FIG. 2.

FIG. 2 illustrates a front elevation view of a robotic end effector 100 in accordance with an example of the present disclosure. FIG. 3 illustrates a top view of the end effector 100. With reference to FIGS. 1, 2 and 3, the end effector 100 can be configured to acquire, move, lift, manage, or otherwise manipulate a target article TA. In the example shown, the end effector 100 can be configured as a baggage management type of end effector, and the target article TA can be a piece of luggage or baggage commonly used for traveling. However, it is to be understood that the end effector 100 can be other types, and that the article could be any other item to be acquired and lifted from a first location, and then moved to and released at a different or second location, without limitation. As a specific, non-limiting example, the end effector 100 can be used with articles that are commonly loaded on to a transport or vehicle (e.g., airplane, train, bus, ship/boat) for humans or that are cargo.

The end effector 100 can include an arm in the form of an extendable arm 102 comprising a first support member 104. The end effector 100 can further include a capture device 106 comprising a support base 108. The end effector 100 can further include an article interface system 110 supported by the first support member 104 of the extendable arm 102. The article interface system 110 can comprise an articulating arm 118 coupled to the first support member 104 of the extendable arm 102, the articulating arm 118 providing support for an actuatable article engagement device 112 comprising at least one article interface surface 114. The actuatable article engagement device 112 can be operable to interface with the target article TA to facilitate movement of the target article TA toward the capture device 106. Various configurations, structures, and alternative designs for each of the capture device, the article interface system, the actuatable article engagement device, and the extendable arm will be described in further detail elsewhere in this disclosure.

With respect to the extendable arm 102, the extendable arm 102 can comprise a first support member 104 and a second support member. In the example shown, the first support member 104 can comprise a first link 104A and the second support member can comprise a second link 104B that are moveable relative to one another. For example, the first link 104A can be made to translate with respect to the second link 104B. As illustrated, the first link 104A and the second link 104B of the extendable arm 102 can be configured as telescoping support members with the first link 104A being configured to slide in and out of the second link 104B in a telescoping fashion such that the extendable arm 102 is a telescoping arm. However, the first link 104A can be moveably coupled to a second link 104B in any way in which the first link 104A is actuatable to move in a linear direction along an axis (longitudinal axis) of the extendable arm 102 relative to the second link 104B without any intended limitation. In other words, the first link 104A is moveably coupled to the second link 104B and is actuatable to move in a linear direction along an axis (longitudinal axis) of the extendable arm 102 either in a telescoping fashion or in any other way in which linear translation of a support member can be achieved. The extendable arm 102 can be configured in many different ways other than as shown in FIGS. 2 and 3. For example, the extendable arm can be configured to comprise one or more links connected via one or more types of joints that facilitate movement in any manner of one or more links relative to any other links in any type of degree of freedom, such as linearly, rotationally, or in any combination of these.

To achieve translation of the first link 104A and the second link 104B relative to one another, the first and second links 104A and 104B can be coupled together at an actuatable joint 105. An actuator 107, whether being a linear, rotational, or other type of actuator, associated with the actuatable joint 105 can be operable to impart translational motion between the second link 104B and the first link 104A to move these relative to one another in at least one degree of freedom (such as a linear degree of freedom, or in other words, a translating degree of freedom). In other words, depending upon the configuration of the extendable arm 102 the actuator 107 can move at least one of the first link 104A or the second link 104B to achieve relative translational motion between the first and second links 104A and 104B. In the example shown, the actuator 107 can comprise a linear or a rotational actuator operable to extend and retract the first link 104A relative to the second link 104B.

The actuatable article engagement device 112 of the article interface system 110 can include one or more rollers 116 moveably coupled to the articulating arm 118 and indirectly to the extendable arm 102. In the example of FIGS. 2 and 3, the one or more rollers 116 can be indirectly coupled to the first support member 104, namely to the first link 104A, by being coupled to the articulating arm 118, which can be rotatably coupled to the first link 104A of the first support member 104 of the extendable arm 102. In alternative configurations, the one or more rollers 116 can be coupled directly to the second link 104B or first link 104A of the first support member 104. The article interface surface (s) 114 can include one or more surfaces 114 of the one or more rollers 116.

The articulating arm 118 of the actuatable article engagement device 112 of the article interface system 110 can be an articulating arm 118 that is moveably coupled to the first support member 104 (in this example the first link 104A) of the extendable arm 102 at an actuatable joint 122. The articulating arm 118 can alternately be referred to as a rotating arm that is rotatably coupled to the extendable arm 102 at a rotational joint (e.g., actuatable joint 122). The actuatable joint 122 can be operable to facilitate relative movement between the first support member 104 and the articulating arm 118 in at least one degree of freedom, and can be operated by driving an actuator 124 to move the articulating arm 118 relative to the first support member 104 in at least one degree of freedom. For example, the actuator 124 can be a rotary actuator operable to rotate the articulating arm 118 about a rotational axis A within a rotational degree of freedom. The actuatable article engagement device 112 can further include the one or more rollers 116 moveably coupled to the articulating arm 118. The rollers 116 can be powered rollers operable to move by driving an actuator 119 in at least one degree of freedom. The article interface surface 114 can include at least one surface of the one or more rollers 116. The actuator 124 can be operable to move the articulating arm 118 about a degree of freedom (e.g., rotational degree of freedom) to cause the powered rollers 116 to also move. In operation, when acquiring the target article TA with the end effector 100, the articulating arm 118 can be actuated to cause the rollers 116 to come into contact with the target article TA to exert a downward force on the target article TA (e.g., a bag). The downward force exerted on the target article TA by the articulating arm 118 can be monitored by one or more sensors of the end effector 100, such that a suitable force is applied to facilitate movement of the target article TA, but not damage the target article TA. Once an appropriate downward force is applied to the target article TA from actuation and movement of the articulating arm 118, the rollers 116 can then be actuated via the actuator 119 to rotate, thereby exerting or imparting a force to the target article TA in a direction toward the capture device 106. The actuator 119 can be operated to cause the rollers 115 to rotate in an opposite direction as well, if needed.

In the example shown, the extendable arm 102 can comprise the robotic positioning member interface 126 operable to facilitate coupling the end effector 100 to the robotic positioning member 25. The robotic positioning member interface 126 can be integrally formed with the extendable arm 102 or otherwise part of the extendable arm 102. The robotic positioning member interface 126 can comprise any structure or configuration, and can have any number of interfacing surfaces operable to facilitate interfacing with the end effector interface of the robotic positioning member 25 for the purpose of coupling the end effector 100 to the robotic positioning member 25. In one example, the interfaces can facilitate removable coupling of these, such that the end effector 100 can be selectively attached or coupled and removed from the robotic positioning member 25. Specific interface configurations are not shown in detail herein, but these will be apparent to those skilled in the art. Additionally, one or more couplers or coupling means can be used to secure the coupling of the end effector 100 to the robotic positioning member 25, such as fasteners, quick-connect systems, or any other types.

The capture device 106 can be supported so as to be accessible by the extendable arm 102 and the article interface system 110 supported by the extendable arm 102. In one example, the capture device 106 can be coupled to the extendable arm 102, such as the second support member (in this example the second link 104B) of the extendable arm 102. The capture device 106 can be coupled to other parts of the extendable arm 102, depending upon how the extendable arm 102 is configured. In another example, the capture device 106 can be uncoupled from any part of the extendable arm 102 and supported about the robotic positioning member 25 or even the platform 28 without departing from the present disclosure. The support or connection point of the capture device 106 with the rest of the end effector 100 is not intended to be limited by this disclosure, so long as the capture device 106 is properly positioned and able to function to capture the target article TA as acted upon by the extendable arm 102 and the article interface system 110. In other words, the extendable arm 102 can be manipulated to position the article interface system 110 adjacent the target article TA to be acquired. Once in position, the article interface system 110 can be manipulated to move the target article TA. The capture device 106 can be supported in any manner, such that it is caused to be in a position to receive the target article TA as the extendable arm 102 and the article interface system 110 are caused to move the target article TA into engagement with the capture device 106. This process is discussed in more detail below.

The acquisition of an example target article TA by the end effector 100 will be described with reference to FIGS. 1-3, 4A, 4B, 4C, 4D, and 4E. Each of FIGS. 4A-4E are side cross-sectional views of the end effector 100 taken along line AA shown in FIG. 3. In such a configuration, the interior of the capture device 106 is illustrated. In this example method or process for acquiring the target article TA, such as a bag or baggage, the capture device 106 of the end effector 100 can include a support base 108 comprising a base plate 127 having a support surface 128. The support base 108 can alternatively be referred to as a support structure. At least one wall 130 can extend from the base plate 127 to define an opening 132 and a volumetric interior 134 of the capture device 106. The size of the volumetric interior 134 is not intended to be particularly limited by this disclosure in any way. The size of the volumetric interior 134 can be established based on context and application. For example, in an airline baggage handling context, the volumetric interior can be sized at about 25" wide×18" high, so that at least a portion of the target article TA the size of a commonly-used luggage bag checked on an airline can be received by the capture device 106 and in the volumetric interior 134 with room for clearance between the bag and the wall 130 defining the volumetric interior 134. In one example, the at least one wall 130 can be four walls substantially circumscribing the base plate 127. The opening 132 can be defined by the at least one wall 130 and positioned opposite the base plate 127.

Figure 4A:
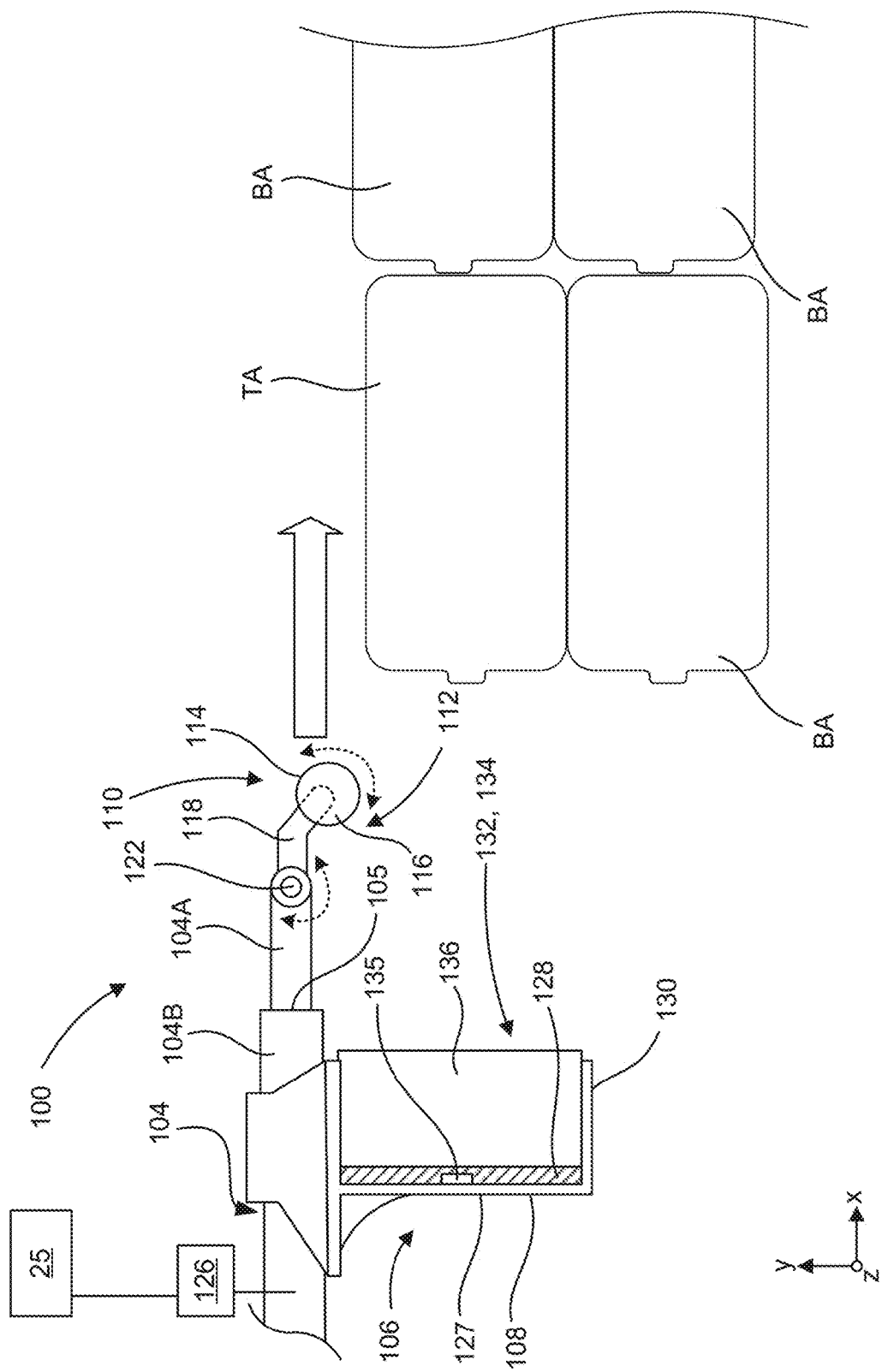
FIGS. 4A-4E illustrates a process of acquiring a target article in accordance with at least one example of the present disclosure using the robotic end effector of FIG. 2.

To acquire the target article TA, various method steps can be carried out to obtain the target article TA. The target article TA can be alone or can be stacked or surrounded on multiple sides by one or more other articles BA to be later acquired, as shown in FIG. 4A. The articles (e.g., TA and BA) can be stacked on the ground, on a trailer, on a flat-bed, on a utility vehicle, on a floor (e.g., warehouse, shipping or loading dock, store, etc.), on a rack, on a shelf, or on any other support surface capable of supporting the articles TA and BA without limitation. Thus, the target article TA can be positioned on top of a support surface, such as another article BA, and may be located proximate a lateral surface, such as a lateral proximate article, on one side, two sides, or three sides. The lateral surface may be other articles BA or other structures. The articles TA and BA, in other words, are at a first location and are awaiting acquisition and management, such as movement from one location to another location. For example, it may be the intent to acquire and move the articles TA and BA from the first location and load these onto a vehicle or conveyor. Or, it may be that the articles TA and BA are to be unloaded from a vehicle or other first location. Those skilled in the art will recognize that the type and condition of the first location where the articles TA or BA currently reside ready to be acquired by the end effector 10 and the second location where the articles TA and BA are to be moved to and released is not intended to be limiting in any way.

Figure 4B:
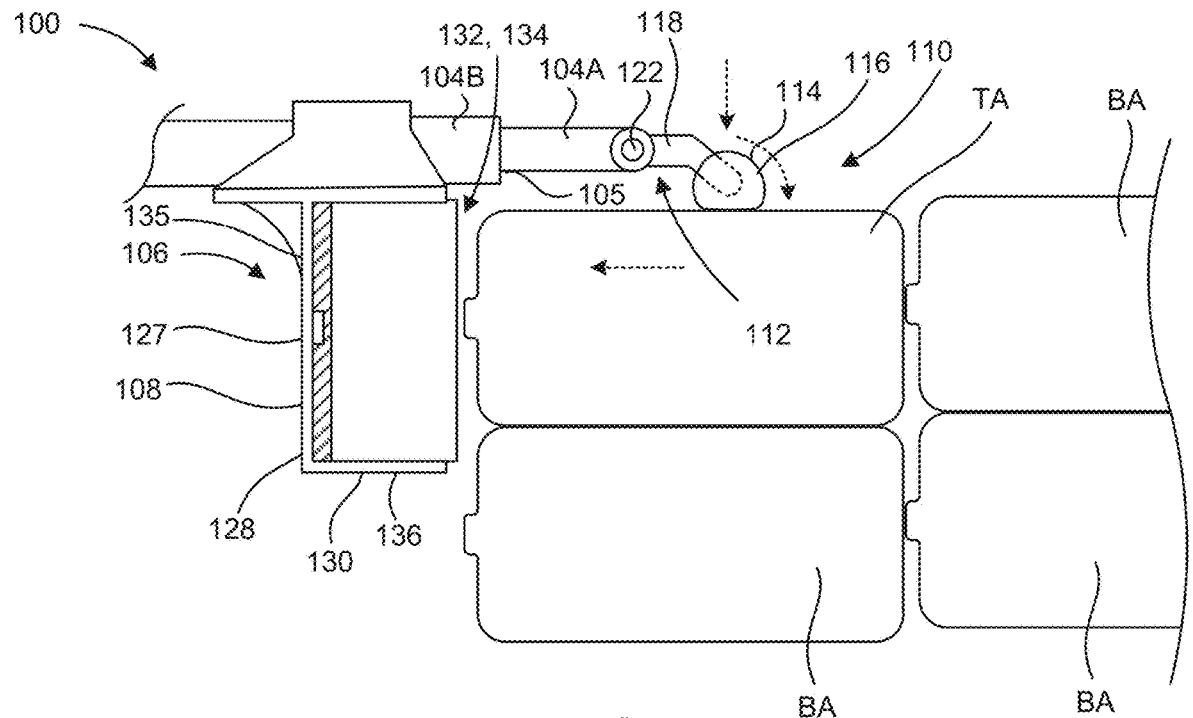

In a step of acquisition, the end effector 100 can be initially separated from or located away from the target article TA to be acquired (i.e., the end effector 100 can be positioned in an initial position as shown in FIG. 4A). From the initial position of FIG. 4A, the end effector 100 can be moved into a position in which the end effector 100 is in operational proximity to the target article TA, as shown in FIG. 4B (the term "operational proximity" meaning that the end effector 100 is brought to a position, via macro positioning movements by the platform 28 or the robotic positioning member 25 to which the end effector 100 is coupled, where the end effector 100 is capable of acting on the target article TA by micro positioning and actuation/operation movements of one or more components of the end effector 100). For example, the end effector 100 can be moved from the initial position into operational proximity to the target article TA by manipulating the robotic positioning member 25 (e.g., a robotic arm) toward the target article TA, such that the end effector 100 is brought into operational proximity with the target article TA. Additionally or alternatively, the robotic positioning member 25 can be attached to a mobile platform 28 (e.g., a utility vehicle) that is able to be operated at least one of autonomously or actively by a user to move the robotic positioning member 25 and end effector 100 at least partially into proximity to the target article TA, which proximal location may comprise operational proximity, or where the robotic positioning member 25 may further be required to bring the end effector 100 into operational proximity to the article(s) TA and BA in the event the mobile platform 28 is unable achieve this level of proximity. As indicated herein, the platform 28 method or system used to move and/or facilitate the end effector 100 being brought into proximity with the target article TA is not intended to be limited by this disclosure in any way.

When in the position shown in FIG. 4B, the end effector 100 can be operated to cause the article interface surface 114 to engage with the target article TA. For example, the entire end effector 100 and/or the robotic positioning member 25 (e.g., robotic arm) to which the end effector 100 is attached can be moved in any direction into a position where the article interface surface 114 is caused to come into contact with the target article TA. Similarly, or additionally, the end effector 100 can be operated to cause the capture device 106 to be positioned proximate or opposing the target article TA.

Alternatively, or additionally, the extendable arm 102 can be extended (e.g., the first support member or in this case the first link 104A can be extended relative to the second support member or in this case the link 104B) in a linear degree of freedom by actuating actuatable joint 105 via actuator 124 until the article interface surface 114 is caused to be in contact with the target article TA or in close proximity to the target article TA. Similarly, or additionally, the extendable arm 102 can be extended until the capture device 106 is positioned proximate or opposing the target article TA.

Additionally, or alternatively, the article interface system 110 supported by the extendable arm 102 can be operated to move the actuatable article engagement device 112 (in this example rollers 116) with its article interface surface 114 into contact with the target article TA to interface with the target article TA and to facilitate movement of the target article TA toward the capture device 106. For example, the article interface system 110 can facilitate movement of the target article TA by first moving the actuatable article engagement device 112 from an initial position (e.g., shown in FIG. 4A) out of contact with the target article TA to a first position (e.g., shown in FIG. 4B) relative to the target article TA in which the actuatable article engagement device 112 with its article interface surface 114 engages with the target article TA. As shown in the figures, the actuatable article engagement device 112 can be supported by or from the articulating arm 118. The articulating arm 118 can be moveably coupled to the first support member 104 of the extendable arm 102, in this case the first link 104A, at the actuatable joint 122. The actuatable joint 122 can be operated by the actuator 124 to facilitate relative movement between the first support member 104 (first link 104A) and the article interfacing system 110, comprising the articulating arm 118 and the actuatable article engagement device 112, in at least one degree of freedom (e.g., a rotational degree of freedom along axis A). The method for moving the article interface surface 114 to engage with the target article TA can include operating the actuatable joint 122 to position the article interface system 110, including the articulating arm 118 and the actuatable article engagement device 112, relative to the first support member 104 (the first link 104A) to position the article interface system 110 in the first position shown in FIG. 4B and to cause the article interface surface 114 of the actuatable article engagement device 112 to engage with the target article TA. For example, the actuator 124 can rotate the articulating arm 118 relative to the first support member 104 (the first link 104A) to move the articulating arm 118 and/or the actuatable article engagement device 112 (in this example, rollers 116) toward the target article TA to engage the article interface surface 114 with the target article TA. As discussed further below, engagement of the actuatable article engagement device 112 with the target article TA can further comprise actuating the actuatable joint 122 to cause the article interface system 110, namely the actuatable article engagement device 112 via further actuation and rotation of the articulating arm 118, to exert a force (in this case a downward force) on the target article TA as needed or desired following contact of the actuatable article engagement device 112 with the target article TA.

Figure 4C:
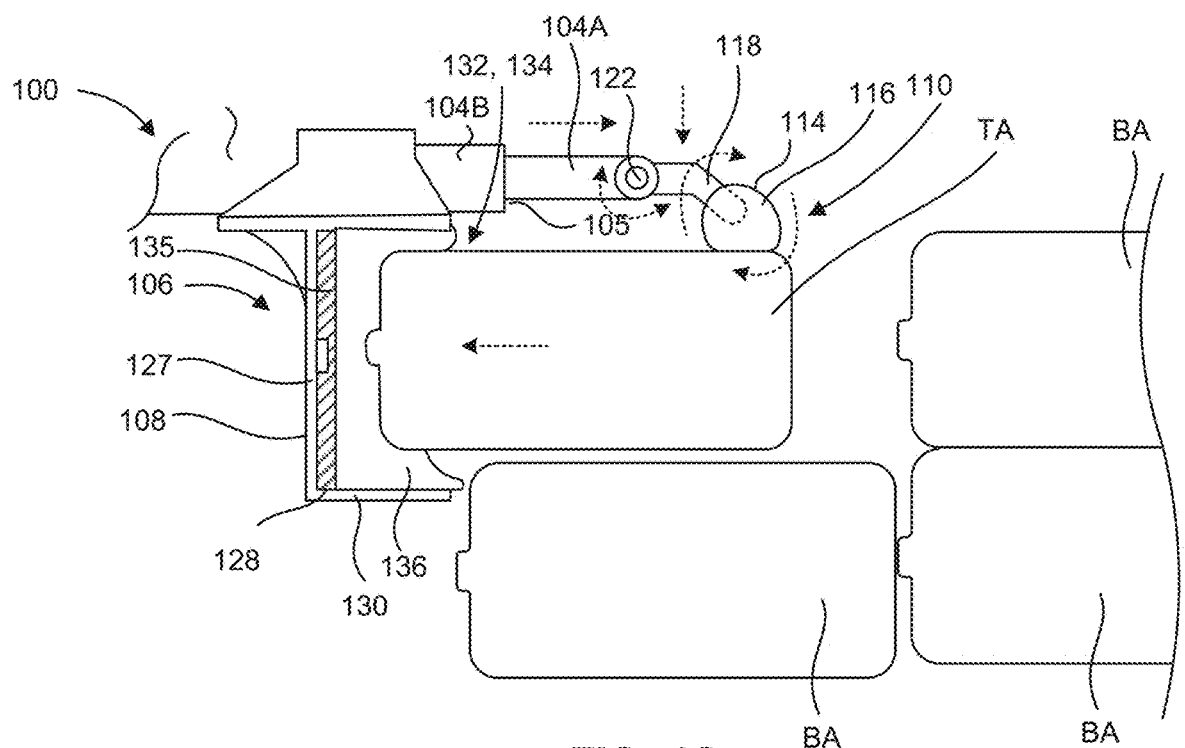

Following engagement between the article interface surface 114 and the target article TA, and after a suitable force by the article interface system 110 is exerted on the target article TA, the actuatable article engagement device 112 of the article interface system 110 can be actuated to cause the target article TA to move in a direction toward the capture device 106 until the target article TA comes into contact with the capture device 106. The actuatable article engagement device 112 can be actuated by rotating the articulating arm 118 using the actuator 124 as the articulating arm 118 is rotatably coupled to the first support member 104 of the extendable arm 102 via the actuatable joint 122. The articulating arm 118 can be actuated to apply a first stage engagement force (e.g., a force exerted on the target article TA sufficient to facilitate movement of the target article TA toward and into the capture device 106) to the target article TA with the article interface system 110 in the first position. As shown in FIG. 4B, the first position can be with the article interface system 110 (e.g., with the article interface surface 114) in contact with a top surface of the target article TA. As recited above, the actuatable article engagement device 112 can further include one or more powered rollers 116 movably coupled to the articulating arm 118 and driveable by the actuator 119. The article interface surface 114 can be a surface of one or more of the powered rollers 116. Moving the target article TA toward and into contact with the capture device 106 can include driving the powered roller 116 to apply the first stage engagement force to the target article TA as it comes into contact with the capture device 106. FIG. 4C illustrates the movement of the target article TA into contact with the capture device 106 (and the proximal end of the target article TA into the volumetric interior 134 of the capture device 106) and the application of the first stage engagement force on the target article TA by operation of the one or more powered rollers 116. Movement or actuation of the extendable arm 102 (e.g., extension and retraction of the first support member (e.g., first link 104A) relative to the second support member (e.g., second link 104B) can also be effectuated separately or independently from or simultaneously with actuation of the article interface system 110 to assist in the movement of the target article TA towards and into contact with the capture device 106.

In the method of acquiring the target article TA, the actuatable joint 122 can be further operated by the actuator 124 to position the articulating arm 118 relative to the first support member 104 (e.g., first link 104A) in order to move the article interface system 110 from the first position (shown in FIGS. 4B and 4C where the article interface surface 114 of the actuatable article engagement device 112 is positioned engaged with the top surface of the target article TA) to a second position, with the target article TA being maintained in contact with the capture device 106. The second position of the article interface system 110 is shown in FIGS. 4D and 4E where the article interface surface 114 of the actuatable article engagement device 112 is engaged with a rear or distal surface of the target article TA.

Figure 4D:
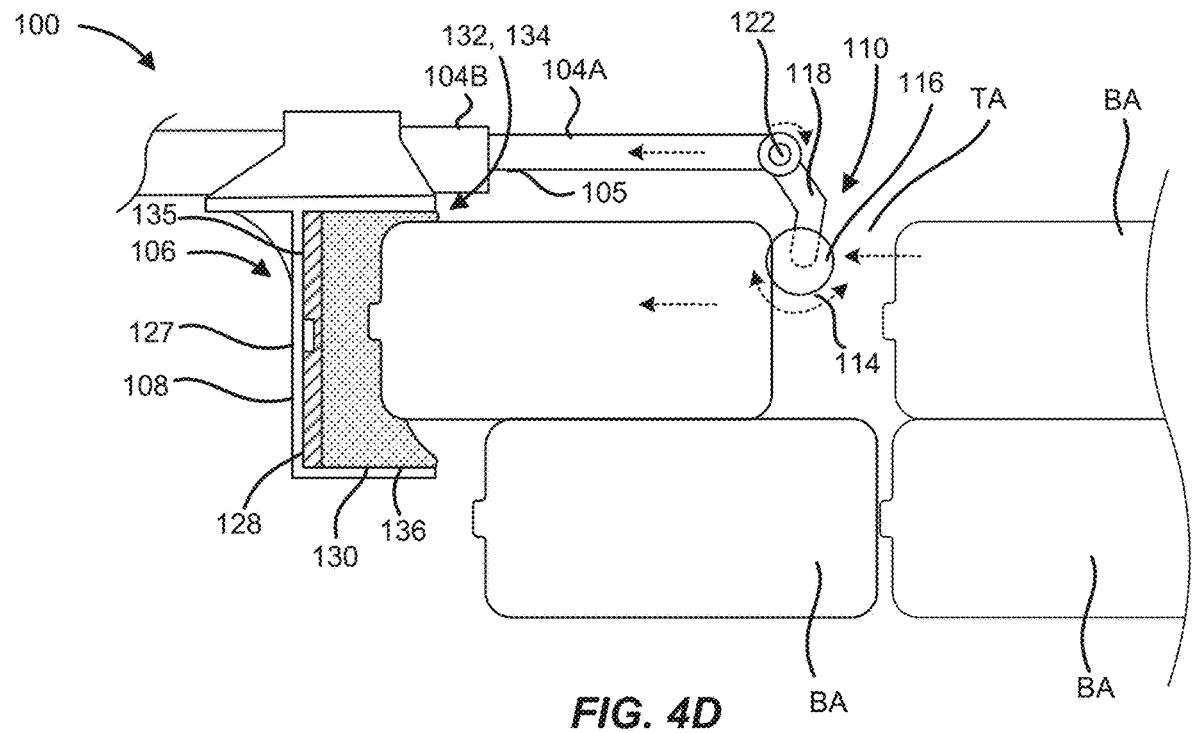
Figure 4E:
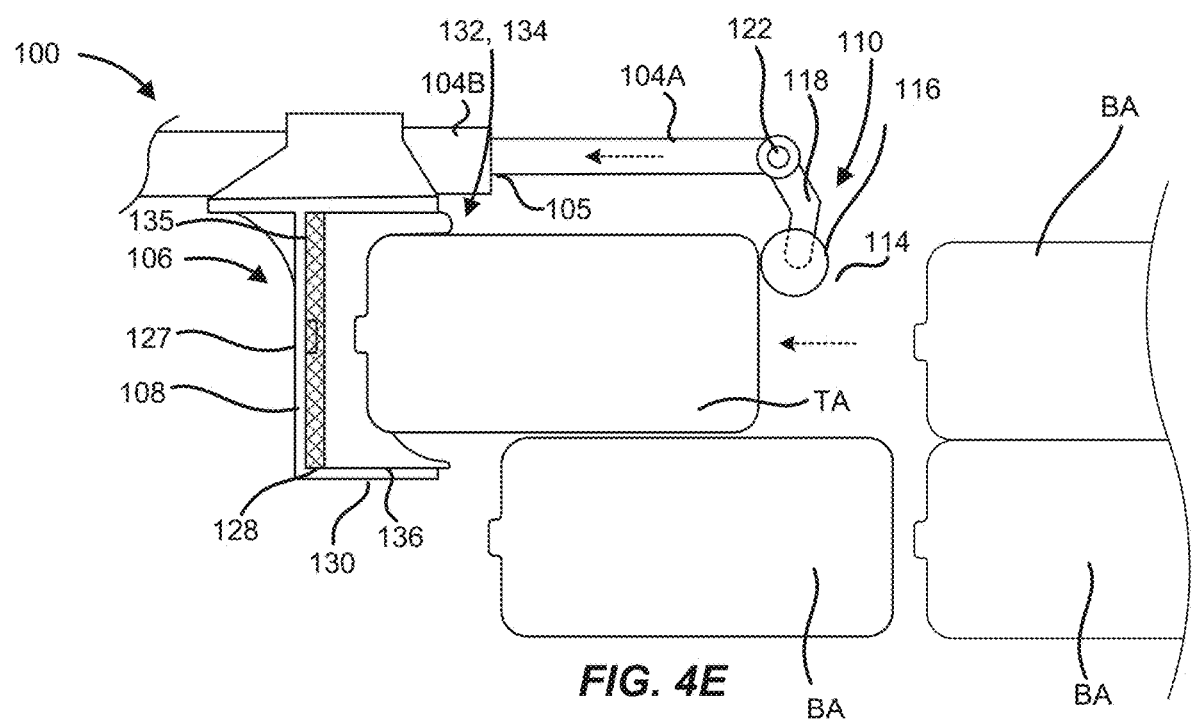

Although certainly not required, in one example, the process of transitioning from the first position to the second position can be carried out, such that the article interface surface 114 of the actuatable article engagement device 112 is caused to maintain contact with the target article TA as the article interface system 110 transitions from the first position (e.g., as shown in FIG. 4C) to the second position (e.g., as shown in FIG. 4D). By maintaining contact between the article interface surface 114 and the target article TA, the forces acting on the target article TA by the end effector 100 (including those by the capture device 106 and the article interface system 110) can be maintained as the target article TA is in the process of being captured in order to prevent the target article TA from dropping out of the end effector 100 during acquisition. To help maintain contact between the article interface system 110 and the target article TA, the article interface system 110 can transition from the initial position to the first position (shown in the transition of the article interface system 110 from FIG. 4A to FIG. 4B) at a first velocity and can transition from the first position to the second position (shown in the transition of the article interface system 110 from FIG. 4C to the FIG. 4D) at a second velocity that is greater than the first velocity. By transitioning from the first position to the second position quickly, the article interface system 110 can switch from engaging the top surface of the target article TA to engaging with the rear or distal surface of the target article TA without an extended of period of time elapsing in which the target article TA is not being acted upon by the article interface system 110 and in which the target article TA is at risk of falling out of the end effector 100. If necessary or desired, the extendable arm 102 can also be actuated in a strategic manner separately (i.e., independently) or at the same time as the article interface system 110 to assist in the transition of the article interface system 110 from the first position to the second position.

Again, the end effector 100 can further comprise a sensor that can be deployed and that is operable to measure the force acting on the article (e.g., a downward force) by the article interface system 110. The sensor can further facilitate the maintaining of the article interface system 110 in continuous contact with the target article TA by sensing the force applied thereto and providing the computing device 32 (i.e., controller) information to maintain this force at a certain threshold or within a certain range of forces, such that the article interface system 110 does not come out of contact with the target article TA. For example, if the force applied falls below a certain given threshold, the articulating arm 118 can be actuated to increase the applied force. Conversely, if the applied force is beyond a given threshold then the articulating arm 118 can be actuated to reduce the applied force. The threshold for increasing the applied force on the target article TA can be the same or different from the threshold for decreasing the applied force on the target article TA (i.e., the force can be kept within a certain range by the computing device 32 (i.e., controller)).

The end effector 100 can further comprise a sensor (e.g., load sensor 135) for measuring the engagement force acting on the article by the end effector 100. In one non-limiting example, as shown in FIGS. 4A-4E, the load sensor 135 can be disposed on or otherwise associated with the support base 108 of the capture device 106. Accordingly, the load sensor 135 can sense a force acting on the capture device 106 (e.g., the support base 108) by the target article TA as it is being forced against the capture device 106 by the article interface system 110 (and, in some cases, separately by or also by the extendable arm 102). Although the load sensor 135 is disposed on the support base 108 of the capture device 106 in FIGS. 4A-4E, it is to be understood that, based on every force having an equal and opposite force, the load sensor can be placed anywhere on the end effector 100 where the engagement force acting on the target article TA by any part of the end effector 100 can be measured (e.g., load sensor can be located on the extendable arm 102, the first support member 104 (the first link 104A), the second support member (the second link 104B), the actuatable joint 105, the actuatable joint 122, the articulating arm 118, the rollers 116, or the joint at which the rollers 116 are coupled to the articulating arm 118).

With the target article TA being in contact with and at least partially supported by the capture device 106 (at this stage the target article TA is supported by both the capture device 106 at one end and the external object or item that it was initially resting on at the opposite end), and with the load sensor 135 deployed to measure the engagement force acting on the target article TA by the article interface system 110, the article interface system 110 can be operable to transition from the first position (shown in FIGS. 4B and 4C) to the second position (shown in FIGS. 4D and 4E) upon the load sensor 135 detecting a threshold first stage engagement force as the target article TA is caused to engage the capture device 106. The threshold first stage engagement force can be set to any desired value based on need, such as the type of article being acquired by the end effector 100, the ability of the end effector 100 to maintain the target article TA in contact with the capture device 106, or others. More specifically, the threshold first stage engagement force can be a value of a force that shows a level of engagement between the target article TA and the capture device 106 sufficient to allow the article interface system 110 to transition from the first position to the second position (e.g., the articulating arm 118 and the actuatable article engagement device 112 (e.g., the rollers 116) transition from on or about the top surface of the target article TA to on or about the rear surface of the target article TA) without the target article TA dropping out of the capture device 106 or falling from the end effector 100. The article interface system 110 can be operated to at least maintain the threshold first stage engagement force measured by the load sensor 135 during transition from the first position to the second position. Although not necessary, as indicated above, in some examples, the article interface system 110 (and/or the extendable arm 102) can be operated to maintain the threshold first stage engagement force by moving to maintain continuous contact between the article interface surface 114 and the target article TA as the article interface system 110 transitions from the first position to the second position.

In an example, in order to further facilitate holding the target article TA in contact with the capture device 106 and to prevent the target article TA from falling out of the end effector 100, the rollers 116 and articulating arms 118 can lock in place. For example, upon transition to the second position, the actuatable article engagement device 112, in this example comprising the one or more powered rollers 116 movably coupled to the articulating arm 118, can be locked in position to prevent further movement relative to the articulating arm 118 and the target article TA, which could cause the target article TA to fall. In other words, the one or more powered rollers 116 can act as a brake or a lock holding the target article TA in contact with the capture device 106. Furthermore, the articulating arm 118 can be locked in any of its rotational positions to prevent movement of the articulating arm 118 about the actuatable joint 122 upon transition from the first position to the second position, such that the articulating arm 118 functions as a stop, brake, or locking member holding the target article TA in the capture device 106.

With the article interface system 110 in the second position as shown in FIGS. 4D and 4E, the end effector 100 can be positioned to apply a second stage engagement force to the target article TA. For example, with the article interface surface 114 of the actuatable article engagement device 112 being engaged with the rear or distal surface of the target article TA, but with the target article TA not yet fully acquired by the end effector 100 as shown in FIG. 4D, the end effector 100 can apply the second stage engagement force to urge the target article TA further into or otherwise more forcefully against the capture device 106. The second stage engagement force can be applied by at least one of actuating the articulating arm 118 using the actuator 124 of the actuatable joint 122, or actuating the extendable arm 102 to retract the first support member 104 (in this case the first link 104A) relative to the second support member (in this case the second link 104B) by activating the actuator 107 to actuate the actuatable joint 105. Either or both of these functions can be employed to apply an increased force to the target article TA against the capture device 106 and to more securely hold the target article TA against the capture device 106.

The target article TA can be urged into or more forcefully against the capture device 106 by the extendable arm 102 or the article interface system 110, or both, until a state of acquisition is achieved, as shown in FIG. 4E. The state of acquisition is defined as a state in which the forces acting on the target article TA from the end effector 100 are sufficient to counter collective external forces acting on the article. The collective external forces acting on the article can include gravitational forces acting on the article, stiction between the target article TA and adjacent articles BA or a ground or other initially supporting surface in contact with one or more surfaces of the target article TA, and/or compressive forces acting on the target article TA from any surrounding articles BA. At a point at which the collective external forces acting on the target article TA are countered, the end effector 100 has a strong enough hold on the target article TA to lift, move, transport, or otherwise manipulate the target article from its current or first position to a new or second position, such as that position intended to be achieved for subsequent release of the target article TA. The forces acting on the target article TA from the end effector 100 necessary to overcome the other collective forces acting on the target article TA, such as the predetermined threshold of the second stage engagement force, the forces applied by the article engagement system 110, and any others, can be a value determined by the user experimentally or by experience, or these can be derived and achieved and adjusted in real-time using sensor output data from a plurality of sensors deployed within the end effector 100, wherein the computing device 32 (i.e., controller) autonomously determines the forces necessary to achieve all of the different stages between initial contact with the target article TA and a state of acquisition of the target article TA based on real-time input from the sensors. Using the load sensor 135, a state of acquisition of the target article can be determined to be achieved upon the load sensor 135 detecting a predetermined threshold of the second stage engagement force acting on the target article TA that sufficiently counters collective external forces acting on the target article TA.

Additional features of the capture device 106 can be used to facilitate capture, support, and retention of at least a portion of the target article TA (e.g. the proximal end of the target article TA). For example, the end effector 100 can further comprise a compliant element 136 associated with the capture device 106 for the purpose of distributing forces acting on the capture device 106 by the target article TA, and for providing conformable support to the target article TA during acquisition and once acquired. In other words, the compliant element 136 can conform to at least a portion of the target article TA as the target article TA is caused to interface with and displace and deform one or more surfaces of the compliant element 136, wherein the compliant element 136 at least partially envelops or surrounds portions of the target article TA beyond an end portion of the target article TA (in some examples, such as with a target article TA comprising edges, the compliant element 136 can be caused to extend or wrap around one or more of the edges). With the target article TA in a state of acquisition, the compliant material 136 functions to enhance the captured support of the target article TA over a capture device without such compliant material (a capture device formed of rigid, non-compliant elements).

In one example, the compliant element 136 can be disposed on or otherwise supported by the support base 108 of the capture device 106, such as within the volumetric interior 134 of the capture device 106 defined by one or more walls, such as walls 130. In one example, as shown, the compliant element 136 can comprise or be formed as a single compliant material mass. The size of the compliant element 136 disposed within the volumetric interior 134 is not intended to be particularly limited by this disclosure in any way. The size of the compliant element 136 can be established based on context and application. For example, in an airline baggage handling context, the compliant element 136 can be sized at about 25" wide×18" high, so as to fit in the volumetric interior 134 and such that an article the size of a commonly-used luggage bag checked on an airline can be supported by the compliant element 136 with room for clearance between the bag and the wall 130 defining the volumetric interior 134. With such a size, once the bag or article is embedded, even slightly, within the compliant element 136, the bag would be constrained, at least somewhat, in both the horizontal and vertical directions. The compliant element 136 can also function to accommodate crooked bags that are not aligned parallel with the wall 130.

As shown in FIG. 4C, as at least a portion of the target article TA is moved into the capture device 106 by operation of the article interface system 110 (e.g., the powered rollers 116), the target article TA engages with the compliant element 136 within the volumetric interior 134 of the capture device 106. As the target article TA engages with the compliant element 136, the compliant element 136 deforms to at least partially conform to the shape of the target article TA. The compliant element 136 can act to provide support to the target article TA within the capture device 106 and can act to counter collective forces acting on the target article TA, such as gravitational forces pulling the target article TA downward.

The compliant element 136 contained in the capture device 106 to support the target article TA can be made of any compliant material such as a closed-cell foam material, an open-cell foam material, a rubber material, elastomer, polymer or any other compliant material of any different level of compliance and having or providing a spring or spring-like function (i.e., that comprises an element of elasticity and that possess an elastic modulus (e.g., Young's modulus)) and that is capable of applying a force that acts on an object, wherein the biasing member is capable of storing energy when compressed and releasing energy when the compressing force is removed, or at least partially decreased without any intended limitation. The compliant element 136 can have any cell size, any shape, and any configuration to vary or establish a desired amount of compliance of the compliant element 136. Alternatively, or additionally, the compliant element 136 can be formed into a structure or pattern to establish a desired compliance level for the compliant element 136. For example, removal of certain portions or amounts of compliant material in a certain pattern can add pockets or voids within the compliant material to reduce a force necessary to compress the compliant material and therefore change the compliance of the material. For instance, removing every alternate square inch for the full thickness, or extracting circular sections of the compliant material, or using other cut patterns to remove portions of compliant material can change the compliance.

The compliant element 136 can be a single unitary piece of a compliant material (a compliant material mass) or it can be made up of a plurality of discrete compliant elements arranged in layers on top of each other within the volumetric interior 134 from the support base 108 to and/or through the opening 132. Different layers of different compliant materials can also be used in the capture device 106 in order to establish a desired compliance for the compliant element 136. Furthermore, surface features can be created in the compliant element 136, such as foam bumps, ridges, protrusions or other features to facilitate better support and gripping of the target article TA by the compliant element 136. Alternatively, or additionally, the compliant element 136 can comprise a plurality of discrete compliant elements, each oriented in a direction as supported from the support base 108, and extending towards the opening 132. In some examples, the compliant element 136 can be formed, configured, or otherwise provided, such that the compliant element 136 possesses sufficient compliance to conform to the target article TA. Depending upon the engagement load acting on the target article TA, in some examples, the compliant element 136 can be configured to conform around one or more edges of the target article TA, such as when in a fully acquired state, or when in a state of acquisition.

Furthermore, one or more surfaces of the compliant element 136 can be sealed to prevent fluids, debris and other elements from penetrating the sealed surfaces. For example, the front face (e.g., the face contacted by the target article TA) of the compliant element 136 can be waterproofed by coating or covering the compliant element 136 with a waterproof chemical, membrane, or other waterproof structure to ensure protection from deterioration of the compliant element 136. Other surfaces can be similarly sealed. The load sensor 135 (or other similar or different sensors) can be disposed between the compliant element 136 and the support base 108 in order to sense a load acting on the compliant element 136 by the target article TA.

Figure 5A:
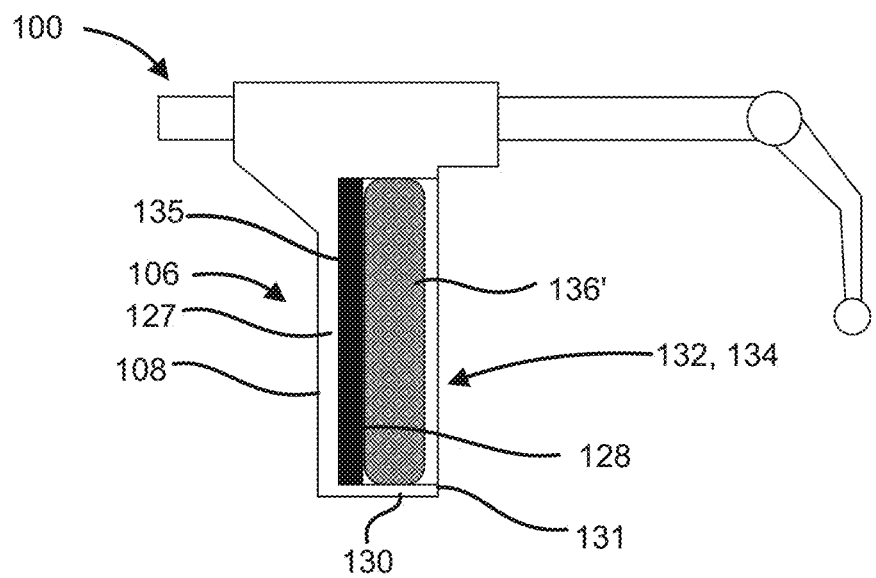
FIG. 5A illustrates a side view of the robotic end effector of FIG. 2 with an alternative configuration of a capture device of the robotic end effector in accordance with at least one example of the present disclosure.
Figure 5B:
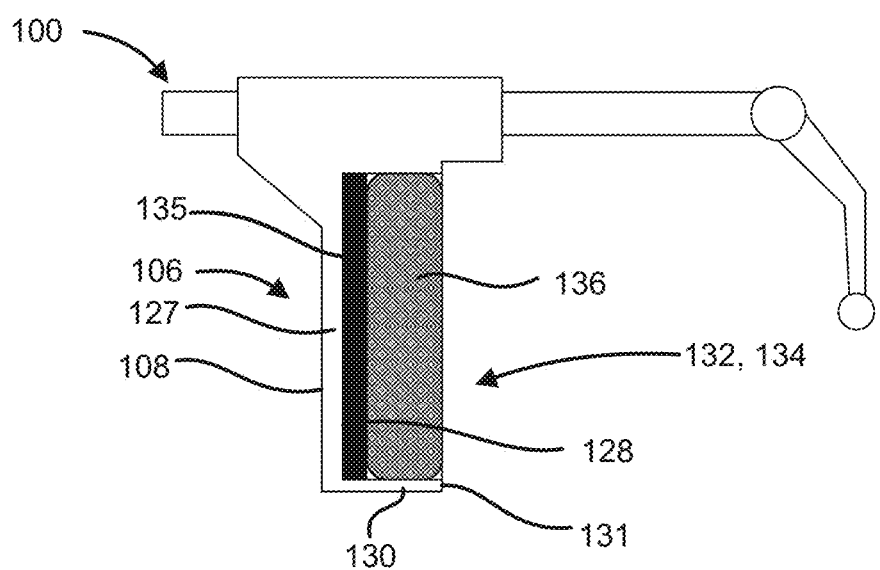
FIG. 5B illustrates a side view of the robotic end effector of FIG. 2 with an alternative configuration of a capture device of the robotic end effector in accordance with at least one example of the present disclosure.
Figure 5C:
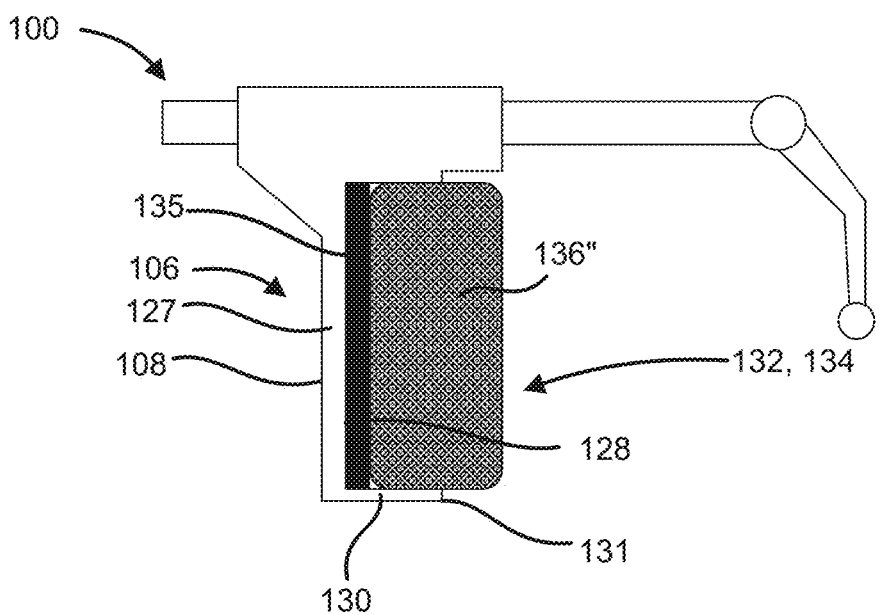
FIG. 5C illustrates a side view of the robotic end effector of FIG. 2 with an alternative configuration of a capture device of the robotic end effector in accordance with at least one example of the present disclosure.

The compliant element 136 can be sized to comprise any desired dimensions. FIGS. 5A-5C illustrate cross-sectional views (e.g., taken along a line similar to line AA of FIG. 3) of capture device 106 containing different sized compliant elements. For example, the compliant element 136' within the volumetric interior 134 of the capture device 106 can be sized such that it is recessed within the volumetric interior 134 of the capture device 106 as shown in FIG. 5A. In other words, the compliant element 136' can be sized and configured so as to be recessed relative to an edge 131 of the wall 130 defining the volumetric interior 134 and the opening 132 of the capture device 106. Alternatively, the compliant element 136 within the volumetric interior 134 of the capture device 106 can be sized and configured so as to be even or flush with an edge 131 of the wall 130 defining the volumetric interior 134 and the opening 132 of the capture device 106, as shown in FIG. 5B. Alternatively, the compliant material 136" within the capture device 106 can be sized and configured so as to extend beyond or outside of the volumetric interior 134 and the opening 132 of the capture device 106 as shown in FIG. 5C. In other words, the compliant element 136" can be sized such that it extends beyond the edge 131 of the wall 130 defining the volumetric interior 134. The compliant element 136" can extend to an outside of the volumetric interior 134. With the compliant element 136" extending beyond the edge 131 of the wall 130, as shown in FIG. 5C, the target article TA being acquired by the end effector 100 can engage with the compliant element 136" before being within the volumetric interior 134 of the capture device 106. Therefore, the target article TA can be at least partially supported by the compliant element 136" before being within the wall 130 or the volumetric interior 134. Furthermore, depending upon the extent that the compliant element 136" extends beyond the opening 132 of the capture device 106, the compliant element 136" can engage with target article TA upon the end effector 100 being moved into position to acquire the target article TA either before or at the point of the article interface system 110 being moved into the first position and prior to operation of the actuatable article engagement device 112 to drive the target article TA toward the capture device 106.

With the load sensor 135 disposed and operable between the compliant element 136" and the support surface 128 of the support base 108, the load sensor 135 can sense a load exerted on the compliant element 136" by the target article TA. With the compliant element 136" extending beyond the wall 130, such load can be sensed by the load sensor 135 as soon as the target article TA engages with the compliant element 136" even before the target article TA enters the volumetric interior 134 of the capture device 106. Additionally, the compliant element 136" extending beyond the wall 130 can engage with the target article TA before any actuation or operation of the extendable arm 102 or the article interface system 110. In other words, the target article TA can be supported by the compliant element 136" during the entire acquisition process carried out by the end effector 100, thereby avoiding the target article TA being unsupported by the capture device 106 during actuation of the extendable arm 102 or the article interface system 110.

Figure 6A:
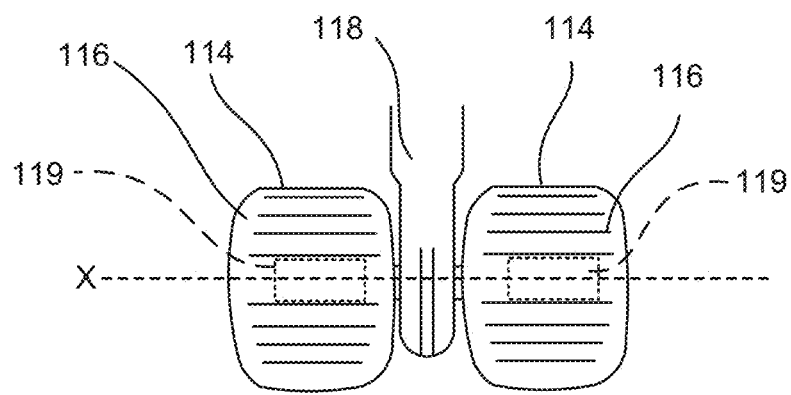
FIG. 6A illustrates front view of an exemplary wheel-type roller of an article engagement device of a robotic end effector of FIG. 2 in accordance with at least one example of the present disclosure.
Figure 6B:
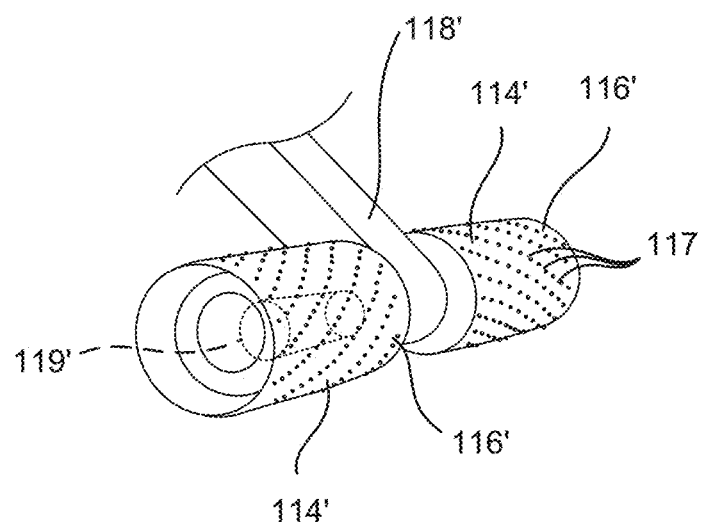
FIG. 6B illustrates a perspective view of an exemplary cylindrical roller of a robotic end effector in accordance with at least one example of the present disclosure.
Figure 6C:
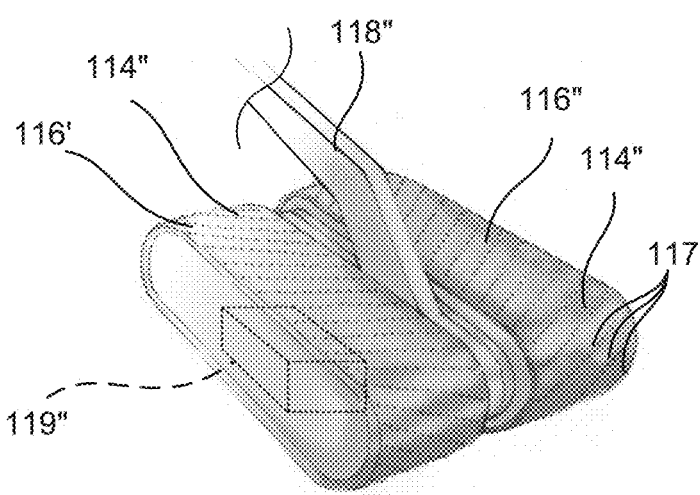
FIG. 6C illustrates a perspective view of an exemplary belt-type roller of a robotic end effector in accordance with at least one example of the present disclosure.

As described herein, the one or more rollers 116 can be moveably coupled to the first support member 104 of the extendable arm 102, or can be indirectly coupled to the first support member 104 by being coupled to the articulating arm 118 of the actuatable article engagement device 112. In FIGS. 6A-6C, various examples of rollers are illustrated that can be coupled to the extendable arm 102 or the articulating arm 118. As illustrated in FIG. 6A, the rollers 116 can be wheel-type rollers that can be powered by an actuator 119 to rotate about an axis X. The rollers 116 can each include a surface 114 that can operate as the article interface surface 114. As illustrated, the rollers 116 can be at least partially made of a compliant material configured to at least partially conform to a surface of the target article TA upon engagement with the target article TA.

The rollers can further be cylindrical rollers 116', as shown in FIG. 6B, having surfaces 114' as the article interface surface 114 and having an actuator 119' operable to drive the rollers 116'. The cylindrical rollers 116' can have a length greater than a diameter. The rollers can further be belt-type rollers 116", as shown in FIG. 6C, having surfaces 114" as the article interface surface 114 and having an actuator 119" operable to drive the rollers 116". The belt-type rollers 116" can be non-circular with an oblong profile. The belt-type rollers 116", and to a lesser extent the cylindrical rollers 116', can facilitate an increased engagement area between rollers 116' and 116" and the target article TA due to the increased surface area of the belt-type rollers 116" and cylindrical rollers 116' compared to the wheel-type rollers 116.

While the rollers 116, 116', and 116" are all shown respectively coupled to articulating arms 118, 118', and 118", it is to be understood that the rollers 116, 116', and 116" can also be coupled to the extendable arm 102 or a stationary arm and still provide the same function of driving the target article TA toward the capture device 106. Additionally, any of the rollers 116, 116', and 116" can be at least partially made of a compliant material (e.g., foam material, foam-backed material, pneumatically inflatable and deflatable materials, and any other compliant materials) configured to flatten and at least partially conform to and grip the surface of the target article TA upon engagement with the target article TA to thereby increase the engagement between the rollers and the target article TA.

The rollers 116, 116', and 116" can be sized to any appropriate size depending on the size of the article to be acquired. For example, in the airline travel example, the rollers 116, 116', and 116" could be sized to engage with a surface of a luggage bag, but can be sized small enough not to engage with neighboring articles or bags when engaging with the target article TA or bag. In other words, the roller(s) 116, 116', and 116" can be sized such that together, in the case of a plurality of rollers being used, the roller(s) 116, 116', and 116" is/are narrower than the narrowest bag expected or desired to be acquired by the end effector 100.

The surfaces of the rollers 116, 116', and 116" can further include friction enhancing elements so as to increase the coefficient of friction between a surface of the target article TA and the roller (e.g., 116, 116', and 116"). For example, the rollers (e.g., 116, 116', and 116") can be modified to have a rough surface to increase the coefficients of friction (dynamic and static friction) between surfaces 114, 114', and 114" of the rollers 116, 116', and 116" and surfaces of target articles TA. The rough surface can be created by embedding within the surfaces 114, 114', and 114" of the rollers 116, 116', and 116" roughness enhancing materials, sticky or adhesive-type materials or any other materials known to increase coefficient of friction between two surfaces. For example, a surface 114, 114', and 114" of the rollers 116, 116', and 116" can be made at least partially of silicon carbide or embedded with silicon carbide to increase roughness of the surfaces of the rollers, to increase coefficients of friction between surfaces, and to facilitate better gripping between the target article TA and the rollers (e.g., 116, 116', and 116").

Alternatively or additionally, structures can be formed on the surfaces 114, 114', and 114" of rollers (e.g., 116, 116', and 116") to facilitate and/or increase mechanical interaction between the rollers 116, 116', and 116" and the target article TA and thereby increase the coefficient of friction or grip between the rollers 116, 116', and 116" and the target article TA. For example, the surfaces 114, 114', and/or 114" can have one or more protrusions 117, such as micro-spines, formed thereon to extend outward away from the surfaces (e.g., 114, 114', and/or 114") of the rollers (e.g., 116, 116', and 116"). The protrusions 117 can mechanically engage with surfaces of the target article TA by penetrating or abutting against the material of the surface of the target article TA in order to facilitate better gripping and movement of the target article TA by the rollers 116, 116', and 116". The example friction enhancing elements described herein are not intended to be limiting in any way. Indeed, those skilled in the art will recognize other ways in which to increase the coefficient of friction between the rollers (e.g., 116, 116', and 116") and the target article TA.

Figure 7A:
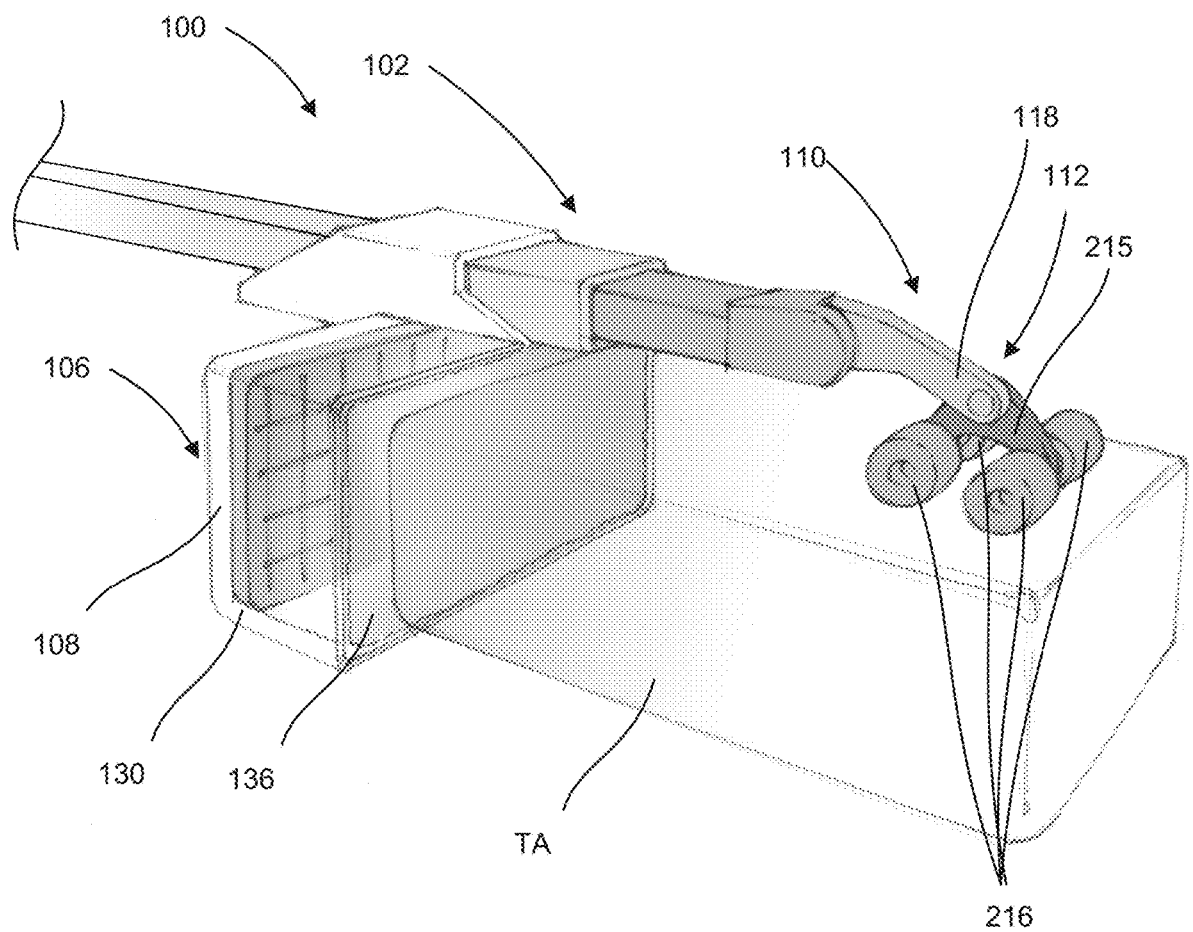
FIG. 7A illustrates a front elevation view of an alternative configuration of the robotic end effector of FIG. 2, in accordance with at least one example of the present disclosure.
Figure 7B:
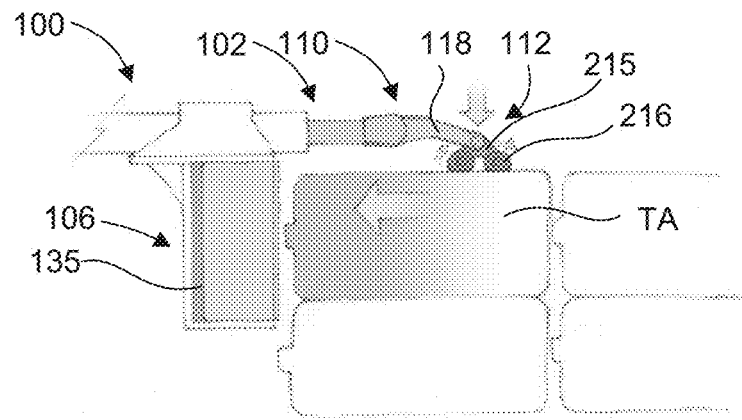
FIGS. 7B-7E illustrates a process of acquiring a target article in accordance with at least one example of the present disclosure using the robotic end effector of FIG. 7A.

FIGS. 2-6C illustrate an end effector 100 having a dual roller configuration. However, it is to be understood that the number of rollers used is not intended to be limited in any way and that the same functionalities can be accomplished with a single roller. Furthermore, additional rollers can be added to increase surface area engagement between the article interface surface 114 of the actuatable article engagement device 112 and the target article TA. For example, as shown in FIG. 7A, a roller carriage 215 can be movably coupled to the articulating arm 118 (or extendable arm 102) of the end effector 100. The roller carriage 215 can support four rollers 216 each comprising a surface (not identified in the figure) to engage with the target article TA and to act as at least a portion of the article interface surface (e.g., 114). The roller carriage 215 can have two axles or axes of rotation with a pair of rollers on each axle or axis to provide two pairs of rollers in series. The roller carriage 215 can be pivotally coupled to the articulating arm 118 intermediate the pair of axles so that there is a forward axis and a forward pair of rollers and a rearward axis and a rearward pair of rollers. The forward pair of rollers can interface with the rear surface of the target article TA while the rear pair of rollers can simultaneously interface with the top surface of the target article TA. These four rollers 216 can also comprise any size, configuration, and can have one or more friction enhancing elements formed thereon.

Figure 7C:
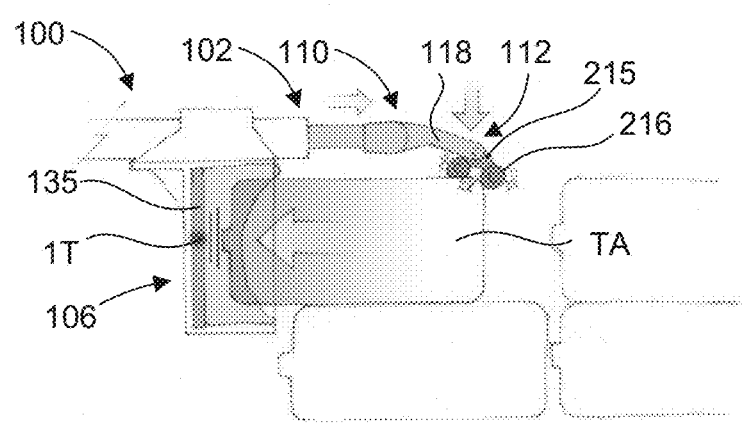

FIGS. 7B-7E illustrate acquisition of a target article TA, and specifically, an example method or process for acquiring an article or articles, such as a bag or baggage, using the roller carriage 215 and the rollers 216 of FIG. 7A. FIGS. 7B-7E illustrate cross-sectional views (e.g., taken along a line similar to line AA of FIG. 3) of capture device 106. FIGS. 7B-7E are similar to the steps illustrated in FIGS. 3A-3E. The discussion above regarding the functions of the elements and steps of acquisition described with respect to FIGS. 3A-3E also apply to FIGS. 7B-7E. However, the rollers and roller configuration of the article interface system 110 and actuatable article engagement device 112 is changed to include the roller carriage 215 and rollers 216 in place of the rollers 116 shown in FIGS. 2-3. With reference to FIGS. 7B-7E, FIG. 7B illustrates the article interface system 110 (e.g., with the actuatable article engagement device 112 including the roller carriage 215 and the rollers 216) in a first position along the top surface of the target article TA. FIG. 7C illustrates the article interface system 110 in a state of transitioning from the first position along the top surface of the target article TA to a second position along a rear surface of the target article TA. As described above with respect to the similar method shown in FIGS. 3A-3E using the end effector configuration shown in FIGS. 2-3, the article interface system 110 can transition from the first position to the second position upon the load sensor 135 detecting a threshold first stage engagement force 1T as the target article TA is caused to engage capture device 106.

Figure 7D:
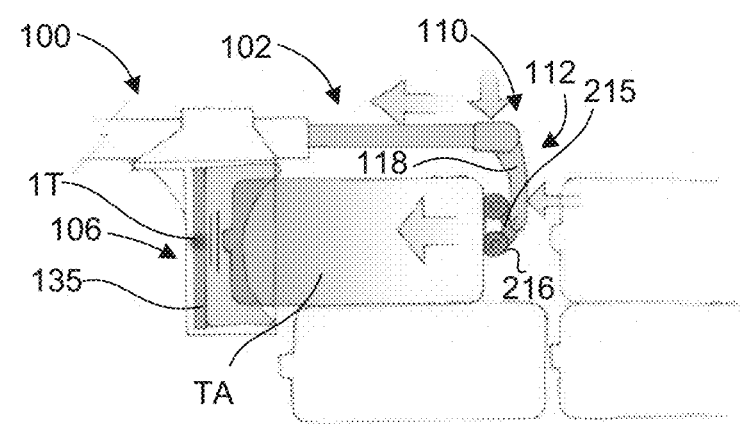
Figure 7E:
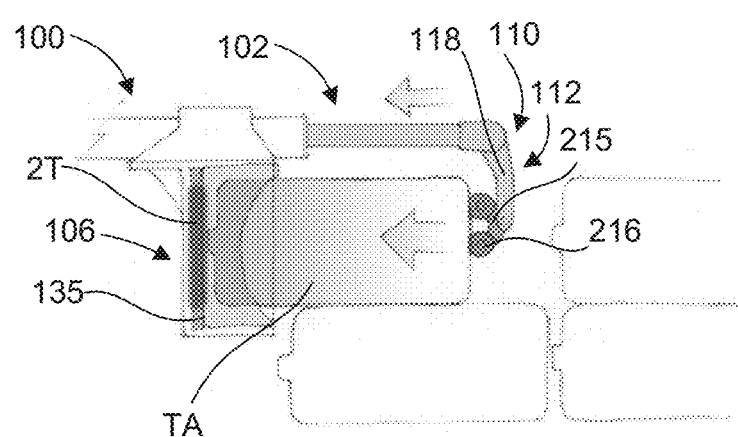

FIG. 7D illustrates the article interface system 110 in the second position along a rear surface of the target article TA. When transitioning to the second position, the article interface system 110 can maintain the threshold first stage engagement force 1T by maintaining contact between the rollers 216 and the target article TA from the first position and through the transition to the second position. FIG. 7E illustrates the article interface system 110 in the second position along the rear surface of the target article TA and the end effector 100 further driving the target article TA into the capture device 106 by operation of at least one of the article interface system 110 (e.g., by rotating the articulating arm 118) or the extendable arm 102 (e.g., by retracting the extendable arm 102). Using the load sensor 135, a state of acquisition of the target article TA can be determined to be achieved upon the load sensor 135 detecting a predetermined threshold second stage engagement force 2T sufficient to counter collective forces acting on the target article TA.

Figure 8A:
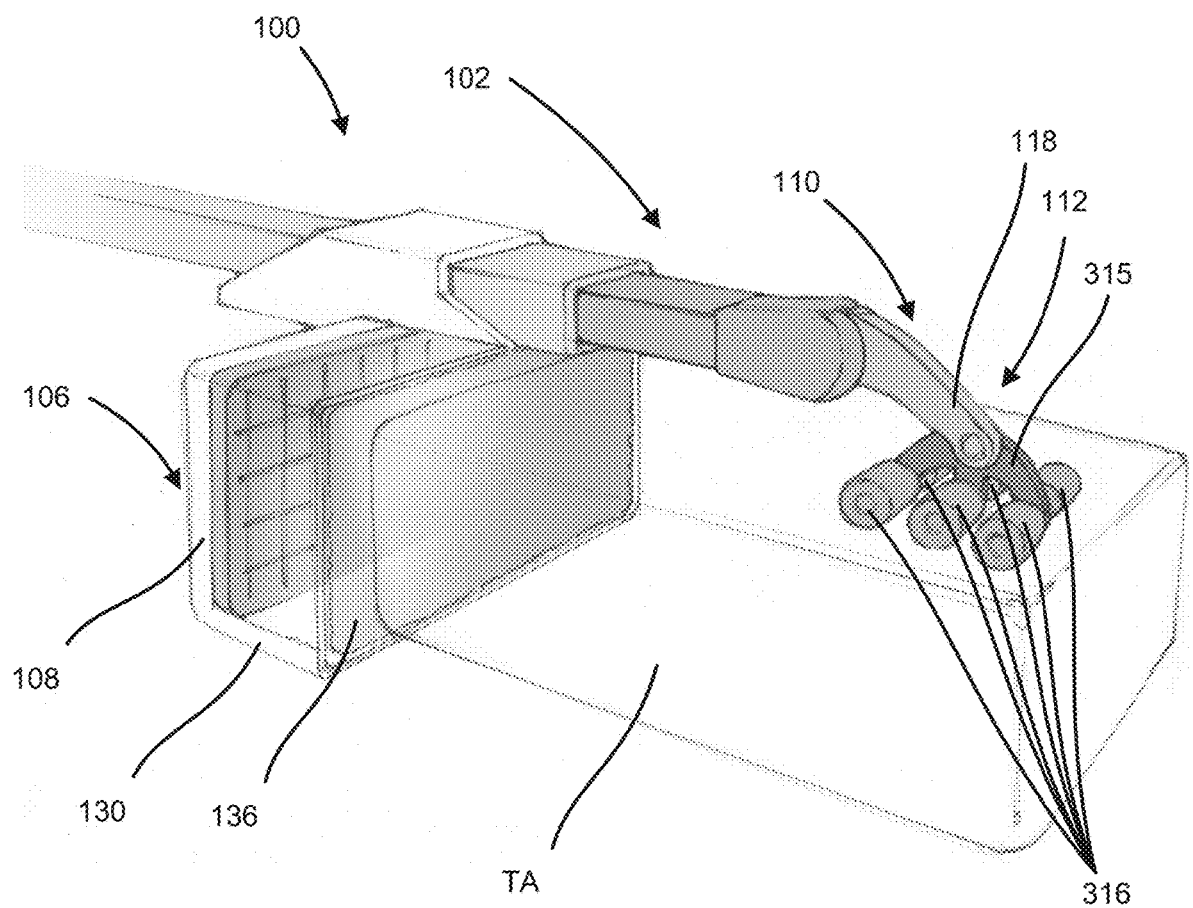
FIG. 8A illustrates a front elevation view of an alternative configuration of the robotic end effector of FIG. 2, in accordance with at least one example of the present disclosure.
Figure 8B:
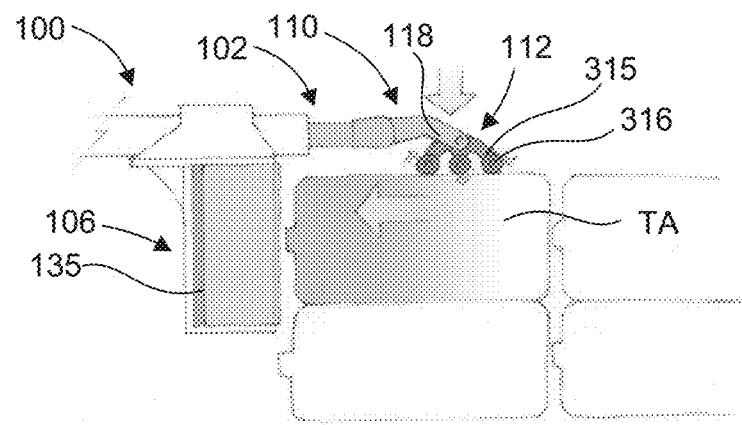
FIGS. 8B-8E illustrates a process of acquiring a target article in accordance with at least one example of the present disclosure using the robotic end effector of FIG. 8A.

FIG. 8A illustrates a roller carriage 315 that can be movably coupled to the articulating arm 118 (or extendable arm 102). The roller carriage 315 can be configured similar to the roller carriage 215 of the article interface system 110 of FIG. 7A. The roller carriage 315 can support six rollers 316 each comprising a surface (not identified in the figure) to engage with the target article TA and to act as at least a portion of the article interface surface (e.g., 114). The roller carriage 315 can have three axles or axes of rotation with a pair of rollers on each axle or axis to provide three pairs of rollers in series. The roller carriage 315 can be pivotally coupled to the articulating arm 118 at an intermediate axis and an intermediate pair of rollers so that there is a forward axis and a forward pair of rollers and a rearward axis and a rearward pair of rollers.

Figure 8C:
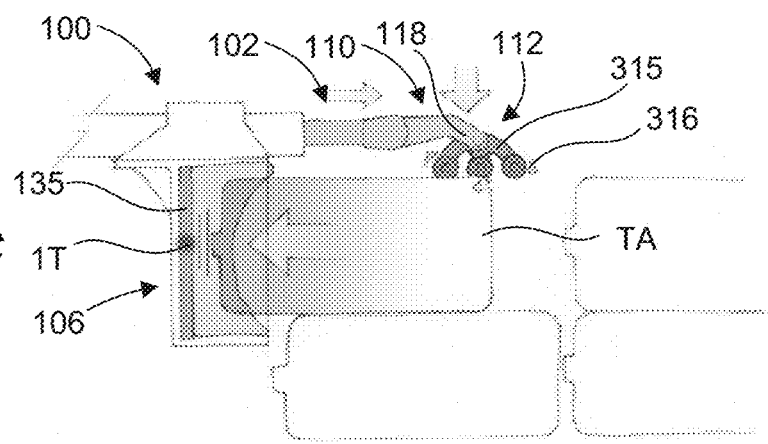

FIGS. 8B-8E illustrate acquisition of a target article TA, and specifically, an example method or process for acquiring an article or articles, such as a bag or baggage, using the roller carriage 315 and the rollers 316. FIGS. 8B-8E illustrate cross-sectional views (e.g., taken along a line similar to line AA of FIG. 3) of capture device 106. FIGS. 8B-8E are similar to the steps illustrated in FIGS. 7A-7E. The discussion above regarding the functions of the elements and steps of acquisition described with respect to FIGS. 3A-3E also apply to FIGS. 8B-8E. However, the rollers and roller configuration of the article interface system 110 and actuatable article engagement device 112 is changed to include the roller carriage 315 and rollers 316 in place of the rollers 216. With reference to FIGS. 8A-8E, FIG. 8B illustrates the article interface system 110 (e.g., with the actuatable article engagement device 112 including the roller carriage 315 and the rollers 316) in a first position along the top surface of the target article TA. FIG. 8C illustrates the article interface system 110 in a state of transitioning from the first position along the top surface of the target article TA to a second position along a rear surface of the target article TA. As described above, with respect to the similar method shown in FIGS. 3A-3E using the end effector configuration shown in FIGS. 2-3, the article interface system 110 can transition from the first position to the second position upon the load sensor 135 detecting a threshold first stage engagement force 1T as the target article TA is caused to engage capture device 106.

Figure 8D:
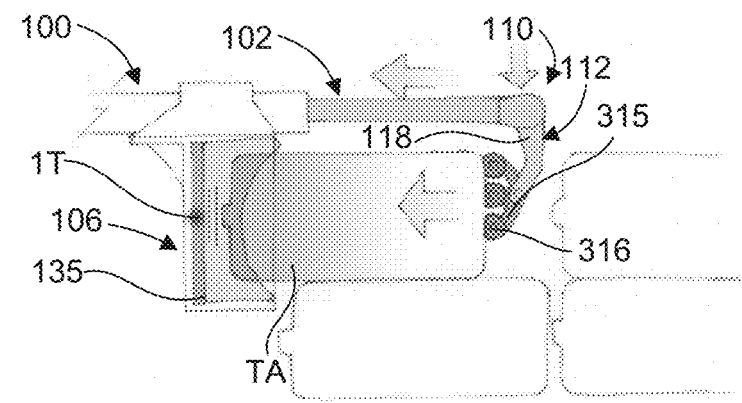
Figure 8E:
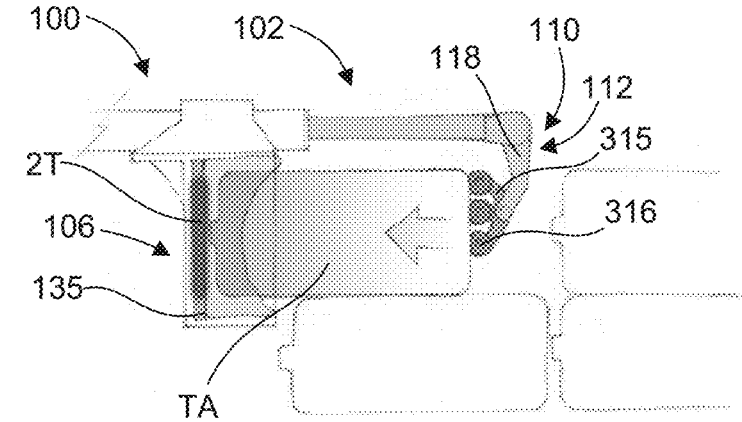

FIG. 8D illustrates the article interface system 110 in the second position along a rear surface of the target article TA. When transitioning to the second position, the article interface system 110 can maintain the threshold first stage engagement force 1T by maintaining contact between the rollers 316 and the target article from the first position and through the transition to the second position. FIG. 8E illustrates the article interface system 110 in the second position along the rear surface of the target article TA and the end effector 100 further driving the target article TA into the capture device 106 by operation of at least one of the article interface system 110 (e.g., by rotating the articulating arm 118) or the extendable arm 102 (e.g., by retracting the extendable arm 102). Using the load sensor 135, a state of acquisition of the target article TA can be determined to be achieved upon the load sensor 135 detecting a predetermined threshold of the second stage engagement force 2T sufficient to counter collective forces acting on the target article TA.

Figure 9:
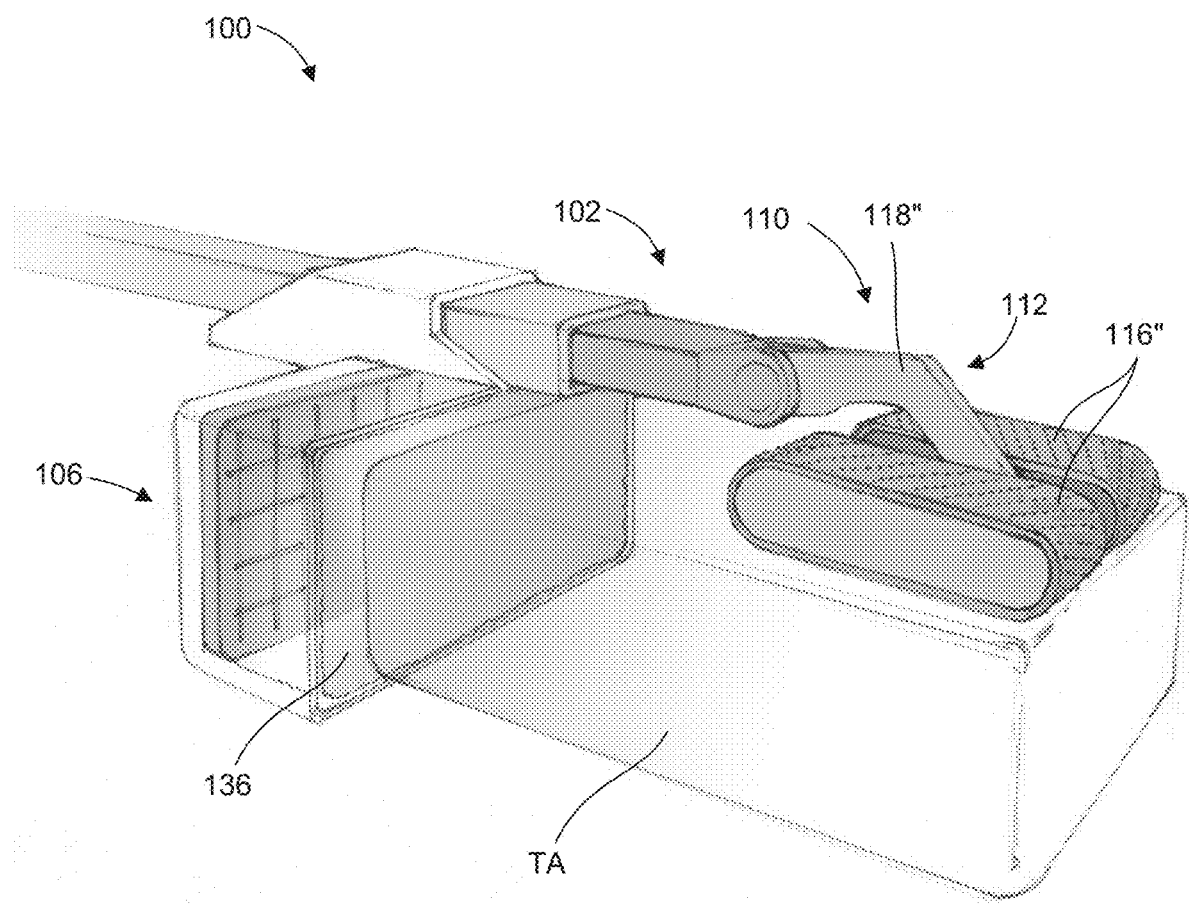
FIG. 9 illustrates a front elevation view of an alternative configuration of the robotic end effector of FIG. 2, in accordance with at least one example of the present disclosure.

In FIG. 9, an exemplary end effector 100 is illustrated including the belt-type rollers 116" shown in FIG. 6C. The belt-type rollers 116" can be supported on an articulating arm 118". Although not shown in FIG. 9, the belt-type rollers 116" can be moveably coupled to the articulating arm 118" to rotate relative to the articulating arm 118", such that the belt-type rollers 116" can transition from the top surface of the target article TA to the rear surface of the target article TA, similar to the example end effectors 100 illustrated in FIGS. 2-4E, and 7A-8E.

Figure 10A:
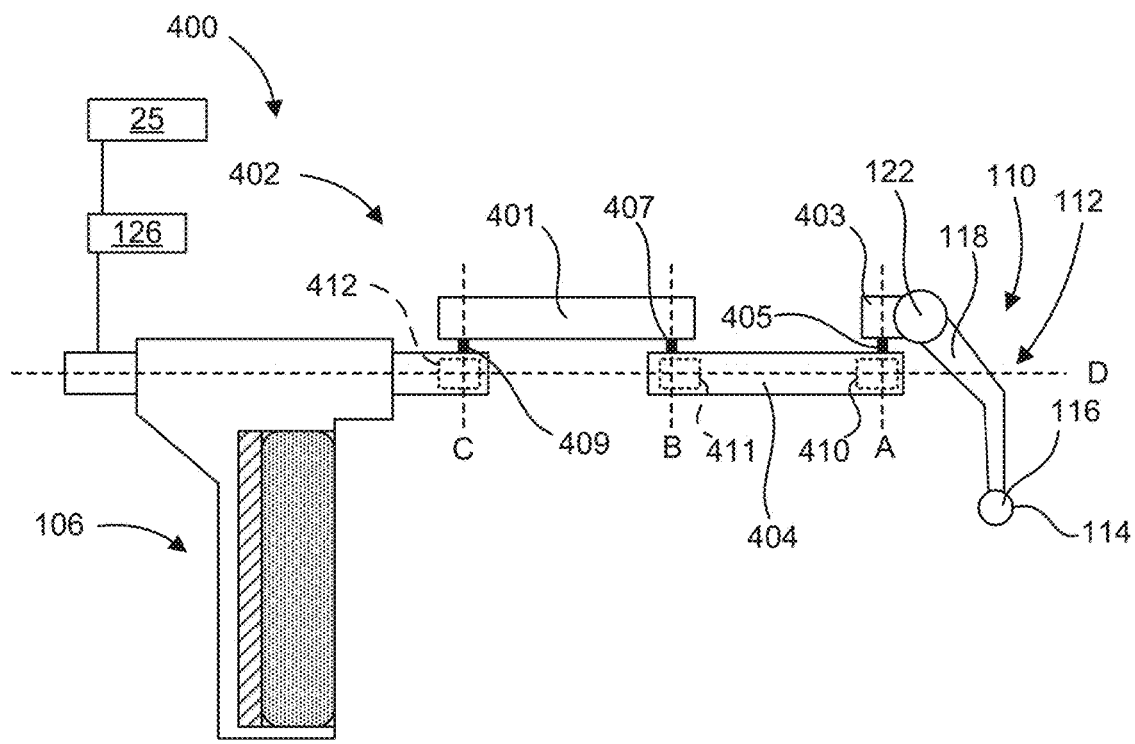
FIG. 10A illustrates a side view of an alternative configuration of the robotic end effector of FIG. 2, having an extendable arm in the form of a Selective Compliance Articulated Robot Arm (SCARA) robotic arm, in accordance with at least one example of the present disclosure.

Additional configurations and modifications to the arm 12 (see FIG. 1), such as the extendable arm 102, are possible and are contemplated within the scope of this disclosure. As shown in FIG. 10A, an end effector 400 can include an extendable arm 402 comprising a different configuration from the extendable arm 102 shown in FIGS. 2-9. FIG. 10A illustrates a cross-sectional view (e.g., taken along a line similar to line AA of FIG. 3) of the capture device 106 associated with the extendable arm 402 and the end effector 400. The extendable arm 402 can include a plurality of support members of any number. For example, the extendable arm 402 can include a first support member 403 and a second support member 404 moveably coupled to the first support member 403 at, or via, a first joint 405. The extendable arm 402 can further include a third support member 401 moveably coupled to the second support member 404 at, or via, a second joint 407. The extendable arm 402 can further include a fourth support member 413 moveably coupled to the third support member 401 at, or via, a third joint 409. The article interface system 110 (e.g., including the actuatable article engagement device 112, the articulating arm 118, roller 116, article interface surface 114, and actuatable joint 122) can be coupled to the first support member 403 and can be configured and can operate as described previously in this disclosure with reference to FIGS. 2-5C. Each of the support members (e.g., 403, 404, 401, and 413) can be coupled to at least one of the other support members by a revolute actuatable joint (e.g., joints 405, 407, 409) that are each associated with an actuator (e.g., respective actuators 410, 411, and 412) and operable to rotate the associated support members about an axis (e.g., respective axes A, B, and C). In other words, the extendable arm 402 can be configured as a selective compliance articulated robot arm (SCARA) comprising two or more actuatable revolute joints at which two support members of the plurality of support members are moveably coupled to each other.

Figure 10B:
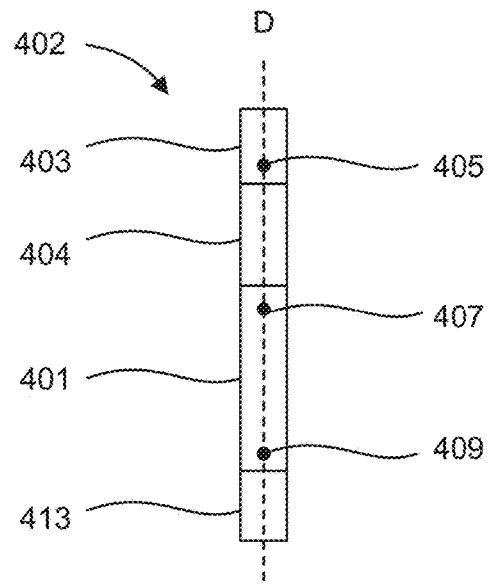
FIG. 10B illustrates an extended position of the SCARA arm of the robotic end effector of FIG. 10A.
Figure 10C:
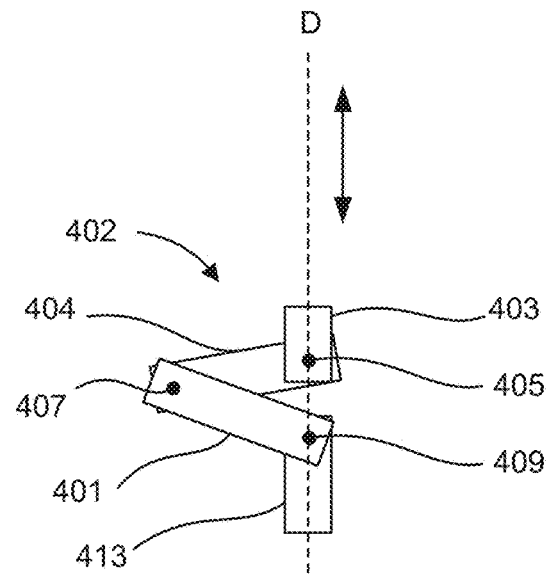
FIG. 10C illustrates a retracted position of the SCARA arm of the robotic end effector of FIG. 10A.

The extendable arm 402 is extendable and retractable in a direction oriented along an axis D. With continuing reference to FIGS. 10A-10C, FIG. 10B illustrates a top view of the extendable arm 402 in the fully extended position and FIG. 10C illustrates a top view of the extendable arm 402 in an at least partially retracted position. FIGS. 10A-10C thereby illustrate the actuation of the extendable arm 402 to facilitate moving a target article TA toward the capture device 106. For simplicity, certain elements of the end effector 400 and extendable arm 402 have been omitted in FIGS. 10B and 10C. The extendable arm 402 can further comprise a positioning member interface 126 that facilitates coupling the end effector 400 to a positioning member 25 in a similar manner as discussed above with respect to the extendable arm 102 of FIG. 2.

Figure 11:
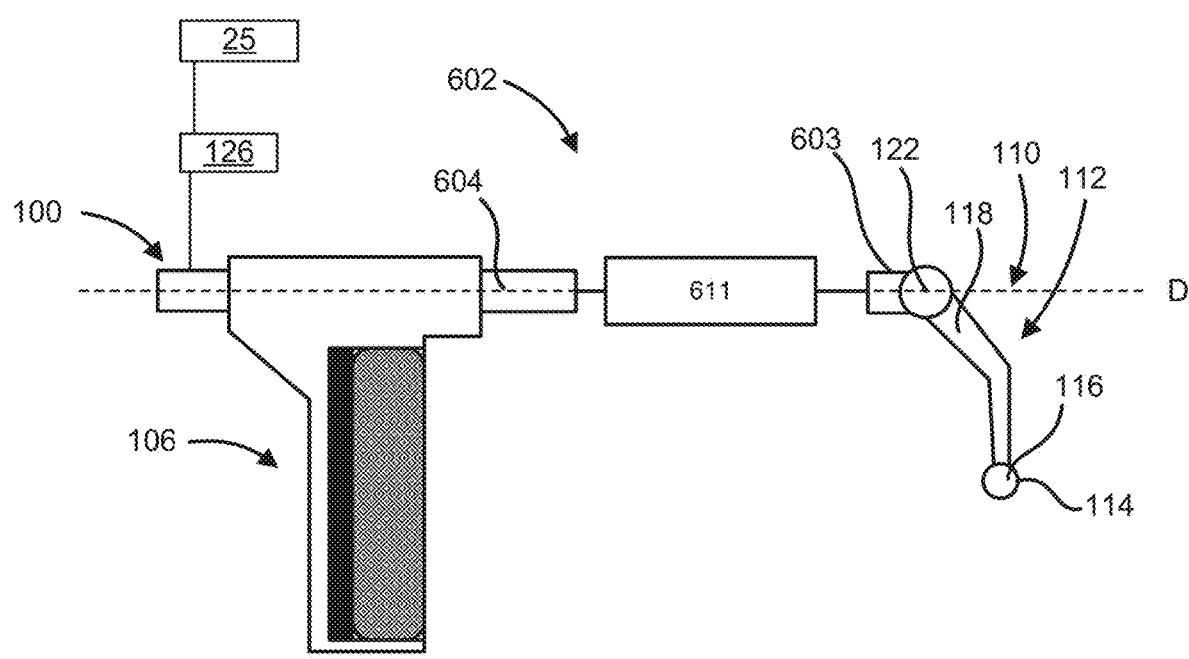
FIG. 11 illustrates a side view of an alternative configuration of the robotic end effector of FIG. 2, in accordance with at least one example of the present disclosure.

FIG. 11 illustrates an alternative configuration of an extendable arm. In this example, an extendable arm 602 is illustrated, and comprises a first support member 603 and a second support member 604. The extendable arm 602 further comprises a linearly translatable mechanism 611 operable to couple the first support member 603 to the second support member 604, such that the first support member 603 and the second support member 604 are moveable relative to one another, and such that the article interface system 110 coupled to the first support member 603 is operable to be translated along a direction of an axis D in order to move the article interface system 110 and a target article TA towards or away from a capture device 106. The article interface system 110 (e.g., including the actuatable article engagement device 112, the articulating arm 118, roller 116, article interface surface 114, and actuatable joint 122) can be coupled to the first support member 603 and can configured and can operate as described previously in this disclosure with reference to FIGS. 2-5C. FIG. 11 illustrates a cross-sectional view (e.g., taken along a line similar to line AA of FIG. 3) of the capture device 106. The linearly translatable mechanism 611 can be any mechanism suitable for achieving linear translation of one structural member relative to another. Examples of linearly translatable mechanisms 611 can be a pantograph linkage or other linearly translatable linkage, a telescope configuration, a rod being linearly translatable to another support member, a robotic arm comprising a plurality of support members coupled at a plurality of actuatable joints, or any other linearly translatable mechanism without any intended limitation. The extendable arm 602 can further comprise a positioning member interface 126 that facilitates coupling the end effector 100 to a positioning member 25 in a similar manner as discussed above with respect to the extendable arm 102 of FIG. 2.

Figure 12:
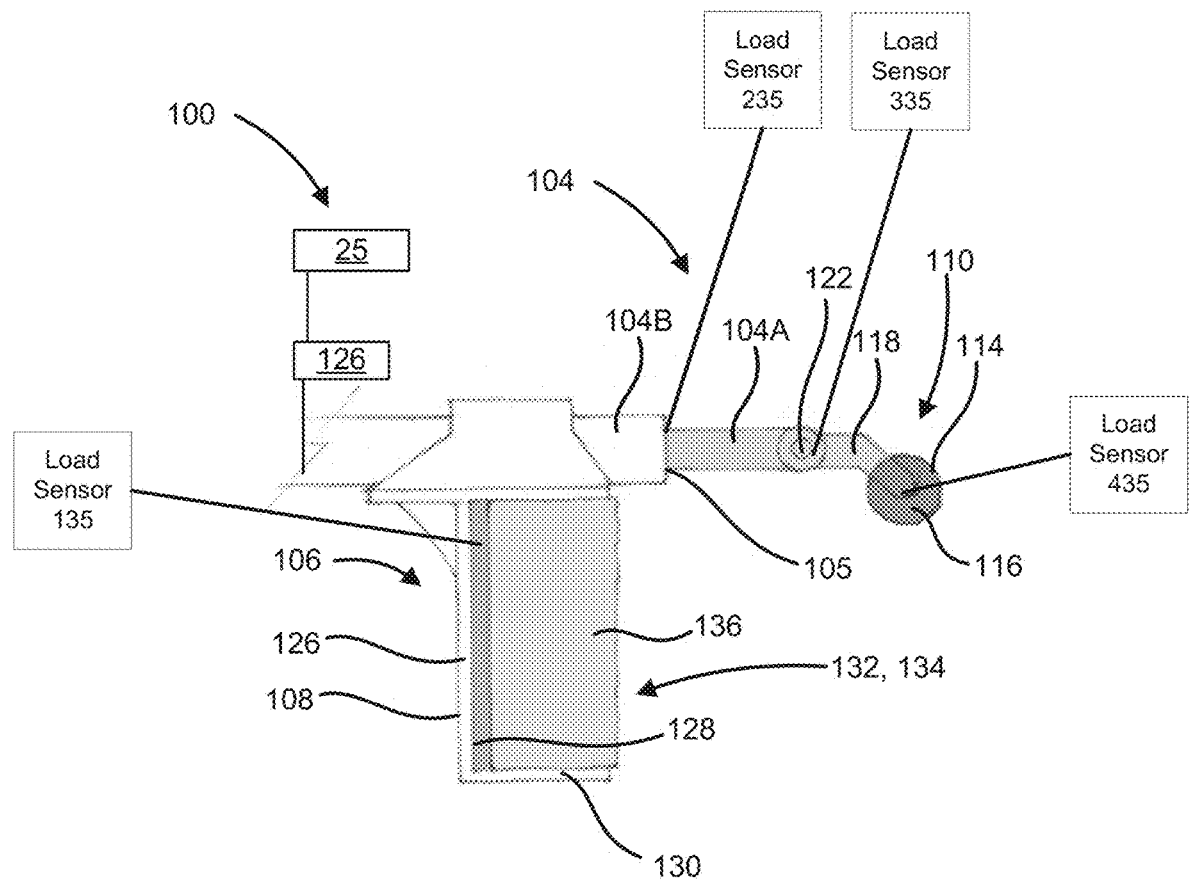
FIG. 12 illustrates a side view of an alternative configuration of the robotic end effector of FIG. 2.

Several modifications and alternative configurations can be made to the placement of the load sensor. For example, with reference again to FIG. 2 and FIG. 12, FIG. 12 illustrates various points and places on the end effector 100 that can serve as placement for the load sensor 135. FIG. 12 illustrates a cross-sectional view (e.g., taken along a line similar to line AA of FIG. 3) of the capture device 106. As shown in previous figures, the load sensor 135 can be placed on the support base 108 to detect the force exerted on the capture device 106 by the target article TA. Alternately or additionally, a load sensor 235 can be associated with the actuatable joint 105 that extends or retracts the first support member (e.g., the first link 104A) relative to the second support member (e.g., the second link 104B) of the extendable arm 102. As the retraction of the first link 104A relative to second link 104B can exert a force on the target article TA being pressed into the capture device 106, the engagement force applied by moving the target article TA into the capture device can be measured at joint 105.

Alternately or additionally, a load sensor 335 can be associated with the actuatable joint 122 that rotates the articulating arm 118 of the actuatable article engagement device 112 of the article interface system 110 relative to the extendable arm 102. The force on the target article TA against the capture device 106 can have an equal and opposite force exerted by the target article TA on the articulating arm 118. Accordingly, the engagement force on the target article TA being pressed into the capture device 106 can be determined by sensing the equal and opposite force acting on the articulating arm 118 with load sensor 335. Similarly, a load sensor 435 can be associated with a joint where the roller 116 is coupled to the articulating arm 118 to measure a force that the target article TA exerts on the roller 116 in a linear direction against the articulating arm 118. Such force is an equal and opposite force to the force exerted by the target article TA on the capture device 106. Accordingly, the engagement force on the target article TA being pressed into the capture device 106 can be determined by sensing the equal and opposite force acting on the roller 116 with load sensor 435. In short, one or more load sensors can be placed anywhere within the end effector 100 where the engagement force acting on the target article TA as it is at least partially captured between the article interface system 110 and the capture device 106 can be sensed or calculated.

Figure 13A:
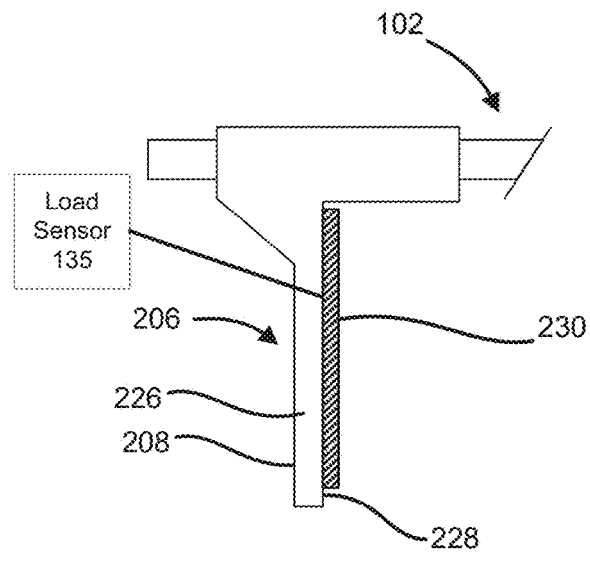
FIG. 13A illustrates a side view of a capture device for a robotic end effector, in accordance with at least one example of the present disclosure.

Several alternative configurations of capture devices for use within the end effector 100 are contemplated herein, and are intended to be within the scope of this disclosure. FIGS. 13A-13K illustrate several different example capture devices, each of which can be implemented into the end effectors 100 discussed herein, and shown in the drawings of FIGS. 2-12. It is noted that many of the other components or elements of the end effectors 100 are not shown, but see the above for a discussion of these. One such example capture device is illustrated in FIG. 13A. With reference to FIGS. 2 and 13A, a capture device 206 can be supported by the extendable arm 102, and can include a support base 208 comprising a base plate 226. The base plate 226 can have a support surface 228. The target article TA can be held within the capture device 206 with just the base plate 226 by a force strong enough to hold the target article TA against the base plate 226 (e.g., between the article interface device (not shown) and the base plate 226) so that the target article TA does not fall out of the end effector and is in a state of acquisition.

Additionally or alternatively, the capture device 206 can comprise on or as part of the support surface 228 one or more friction enhancing elements 230 to enhance friction between the base plate 226 and the target article TA. The friction enhancing element(s) 230 can be a coating (adhesive or gripping rubber or polymer layer) that enhances friction, a layer of material (e.g., silicon carbide impregnated layer) of any known material makeup for enhancing friction between two surfaces. The friction enhancing element(s) 230 can further be a plurality of protrusions, micro spines, teeth, or any other projections that can mechanically interface with a surface of the target article TA to prevent the target article TA from slipping off of the support surface 228 of the capture device 206. The friction enhancing element(s) 230 can assist in acquiring the target article TA, and can further facilitate a reduction in needed engagement forces acting on the target article TA from the end effector to achieve a state of acquisition compared to an example end effector without such friction enhancing element(s) 230.

Figure 13B:
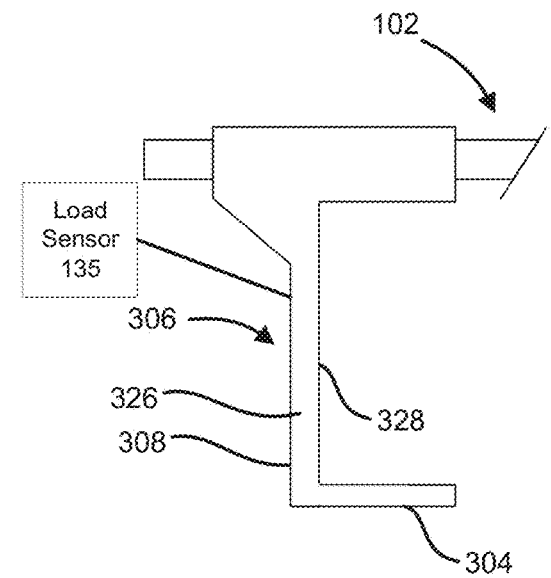
FIG. 13B illustrates a side view of a capture device for a robotic end effector, in accordance with at least one example of the present disclosure.

Another example capture device 306 is illustrated in FIG. 13B. As shown, the capture device 306 can be supported by the extendable arm 102, and can include a support base 308 comprising a base plate 326. The base plate 326 can have a support surface 328 configured to support the target article TA. Additionally, a protrusion 304 can extend from a bottom portion of the support surface 328 of the base plate 326. The protrusion 304 can be coupled to a bottom portion of the capture device 306, and can act as a bottom support or stopping mechanism to prevent the target article TA from falling out of the capture device 306 once it is fully acquired by the end effector. The protrusion 304 can also serve to function as a positioner or locator of the end effector by providing a portion that can be caused to come into contact with an object, such as an article just below a target article TA to be acquired. The end effector can be manipulated and brought into proximity with the target article TA where a proper end effector position at least in one degree of freedom or along one axis can be achieved upon the protrusion 304 coming into contact with an object in support of a target article TA above it. This protrusion 304 can be a feature added to any of the capture device embodiments discussed herein.

Figure 13C:
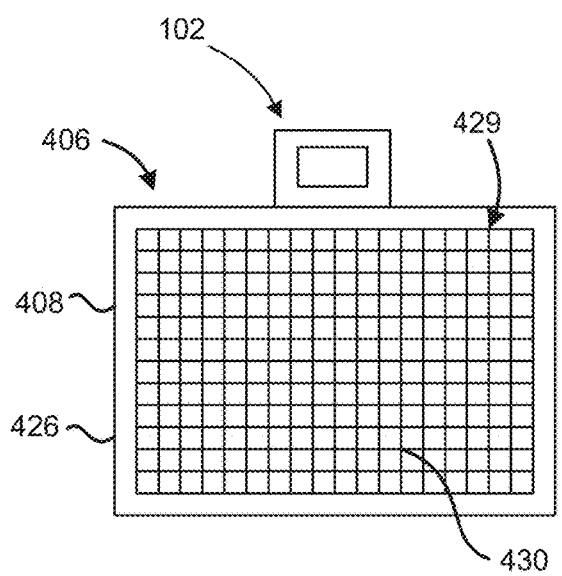
FIG. 13C illustrates a front view of a capture device for a robotic end effector, in accordance with at least one example of the present disclosure.
Figure 13D:
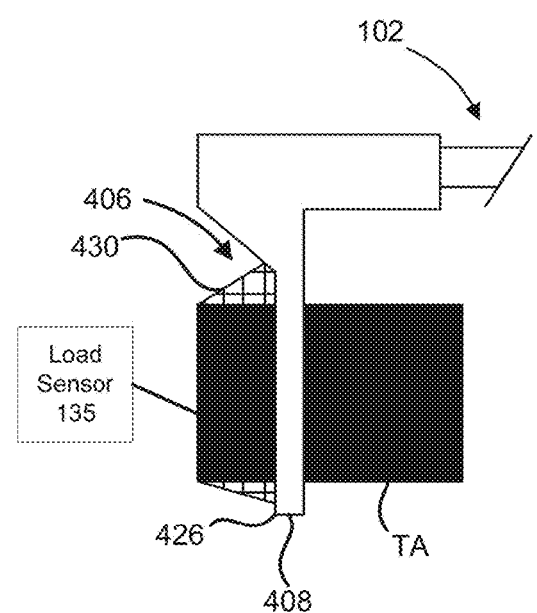
FIG. 13D illustrates a side view of the capture device of FIG. 13C.

An additional example of a capture device 406 is illustrated in FIGS. 13C and 13D. FIG. 13C illustrates a capture device 406 supported by the extendable arm 102, and including a support base 408 configured as a frame 426 with an opening 429 formed therein, such as a hoop. The capture device 406 can further comprise a compliant element 430 that at least partially spans across the opening 429 between components of the frame-like support base 408, which compliant element 430 can be secured to the support base 408 using any known means, such as clamps, fasteners, ties, and others. As illustrated, the compliant element 430 can be one of a net or a latticework of elastic strands configured to receive and support the target article TA in a state of acquisition (as shown in FIG. 13D). The net or lattice work can be made of any suitable elastic or compliant material without any intended limitation. Alternatively, the compliant element 430 can be an elastic diaphragm supported about the support base 408 and configured to support the target article TA in a similar manner.

Figure 13E:
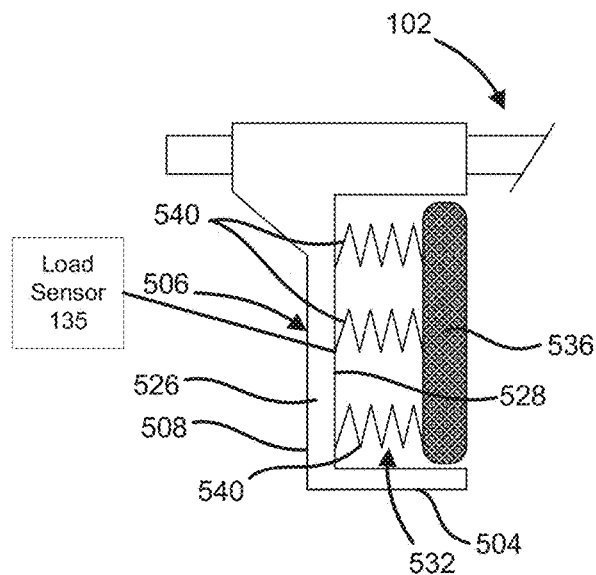
FIG. 13E illustrates a side view of a capture device for a robotic end effector, in accordance with at least one example of the present disclosure.

Another example capture device 506 is illustrated in FIG. 13E. FIG. 13E illustrates a cross-sectional view (e.g., taken along a line similar to line AA of FIG. 3) of capture device 506. As shown, the capture device 506 can be supported by the extendable arm 102, and include a support base 508 comprising a base plate 526 and a wall 504 extending away from the support base 508, which wall can help to support the target article TA as it is being acquired and once it is in a fully captured state of acquisition. The base plate 526 can have a support surface 528 configured to support the target article TA. Instead of a compliant element in the form of a compliant material mass being disposed in a volumetric interior 532 of the capture device 506, a structural member 536 such as a plate, rod, or rigid member can be disposed in the volumetric interior 532 of capture device 506. The structural member 536 can act as a compliant element by being coupled to the support surface 528 with one or more biasing members 540 (e.g., springs or other compliant elements). The structural member 536 and the biasing member(s) 540 can function to displace in proportion to the engagement force acting on the target article TA as it is being acquired. Once the target article TA is released, the structural member 536 and the biasing member(s) 540 can return to an extended position as shown. Moreover, the structural member 536 and the biasing member(s) 540 can help to facilitate the release of the target article TA from the end effector by biasing the target article TA in a direction away from the capture device 506. The capture device 506 can further comprise one or more friction enhancing elements, as taught herein, associated with a surface of the structural member 536.

Figure 13F:
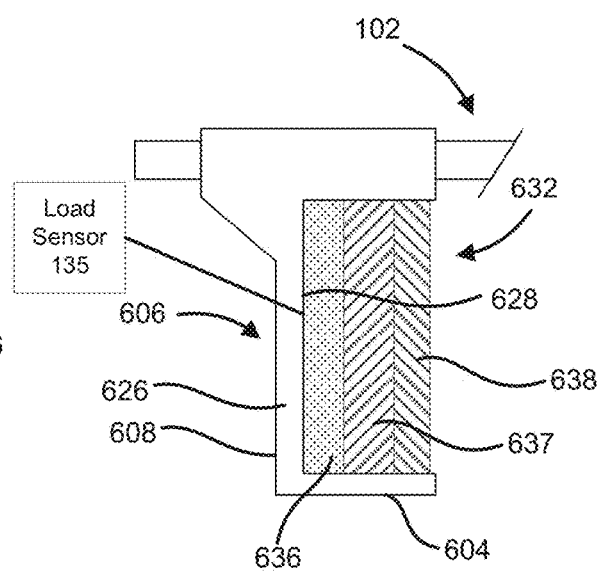
FIG. 13F illustrates a side view of a capture device for a robotic end effector, in accordance with at least one example of the present disclosure.

FIG. 13F illustrates an alternative capture device 606. FIG. 13F illustrates a cross-sectional view (e.g., taken along a line similar to line AA of FIG. 3) of capture device 606. As shown, the capture device 606 can be supported by the extendable arm 102, and can include a support base 608 comprising a base plate 626 and having a wall 604 extending away from the support base 608, which wall 604 can help to support the target article TA as it is being acquired and once it is in a fully captured state of acquisition. The base plate 626 can have a support surface 628 configured to support the target article TA. Instead of a single compliant element (a single mass formed of one or more compliant materials) being disposed in a volumetric interior 632, a plurality of compliant elements (a plurality of compliant material masses, each formed of one or more compliant materials) can be layered in the volumetric interior 632. For example, a first compliant element 636 can be placed against the support surface 628. A second compliant element 637 can be layered on the first compliant element 636. The first and second compliant elements 636 and 637 can have the same or different compliances that together provide a desired compliance depending on user preference, context, or application for using the capture device 606. Additionally, a third compliant element 638 can be layered on the second compliant element 637. The third compliant element 638 can have the same or a different compliance compared to one or more of the first and second compliant elements 636 and 637. Together the three compliant elements can provide a desired compliance depending on user preference, context, or application for using the capture device 606. The capture device 606 can further comprise one or more friction enhancing elements, as taught herein, associated with a surface of the outermost compliant element(s).

Figure 13G:
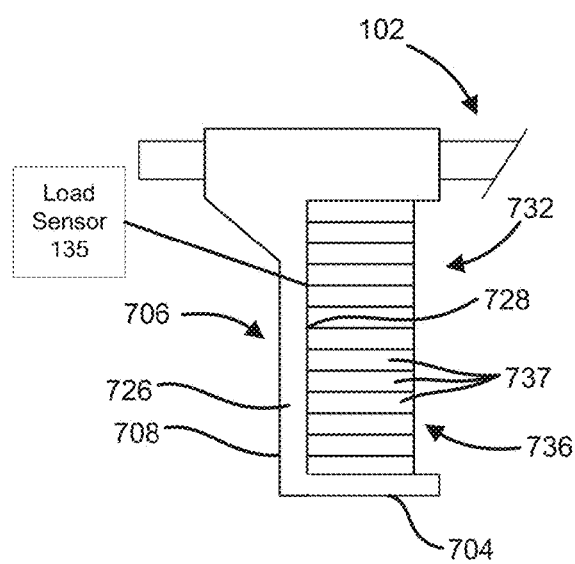
FIG. 13G illustrates a side view of a capture device for a robotic end effector, in accordance with at least one example of the present disclosure.

FIGS. 13G-13K illustrate an alternative capture device 706. FIG. 13G illustrates a cross-sectional view (e.g., taken along a line similar to line AA of FIG. 3) of capture device 706. As shown, the capture device 706 can be supported by the extendable arm 102, and can include a support base 708 comprising a base plate 726 and a wall 704 extending away from the support base 708, which wall 704 can help to support the target article TA as it is being acquired and once it is in a fully captured state of acquisition. The base plate 726 can have a support surface 728 configured to support the target article TA. Instead of a compliant element in the form of a compliant material mass being disposed in a volumetric interior 732, a plurality of discrete compliant rods 737 can be arranged in a compliant rod array 736 within the volumetric interior 732. Each of the compliant rods 737 can be fixed to or commonly supported by the support surface 728. The compliant rods 737 can each be discrete from each other, made of different compliant materials, or can be formed of the same mass of compliant material with a plurality of cuts partially formed through the thickness of the compliant material mass to form the plurality of rods. The cuts may be only partially formed through the compliant material, such that the rods remain connected to each other at a base where the compliant material has not been cut.

Figure 13H:
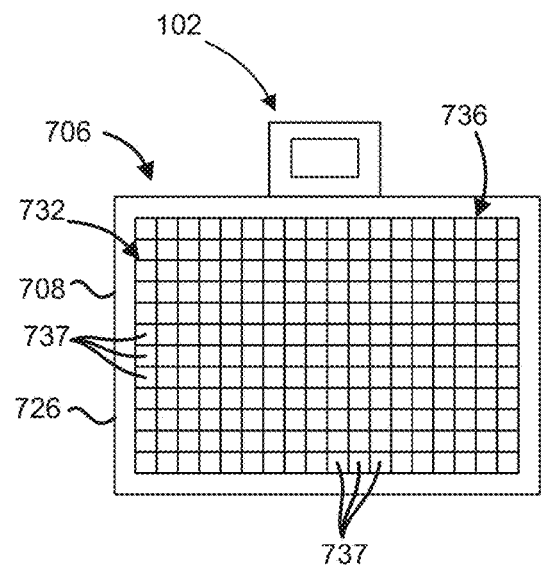
FIG. 13H illustrates a front view of the capture device of FIG. 13G.

As shown in FIG. 13H, the compliant rods 737 can be arranged in a plurality of rows and columns within the volumetric interior 732 of the capture device 706, wherein the compliant rods 737 are supported by the support base 708. As further shown in FIG. 13I, the target article TA can be moved into engagement with the compliant rods 737 of the compliant rod array 738. FIG. 13I illustrates a cross-sectional view (e.g., taken along a line similar to line AA of FIG. 3) of capture device 706. The rods 737A in engagement with a surface of the target article TA can compress under the load of the target article TA as the end effector applies an engagement force to the target article TA, while other rods 737B out of contact or engagement with the target article TA can remain uncompressed and can provide engagement with side surfaces of the target article TA, and/or can support the target article TA within the capture device 706. For example, as shown in FIG. 13J, a compliant rod 737B is shown in an uncompressed state fixed to the support surface 728 of the support base 708, or base plate 726. Additionally, a compressed compliant rod 737A is shown under the influence of a force F (e.g., from target article TA) that causes the rod 737A to compress downward and expand outward. A detailed illustration of some of the rods 737A and 737B supporting the target article TA is shown in FIG. 13K. The rods 737A, as compressed by the target article TA, can support a front surface FS of the target article TA and the rods 737B can support side surfaces (e.g., SS1 and SS2) of the target article TA. In other words, the rods 737B that are not acted upon by the target article TA and that do not compress can provide lateral support to the target article TA as it is being acquired, and once acquired, to maintain the target article in a state of acquisition. Although the FIGS. 13A-13K illustrate a plurality of rods 737 in close touching contact with one another, this is not to be limiting in any way. Other configurations of the same capture device 706 can comprise a plurality of rods 737 that are spaced apart from one another. Moreover, although the compliant rods 737 can be configured to compress (i.e., mash), they can alternatively be configured to deflect or bend, or some combination of these, upon being acted upon by the target article TA as it is being acquired.

It is noted that any of the example end effectors with their respective example capture devices discussed above and shown in any of FIGS. 1-13K can further include one or more sensors operable to measure and detect an engagement force acting upon the target article TA as taught herein. For example, the end effector examples shown in FIGS. 13A-13 are shown as comprising capture devices having one or more sensors (e.g., load cells) associated with the capture devices. However, this is not intended to be limiting in any way as the end effectors in these examples can comprise one or more sensors supported about one or more other components of the end effectors (e.g., see FIG. 12 and its corresponding discussion above).

It is to be understood that any of the capture devices described with respect to any of FIGS. 1-13K (e.g., under application of the applied load by the target article TA to the any of the materials or elements 136, 136', 136", 230, 430, 536, 636, 637, 638, and/or 737 in conjunction with walls 304, 504, 605, and/or 704) can operate to provide full or partial captured support to the target article TA by the respective capture devices, depending upon the state of the article between partial capture (partial engagement with the capture device prior to a state of acquisition) and full capture (full, complete engagement of the article with the capture device at a state of acquisition). The captured support provided by the capture devices (e.g., 106, 206, 406, 506, 606, or 706) on the target article TA can include lateral support of the target article in the x direction, as shown in FIG. 4E. See FIG. 4A for an indicator of the x, y, and z directions referred to herein. The lateral support of the target article TA by the end effector 100 in the x direction can constrain movement of the target article TA from moving in the positive or negative x directions.

The captured support can further include vertical support of the target article TA in the positive and/or negative y directions. The vertical support of the target article TA in the y directions can constrain movement of the target article TA from moving in the positive or negative y directions. The article interface system 110 (e.g., via locking the articulating arm 118 and/or roller 116) can also provide the target article TA with lateral support to constrain movement of the target article in the positive and/or negative y directions.

The captured support can further include support of the target article TA in the positive and/or negative z directions. The positive and negative z directions are shown in FIG. 4A as either extending out of the plane of the drawings or extending into the plane of the drawings. The support of the target article TA in the positive and negative z directions can constrain movement of the target article TA from moving in the positive or negative z directions. The article interface system 110 (e.g., via locking the articulating arm 118 and/or roller 116 and via friction or mechanical engagement) can also provide the target article TA with support to constrain movement of the target article in the positive and/or negative z directions.

It is to be understood that the captured support can further provide rotational support to constrain rotational movement of the target article TA. The rotational support can constrain rotational movement of the target article TA in any of the positive or negative rotational directions about the x, y, or z axes illustrated in FIG. 4A. It is to be understood that the captured support can be one or more of translational movement in the +/−x directions, the +/−y directions, and/or the +/−z directions. The captured support can further be one or more of positive/negative rotational movement about the x axis, the y axis, and/or the z axis. In short, captured support provided to the target article TA by the compliant materials and elements described with respect to FIGS. 1-13K can include support in any combination of the translational and/or rotational directions to facilitate capture of the target article TA within the respective capture devices. The target article TA can be considered fully "captured" and in a state of acquisition by the capture device when the target article TA is supported in one or more of the support directions (e.g., translational movement in the +/−x directions, the +/−y directions, the +/−z directions and/or rotational movement about the x, y, and/or z axes) to a sufficient level to counter collective forces acting on the target article TA.

It is noted that any example capture device configuration, compliant element configuration, extendable arm configuration, and article interface system configuration taught herein can be used with any other of these, with it being understood that their respective elements can be combined in any combination to form end effectors of a variety of different configurations. Indeed, those skilled in the art will recognize that the specific examples shown in the figures and discussed herein are not intended to be limiting in any way.

Figure 14:
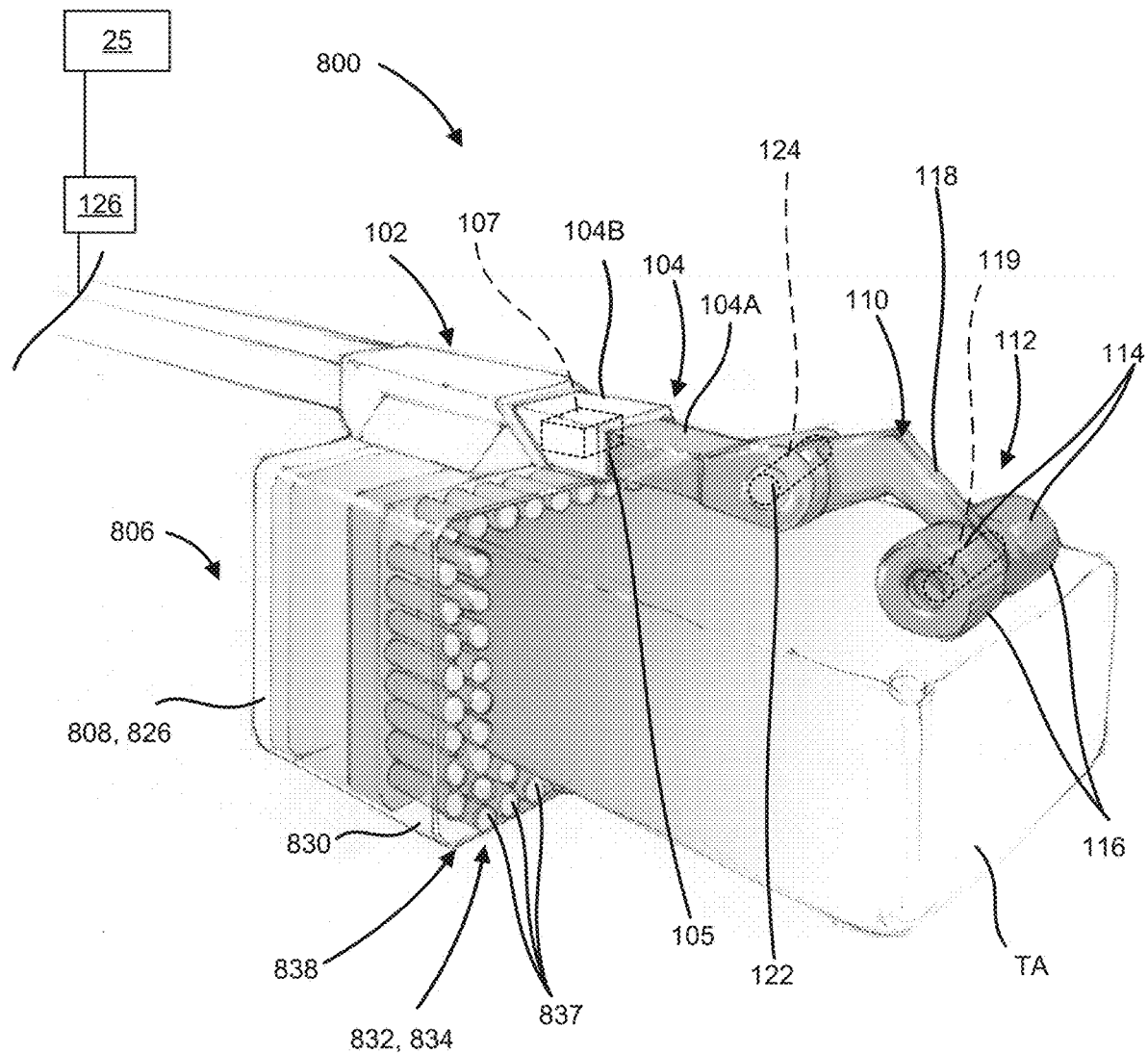
FIG. 14 illustrates a front elevation view of a robotic end effector in accordance with at least one example of the present disclosure.

Another example robotic end effector 800 is illustrated in FIG. 14. The end effector 800 can be operable with a robotic positioning member 25 as taught herein with respect to other end effectors, and can acquire and manage an article similar to other robotic end effectors described herein. The end effector 800 can include a capture device 806 described in more detail below. FIG. 14 illustrates the capture device 806 being used in conjunction with an arm having a robotic positioning member interface 126. The arm can be the same as, or similar to, the arm 12 of FIG. 1, the extendable arm 102 of FIG. 2 described above, or the SCARA-type extendable arm of FIGS. 10A-10C, or the extendable arm 602 of FIG. 11, or any others. The capture device 806 can further be operable with or used in conjunction with an article interface system, such as with any of the article interface systems of FIGS. 2-12, as discussed above. Similar to as described with respect to other robotic end effectors of the disclosure, the end effector 800 can include an article interface system 110 supported by the extendable arm 102. The article interface system 110 can include an actuatable article engagement device 112 that itself comprises an article interface surface 114. The actuatable article engagement device 112 can be operable to interface with the target article TA to facilitate movement of the target article TA toward the capture device 806. As the functions of the extendable arm 102 and the article interface system 110 with its actuatable article engagement device 112 operate similarly to other examples discussed herein, the operation of these elements will not be repeated in detail here, but it is to be understood that the configurations and operations described herein with respect to other examples of robotic end effectors can also apply to end effector 800. It is to be further understood that the capture device 806 of the end effector 800 can be combined with any of the arms (e.g., extendable arms, telescoping arms, SCARA arms, or any other arms operable to perform a similar function) that are mentioned herein without any intended limitation.

As shown in FIG. 14, the capture device 806 can include a support base 808 (e.g., a base plate 826). In some examples, the support base 808 can simply comprise or be in the form of the base plate 826. In other examples, the capture device 806 can further comprise one or more walls extending from the support base 808, such as wall 830 that is shown as extending from the support base 808, to define an opening 832 and a volumetric interior 834. The end effector 800, and particularly the capture device 806, can further comprise a plurality of compliantly biased members or compliantly biased extensible/retractable members that can be supported by the support base 808 or other structure of the capture device 806. The members can be displaceable within the volumetric interior 834. For convenience, the compliantly biased, retractable, extensible, and/or compliantly biased members will be referred to as rods 837.

However, although they certainly can be, it is to be understood that the rods 837 do not necessarily need to be specifically rod shaped, or have a specific configuration (e.g., circular or other cross-section), or be high aspect ratio structures, etc. It is intended that these can comprise a variety of different sizes, shapes, configurations, and cross-sectional areas. As such, the term "rod" is used herein to refer to any structurally configured member that is capable of being extendable, retractable, or otherwise displaceable or moveable by application or removal of a load (e.g., a load as applied by or from the acquisition of a target article TA). A rod 837 can be a block or other mass of material, a high-aspect ratio structure, or any other structural configuration. In some examples, the rods 837 can comprise an array of rods 838 existing in any type of arrangement. In an example, the rods 837 can be at least partially comprised of a rigid material. As recited above, the rods 837 can be extendable, retractable, or displaceable along an axis of the rod. The rods 837 can be extendable, retractable, or displaceable in response to application and/or removal of a load individually. For example, each rod of a plurality of rods 837 can be individually or separately (i.e., independently) biased by a biasing member, as will be explained below. Or, two or more rods 837 can be extendable, retractable, or displaceable together in response to application and/or removal of a load. For example, two or more rods 837 can be biased by the same biasing member, as explained below.

Additional possible elements of the capture device are illustrated in FIGS. 15A-15D. Each of FIGS. 15A-15D show a cross-section of the capture device 806 of FIG. 14 (e.g., taken along a line similar to line AA shown in FIG. 3). As shown in FIGS. 15A-15D, and with reference to FIGS. 14 and 15A-15D, the capture device 806 can further include a guide member 840 supported in a fixed manner by one or more structures of the end effector 800 so as to be positioned offset from the support base 808, and between the wall 830 of the capture device 806 so as to be disposed within the volumetric interior 834. A front view of the guide member 840 is shown in FIG. 16A and a cross-sectional view of the guide member 840 is shown in FIG. 16B. The cross-sectional view is taken along line BB shown in FIG. 16A. As shown in FIGS. 16A and 16B, a plurality of apertures 841 can be formed extending through the guide member 840 from a back surface 842 to a front surface 843 of the guide member 840 to form an array of apertures 844 (i.e., the apertures extend all the way through the guide member 840). Each of the rods 837 of the array of rods 838 can be disposed in respective aperture 841 of the guide member 840. Each rod 837 can be slidably supported in a respective aperture 841, such that each rod of the plurality of rods 837 is operable to move, slide, extend, retract, move, and/or otherwise displace within its respective aperture 841 relative to the guide member 840 and along an axis of the aperture 841.

In FIG. 16C, a rod 837 is illustrated in each of the apertures 841, wherein an array of rods 837 is presented within the capture device 806. Each of the rods 837 can include a flange 845 that is larger than the diameter of the apertures 841 of the guide member 840, wherein the flange 845 of each rod 837 is sized and configured to interface with the back surface 842 of the guide member 840 to constrain the rods 837 from falling out of the apertures 841 of the guide member 840. Although not shown in FIG. 16C, a similar flange can be placed on an opposite end of each rod 837 that can interface with the front surface 843 of the guide member 840 to similarly constrain the rods 837 from falling out of the apertures 841. The guide member 840 can further include a plurality of interior surfaces 846, each defining one or more of the plurality of apertures 841. With the rods 837 disposed in the apertures 841 (shown in FIG. 16C), each of the interior surfaces 846 can be positioned adjacent to an outer perimeter surface 839 of a respective rod 837 of the array of rods 838 to provide lateral support for each respective rod of the plurality of rods 837 disposed in respective apertures 841.

With returning reference to FIGS. 14 and 15A-15D, the capture device 806 can further include a biasing member 836 positioned between the support base 808 and the guide member 840, wherein the biasing member 836 can be associated with one or more rods 837 of the array of rods 838 and configured to bias the one or more rods 837 in a first direction (e.g., in an extended position) relative to the guide member 840, and away from the support base 808. Each rod 837 can be supported by the support base 808 within the guide member 840 via the biasing member 836. The biasing member 836 can be coupled to or supported by the support surface 828 of the support base/base plate 808/826, or it can be supported about the support surface 828 of the support base 808/base plate 826 (i.e., supported by any component of the end effector, but positioned adjacent the support surface 828).

FIG. 16C illustrates the rods 837 in various positions (e.g., the extended position and a depressed position) within the apertures 841. Each rod 837 can comprise an extended position, in which a distal end surface or end portion 847 of the rod 837 is positioned at a distal position relative to the support base 808 (e.g., "distal" meaning distally located as far from the support base 808 as allowed by the range of motion of the rod 837 within the respective aperture 841 of the guide member 840), wherein the rod 837 is constrained from further extending away from the support base 808. Stated differently, the fully extended position of each rod 837 can be that position in which the rod 837 is located furthest from the support base 808. Each rod 837 can further comprise a depressed or retracted position, in which the rod 837 is at least partially depressed relative to the guide member 840 towards the support base 808, such that the end surface 847 of the rod 837 is positioned closer to the support base 808 than when the rod 837 is in the extended position. Each rod of the plurality of rods can move or displace between these two positions depending upon the magnitude of an applied load to the rods 837, which load causes the biasing member 836 to compress at least somewhat. Rods 837A are shown in the extended position in FIG. 16C while the rods 837B are shown in various positions in FIG. 16C that can each be referred to as depressed or retracted positions.

As is further explained with respect to FIGS. 15A-15D, each rod 837 of the array of rods 838 can be configured to transition from the extended position (e.g., position of rods 837A) to the depressed position (e.g., position of rods 837B) upon application of an applied load to the end surface 847 of the rod 837 (e.g., by the target article TA being urged against the rods 837 by the article interface system 110). In one example, each rod 837 of the array of rods 838 can be configured to transition from the extended position to the depressed position independent of other rods 837 of the array of rods 838 such that, under application of an applied load by the target article TA (shown partially and shown in dotted lines) to one or more rods 837 of the array of rods 838 (i.e., as the target article TA is caused to engage one or more rods 837 of the capture device 806), one or more depressed rods 837B in the depressed position can provide support to a front surface FS of the target article TA (i.e., support along an axial direction, or along an axis X of the depressed rods 837B). One or more depressed rods 837B of the array of rods 838 can be positioned axially offset from one or more extended rods 837A in the extended position. Under application of the applied load by the target article TA to at least one of the plurality of rods 837, the one or more extended rods 837A positioned adjacent to the one or more depressed rods 837B can provide lateral (e.g., vertical, rotational, etc.) support to the target article TA (e.g., to a top surface TS, or a bottom surface BS, or a side surface SS, or any combination of these) via the outer perimeter surface 839 of at least some of the one or more extended rods 837A (namely those directly adjacent the depressed rods 837B), the outer perimeter surfaces 839 of at least some of the extended rods 837A being at least partially exposed (i.e., being able to come into contact with the target article TA) by virtue of the depressed rods 837B being in an offset position relative to the extended rods 837A.

With returning references to FIGS. 15A-15D, the biasing member 836 can comprise a compliant element or a plurality of compliant elements, similar to as described with respect to any of the compliant elements above. In the example shown, the biasing member 836 can be supported and disposed between the guide member 840 and the support base 808 and can be a compliant element in the form of a single compliant mass. However, this is not intended to be limiting in any way as the compliant element can comprise a single compliant material mass, a plurality of compliant material masses, a plurality of compliant material masses stacked in layers, or others. In addition, the biasing member 836 can comprise a plurality of discrete compliant elements or rods. The compliant element, such as the compliant material mass(es) or plurality of compliant elements or rods, that functions as the biasing member 836 can be configured to bias the one or more rods 837 of the array of rods 838 in the first direction to the extended position.

The biasing member 836 acting to bias the one or more rods 837 can further be configured in a similar manner as shown in any of FIGS. 13C-13K. In short, any configuration of a compliant element or any arrangement of a plurality of compliant elements that can operate to bias one or more rods 837 to the extended position is contemplated by this disclosure. In the illustration of FIG. 15A-15D, the biasing member 836 can be a mass in the form of a single compliant material mass, which can be formed of any single or combination of compliant materials, such as a foam, polymer, elastomer, rubber, or other compliant material having or providing a spring or spring-like function (i.e., that comprises an element of elasticity and that possess an elastic modulus (e.g., Young's modulus)) and that is capable of applying a force that acts on an object, wherein the compliant material is capable of storing energy when compressed and releasing energy when the compressing force is removed, or at least partially decreased.

To acquire an article, various method steps can be carried out to obtain a target article TA by the capture device 806. The steps, operations, and methods to acquire the target article can be the similar to as described with respect to FIGS. 4A-4E and 7A-11, but with different operations with respect to how the target article is received by the capture device 806 due to the different configuration of the capture device 806. As such, the following description will not repeat the steps carried out by an arm to bring the target article TA up to a point immediately prior to engagement with capture device 806, but will instead describe the process as it relates to the engagement and capture of the target article TA with/in the capture device 806.

Figure 15A:
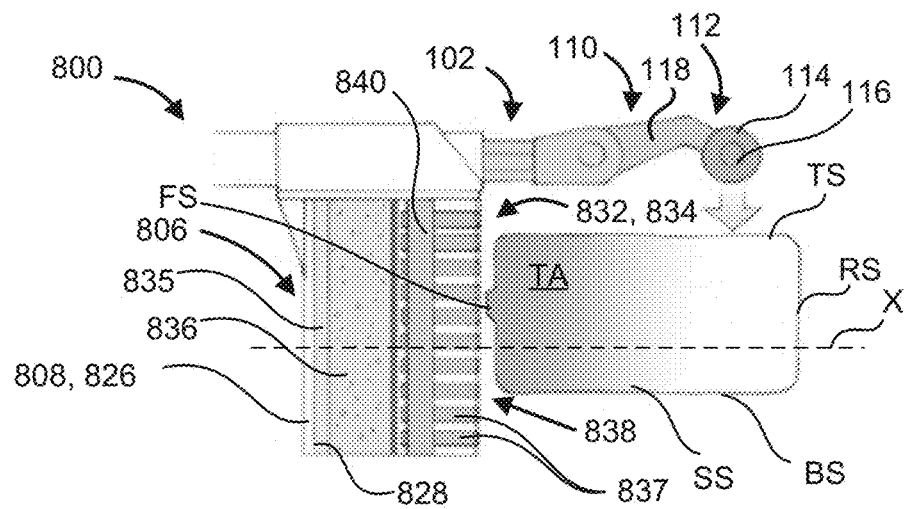
FIGS. 15A-15D illustrates a process of acquiring a target article, in accordance with at least one example of the present disclosure, using the robotic end effector of FIG. 14.

With reference also to FIGS. 14-16C, as shown in FIG. 15A, the target article TA is at a point just before contact and engagement between the rods 837 and the target article TA. The target article TA can be brought to this point by operation of the extendable arm 102, article interface system 110, or by moving the robotic end effector 800 as a whole into position near the target article TA similarly as described with reference to FIGS. 4A-4E and 7A-11 of this disclosure.

When in the position shown in FIG. 15A, the robotic end effector 800 can be operated to cause the article interface surface 114 to engage with the target article TA similarly as described with reference to FIGS. 4A-4E and 7A-11 of this disclosure. Engagement between the article interface surface 114 and the target article TA is shown in FIG. 15B.

Following engagement between the article interface surface 114 and the target article TA, the actuatable article engagement device 112 of the article interface system 110 can be actuated to move the target article TA toward the capture device 806, similarly as described with reference to FIGS. 4A-4E and 7A-11 of this disclosure. For example, moving the target article TA toward the capture device 806 can include driving the powered roller 116 to apply a first stage engagement force to the target article TA. FIG. 15B illustrates the movement of the target article TA into the capture device 806 by operation of the one or more powered rollers 116. Of course, this can be assisted by actuation of the articulating arm 118 and/or retraction of the extendable arm 102. As in other exemplary robotic end effectors described herein, the articulating arm 118 can be moved in order to move the article interface system 110 from the first position (shown in FIG. 15B) where the article interface surface 114 of the article interface system 110 is positioned engaged with a top surface TS of the target article TA) to a second position. The second position of the article interface system 110 is shown in FIGS. 15C and 15D where the article interface surface 114 is engaged with a rear surface RS of the target article TA.

Figure 15B:
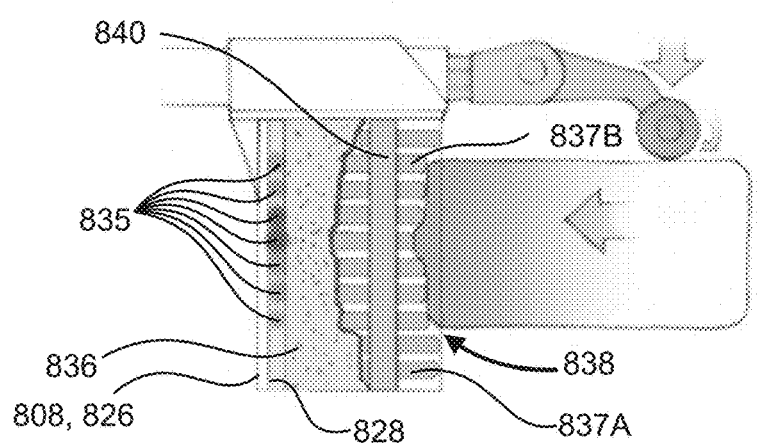
Figure 15C:
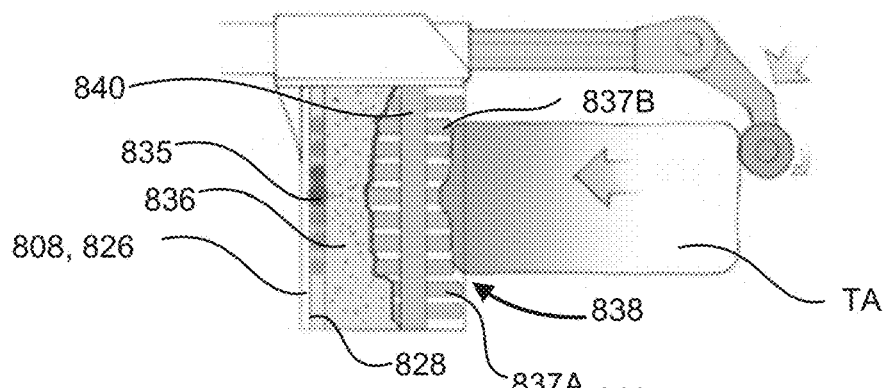
Figure 15D:
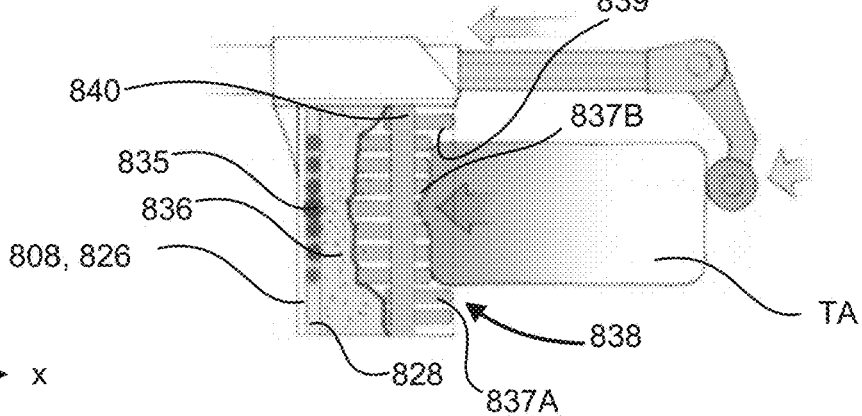

As shown in FIGS. 15B-15D, the target article TA can be received in the capture device 806 by operation of the article interface system 110 (or by the extendable arm 102, or by both). The target article TA can engage with certain rods 837 of the array of rods 838 (such as rods 837B) while not engaging other rods (such as rod 837A). The rods 837B under the force of the target article TA can slide rearward toward the support base 808. The support base 808 can have a support surface 828. The support base 808 can be positioned adjacent and/or parallel to the guide member 840 in the capture device 806 and can be operable to provide a back stop to constrain movement of the rods 837. For example, a distance between the guide member 840 and the support base 808 can be less than the length of the rods 837 to ensure that the rods 837B are only depressed to a certain level before the support surface 828 of the support base prevents further movement of the rods 837 such that the rods 837 are prevented from falling out of the guide member 840.

In other words, the rods 837B can transition from an extended position shown in FIG. 15A to an at least partially depressed position, as shown in FIGS. 15B-15D. As shown in FIGS. 15B-15D, the rods 837B in the depressed position can at least partially compress the biasing member 836. The biasing member 836 can be configured to compress under an applied load and return to an uncompressed state upon removal of the applied load. Accordingly, the biasing member 836, under compression by the rods 837B, can be attempting to expand to return to its uncompressed state, and therefore, can be applying a biasing force to the rods 837B to bias the rods 837B in a direction to return them to the extended position upon removal or partial removal of the applied load by the target article TA (e.g., when the target article TA is released).

Under the load of the target article TA against the rods 837B, the rods 837B can collectively conform to a surface of the target article TA, as shown in FIGS. 15B-15D, to provide axial support (along axis X) to the target article TA by supporting the front surface FS of the target article TA. With the target article TA compressing the rods 837B to a depressed position, the rods 837A can remain in an extended position.

Each rod 837 of the array of rods 838 can transition from the extended position to the depressed position in conjunction with other rods 837 or independent of other rods 837 such that, under application of an applied load by the target article TA to at least one rod of the array of rods 838, one or more depressed rods 837B in the depressed position provide axial support (i.e., support along an axis X of the rods 837) to the target article TA and are offset from one or more extended rods 837A in the extended position. As shown in FIGS. 15A-15D, the extended rods 837A not under the applied load can be positioned to interface with a side surface (e.g., top surface TS or bottom surface BS) of the target article TA. Thereby, the rods 837A can provide lateral (e.g., vertical, rotational, etc.) support to the target article TA in the capture device 806 to prevent the target article TA from moving upward or downward, from rotating, etc. while in a state of acquisition within the capture device 806. In other words, rods 837A not under an applied load, and thus positioned in the extended position via the biasing element 836, can provide support to the target article TA in its state of acquisition to constrain the target article TA from moving in any way relative to the capture device 806, thus helping to secure the target article TA within the capture device 806, and thus helping, along with the article engagement system 110, to secure the target article TA within the end effector 800. Indeed, any forces that may tend to cause the target article TA to move upward or downward, to rotate, of any combination of these, will cause the target article TA to come into contact with an exposed portion of an outer perimeter surface 839 of one or more rods 837A in the extended position.

As illustrated in FIGS. 15A-15D, under application of the applied load by the target article TA to at least one of the plurality of rods 837 of the capture device 806, the one or more extended rods 837A positioned adjacent to the one or more depressed rods 837B can operate to provide captured support to the target article TA via respective outer perimeter surfaces 839 of the one or more extended rods 837A that are at least partially exposed and caused to be adjacent the target article TA as it is at least partially captured within the capture device 806. Depending on the shape and configuration of the target article TA, it is to be understood that the depressed rods 837B can also provide some degree of support to the target article TA via respective outer perimeter surfaces of the depressed rods 837B (e.g., similar outer perimeter surfaces 839).

Figure 17A:
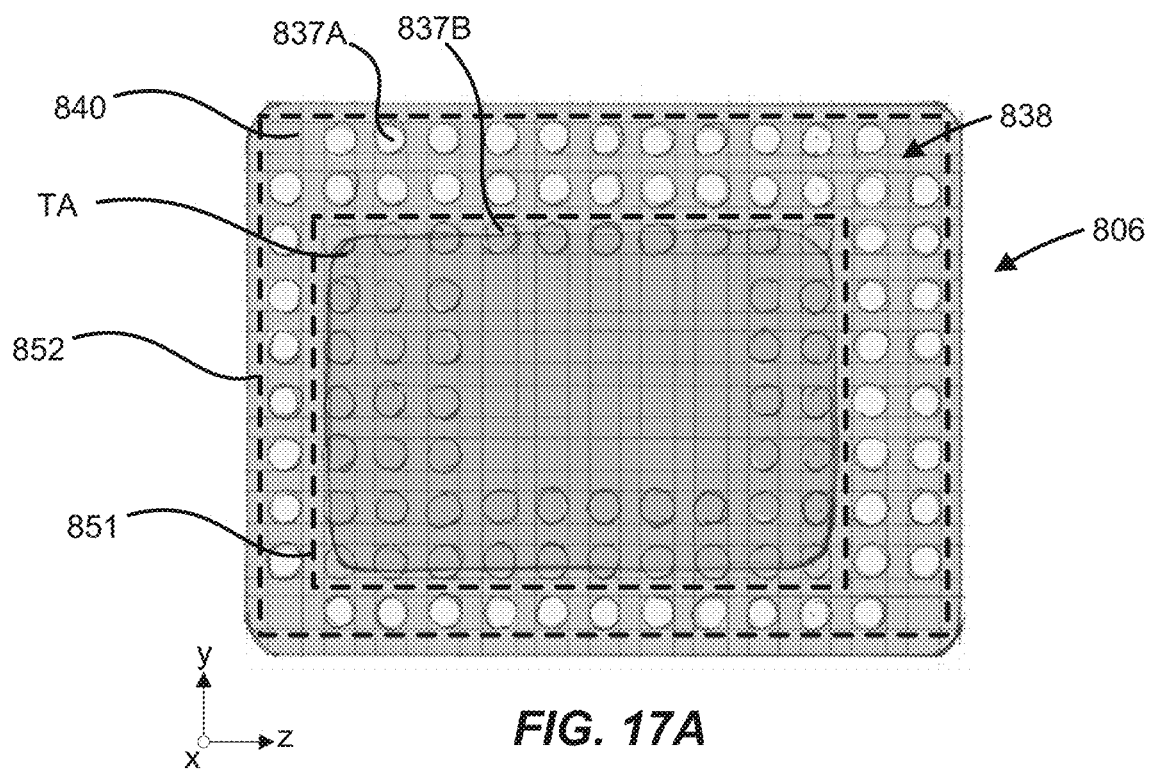
FIGS. 17A and 17B illustrate exemplary alignments of a target article with the guide member of FIG. 16A.
Figure 17B:
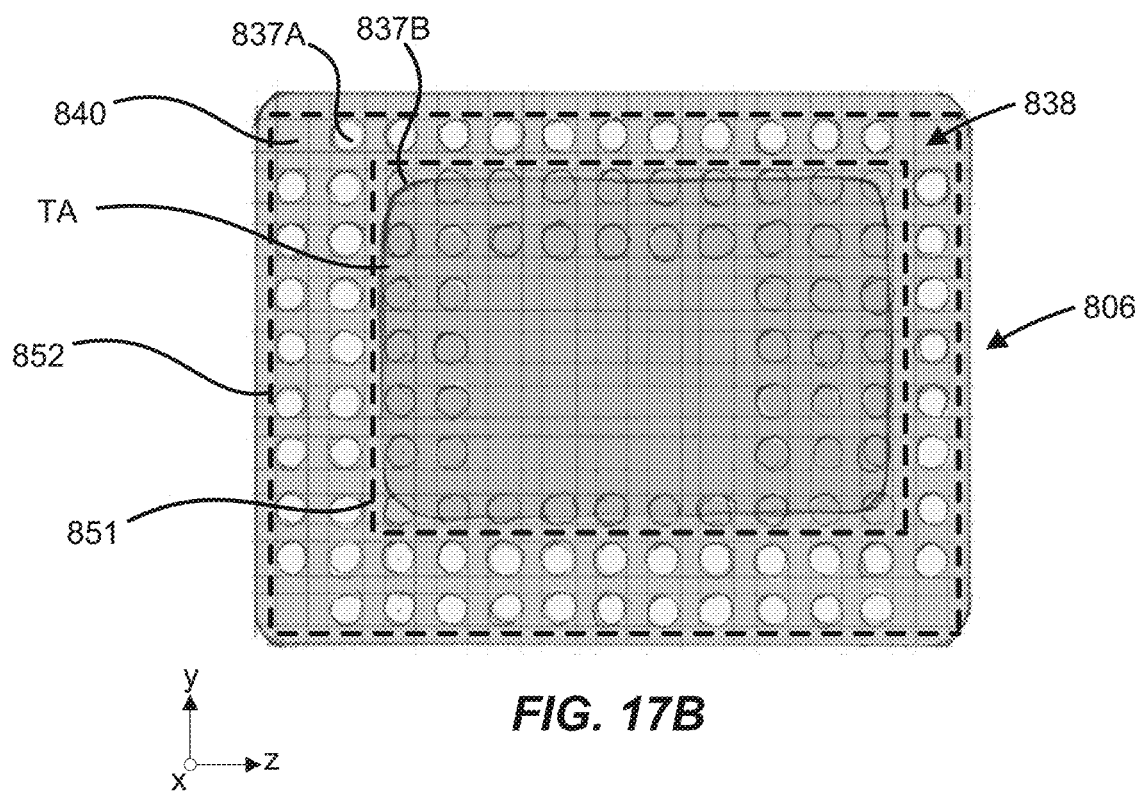

The captured support (i.e., support to the target article TA by the end effector with the target article TA in a state of acquisition) provided by the capture device 806 and extended rods 837A on the target article TA can include axial support of the target article TA (along axis X) in the x direction, as shown in FIGS. 15A-15D and FIGS. 17A and 17B. The positive and negative x directions are shown in FIGS. 17A and 17B as either extending out of the plane of the drawings or extending into the plane of the drawings. The support of the target article TA in the x direction can constrain movement of the target article TA from moving in the positive or negative x directions. Opposite the capture device 806, the article interface system 110 can provide the target article TA with axial support to constrain movement of the target article in the positive or negative x directions (along the X axis).

The captured support provided by the capture device 806 and extended rods 837A on the target article TA can further include support of the target article in the positive and/or negative y directions, as shown in FIGS. 15A-15D and FIGS. 17A and 17B. The vertical support of the target article TA in the y directions by the extended rods 837A (and possibly one or more depressed rods 837B) can constrain movement of the target article TA from moving in the positive or negative y directions. The article interface system 110 (e.g., via locking the articulating arm 118 and/or roller 116) can also provide the target article TA with lateral support to constrain movement of the target article in the positive and/or negative y directions.

The captured support provided by the capture device 806 and extended rods 837A on the target article TA can further include support of the target article TA in the positive and/or negative z directions, as shown in FIGS. 15A-15D and FIGS. 17A and 17B. The positive and negative z directions are shown in FIGS. 15A-15D as either extending out of the plane of the drawings or extending into the plane of the drawings. The support of the target article TA in the positive and negative z directions by the extended rods 837A (and possibly one or more depressed rods 837B) can constrain movement of the target article TA from moving in the positive or negative z directions. The article interface system 110 (e.g., via locking the articulating arm 118 and/or roller 116 and via friction or mechanical engagement) can also provide the target article TA with support to constrain movement of the target article in the positive and/or negative z directions.

It is to be understood that the captured support provided by the rods 837 can further provide rotational support to constrain rotational movement of the target article TA via the extended rods 837A and the depressed rods 837B, and the exposed outer or perimeter surfaces 839 of the extended and depressed rods 837A and 837B in contact with the target article TA. The rotational support can constrain rotational movement of the target article TA in any of the positive or negative rotational directions about the x, y, or z axes illustrated in FIGS. 15A-15D and 17A and 17B.

It is to be understood that the captured support can be one or more of translational movement in the +/−x directions, the +/−y directions, and/or the +/−z directions. The captured support can further be one or more of positive/negative rotational movement about the x axis, the y axis, and/or the z axis. In short, captured support provided to the target article TA by the rods 837 and the capture device 806, in conjunction with the extendable arm 102 and the article interface system 110, can include support in any combination of the translational and/or rotational directions to facilitate capture of the target article TA within the capture device 806. The target article TA can be considered "captured" by the capture device 806 when the target article TA is in a state of acquisition as supported in one or more of the support directions (e.g., translational movement in the +/−x directions, the +/−y directions, the +/−z directions and/or rotational movement about the x, y, and/or z axes) to a sufficient degree to counter collective forces acting on the target article TA.

With reference to FIGS. 14-17B, the end effector 800 can further include one or more sensors 835 that can be associated with the capture device 806. For example, the one or more sensors 835 can be coupled to or otherwise supported on the support surface 828, embedded within the support base 808/base plate 826, or both of these. The sensors 835 can be configured to provide informational feedback related to operation of the end effector 800. In one example, the one or more sensors 835 can be associated with the support base 808, such as the support surface 828, of the capture device 806, and can be of a type configured for measuring the positional displacement and/or engagement force acting on the target article TA. The one or more sensors 835 can be load sensors associated with one or more rods 837 of the array of rods 838 and operable to measure an engagement force acting on the target article TA. Each rod 837 can be supported by the support base 808 within the guide member 840 via the biasing member 836 and/or the load sensors 835. As shown in FIGS. 15B-15D, the load sensors 835 can be disposed between the biasing member 836 and the support base 808. In one aspect, the one or more load sensors 835 can comprise a single load sensor used to measure a load from the rods 837 collectively. In another aspect, the one or more load sensors 835 can comprise an array of discrete load sensors 835 that are each associated with at least one of the rods 837 (e.g., a single load sensor can be associated with two or more rods 837). In still another aspect, each load sensor 835 can be associated with an individual, respective rod 837, such that each rod 837 in the array of rods 838 is operable with its own associated load sensor 835. The one or more load sensors 835 can be configured to sense a force acting on the capture device 806 (e.g., support base 808) by the target article TA as the target article TA is caused to be received within the capture device 806, and pushed into the support base 808 of the capture device 806 by the article interface system 110.

With one or more load sensors 835 being operable to measure the engagement force acting on the target article TA by the end effector 100, the article interface system 110 can be operable to transition from the first position (shown in FIG. 15B) to the second position (shown in FIGS. 15C and 15D) upon the one or more load sensors 835 detecting a threshold first stage engagement force as the target article TA is caused to engage capture device 806. The threshold first stage engagement force can be set to any desired value based on, for example, operational parameters, a user's needs, or other factors. More specifically, the threshold first stage engagement force can be a value of a force acting on the target article TA that shows a level of engagement between the target article TA and the capture device 806 sufficient to allow the article interface system 110 to transition from the first position to the second position (i.e., the articulating arm 118 and the roller 116 transition from the top surface of the target article TA to the rear surface RS of the target article TA) without the target article TA dropping out of the capture device 806 or falling from the end effector 100.

In a case where a single load sensor 835 is used to measure a load of the target article TA engaging with the capture device 806, the threshold first stage engagement force can be a single force reading measured by the single load sensor 835. In a case where a plurality of load sensors 835 are used to measure the load, it is to be understood that each of the plurality of load sensors 835 can be measuring different load magnitudes base on the different levels of depression of the array of rods 837 against the biasing member 836 (see FIGS. 15B-15D). Accordingly, in a case in which a plurality of load sensors 835 are measuring load, the threshold first stage engagement force can be determined to be reached based on at least one load sensor of the plurality of load sensors 835 measuring a load equal to or greater than the threshold first stage engagement force. Alternatively, the threshold first stage engagement force can be determined to be reached upon two or more load sensors, or a threshold number of load sensors, of the plurality of load sensors 835 measuring a load equal to or greater than the threshold first stage engagement force. Alternatively, the threshold first stage engagement force can be determined to be reached upon an average of the loads being measured by the plurality of load sensors 835 being equal to or greater than the threshold first stage engagement force. Indeed, it is contemplated that the transition of the article interface system 110 from the first position (shown in FIG. 15B) to the second position (shown in FIGS. 15C and 15D) can be based on a number of different determinations, these being based on the one or more sensed loads by the one or more load sensors 835.

Similar to other robotic end effectors described herein, in the end effector 800, the article interface system 110 can be operated to at least maintain the threshold first stage engagement force measured by one or more of the load sensors 835 during transition from the first position to the second position. The article interface system 110 (and/or the extendable arm 102) can be operated to maintain the threshold first stage engagement force by moving to maintain contact between the article interface surface 114 and the target article TA as the article interface system 110 transitions from the first position to the second position.

In order to further facilitate holding the target article TA in the capture device 806 and to prevent the target article TA from falling out of the end effector 800, the rollers 116 and articulating arms 118 can lock in place. For example, upon transition to the second position, the actuatable article engagement device 112 comprising the one or more powered rollers 116 movably coupled to the articulating arm 118 can be locked in position to prevent movement of the one or more powered rollers 116 relative to the articulating arm 118, which could cause the target article TA to fall. In other words, the powered rollers 116 can act as a brake or a lock holding the target article TA in the capture device 106. Furthermore, the articulating arm 118 can be locked in position to prevent movement of the articulating arm 118 about the actuatable joint 122 upon transition from the first position to the second position such that the articulating arm 118 functions as a stop, brake, or locking member holding the target article TA in the capture device 806.

In the second position, the article interface system 110 can be positioned to apply a second stage engagement force to the target article TA. For example, with the article interface surface 114 being engaged with the rear surface RS of the target article TA, the article interface system 110 can apply the second stage engagement force to urge the target article TA further into the capture device 106. The second stage engagement force can be applied by one or more of actuating the articulating arm 118 using the actuator 124 of the actuatable joint 122 or actuating the extendable arm 102 to retract the first link 104A relative to the second link 104B of the first support member 104 by using the actuator 107 to actuate the actuatable joint 105. In this case, the articulating arm 118 can be held or locked in place so as to prevent rotation between the articulating arm 118 and the first link 104A. In another example, both of these functions, namely rotating the articulating arm 118 and retracting the first link 104A can be carried out simultaneously. These functions and actions can be used to further apply a force to the target article TA against the capture device 106 and to more firmly hold the target article TA within the capture device 106.

The target article TA can be urged into the capture device 806 by at least one of the extendable arm 102 or the article interface system 110 until a state of acquisition is achieved. The state of acquisition is defined as a state in which the forces acting on the target article TA from the end effector 800 and article interface system 110 are sufficient to counter collective forces acting on the target article TA. The collective forces acting on the target article TA can include at least one of gravitational forces acting on the target article TA, stiction between the target article TA and adjacent articles BA in contact with one or more surfaces of the target article TA, or compressive forces acting on the target article TA from surrounding articles BA. At a point at which the collective forces acting on the target article TA are countered, the end effector 800, with the article interface system 110 applying a continuous force to cause to target article TA to move towards the capture device 106, has a strong enough hold on the target article TA to lift, move, transport, or otherwise manipulate the target article TA from its current position to a new position. The forces acting on the target article TA from the end effector 800 and the article interface system 110 necessary to overcome the other collective forces acting on the target article TA can be a value determined by the user experimentally or by experience, or they can be determined in real-time using the one or more sensors 835, as well as any other sensors capable of measuring any countering forces, which sensor outputs can be processed and compared to one another.

Using the load sensors 835, a state of acquisition of the target article TA can be determined to be achieved upon one or more of the load sensors 835 detecting a predetermined threshold of the second stage engagement force, which can be determined by the user through experiments or experience or in real-time to sufficiently counter collective forces acting on the target article TA. In a case where a single load sensor 835 is used to measure a load of the target article TA engaging with the capture device 806, the predetermined threshold of the second stage engagement force can be a single force reading measured by the single load sensor 835. In a case in which a plurality of load sensors 835 are measuring load, the predetermined threshold of the second stage engagement force can be determined to be reached based on at least one load sensor of the plurality of load sensors 835 measuring a load equal to or greater than the predetermined threshold of the second stage engagement force. Alternatively, the predetermined threshold of the second stage engagement force can be determined to be reached upon two or more load sensors, or a threshold number of load sensors, of the plurality of load sensors 835 measuring a load equal to or greater than the predetermined threshold of the second stage engagement force. Alternatively, the predetermined threshold of the second stage engagement force can be determined to be reached upon an average of the loads being measured by the plurality of load sensors 835 being equal to or greater than the predetermined threshold of the second stage engagement force.

With the configuration of capture device 806 being larger than the target article TA, the target article TA can be captured in a number of positions and/or orientations relative to the capture device 806 and the guide member 840 without needing to be exactly aligned or oriented with the position and orientation of the capture device 806 in any specific way. For example, as shown in FIGS. 17A and 17B that illustrate front views of the capture device 806, the target article TA can be aligned centrally or it can be in a position offset with respect to the guide member 840 and still be captured by the capture device 806. As shown in FIG. 17A, for instance, the target article TA can be offset toward a bottom and/or toward a left side of the capture device 806, or in any other position. In any of these alignments, certain rods 837B are depressed by contact with the target article TA (e.g. rods 837B within the area 851 outlined by a dotted line). Other rods 837A remain extended, and can be operable to support at least one of upper, lower or side surfaces of the target article (e.g., rods 837A within the area 852 outlined by a dotted line but outside of the area 851). It is further to be understood that the target article TA can be oriented on an angle with respect to the capture device 806 (e.g., an axis of the target article TA (e.g., see axis X in FIG. 15A) can be out of alignment with an axis extending through the capture device normal to the guide member 840) and still be captured within the capture device 806 as supported with the rods 837. Stated another way, a surface of the target article TA facing towards the capture device 806 does not need to be parallel (or a side surface of the target article TA does not need to be perpendicular) to the guide member 840 in order for the target article TA to be captured within the capture device 806, thus being able to be supported, moved, and/or manipulated by the end effector 800.

Figure 18A:
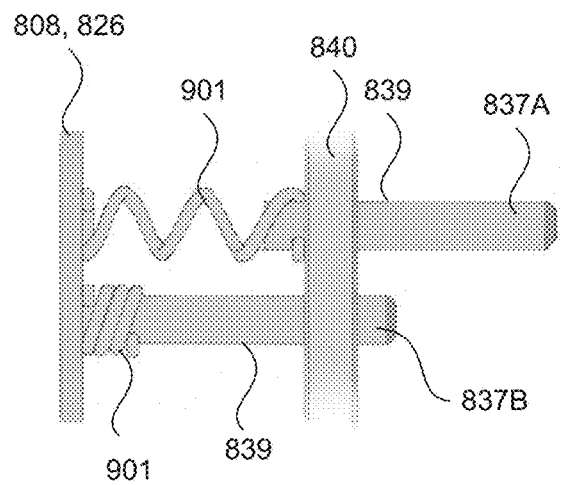
FIGS. 18A-18D illustrate exemplary configurations of compliant rods used, in the capture device of the robotic end effector of FIG. 14, in both extended and depressed positions in accordance with at least one example of the present disclosure.

Alternative biasing members other than a compliant material mass (e.g., a type of the biasing member 836 described above) can be used to bias the rods 837 to the extended position. Example alternatives are illustrated in FIGS. 18A-18D. As shown in FIG. 18A, the biasing member 836 can be replaced by a spring 901 that acts as the biasing member. FIG. 18A shows both a rod 837A in the extended position and a rod 837B in the depressed position relative to the guide member 840 and support base 808. The spring 901 can be supported between the rods 837 and the support base 808, and can be configured to bias (e.g., exert a force upon) the rods 837 in a direction away from the support base 808. As shown, a respective spring 901 can be used to couple the rods 837A and 837B to the support base 808 (e.g., the base plate 826). The spring 901 can have one end coupled to an outer perimeter surface 839 at an end of the rods 837A and 837B and another end coupled to the support base 808. This particular arrangement is not intended to be limiting in any way, however. Indeed, the spring 901 can be supported between the rods 837 and the support base 808 using any supporting structural arrangements. The spring 901 can be configured to bias the rods 837A and 837B to the extended position. In one example, the spring 901 can be a coiled compressive spring.

Figure 18B:
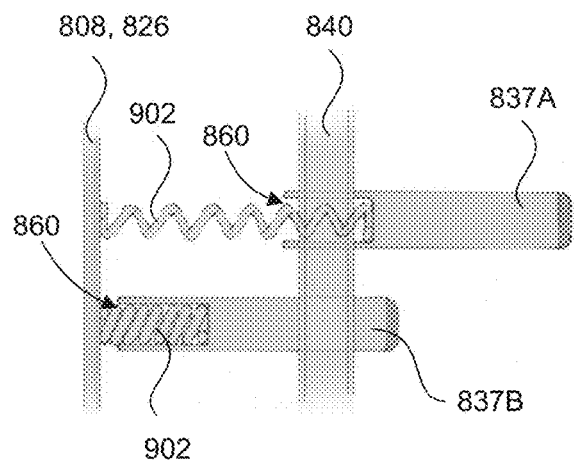

As shown in FIG. 18B, the biasing member 836 can be replaced by a spring 902 that acts as the biasing member. FIG. 18B shows both a rod 837A in the extended position and a rod 837B in the depressed position relative to the guide member 840 and support base 808. The spring 902 can be supported between the rods 837 and the support base 808, and can be configured to bias (e.g., exert a force upon) the rods 837 in a direction away from the support base 808. As shown, a respective spring 902 can be used to couple the rods 837A and 837B to the support base 808 (e.g., the base plate 826). The spring can have one end coupled to the rods 837A and 837B at a surface within an inner cavity 860 (e.g., either coupled to a surface defining the cavity 860 or other element or structure disposed in the cavity 860) defined in an end of the rods 837A and 837B and can have another end coupled to the support base 808. This particular arrangement is not intended to be limiting in any way, however. Indeed, the spring 902 can be supported between the rods 837 and the support base 808 using any supporting structural arrangements. The spring 902 can be configured to bias the rods 837A and 837B to the extended position. In one example, the spring 902 can be a coiled compressive spring.

Figure 18C:
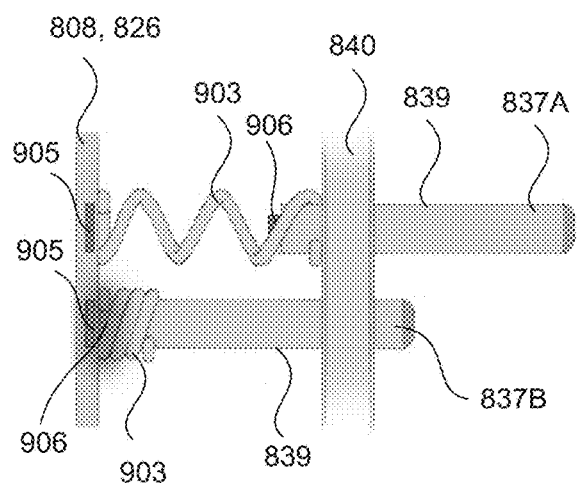
Figure 18D:
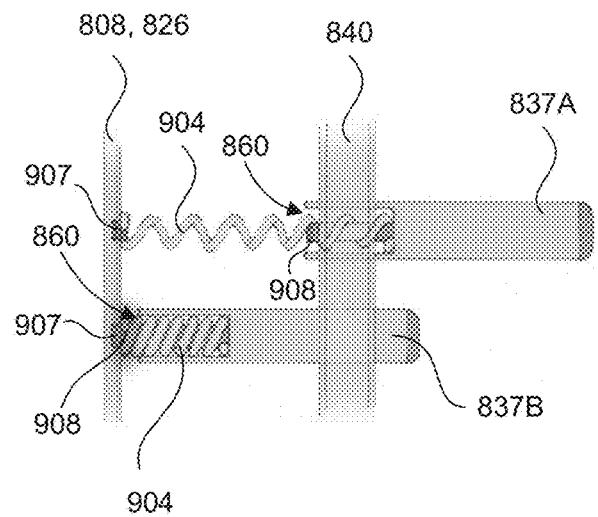

As shown in FIG. 18C, one or more sensors (e.g., either or both of sensors 905 and 906) can be used in conjunction with the rods 837A and 837B. Similarly, as shown in FIG. 18D, one or more sensors (e.g., either or both of sensors 907 and 908) can be used in conjunction with the rods 837A and 837B. One or more of the sensors (e.g., 905, 906, 907, 908) can be load sensors (e.g., load sensors 835) as described above with respect to FIGS. 15A-15D and can be operable to measure loads acting on the rods 837A and 837B to determine proper acquisition and capture of the target article TA.

Alternatively or additionally, one or more of the sensors (e.g., 905, 906, 907, 908) can be position sensing sensors, either operating alone or in conjunction with each other, to determine a position of the rods 837A and 837B. In other words, the sensors 835 illustrated in FIGS. 15A-15D can be load sensors and/or position sensors. In a case in which the sensors 835 are position sensors, the position and/or displacement of the rods 837A and 837B can be determined relative to the guide member 840 or the support base 808 using the position sensors 835. The displacement or position can be defined as a distance the rod 837 is moved from the extended position, thereby indicating a distance that the rod 837 has been depressed. Accordingly, instead of, or in addition to, using a load sensor, a position sensor (e.g., one or more of sensors 905, 906, 907, 908) can be used to determine a state of acquisition and capture of the target article TA. For example, assuming no load sensor is being used, the position sensor(s) 835 (e.g., one or more of sensors 905, 906, 907, 908) can be used to measure a displacement distance of the rods 837 in contact with the target article TA, and to indicate when a target article TA is sufficiently captured for the article interface system 110 to transition from the first position to the second position based on a threshold distance being reached by at least one of the rods 837. More specifically, with a position sensor for each rod 837 operable to measure the position (whether in the extended position or the depressed position) of the rod 837, and therefore, the position of the target article TA interacting with the displaced rods 837, the article interface system 110 can be operable to transition from the first position (shown in FIGS. 15B) to the second position (shown in FIGS. 15C and 15D) upon the position sensor(s) 835 detecting a threshold first stage displacement of one or more rods 837 as the target article TA is caused to engage the capture device 806. The threshold first stage displacement can be set to any desired value, or in real-time. More specifically, the threshold first stage displacement can be a value of displacement of one or more rods 837 that shows a level of engagement between the target article TA and the capture device 806 sufficient to allow the article interface system 110 to transition from the first position to the second position (i.e., the articulating arm 118 and the roller 116 transition from the top surface TS of the target article TA to the rear surface RS of the target article TA) without the target article TA dropping out of the capture device 806 or falling from the baggage handling end effector 800. The article interface system 110 can be operated to at least maintain the threshold first stage displacement measured by the position sensor(s) 835 during transition from the first position to the second position. The article interface system 110 (and/or the extendable arm 102) can be operated to maintain the threshold first stage displacement by moving to maintain contact between the article interface surface 114 and the target article TA as the article interface system 110 transitions from the first position to the second position.

In the second position, the article interface system 110 can be positioned to apply a second stage engagement force to the target article TA, similar to as described above with respect to FIGS. 4A-4E, 7A-11, and 15A-D. The target article TA can be urged into the capture device 106 by the extendable arm 102 and/or the article interface system 110 until a state of acquisition is achieved. The state of acquisition is defined as a state in which the forces acting on the target article TA from the baggage handling end effector 100 are sufficient to counter collective forces acting on the article. The collective forces acting on the target article TA can include gravitational forces acting on the article, stiction between the target article TA and adjacent articles BA in contact with one or more surfaces of the target article TA, and/or compressive forces acting on the target article TA from surrounding articles BA. At a point at which the collective forces acting on the target article TA are countered, the end effector 800 has a strong enough hold on the target article TA to lift, move, transport, or otherwise manipulate the target article from its current position to a new position. The forces acting on the target article TA from the end effector 800 necessary to overcome the other collective forces acting on the target article TA can be associated with a displacement value of one or more of the rods 837, which displacement value can be determined by the user experimentally, by experience, or in real-time by comparing sensor output data from various sensors measuring forces between the capture device 806 and the target article TA, and those countering forces acting on the target article TA. Using the position sensor(s) 835 (e.g., one or more of sensors 905, 906, 907, and 908), a state of acquisition of the target article can be determined to be achieved upon the position sensor(s) 835 detecting a predetermined threshold of the second stage displacement of one or more rods 837 that is determined by the user, through experiments or experience, or in real-time to be indicative of a position of the target article TA in the capture device 806 in which the target article TA is sufficiently supported to counter collective forces acting on the target article TA.

FIG. 15C illustrates the article interface system 110 in the second position along a rear surface RS of the target article TA. FIG. 15D illustrates the article interface system 110 in the second position along the rear surface RS of the target article TA and further driving the target article TA into the capture device 106 by operation of the article interface system 110 (e.g., by rotating the articulating arm 118) and/or the extendable arm 102 (e.g., by retracting the extendable arm 102). Using the position sensor(s) 835 (e.g., one or more of sensors 905, 906, 907, and 908), a state of acquisition of the target article TA can be determined to be achieved upon the position sensor(s) 835 detecting a predetermined threshold of the second stage displacement sufficient to counter collective forces acting on the target article TA.

Various methods and/or algorithms can be used to determine that the threshold first stage displacement and/or the threshold of the second stage displacement has been achieved based on the positions of one or more rods 837 measured by one or more position sensor(s) 835 (e.g., one or more of sensors 905, 906, 907, 908). For example, the threshold first stage displacement can be determined to be met upon one position sensor 835 registering the threshold first stage displacement of one rod 837. In a case where a plurality of position sensors 835 are used (e.g., a position sensor being associated with each of the individual rods 837 in the rod array 838), it is to be understood that each of the plurality of position sensors 835 can be measuring different rod displacement values based on the different levels of depression of the rods 837 within the capture device 806 (see FIGS. 15B-15D). Accordingly, in a case in which a plurality of position sensors 835 are measuring different positions of rods 837, the threshold first stage displacement can be determined to be reached based on at least one position sensor 835 of the plurality of position sensors measuring a displacement of an associated rod 837 equal to or greater than the threshold first stage displacement. Alternatively, the threshold first stage displacement can be determined to be reached upon two or more position sensors, or a threshold number of position sensors, of the plurality of position sensors 835 measuring a displacement equal to or greater than the threshold first stage engagement force. Alternatively, the threshold first stage displacement can be determined to be reached upon an average of the displacements of the depressed rods 837B being measured by the plurality of position sensors 835 being equal to or greater than the threshold first stage displacement.

Similarly, the predetermined threshold of the second stage displacement can be determined to be met upon one position sensor 835 registering the predetermined threshold of the second stage displacement of one rod 837. In a case in which a plurality of position sensors 835 are measuring different positions of rods 837, the predetermined threshold of the second stage displacement can be determined to be reached based on at least one position sensor 835 of the plurality of position sensors measuring a displacement of an associated rod 837 equal to or greater than the predetermined threshold of the second stage displacement. Alternatively, the predetermined threshold of the second stage displacement can be determined to be reached upon two or more position sensors, or a threshold number of position sensors, of the plurality of position sensors 835 measuring a displacement equal to or greater than the predetermined threshold of the second stage displacement. Alternatively, the predetermined threshold of the second stage displacement can be determined to be reached upon an average of the displacements of the depressed rods 837B being measured by the plurality of position sensors 835 being equal to or greater than the predetermined threshold of the second stage displacement.

It is to be understood that, with a known spring constant (k) of the biasing members 836, Hooke's law (i.e., $F=kx$) can be used to relate the force (F) acting on the rods 837/target article TA to the displacement (x) of the rods 837 in order to determine an unknown force F acting on the target article TA from a known displacement (e.g., provided by position sensors) or to determine an unknown displacement x of the rods 837 and/or target article TA within the capture device 806 relative to the guide member 840, from a known force F acting on the rods 837 and target article TA (e.g., provided by the load sensors). Additionally or alternatively, the one or more sensors 835 can include an optical sensor configured to sense a proximity, position, or displacement of the target article TA within the capture device 806.

Figure 19A:
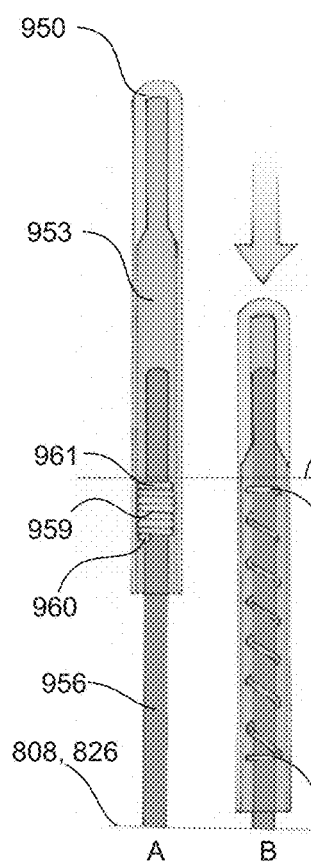
FIGS. 19A-19C illustrate exemplary configurations of compliant rods used, in the capture device of the robotic end effector of FIG. 14, in both extended and depressed positions in accordance with at least one example of the present disclosure.
Figure 19B:
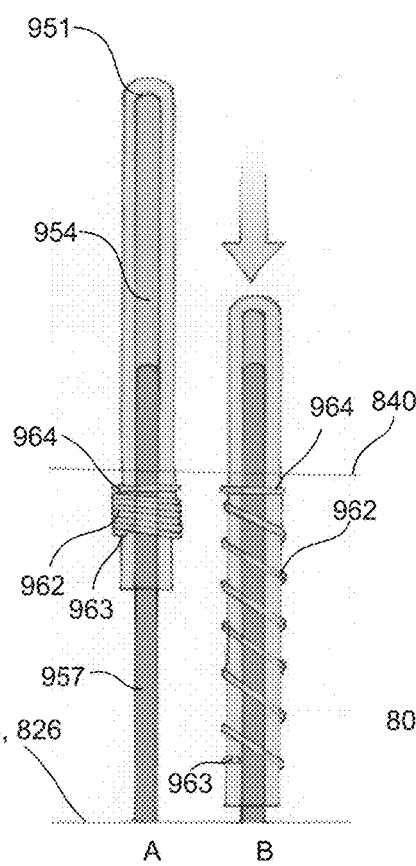
Figure 19C:
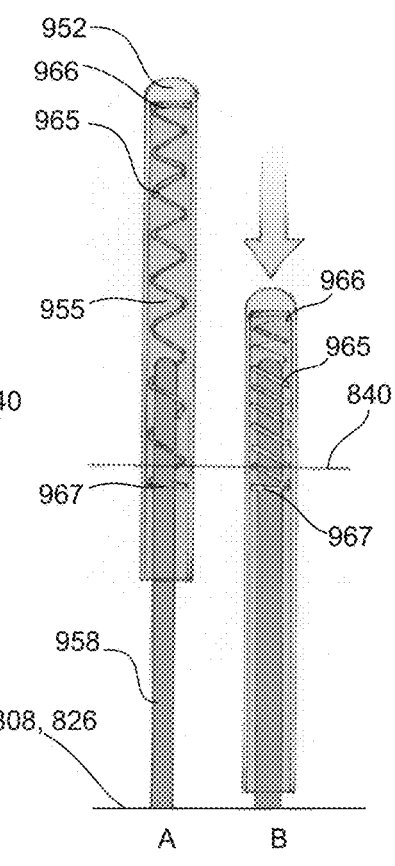

Further alternative configurations of the rods and biasing members are contemplated and illustrated in FIGS. 19A, 19B, and 19C. Each of FIGS. 19A, 19B, and 19C illustrate cross sections of alternative rod configurations to show the internal structure of each of rods 950, 951, and 952. Each of the rods can be slidably supported in a guide member 840. Rods 950, 951, and 952 can each define a respective inner cavity 953, 954, and 955 and each inner cavity 953, 954, and 955 can slidably receive a respective shaft 956, 957, and 958. The rods 950, 951, and 952 can actuate between an extended position and a depressed position (respectively labeled positions A and B in each of FIGS. 19A, 19B, and 19C) along the shafts 956, 957, and 958. The shafts 956, 957, and 958 can be coupled to a base plate 826 or support base 808. Each of the rods 950, 951, and 952 can be coupled to their respective shafts 956, 957, and 958 via a biasing member (e.g., a spring) operable to bias the rods 950, 951, and 952 to the extended position A.

For example, as shown in FIG. 19A, a biasing member 959 can be disposed within the inner cavity 953 of the rod 950. The biasing member 959 can be a coil tension spring. The biasing member 959 can comprise a first end 960 coupled to the rod 950 and a second end 961 coupled to the shaft 956. The biasing member 959 itself can be biased to be in a compressed state (shown in position A of FIG. 19A) such that when the biasing member 959 is stretched (shown in position B of FIG. 19A) by an applied load, the biasing member 959 will return to the compressed state upon removal of the applied load. Accordingly, exerting a force to depress the rod 950 toward the support base 808 (e.g., moving the rod 950 to a depressed position) will cause the biasing member 959 to stretch. Upon removal of the force on the rod 950, the biasing member 959 will return to the compressed state, causing the rod 950 to move from the depressed position B to the extended position A.

As shown in FIG. 19B, a biasing member 962 can be disposed outside the rod 951 around an outer perimeter surface of the rod 951. The biasing member 962 can be a coil tension spring. The biasing member 962 can comprise a first end 963 coupled to the rod 951 and a second end 964 coupled to another structure (e.g., the shaft 957, the guide member 840, or to another outside structure separate from the rod 951 and shaft 957) such that the second end 964 remains stationary as the rod 951 is actuated. The biasing member 962 itself can be biased to be in a compressed state (shown in position A of FIG. 19B) such that when the biasing member 962 is stretched (shown in position B of FIG. 19B) by an applied load, the biasing member 962 will return to the compressed state upon removal of the applied load. Accordingly, exerting a force to depress the rod 951 toward the support base 808 (e.g., moving the rod 951 to a depressed position) will cause the biasing member 962 to stretch. Upon removal of the force on the rod 951, the biasing member 962 will return to the compressed state, causing the rod 951 to move from the depressed position B to the extended position A.

As shown in FIG. 19C, a biasing member 965 can be disposed within the inner cavity 955 of the rod 952. The biasing member 965 can be a coil compression spring. The biasing member 965 can comprise a first end 966 coupled to the rod 952 and a second end 967 coupled to the shaft 958. The biasing member 965 itself can be biased to be in an extended state (shown in position A of FIG. 19C) such that when the biasing member 965 is compressed (shown in position B of FIG. 19C) by an applied load, the biasing member 965 will return to the extended state upon removal of the applied load. Accordingly, exerting a force to depress the rod 952 toward the support base 808 (e.g., moving the rod 952 to a depressed position) will cause the biasing member 965 to compress. Upon removal of the force on the rod 952, the biasing member 965 will return to the extended state, causing the rod 952 to move from the depressed position B to the extended position A.

Figure 20:
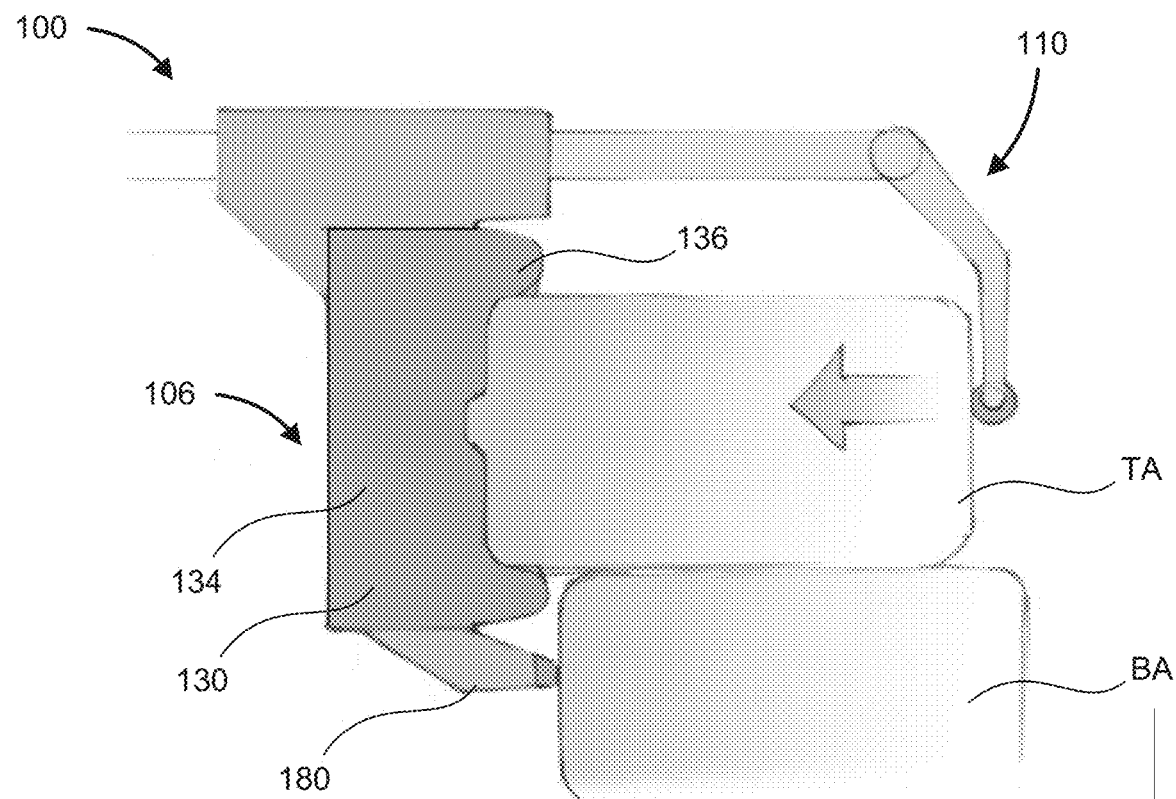
FIG. 20 illustrates a side view of an alternative configuration of the robotic end effector of FIG. 2, in accordance with at least one example of the present disclosure.
Figure 21:
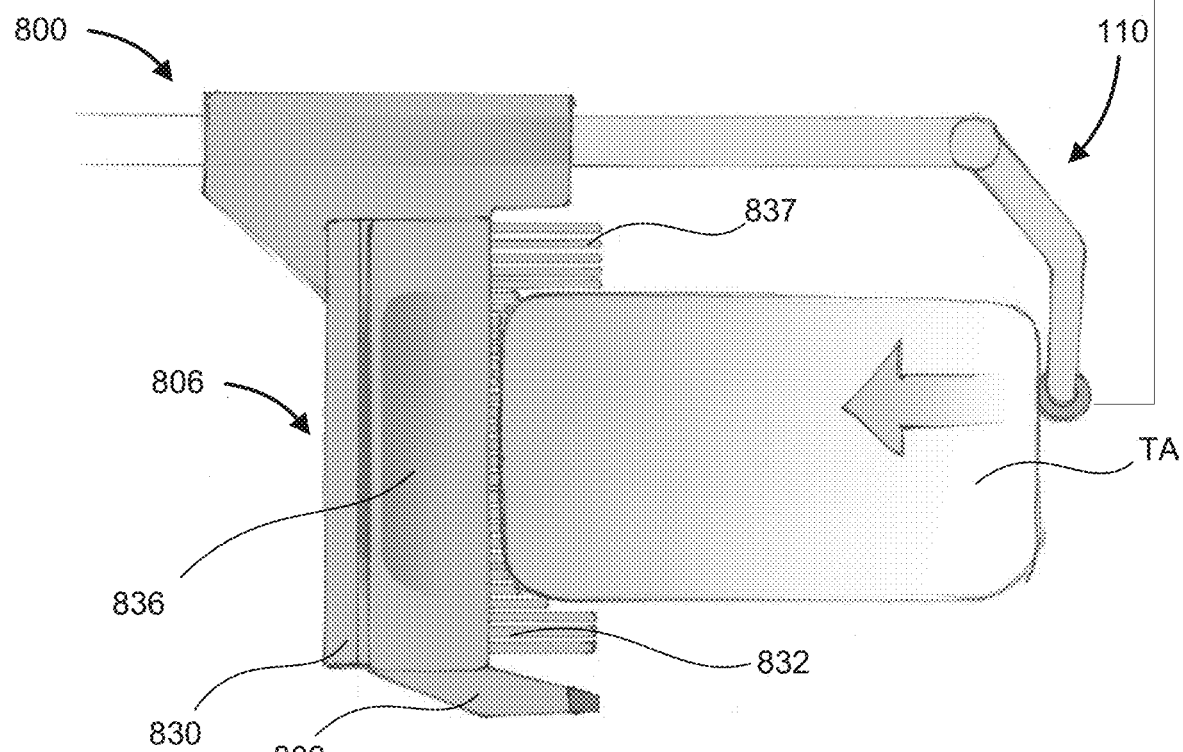
FIG. 21 illustrates a side view of an alternative configuration of the robotic end effector of FIG. 14, in accordance with at least one example of the present disclosure.

FIGS. 20 and 21 illustrate alternative configurations of robotic end effectors 100 and 800, respectively. As shown in FIG. 20, the compliant element 136 can extend outward beyond an edge of the wall 130. With the compliant element 136 extending beyond the wall 130, the compliant element 136 can engage, contact, and/or interface with the target article TA before operation of the article interface system 110 is carried out to move the target article TA toward the capture device 106. Additionally, a stopper extension 180 can be coupled to the capture device 106 (e.g., on a surface of the wall 130). The stopper extension 180 can extend past an edge of the wall 130 defining the opening 132 and the volumetric interior 134. The stopper extension 180 can operate to abut against an adjacent article BA during acquisition of the target article TA. The stopper extension 180 can prevent the adjacent article BA from moving or shifting during acquisition of the target article TA in the event stiction between the adjacent article BA and the target article TA is too great to be overcome by the article interface system 110 alone, or in the event elements of the adjacent article BA and the target article TA are caught on one another, such that movement of the target article TA towards the capture device 106 also causes the adjacent article BA to move towards the capture device 106. In other words, the stopper extension 180 can hold the adjacent article BA in place while the target article TA is moved by the article interface system 110. While the stopper extension 180 is shown extending from a bottom of the capture device 106 in FIG. 20, it is to be understood that the stopper extension 180 can be placed anywhere necessary to prevent any adjacent articles BA from moving during acquisition of the target article TA (e.g., whether the adjacent articles are placed on top of, below, or to the sides of the target article TA).

Similarly, as shown in FIG. 21, the end effector 800 can include a plurality of rods 837 that can include at least some of which that extend outward beyond the wall 830 to a position outside of the volumetric interior 836. With the rods 837 extending beyond the wall 830, the rods 837 can engage, contact, and/or interface with the target article TA before operation of the article interface system 110 is carried out to move the target article TA toward the capture device 806. Additionally, a stopper extension 880 can be coupled to the capture device 806 (e.g., on a surface of the wall 830). The stopper extension 880 can extend past an edge of the wall 830 defining the opening 832 and the volumetric interior 834. The stopper extension 880 can operate to abut against an adjacent article BA during acquisition of the target article TA. The stopper extension 880 can prevent the adjacent article BA from moving or shifting during acquisition of the target article TA in a similar manner as discussed above. While the stopper extension 880 is shown extending from a bottom of the capture device 806 in FIG. 21, it is to be understood that the stopper extension can be placed anywhere necessary to prevent any adjacent articles BA from moving during acquisition of the target article TA (e.g., whether the adjacent articles are placed on top of, below, or to the sides of the target article TA).

Figure 22:
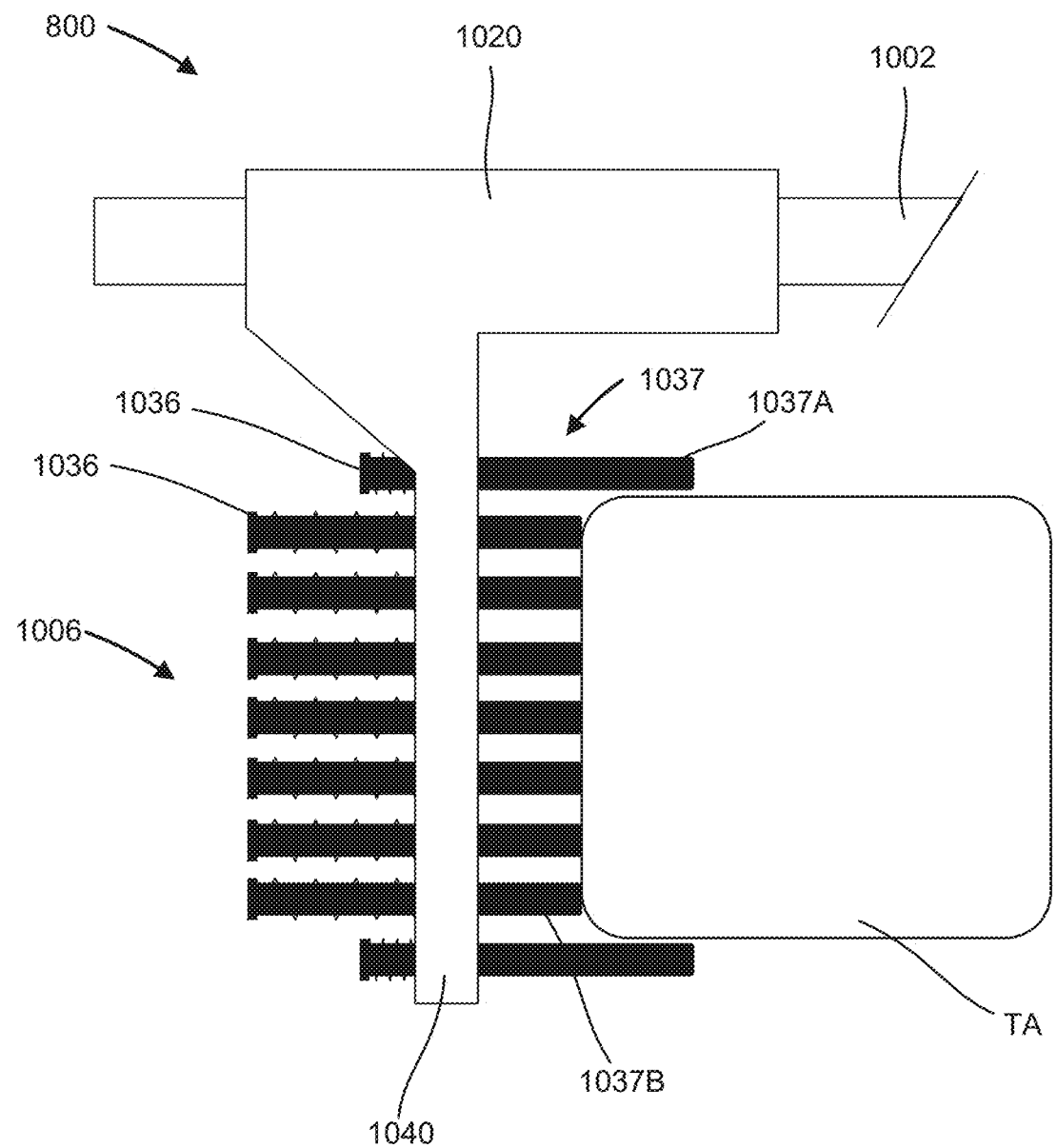
FIG. 22 illustrates a side view of an alternative configuration of a robotic end effector in accordance with at least one example of the present disclosure.

An alternative configuration of the end effector 800 having a capture device 1006 with an array of rods 1037 is also contemplated by this disclosure and described with reference to FIG. 22. For convenience, the extendable arm 1002 is not fully shown but should be understood to still be present and operable with the capture device 1006. As shown in FIG. 22, the support base 808 or base plate 826 can be omitted while still achieving a capture device 1006 having an array of rods 1037 that are each biased to an extended position by a biasing member 1036. For example, the capture device 1006 can include a guide member 1040 that can be supported on an end effector interface 1020. The guide member 1040 can itself support an array of rods 1037. The guide member 1040 can be configured to have a plurality of apertures slidably supporting the rods 1037, similar to those shown in FIGS. 16A-16C. Each of the rods 1037 can have an extended position (shown with respect to rod 1037A) and a depressed position (shown with respect to rod 1037B).

Each rod 1037 can be coupled to the guide member 1040 via a biasing element 1036, such as a coil tension spring. As shown the biasing elements 1036 can have one end coupled to the guide member 1040 and another end coupled to the rod 1037. As a rod 1037 is depressed (e.g., by the target article TA), the biasing member 1036 can be caused to lengthen or expand (see rods 1037B). As the rod is released from its depressed position, the rod can return to the extended position (see rods 1037A) by the biasing member returning to its unstretched state. The biasing members 1036 can also act to constrain movement of the rods 1037 to a certain degree in order to ensure that the rods 1037 do not fall out of the guide member 1040. It is to be understood that the capture device 1006 can operate in a similar manner to any of the capture devices described herein with respect to FIGS. 14-21, including placing load sensors and/or position sensors to be associated with the rods 1037. As such, a detailed description of the operation of capture device 1006 will not be recited here.

An alternative configuration of the end effector 1100 is now described with reference to FIGS. 23A-23D. Each of FIGS. 23A-23D show a cross-section of the capture device 1106 (e.g., taken along a line similar to line AA shown in FIG. 3). The end effector 1100 can acquire and manage an article similar to other end effectors described herein. The end effector 1100 can include a capture device 1106 described in more detail below.

Similar to other end effectors as described herein, the end effector 1100 can include the article interface system 110 supported by the extendable arm 102. The article interface system 110 can include an actuatable article engagement device 112 that itself comprises an article interface surface 114. The actuatable article engagement device 112 can be operable to interface with the target article TA to facilitate movement of the target article TA toward the capture device 1106. As the functions of the extendable arm 102 and the actuatable article engagement device 112 operate similarly as other example end effectors described herein, the operation of these elements will not be repeated in detail here, but it is to be understood that operations described with respect to other examples of end effectors can also apply to end effector 1100. It is to be further understood that the capture device 1106 of the end effector 1100 can be combined with any of the arms (e.g., extendable arms, telescoping arms, SCARA arms, or any other arms operable to perform a similar function) that are discussed herein without any intended limitation.

Figure 23A:
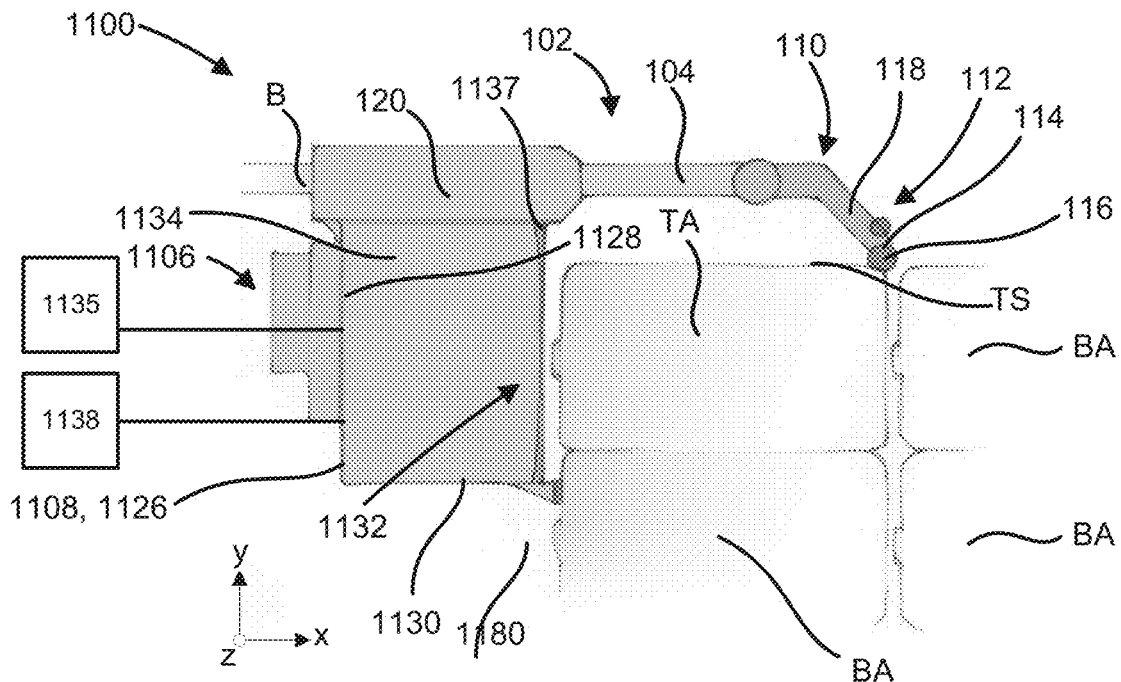
FIGS. 23A-23D illustrate a process of acquiring a target article using an end effector in accordance with at least one example of the present disclosure.

As shown in FIG. 23A, the capture device 1106 can include a support base 1108 (e.g., a base plate 1126) having a support surface 1128. The capture device 1106 can further include a wall 1130 extending away from the support base 1108 to define an opening 1132 and a volumetric interior 1134. A compliant element in the form of a compliant diaphragm 1137, such as one made of a rubber, latex, elastomer, polymer, or another compliant material, can be supported at the edge of the wall 1130 and disposed over and proximate the opening 1132. In one example, the compliant diaphragm 1137 can be configured to cover the opening 1132 to create an airtight seal over the volumetric interior 1134 and to ensure that an inside of the volumetric interior 1134 is sealed off from an environment outside of the volumetric interior 1134). The compliant diaphragm 1137 can be made of any compliant material without any intended limitation, or the compliant diaphragm 1137 can be made of a collection of compliant materials.

Additionally, a stopper extension 1180 can be coupled to the capture device 1106 (e.g., on a surface of the wall 1130). The stopper extension 1180 can extend past an edge of the wall 1130 defining the opening 1132 and the volumetric interior 1134. The stopper extension 1180 can operate to abut against an adjacent article BA during acquisition of the target article TA. The stopper extension 1180 can prevent the adjacent article BA from moving or shifting during acquisition of the target article TA, such as due to stiction between the adjacent article BA and the target article TA, or due to elements of the adjacent article BA and the target article TA catching on one another. In other words, the stopper extension 1180 can hold the adjacent article BA in place while the target article TA is moved by the article interface system 110. While the stopper extension 1180 is shown extending from a bottom of the capture device 1106 in FIGS. 23A-23C, it is to be understood that the stopper extension can be placed anywhere necessary to prevent any adjacent articles BA from moving during acquisition of the target article TA (e.g., whether the adjacent articles are placed on top of, below, or to the sides of the target article TA). The compliant diaphragm 1137 can be stretched across the opening 1132 and secured to the wall 1130 of the capture device 1106, and can comprise any desired tensioning force suitable for the intended purposes as discussed herein.

In another example, the end effector can further comprise a pump 1138 associated with the capture device 1106 and the compliant diaphragm 1137. The pump 1138 can be operable to pump gasses and/or liquids, collectively referred to hereinafter as "fluids," in either a single direction (e.g., into or out of the volumetric interior 1134) or bidirectionally into and out of the volumetric interior 1134 as sealed by the compliant diaphragm 1137. The pump 1138 can pump fluids into the volumetric interior 1134 to adjust an amount of fluid within the volumetric interior 1134 by performing at least one of adding fluid to the volumetric interior 1134 or removing fluid from the volumetric interior 1134. As such, depending upon the type, the pump 1138 can be in either hydraulic or pneumatic communication with the volumetric interior 1134 to add or remove liquid or gas to/from the volumetric interior 1134. Adding or removing fluid to/from the volumetric interior 1134 can either increase or decrease the pressure within the volumetric interior 1134, and the forces exerted on the compliant diaphragm 1137.

Additionally, or alternatively, the compliant diaphragm 1137 can stretch and/or flex in response to adding fluid to, or removing fluid from, the volumetric interior 1134. For example, the pump 1138 can be operable to add fluid to the volumetric interior 1134 to cause the compliant diaphragm 1137 to extend away from the support base 1108. The pump 1138 can also be operable to remove fluid from the volumetric interior 1134 to cause the compliant diaphragm 1137 to move toward the support base 1108. A one-way release valve (not shown) can be disposed on the wall 1130 to facilitate the release of fluid from or the introduction of fluid to the volumetric interior 1134 in cases in which the pressure or amount of fluid within the volumetric interior 1134 is above a desired level or is below a desired level, respectively.

Acquisition of a target article TA with the end effector 1100 is described with reference to FIGS. 23A-23D. The operation of the extendable arm 102 and/or the article interface system 110 can be similar as to any other examples of end effectors described herein. Additionally, the pump 1138 can be operated to adjust the amount of fluid in the volumetric interior 1134 in conjunction with one or more movements of at least one of the extendable arm 102 or the article interface system 110.

Various method steps can be carried out to obtain a target article TA with the end effector 1100. The steps, operations, and methods to acquire the target article can be the similar to as described with respect to FIGS. 4A-4E, 7A-11, 14-21, but with different operations with respect to how the target article TA is received by the capture device 1106. As such, the following description will not repeat the steps carried out by the extendable arm and the article interfacing system 110 to bring the target article TA up to a point immediately prior to engagement with capture device 806, but will instead describe the process as it relates to the engagement and capture of the target article TA in the capture device 1106.

As shown in FIG. 23A, the target article TA is at a point just before contact between the compliant diaphragm 1137 and the target article TA. The target article TA can be brought to this point by operation of the extendable arm 102, article interface system 110, or by moving the end effector 1100 as a whole into position near the target article TA as described as described with reference to FIGS. 4A-4E, 7A-11 and 15A-15D of this disclosure.

When in the position shown in FIG. 15A, the baggage handling end effector 1100 can be operated to engage the article interface surface 114 with the target article TA as described with reference to FIGS. 4A-4E, 7A-11 and 15A-15D of this disclosure. Engagement between the article interface surface 114 and the target article TA is shown in FIG. 23A.

Figure 23B:
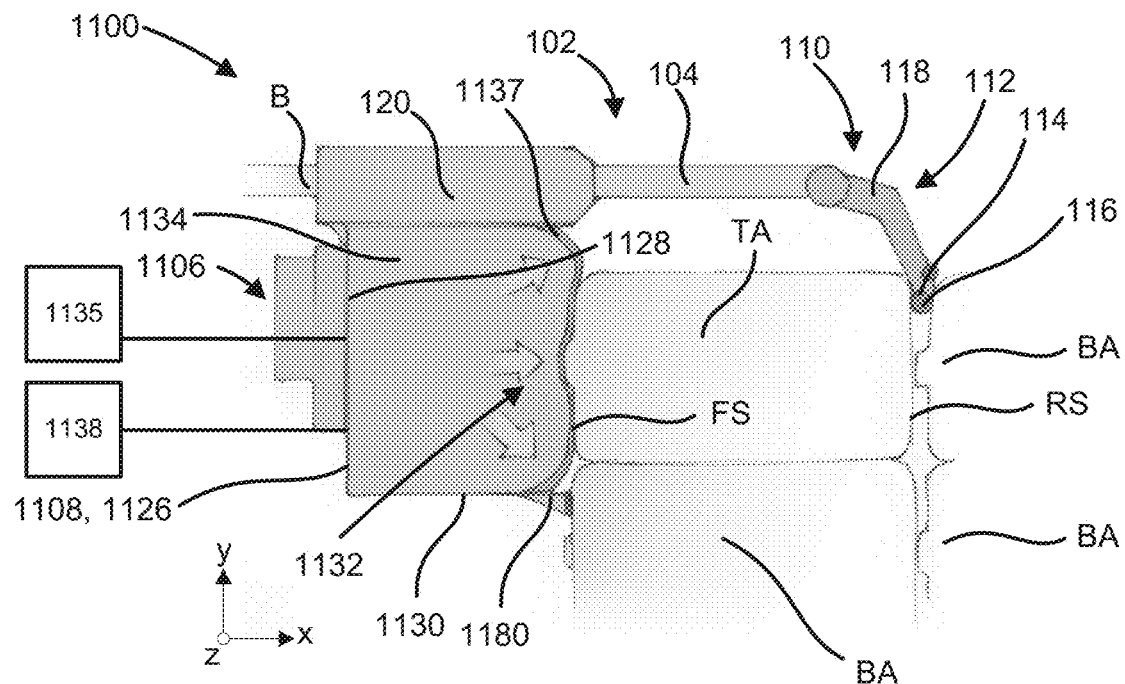

Following engagement between the article interface surface 114 and the target article TA, the actuatable article engagement device 112 of the article interface system 110 can be actuated to move the target article TA toward the capture device 1106, as described with reference to FIGS. 4A-4E, 7A-11 and 15A-15D of this disclosure. For example, moving the target article TA toward the capture device 1106 can include driving the powered roller 116 to apply the first stage engagement force to the target article TA. Alternatively or additionally, an amount of pressure within the volumetric interior 1134 can be increased in order to distend the compliant diaphragm 1137 outward away from the support base 1108 in order to engage the compliant diaphragm 1137 with a surface of the target article TA prior to driving the target article TA toward the capture device 1106 with the extendable arm 102 and/or the article interface system 110. The distension of the compliant diaphragm 1137 to interface with the target article TA is illustrated in FIG. 23B.

Adjusting the amount of pressure within the volumetric interior 1134, by operation of one or more of the pumps 1138 or release valve (not shown), can be carried out in conjunction with driving the article interface system 110 to move the target article TA toward the capture device 1106. Moving the target article TA toward the capture device 1106 can be carried out by any of the systems or devices described herein, such as driving any part of the article interface system 110 (e.g., via operation of the article interface system 110, the actuatable article engagement device 112, the actuatable joint 122 to move the articulating arm 118 relative to the first support member 104, and/or the powered rollers 116) or by driving the extendable arm 102 (e.g., by operation of the actuatable joint 105 to move the first link 104A relative to the second link 104B of the first support member 104).

The adjusting of the fluid and corresponding pressure within the volumetric interior 1134 (e.g., via the pump 1138) can be carried out during driving the target article TA toward the capture device 1106 (e.g., via operation of the article interface system 110, the actuatable article engagement device 112, the extendable arm 102, the actuatable joint 122, the articulating arm 118, the actuatable joint 105, and/or the powered rollers 116) for a variety of reasons. For example, the fluid within the volumetric interior 1134 can be removed or extracted as the target article TA is moved further into the capture device 1106 in order to regulate a pressure level within the volumetric interior 1134 as the target article TA presses into the compliant diaphragm 1137, and therefore, decreases the volume of the volumetric interior 1134. The fluid within the volumetric interior 1134 can also be removed or extracted as the target article TA is moved further into the capture device 1106 in order to increase flexibility of the compliant diaphragm 1137 by decreasing pressure within the volumetric interior 1134 in order to facilitate the compliant diaphragm 1137 conforming to a surface of the target article TA.

Alternatively, the amount of fluid and corresponding pressure within the volumetric interior 1134 can be increased as the target article TA is moved further into the capture device 1106 in order to regulate the pressure level within the volumetric interior 1134 as the target article TA presses into the compliant diaphragm 1137. The fluid and pressure within the volumetric interior 1134 can be increased in order to increase a force of the compliant diaphragm 1137 acting on the target article TA as the target article TA is moved further into the capture device 1106 in order to increase a force holding the target article TA between the compliant diaphragm 1137 and the article interface system 110.

Figure 23C:
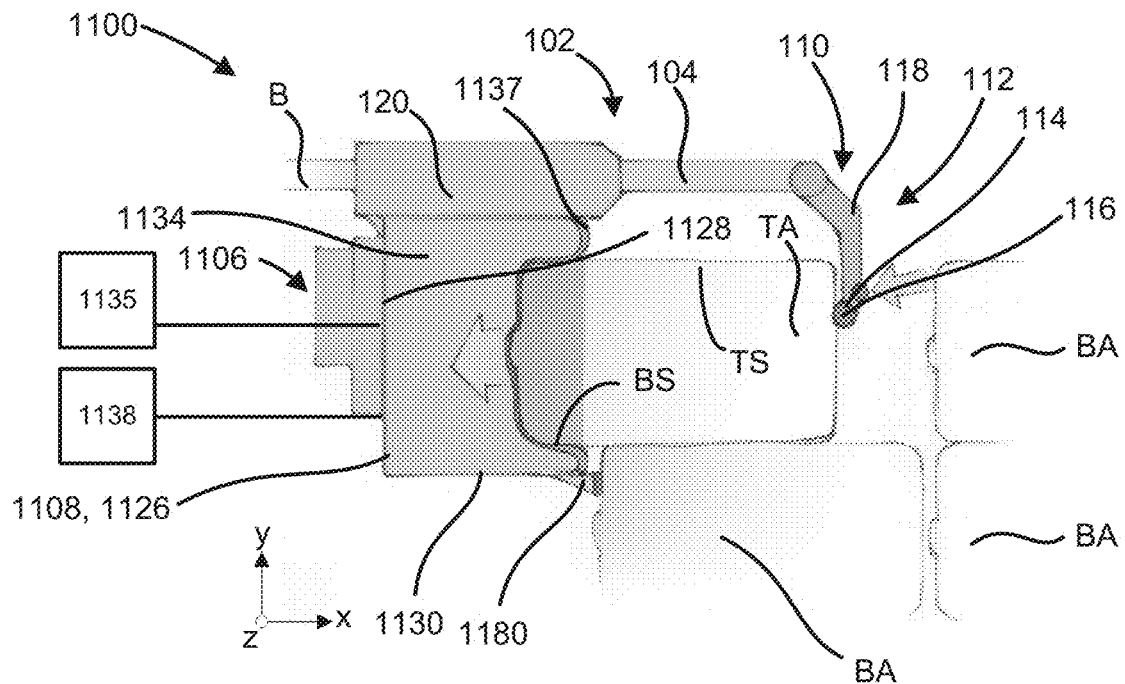
Figure 23D:
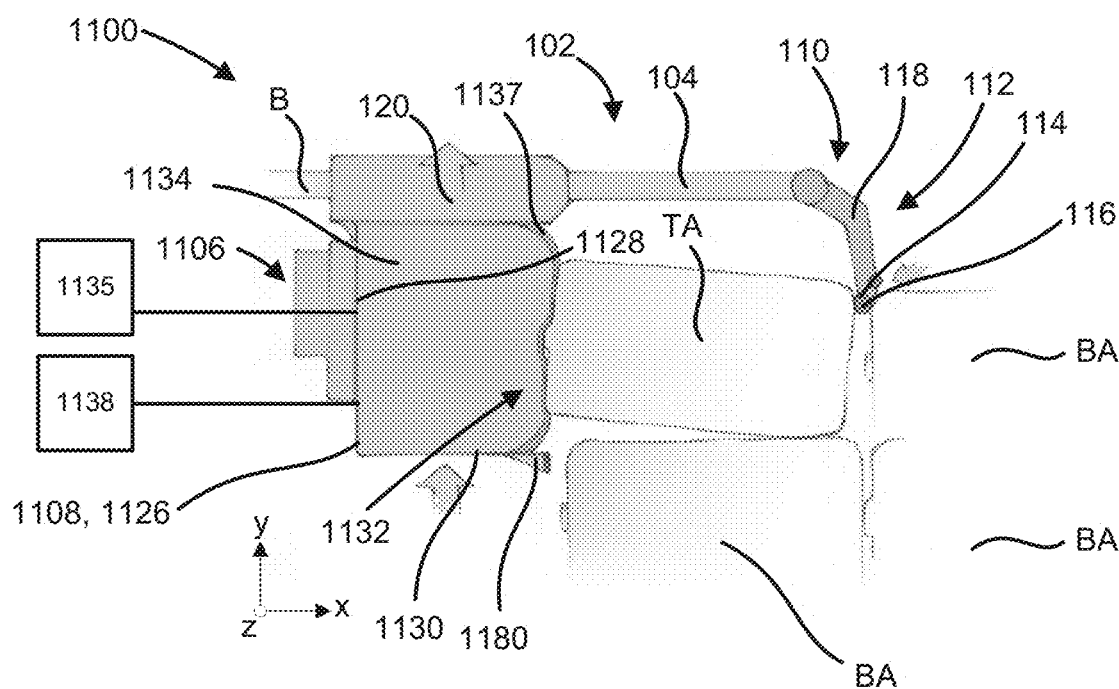

As in other exemplary end effectors described herein, the articulating arm 118 can be moved in order to move the article interface system 110 from the first position (shown in FIG. 23A where the article interface surface 114 of the article interface system 100 is positioned engaged with the top surface TS of the target article TA) to a second position. The second position of the article interface system 110 is shown in FIGS. 23B-23D where the article interface surface 114 is engaged with a rear surface RS of the target article TA. As shown in FIGS. 23A-23D, the target article TA can be received in the capture device 1106 by operation of the article interface system 110, as described elsewhere herein.

The target article TA can interface with the compliant diaphragm 1137. Under the load of the target article TA against the compliant diaphragm 1137, the compliant diaphragm 1137 can conform to a surface of the target article TA, as shown in FIG. 23B, to provide lateral support to the target article TA by supporting the front surface FS of the target article TA. As further shown in FIG. 23C, compliant diaphragm 1137 can further be positioned to interface with a side surface (e.g., top surface TS or bottom surface BS) of the target article TA. Thereby, the compliant diaphragm 1137 can provide vertical support to the target article TA in the capture device 1106 to prevent the target article TA from moving downward or moving upward in the capture device 1106. In other words, the compliant diaphragm 1137 can provide vertical support to the target article TA to constrain the target article TA from moving in upward and/or downward directions.

The compliant diaphragm 1137 can also be configured to provide rotational support to the target article TA around by being caused to extend about one or more surfaces of the target article TA to prevent side to side movement of the target article TA Finally, as illustrated in FIGS. 23A-23D, under application of the applied load by the target article TA to the compliant diaphragm 1137 of the capture device 1106, the compliant diaphragm 1137 can operate to provide captured support to the target article TA by the capture device 1106 that includes support of the target article in the x direction, as shown in FIGS. 23A-23D. The lateral support of the target article TA in the x direction can constrain movement of the target article TA from moving in the positive or negative x directions after fully captured.

The captured support provided by the capture device 1106 and the compliant diaphragm 1137 on the target article TA can further include vertical support of the target article TA in the positive and/or negative y directions, as shown in FIGS. 23A-23D. The vertical support of the target article TA in the y directions by the compliant diaphragm 1137 can constrain movement of the target article TA from moving in the positive or negative y directions. The article interface system 110 (e.g., via locking the articulating arm 118 and/or roller 116) can also provide the target article TA with support to constrain movement of the target article in the positive and/or negative y directions.

The captured support provided by the capture device 1106 and the compliant diaphragm 1137 on the target article TA can further include support of the target article TA in the positive and/or negative z directions, as shown in FIGS. 23A-23D. The positive and negative z directions are shown in FIGS. 23A-23D as either extending out of the plane of the drawings or extending into the plane of the drawings. The support of the target article TA in the positive and negative z directions by the compliant diaphragm 1137 can constrain movement of the target article TA from moving in the positive or negative z directions. The article interface system 110 (e.g., via locking the articulating arm 118 and/or roller 116 and via friction or mechanical engagement) can also provide the target article TA with support to constrain movement of the target article in one or more directions.

It is to be understood that the captured support provided by the compliant diaphragm 1137 can further provide rotational support to constrain rotational movement of the target article TA. The rotational support can constrain rotational movement of the target article TA in any of the positive or negative rotational directions about the x, y, or z axes illustrated in FIGS. 23A-23D. It is to be understood that the captured support can be one or more of translational movement in the +/−x directions, the +/−y directions, and/or the +/−z directions. The captured support can further be one or more of positive/negative rotational movement about the x axis, the y axis, and/or the z axis. In short, captured support provided to the target article TA by the compliant diaphragm 1137 can include support in any combination of the translational and/or rotational directions to facilitate capture of the target article TA within the capture device 1106. The target article TA can be considered "captured" by the capture device when the target article TA is supported in one or more of the support directions (e.g., translational movement in the +/−x directions, the +/−y directions, the +/−z directions and/or rotational movement about the x, y, and/or z axes) to a sufficient level to counter collective forces acting on the target article TA.

End effector 1100 can further include one or more sensors 1135 that can be included in the capture device 1106 for measuring the pressure within the volumetric interior 1134 to determine a force acting on the target article TA by the article interface system 110 and/or the capture device 1106. The one or more sensors 1135 can be pressure sensors and can be a single pressure sensor or a plurality of pressure sensors. The one or more sensors 1135 can sense a pressure within the volumetric interior 1134, which pressure can increase as the target article TA is urged into the capture device 1106 and against the compliant diaphragm 1137. The pressure within the volumetric interior 1134 can correspond to a force between the target article TA and the capture device 1106 as the target article TA is being urged into the capture device 1106 by the article interface system 110 and/or extendable arm.

With one or more sensors 1135 to measure the pressure within the volumetric interior 1134, and thereby the engagement force acting on the target article TA by the article interface system 110, the article interface system 110 can be operable to transition from the first position (shown in FIG. 23A) to the second position (shown in FIGS. 23B-23C) upon the one or more sensors 1135 detecting a pressure indicative of threshold first stage engagement force on the target article TA as the target article TA is caused to engage the capture device 1106. The threshold first stage engagement force can be set to any desired value based on a user's needs, in real-time, etc. More specifically, the threshold first stage engagement force can be a value of a force acting on the target article TA that shows a level of engagement between the target article TA and the capture device 1106 sufficient to allow the article interface system 110 time to transition from the first position to the second position (i.e., the articulating arm 118 and the roller 116 transition from the top surface TS of the target article TA to the rear surface RS of the target article TA) without the target article TA dropping out of the capture device 1106 or falling from the end effector 1100.

Similar to other end effectors described herein, in end effector 1100, the article interface system 110 can be operated to at least maintain the threshold first stage engagement force measured by one or more of the sensors 1135 during transition from the first position to the second position. The article interface system 110 (and/or the extendable arm 102) can be operated to maintain the threshold first stage engagement force by moving to maintain contact between the article interface surface 114 and the target article TA as the article interface system 110 transitions from the first position to the second position.

In order to further facilitate holding the target article TA in the capture device 1106 and to prevent the target article TA from falling out of the end effector 1100, the rollers 116 and articulating arms 118 can lock in place. For example, upon transition to the second position, the actuatable article engagement device 112 comprising the one or more powered rollers 116 movably coupled to the articulating arm 118 can be locked in position to prevent movement of the one or more powered rollers 116 relative to the articulating arm 118, which could cause the target article TA to fall. In other words, the powered rollers 116 can act as a brake or a lock holding the target article TA in the capture device 1106. Furthermore, the articulating arm 118 can be locked in position to prevent movement of the articulating arm 118 about the first actuatable joint 122 upon transition from the first position to the second position such that the articulating arm 118 functions as a stop, brake, or locking member holding the target article TA in the capture device 1106.

In the second position, the article interface system 110 can be positioned to apply a second stage engagement force to the target article TA. For example, with the article interface surface 114 being engaged with the rear surface RS of the target article TA, the article interface system 110 can apply the second stage engagement force to urge the target article TA into the capture device 1106. The second stage engagement force can be applied by one or more of actuating the articulating arm 118 using the actuator 124 of the actuatable joint 122 or actuating the extendable arm 102 to retract the first link 104A relative to the second link 104B of the first support member 104 by using the actuator 107 to actuate the actuatable joint 105. Either functionality can be used to further apply a force to the target article TA against the capture device 1106 and to more firmly hold the target article TA in the capture device 1106.

The target article TA can be urged into the capture device 1106 by the extendable arm 102 and/or the article interface system 110 until a state of acquisition is achieved. The state of acquisition is defined as a state in which the forces acting on the target article TA from the end effector 1100 are sufficient to counter collective forces acting on the target article TA. The collective forces acting on the target article TA can include gravitational forces acting on the target article TA, stiction between the target article TA and adjacent articles BA in contact with one or more surfaces of the target article TA, and/or compressive forces acting on the target article TA from surrounding articles BA. At a point at which the collective forces acting on the target article TA are countered, the end effector 1100 has a strong enough hold on the target article TA to lift, move, transport, or otherwise manipulate the target article TA from its current position to a new position. The forces acting on the target article TA from the end effector 1100 necessary to overcome the other collective forces acting on the target article TA can be a value determined by the user experimentally or by experience.

Using the sensors 1135, a state of acquisition of the target article TA can be determined to be achieved upon one or more of the load sensors 1135 detecting a predetermined threshold of the second stage engagement force, which can be determined by the user through experiments or experience to sufficiently counter collective forces acting on the target article TA.

It is to be further understood that adjusting of the fluid, and thus the pressure, within the volumetric interior 1134 (e.g., via the pump 1138) can be carried out in conjunction with one or more of the operations described herein, including: (1) transitioning the article interface system 110 from the first position to the second position; (2) driving the powered rollers 116; (3) moving the articulating arm 118 relative to the first support member 104 by operation of the actuatable joint 122; (4) moving the first link 104A relative to the second link 104B by operation of the actuatable joint 105; (5) application of the first stage engagement force; (6) application of the second stage engagement force; (7) achievement of the threshold first stage engagement force; (8) achievement of the predetermined threshold of the second stage engagement force; (9) release of the target article TA; (10) any operation, movement, or actuation of any elements of the arms described with respect to FIGS. 1-12 and 23A-23D operated to urge the target article into the capture device 1106; and (11) any other operation carried out to acquire the target article TA using the end effector 1100 or any alternative configuration of the end effector 1100 designed using a combination of any of the elements, systems, devices, or principles of this disclosure.

Adjusting the amount of fluid and corresponding pressure within the volumetric interior 1134 by the pump 1138 in conjunction with any of the operations described above can be carried out for any one or more of a variety of reasons. The fluid within the volumetric interior 1134 can be adjusted as the target article TA is moved further into the capture device 1106 (e.g., by operation of any of the extendable arm 102, the article interface system 110, the articulating arm 118, the actuatable joint 105, the actuatable joint 122, the first support member 104 including the first link 104A and the second link 104B, and/or the powered rollers 116, or any similar mechanism operable to urge the target article TA toward the capture device 1106). Reducing the fluid within the volumetric interior 1134 can be performed by the pump 1138 in order to regulate a pressure level within the volumetric interior 1134 as the target article TA presses into the compliant diaphragm 1137, and therefore, decreases the volume of the volumetric interior 1134. The fluid within the volumetric interior 1134 can also be reduced in order to increase flexibility of the compliant diaphragm 1137 by decreasing pressure within the volumetric interior 1134 and in order to facilitate the compliant diaphragm 1137 conforming to a surface of the target article TA.

Alternatively, the amount of fluid within the volumetric interior 1134 can be increased as the target article TA is moved further into the capture device 1106 in order to regulate the pressure level within the volumetric interior 1134 as the target article presses into the compliant diaphragm 1137. The fluid within the volumetric interior 1134 can be increased in order to increase a force of the compliant diaphragm 1137 acting on the target article TA as the target article TA is moved further into the capture device 1106 in order to increase a force holding the target article TA between the compliant diaphragm 1137 and the article interface system 110. The fluid and corresponding pressure within the volumetric interior 1134 can also be increased or decreased in order to stabilize and better support the target article TA, as supported by the compliant diaphragm 1137, during transition of the article interface system 110 from the first position to the second position. Furthermore, the fluid and corresponding pressure within the volumetric interior 1134 can be either increased or decreased upon achievement of the threshold first stage engagement force in order to increase support of the target article TA by the compliant diaphragm 1137, or to allow the target article TA to be received further into the compliant diaphragm 1137 and the capture device 1106. Furthermore, the fluid and corresponding pressure within the volumetric interior 1134 can be either increased or decreased upon achievement of the predetermined threshold of the second stage engagement force in order to increase support of the target article TA by the compliant diaphragm 1137, or to allow the target article TA to be received further into the compliant diaphragm 1137 and the capture device 1106.

Additionally, to release the target article TA from the capture device 1106 and the end effector 1100, the fluid and corresponding pressure within the volumetric interior 1134 can be increased to urge the target article out of the capture device 1106. Alternatively, to release the target article TA from the capture device 1106, the fluid and corresponding pressure within the volumetric interior 1134 can be decreased such that support provided by the compliant diaphragm 1137 to the target article TA can be reduced to allow the target article TA to separate from the end effector 1100.

Alternatively or additionally, one or more of the sensors 1135 can be position sensing sensors, either operating alone or in conjunction with each other, to determine a position of the compliant diaphragm 1137 relative to the support base 1108, thereby indicating a position of the target article TA within the capture device 1137. In other words, the sensors 1135 illustrated in FIGS. 23A-23D can be pressure sensors, as described above, and/or position sensors. In a case in which the sensors 1135 are position sensors, the position and/or displacement of the compliant diaphragm 1137 can be determined relative to the support base 1108 or other element of the capture device 1106 using the position sensors 1135. The displacement or position of the compliant diaphragm 1137 can be defined as a distance of at least a portion of the compliant diaphragm 1137 (e.g., a center portion of the compliant diaphragm 1137) from the support base 1108 or other element of the capture device 1106, thereby indicating a position of the target article TA within the capture device 1106. Accordingly, instead of, or in addition to, using a pressure sensor, a position sensor (e.g., one or more of sensors 1135) can be used to determine a state of acquisition of the target article TA.

For example, assuming no load sensor is being used, the position sensor(s) 1135 can be used to indicate when a target article TA is sufficiently captured for the article interface system 110 to transition from the first position to the second position. With a position sensor 1135 operable to measure the position of the compliant diaphragm 1137, and therefore, the position of the target article TA interacting with the compliant diaphragm 1137, the article interface system 110 can be operable to transition from the first position (shown in FIGS. 23A) to the second position (shown in FIGS. 23B-23D) upon the position sensor(s) 1135 detecting a threshold first stage displacement of the compliant diaphragm 1137 as the target article TA is caused to engage capture device 1106. The threshold first stage displacement can be set to any desired value based on a user's needs. More specifically, the threshold first stage displacement can be a value of displacement of the compliant diaphragm 1137 that shows a level of engagement between the target article TA and the capture device 1106 sufficient to allow the article interface system 110 to transition from the first position to the second position (i.e., the articulating arm 118 and the roller 116 transition from the top surface TS of the target article TA to the rear surface RS of the target article TA) without the target article TA dropping out of the capture device 1106 or falling from the baggage handling end effector 1100. The article interface system 110 can be operated to at least maintain the threshold first stage displacement measured by the position sensor(s) 1135 during transition from the first position to the second position. The article interface system 110 (and/or the extendable arm 102) can be operated to maintain the threshold first stage displacement by moving to maintain contact between the article interface surface 114 and the target article TA as the article interface system 110 transitions from the first position to the second position.

In the second position, the article interface system 110 can be positioned to apply a second stage engagement force to the target article TA, similar to as described above with respect to FIGS. 4A-4E, 7A-11, and 15A-15D. The target article TA can be urged into the capture device 1106 by the extendable arm 102 and/or the article interface system 110 until a state of acquisition is achieved. The state of acquisition is defined as a state in which the forces acting on the target article TA from the end effector 100 are sufficient to counter collective forces acting on the article. The collective forces acting on the article can include gravitational forces acting on the article, stiction between the target article and adjacent articles BA in contact with one or more surfaces of the target article TA, and/or compressive forces acting on the target article TA from surrounding articles BA. At a point at which the collective forces acting on the target article TA are countered, the end effector 100 has a strong enough hold on the target article TA to lift, move, transport, or otherwise manipulate the target article from its current position to a new position. The forces acting on the target article TA from the end effector 100 necessary to overcome the other collective forces acting on the target article TA can be associated with a displacement value of the compliant diaphragm 1137.

Using the position sensor(s) 1135, a state of acquisition of the target article TA can be determined to be achieved upon the position sensor(s) 1135 detecting a predetermined threshold of the second stage displacement of the compliant diaphragm 1137 that is determined by the user, through experiments or experience, or in real-time due to comparison of sensor data, to be indicative of a position of the target article TA in the capture device 1106 in which the target article TA is sufficiently supported to counter collective forces acting on the target article TA.

FIG. 23B illustrates the article interface system 110 in the second position along a rear surface RS of the target article TA. FIG. 23C illustrates the article interface system 110 in the second position along the rear surface RS of the target article TA and further driving the target article TA into the capture device 1106 by operation of the article interface system 110 (e.g., by rotating the articulating arm 118) and/or the extendable arm 102 (e.g., by retracting the extendable arm 102). Using the position sensor(s) 1135, a state of acquisition of the target article TA can be determined to be achieved upon the position sensor(s) 1135 detecting a predetermined threshold of the second stage displacement sufficient to counter collective forces acting on the target article TA.

Figure 24:
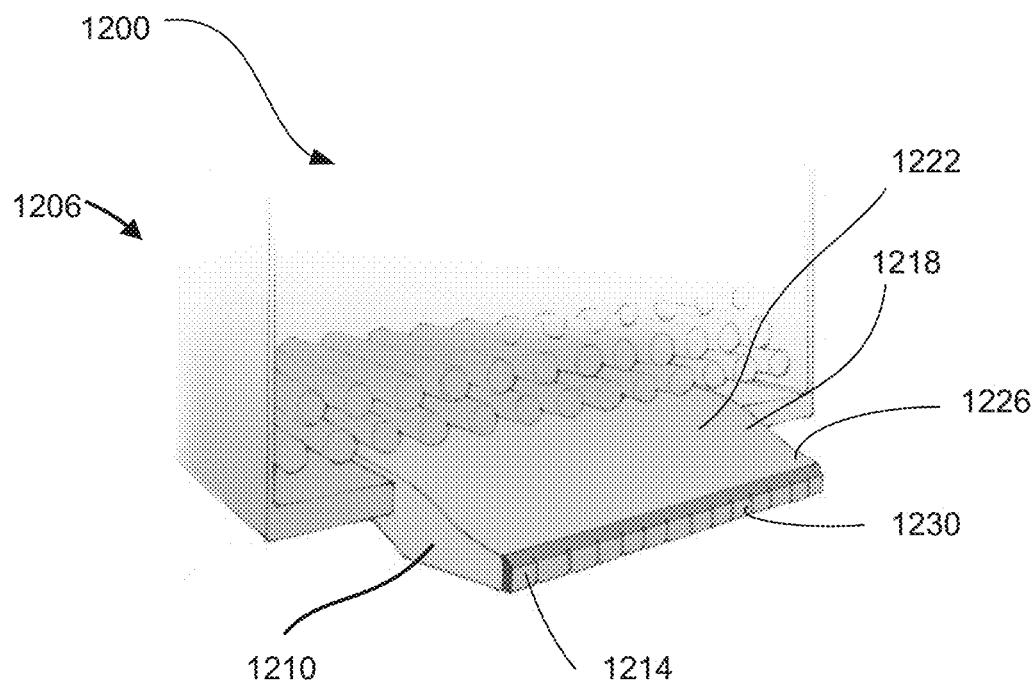
FIG. 24 illustrates a partial front elevation view of a capture device for a robotic end effector, in accordance with at least one example of the present disclosure.
Figure 25:
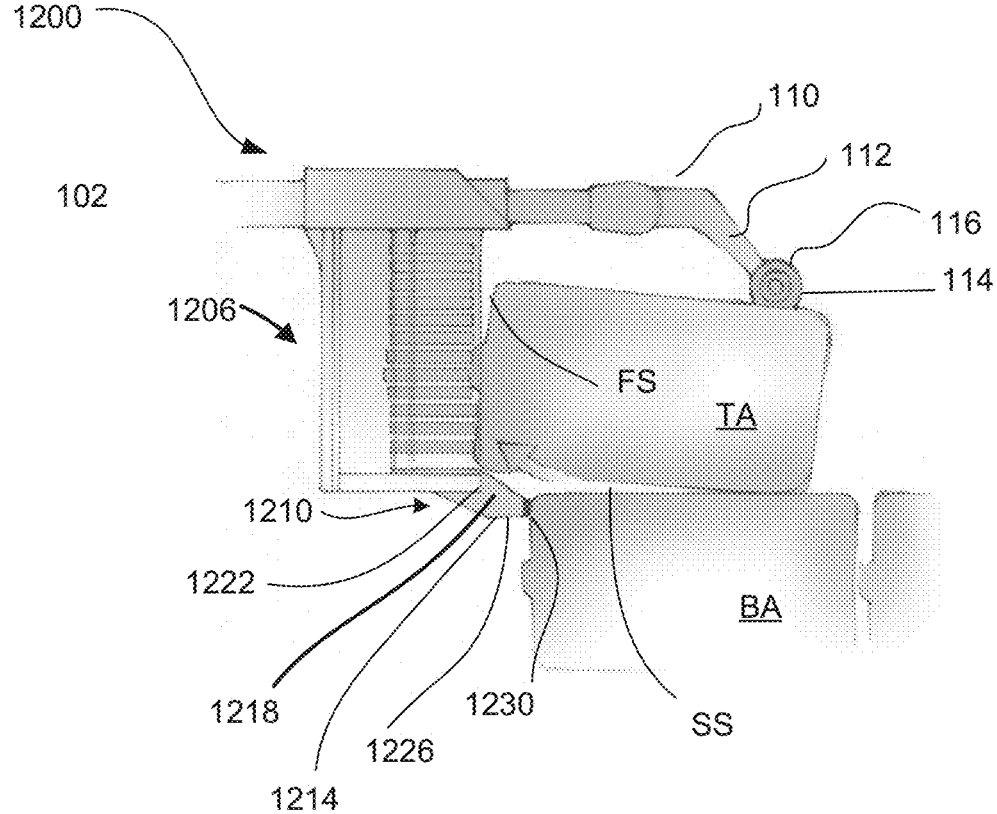
FIG. 25 illustrates a process of acquiring a target article in accordance with at least one example of the present disclosure using a robotic end effector.

An alternative configuration of a capture device 1206 of an end effector 1200 is now described with reference to FIGS. 24 and 25. FIG. 24 shows a partial front elevation view of the capture device 1206. FIG. 25 illustrates a cross-section of the capture device 1206 (e.g., taken along a line similar to line AA shown in FIG. 3). The end effector 1200 can acquire and manage a target article TA similar to other end effectors described herein. The end effector 1200 can include a capture device 1206 described in more detail below. The capture device 1206 can be utilized with any of the end effectors described herein and any aspect thereof can be used in conjunction with any other capture device described herein.

Similar as described with respect to other end effectors of this disclosure, the end effector 1200 can include an article interface system 110 supported by the extendable arm 102. The article interface system 110 can include an actuatable article engagement device 112 that itself comprises an article interface surface 114. The actuatable article engagement device 112 can be operable to interface with the target article TA to facilitate movement of the target article TA toward the capture device 1206. As the functions of the extendable arm 102 and the actuatable article engagement device 112 operate similarly as in other example end effectors described herein, the operation of these elements will not be repeated in detail here, but it is to be understood that operations described with respect to other examples of end effectors can also apply to end effector 1200. It is to be further understood that the capture device 1206 of the end effector 1200 can be combined with any of the arms (e.g., extendable arms, telescoping arms, SCARA arms, or any other arms operable to perform a similar function) that are mentioned herein without any intended limitation. Similarly, as the functions and structure of the capture device 1206 are similar to other examples of capture devices described herein, the operation and structure of these elements will not be repeated in detail here, but it is to be understood that operations and structures described with respect to other examples of capture devices can also apply to the capture device 1206.

As shown in FIGS. 24 and 25, the end effector 1200 and the capture device 1206 can include a guide member 1210 operable to interface with the target article TA to facilitate lifting the target article TA off a lower support surface SS upon which the target article TA is resting, such as another article BA, and alignment of the target article TA with the capture device 1206. In one aspect, the guide member 1210 can be coupled to the capture device 1206.

In one aspect, the end effector 1200, the capture device 1206, and the guide member 1210 can comprise a front stop 1214 extending beyond the capture device 1206 and positioned forward of the capture device 1206. The front stop 1214 can also be positioned below the capture device 1206. Thus, the front stop 1214 can abut to the lower support surface SS, such as another article BA below the target article TA, to resist movement of the lower support surface SS as the target article TA moves or is moved by the end effector 1200.

In another aspect, a front stop can be positioned at a side of the capture device to abut to another article SA alongside the target article TA. In another aspect, multiple front stops can be carried by the capture device, such as positioned below the capture device, and on opposite sides of the capture device. In another aspect, a continuous front stop can extend along one side, below and along another side of the capture device.

As shown in FIGS. 24 and 25, the guide member 1210 can be a passive guide member. The guide member 1210 can have a ramp 1218 that can be inclined with respect to the capture device 1206. The ramp 1218 can have a proximal end 1222 closest to the capture device 1206 and a distal end 1226 farther from the capture device 1206 and lower with respect to the proximal end 1222. The ramp 1218 can be an external ramp 1218 with respect to the capture device 1206 and with the distal end 1226 outside the capture device 1206. Similarly, the guide member 1210 can be an external guide member 1210 positioned wholly or mostly outside of the capture device 1206. In one aspect, a stop 1230 can be positioned at the distal end 1226 of the ramp 1218 to abut to the lower support surface SS to resist movement of the lower support surface SS as the target article TA moves. Thus, the ramp 1218 can have the stop 1230 or the front stop 1214 can have the ramp 1218. The front stop 1214 and the ramp 1218 can both resist movement of the lower support surface SS and lift and align the target article TA with respect to the capture device 1206.

In one aspect, the front stop 1214 and/or the ramp 1218 can be rigid. An upper contact surface of the ramp 1218 can be a relatively low friction surface to allow the proximal end and the front surface FS of the target article TA to slide thereon. The stop 1230 can be a flexible and resilient to conform to contours of the support surface SS without marring another article BA below the target article TA.

The ramp 1218 is one example of a means for lifting as described below.

Figure 26A:
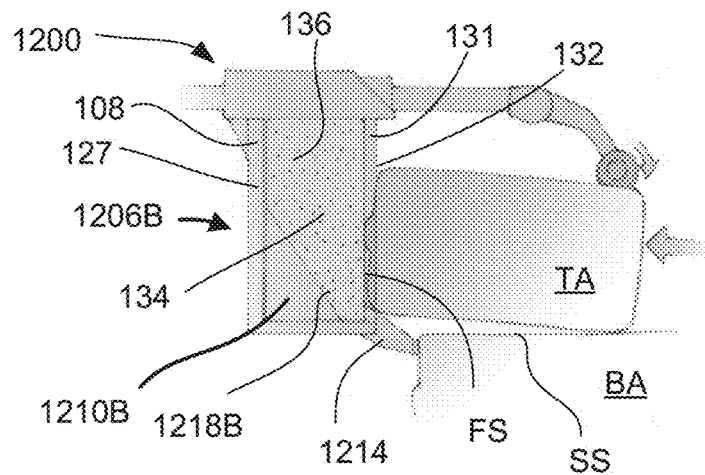
FIGS. 26A-26C illustrate a process of acquiring a target article using an end effector in accordance with at least one example of the present disclosure.
Figure 26B:
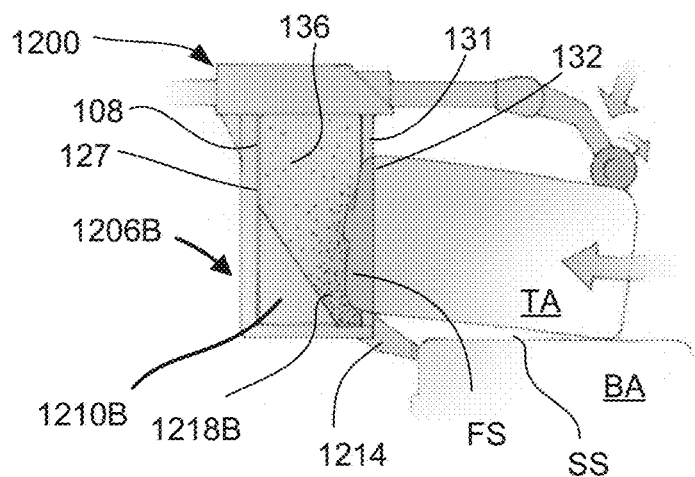
Figure 26C:
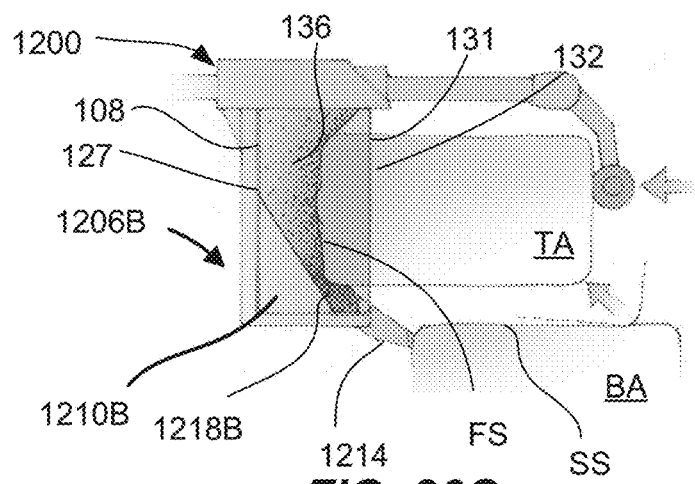

Referring to FIGS. 26A-C, the guide member 1210B can be an internal guide member 1210B located wholly or mostly inside the capture device 1206B. FIGS. 26A-C each show a cross-section of the capture device 1206B (e.g., taken along a line similar to line AA shown in FIG. 3). The internal guide member 1210B can have an internal ramp 1218B with a distal end proximate the opening 132 or the edge 131 of the capture device 1206B and a proximal end proximate the support base 108 or the base plate 127 of the capture device 1206B. Thus, the internal ramp 1218B can incline from the opening 132 or the edge 131 of the capture device 1206B to the support base 108 or the base plate 127 of the capture device 1206B to lift the target article TA as the target article moves toward and into the capture device 1206B.

In another aspect, a compliant material 136 can be disposed in an interior or the volumetric interior 134 of the capture device 1206B. In addition, the compliant material 136 can be disposed on the internal ramp 1218B. The compliant material 136 can interface with the front surface FS of the target article TA and displace upwardly as the target article TA enters the capture device 1206B. The ramp 1218B can decrease a vertical dimension of the interior or the volumetric interior 134 of the capture device 1206B from the opening 132 or the edge 131 to the support base 108 or the base plate 127 of the capture device 1206B. Thus, the proximal end and the front surface FS of the target article TA can be gripped between or within the compliant material 136 as the front surface FS of the target article TA moves from the opening 132 or the edge 131 to the support base 108 or the base plate 127 of the capture device 1206B.

As described above, the end effector 1200 and the capture device 1206B can have the front stop 1214 to interface with the lower support surface SS, such as another article BA below the target article TA.

In another aspect, the end effector 1200 and the capture device 1206 or 1206B can have a guide member 1210 or 1210B with both external and internal ramps 1218 and 1218B.

The internal ramp 1218B is one example of a means for lifting as described below.

Figure 27:
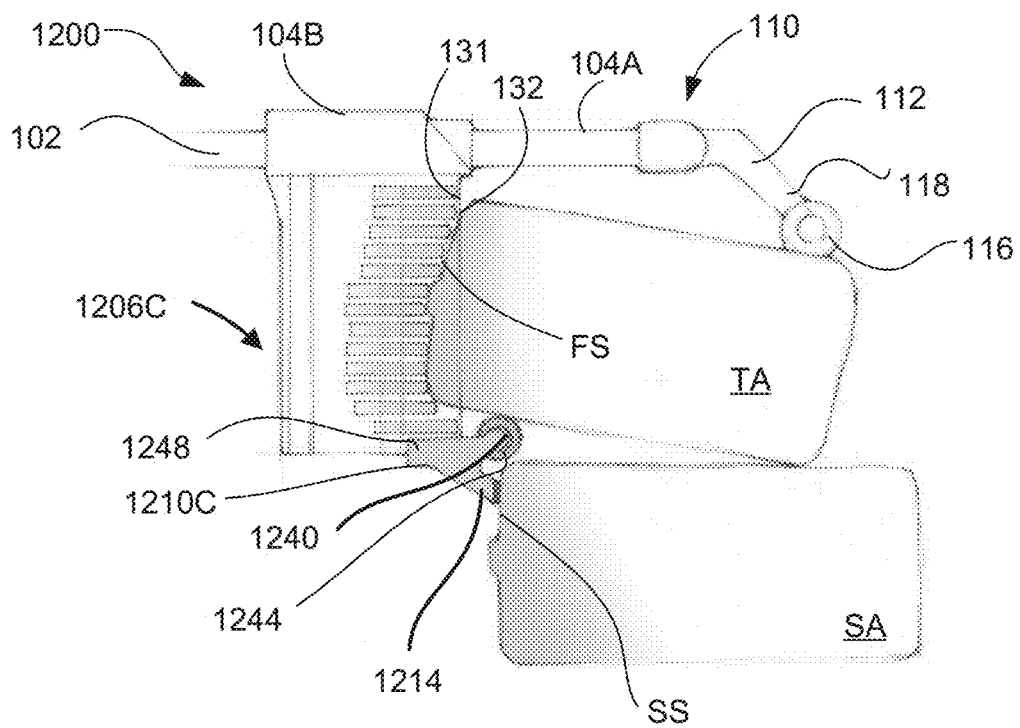
FIG. 27 illustrates a process of acquiring a target article using an end effector in accordance with at least one example of the present disclosure.

Referring to FIG. 27, the guide member 1210C can have a roller. FIG. 27 shows a cross-section of the capture device 1206C (e.g., taken along a line similar to line AA shown in FIG. 3). The guide member 1210C can have a front roller 1240 positioned beyond the capture device 1206C. For example, the front roller 1240 can be positioned in front of the opening 132 or the edge 131 of the capture device 1206C. In addition, the front roller 1240 can be positioned proximate a bottom of the opening 132 or the edge 131 of the capture device 1206C. The front roller 1240 can be rotatable on an axle 1244 with a rotational axis. As described above, the axle 1244 and the rotational axis can be positioned beyond the capture device 1206C and can be positioned at a lower end of the capture device 1206C. For example, the axle 1244 and the rotational axis can be positioned in front of the opening 132 or the edge 131 of the capture device 1206C. In addition, the axle 1244 and the rotational axis can be positioned proximate a bottom of the opening 132 or the edge 131 of the capture device 1206C. The front roller 1240 can transition or translate a proximal end and the front surface FS of the target article TA upwardly as the target article TA moves toward the capture device 1206C and as the front roller 1240 rotates.

In one aspect, the rotational axis 1244 of the front roller 1240 can be fixed with respect to the capture device 1206C. Similarly, the rotational axis 1244 of the front roller 1240 can be fixed with respect to the front stop 1214. In another aspect, the front stop 1214 can extend beyond the capture device 1206C and can be positioned below and forward of the capture device 1206C. In addition, the front stop 1214 can be positioned below the front roller 1240. As described above, the front stop 1214 can abut to the lower support surface SS to resist movement of the lower support surface SS as the target article TA moves.

In another aspect, the front roller 1240 and the front stop 1214 can be carried together by a mount 1248, such as a yoke, extending from the capture device 1206C. The mount 1248 can position the front roller 1240 above the front stop 1214.

In another aspect, the rotational axis 1244 of the front roller 1240 can be movable with respect to the capture device 1206C and the stop 1214, as discussed below.

The front roller 1240 is one example of means for lifting as discussed below.

As described above, the guide member can be a passive guide member. In one aspect, the guide member can be an active guide member. The active guide member can comprise an actuator capable of displacing the guide member upwardly. The actuator can lift and/or rotate the guide member.

The front roller 1240 is one example of a means for lifting as described below.

Figure 28:
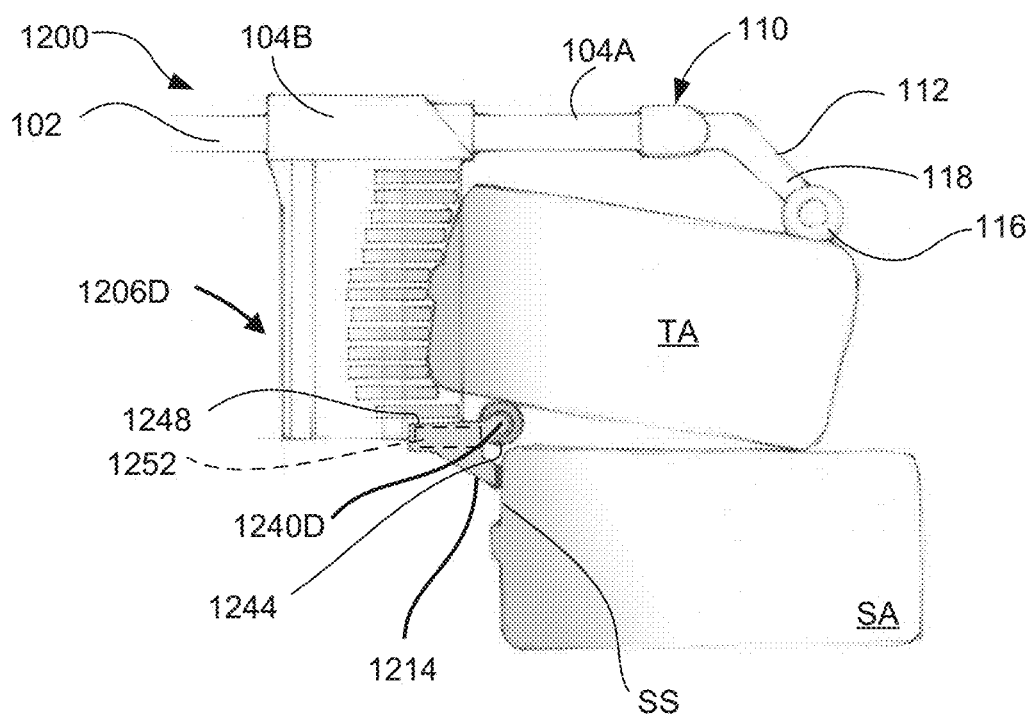
FIG. 28 illustrates a process of acquiring a target article using an end effector in accordance with at least one example of the present disclosure.

Referring to FIG. 28, the guide member 1210D can have a powered roller. FIG. 28 shows a cross-section of the capture device 1206D (e.g., taken along a line similar to line AA shown in FIG. 3). The guide member 1210D can have a powered roller 1240D, similar to the roller 1240 described above, and coupled to and driven by an actuator 1252 to rotate the roller 1240D. The actuator 1252 can be a motor with a rotational drive shaft coupled to the roller 1240D by a drive, such as a chain and sprockets, or a belt and pullies, or a direct drive. The actuator 1252 can be positioned inside the roller 1240D with a shaft fixed to the mount 1248 and a body fixed to the roller 1240D.

The power roller 1240D is one example of a means for lifting as described below.

Figure 29A:
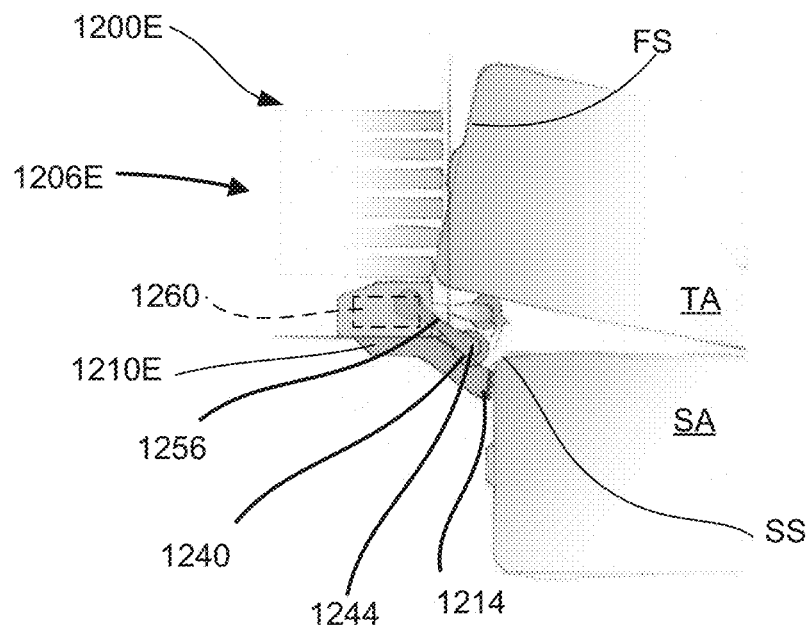
FIGS. 29A and 29B illustrate a process of acquiring a target article using an end effector in accordance with at least one example of the present disclosure.
Figure 29B:
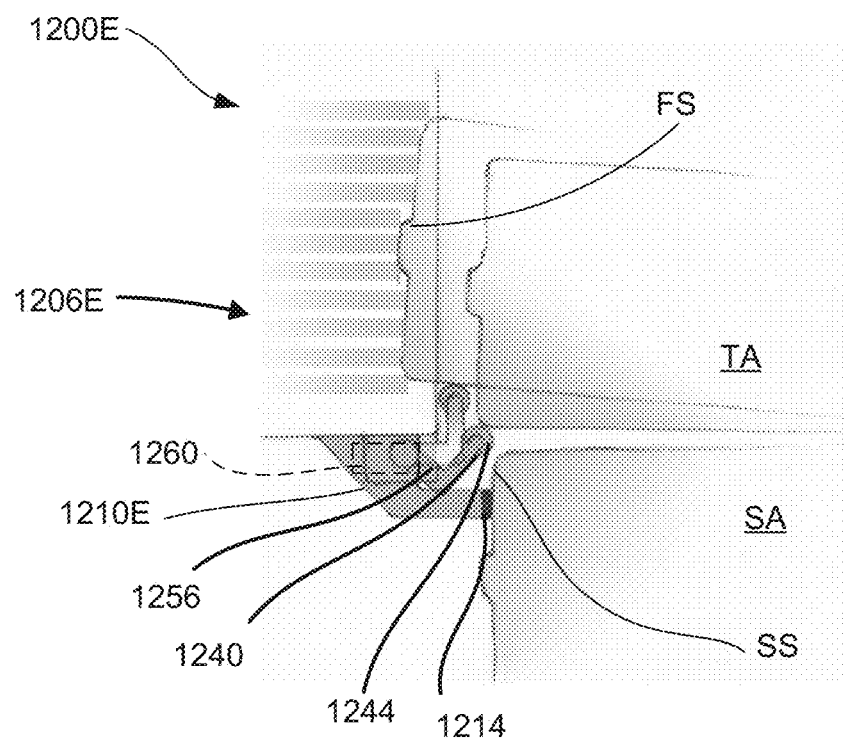

Referring to FIGS. 29A and 29B, the guide member 1210E can have a lifting or vertically displaceable, and/or rotationally displaceable, roller. FIGS. 29A and 29B each show a cross-section of the capture device 1206E (e.g., taken along a line similar to line AA shown in FIG. 3). The guide member 1210E can comprise a lift bar 1256 coupled to the axle 1244 of the front roller 1240. The lift bar 1256 can be pivotally coupled to, and/or with respect to, the capture device 1206E. An actuator 1260 can be coupled to the lift bar 1256 and capable of raising the front roller 1240 to transition the proximal end and front surface FS of the target article TA upwardly as the target article TA moves toward the capture device 1206E and as the front roller 1240 rotates. The actuator 1260 can be a pneumatic/hydraulic piston/cylinder type actuator with one end coupled with respect to the capture device 1206E and another end coupled to the lift bar 1256.

As described above, the end effector 1200E and the capture device 1206E can comprise the front stop 1214. The front roller 1240 and the lift bar 1256 can operate independently of the front stop 1214. The front roller 1240 and the lift bar 1256 can be coupled to the capture device 1206E independently of the front stop 1214. The front roller 1240 and the lift bar 1256 can move and pivot with respect to the capture device 1206E and the front stop 1214.

The lift bar 1256 and the front roller 1240 is one example of a means for lifting as described below.

Figure 30A:
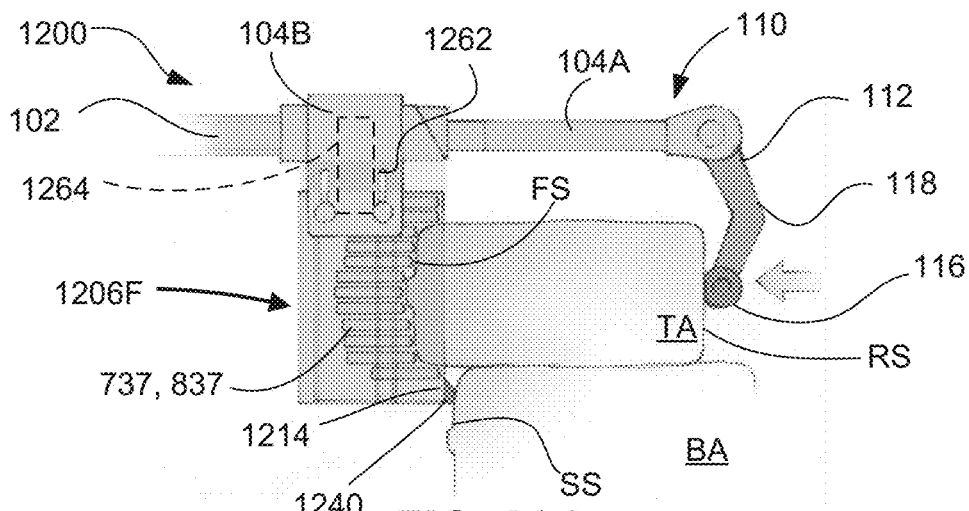
FIGS. 30A-30C illustrate a process of acquiring a target article using an end effector in accordance with at least one example of the present disclosure.
Figure 30B:
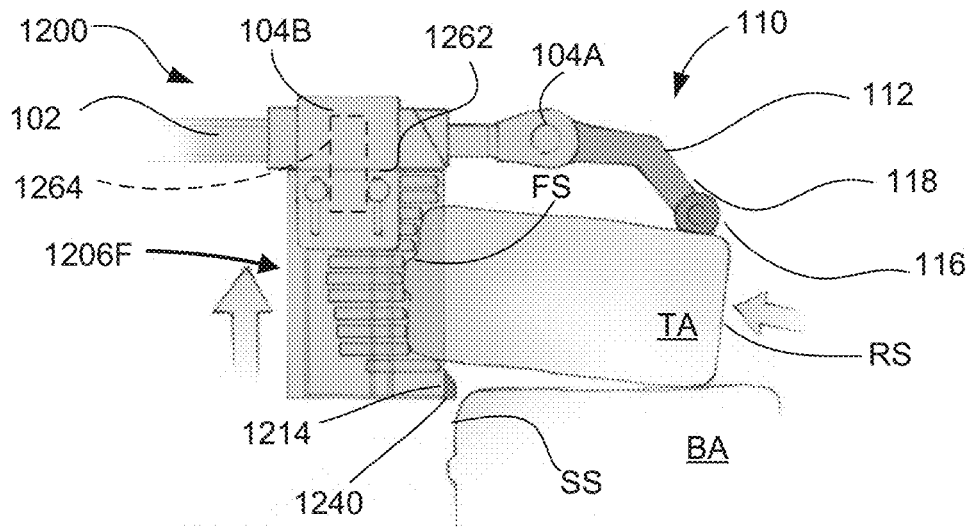
Figure 30C:
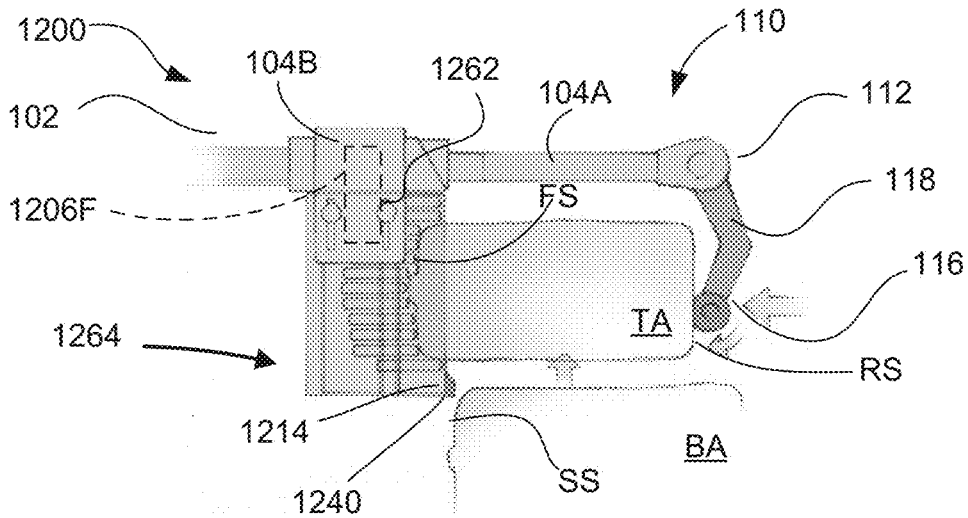

Referring to FIGS. 30A-C, the capture device 1206F itself can displace to lift the proximal end and front surface FS of the target article TA from the lower support surface SS, such as another article BA below the target article TA. FIGS. 30A-C each show a cross-section of the capture device 1206F (e.g., taken along a line similar to line AA shown in FIG. 3). The capture device 1206F can be vertically displaceable with respect to the extendable arm 102. The capture device 1206F can be carried by, and vertically displaceable with respect to, the end effector 1200, the extendable arm 102, and/or the support member 104, such as the second support member 104B or the first support member 104A. A link or coupling 1262 can couple the capture device 1206F to the extendable arm 102, or related structure. The link or coupling 1262 can allow the capture device 1206F to slide vertically and maintain an orientation of the capture device 1206F facing the target article TA. Thus, the capture device 1206F can be movably carried by the extendable arm 102 and capable of moving between: 1) a lower elevation, as shown in FIG. 30A, to receive the proximal end and the front surface FS of the target article TA, and 2) a higher elevation, as shown in FIGS. 30B and 30C, to elevate the proximal end and the front surface FS of the target article TA. An actuator 1264 can be coupled to the capture device 1206F to lift the capture device 1206F to elevate a proximal end and front surface FS of the target article TA off another article BA below the target article TA. In one aspect, the actuator 1264 can be coupled to and between the extendable arm 102 and the capture device 1206F. The actuator 1264 can be controlled by the system controller 4 in conjunction with one or more sensors as described herein. The actuator 1264 can be a pneumatic/hydraulic piston/cylinder. The coupling 1262 can include a brace on both sides of the extendable arm 102 and the capture device 1206F. A pair of vertical slots can be formed in each brace to receive a pair of tabs slidable therein to maintain the orientation of the capture device 1206F.

In one aspect, the end effector 1200 can have the front stop 1214 that can abut to the lower support surface SS of another article BA below the target article TA, as described above. In another aspect, the end effector 1200 can utilize a front roller 1240, as described above, that can abut to the lower support surface SS of another article BA below the target article TA to facilitate movement of the capture device 1206F with respect to the lower support surface SS as the capture device 1206F moves.

As described above, the article interface system 110 can comprise the actuatable article engagement device 112, such as the rollers 116, with an article interface surface 114, such as the surface of the rollers 116. The actuatable article engagement device 112, or the rollers 116, can be positionable opposing the capture device 1206F with the target article TA therebetween. The rollers 116 can comprise one or more powered rollers moveably coupled to the first support member 104A of the extendable arm 102. The article interface surface 114 can comprise at least one surface of the powered rollers 116. The powered rollers 116 can be positionable opposing the capture device 1206F and can lift a distal end and the rear surface RS of the target article TA as the capture device 1206F lifts a proximal end and the front surface FS of the target article TA. Together, the capture device 1206F and the actuatable article engagement device 112 can lift the target article TA off another article BA positioned below the target article TA, as shown in FIG. 30C.

The capture device 1206F being vertically displaceable is an example of a means for lifting as discussed below.

Figure 31A:
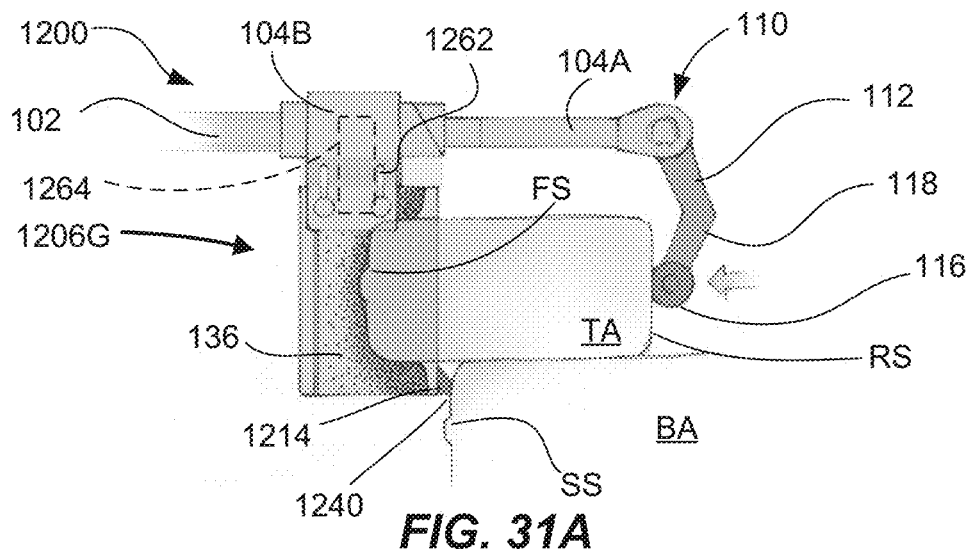
FIGS. 31A-31C illustrate a process of acquiring a target article using an end effector in accordance with at least one example of the present disclosure.
Figure 31B:
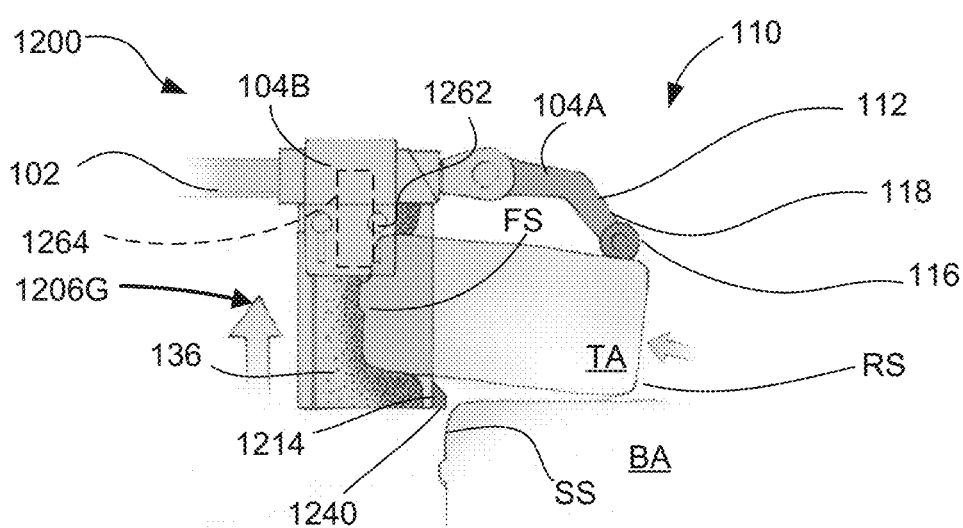
Figure 31C:
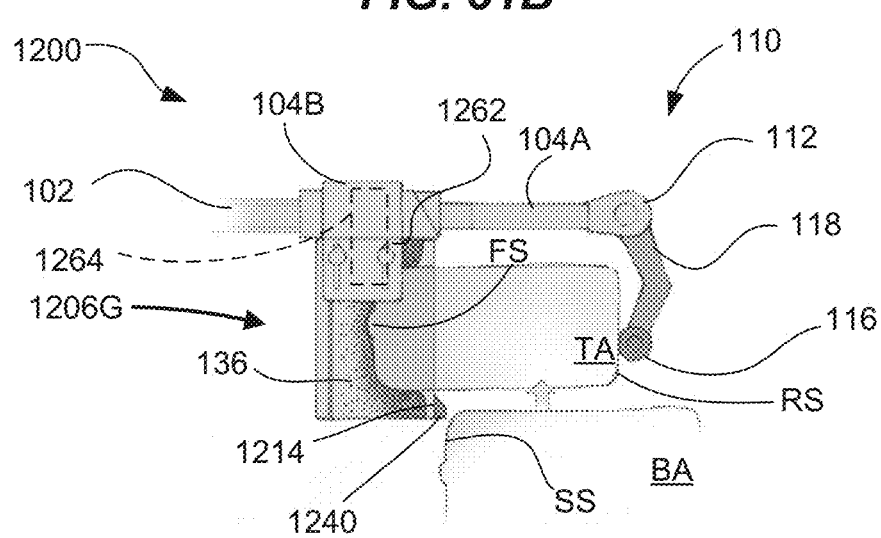

In one aspect, the capture device 1206F can comprise compliant rods 737 or biased rods 837, as described above, to help capture the proximal end and the front surface FS of the target article TA. In another aspect, a capture device 1206G can comprise a compliant material or element 136, as described above, to help capture the proximal end and the front surface FS of the target article TA, as shown in FIGS. 31A-C. FIGS. 31A-C each show a cross-section of the capture device 1206G (e.g., taken along a line similar to line AA shown in FIG. 3).

Described above are various examples of means for lifting a proximal end and front surface FS of the target article TA upward and off of a lower support surface SS, such as another article BA below the target article TA, upon which the target article TA is resting and aligning the target article TA with the capture device 1206-1206G as the target article TA moves toward the capture device 1206-1206G. The means for lifting can be associated with the capture device 1206-1206G. Examples of the means for lifting include the ramp, the front roller and the vertically displaceable capture device, as described above.

Figure 32A:
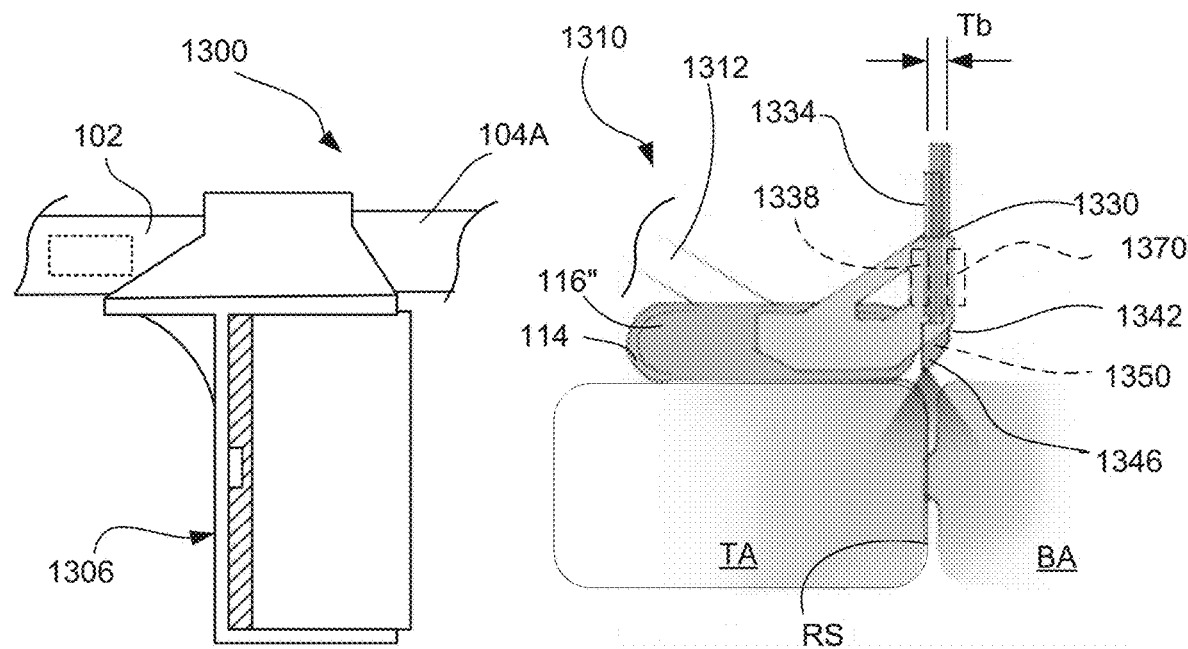
FIGS. 32A and 32B illustrate a process of acquiring a target article using an end effector in accordance with at least one example of the present disclosure.
Figure 32B:
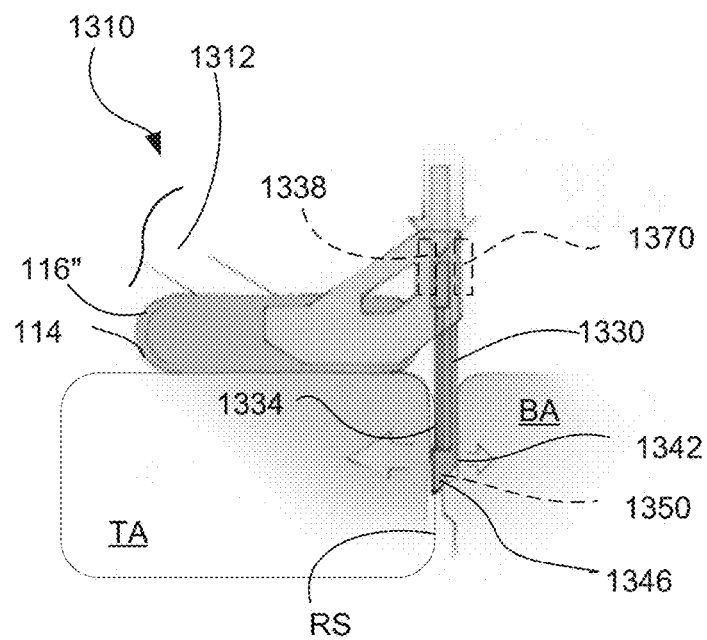

An alternative configuration of the end effector 1300 with vertical disengagement, such as a blade member 1330, is now described with reference to FIGS. 32A and 32B. FIGS. 32A and 32B each show a side view of the article interface system 1310 and the actuatable article engagement device 1312. The end effector 1300 can acquire and manage a target article TA similar to other end effectors described herein. The end effector 1300 can include an article interface system 1310 with an actuatable article engagement device 1312 described in more detail below.

Similar as described with respect to other end effectors of this disclosure, the end effector 1300 can include the article interface system 1310 supported by the extendable arm 102. The article interface system 1310 can include the actuatable article engagement device 1312 that itself comprises an article interface surface 114. The actuatable article engagement device 1312 can be operable to interface with the target article TA to facilitate movement of the target article TA toward the capture device 1306. As the functions of the extendable arm 102 and the actuatable article engagement device 1312 operate similarly as in other example end effectors described herein, the operation of these elements will not be repeated in detail here, but it is to be understood that operations described with respect to other examples of end effectors can also apply to end effector 1300. It is to be further understood that the article interface system 1310 and the actuatable article engagement device 1312 of the end effector 1300 can be combined with any of the arms (e.g., extendable arms, telescoping arms, SCARA arms, or any other arms operable to perform a similar function) that are mentioned herein without any intended limitation. Similarly, as the functions and structure of the article interface system 1310 and the actuatable article engagement device 1312 are similar to other examples of article interface systems and actuatable article engagement devices described herein, the operation and structure of these elements will not be repeated in detail here, but it is to be understood that operations and structures described with respect to other examples of article interface systems and actuatable article engagement devices can also apply to the article interface system 1310 and the actuatable article engagement device 1312. In addition, the end effector 1300, the article interface system 1310 and the actuatable article engagement device 1312 can be utilized with capture devices as described herein. Similarly, as the functions and structure of the capture device 1306 are similar to other examples of capture devices described herein, the operation and structure of these elements will not be repeated in detail here, but it is to be understood that operations and structures described with respect to other examples of capture devices can also apply to the capture device 1306.

As shown in FIGS. 32A and 32B, the article interface system 1310 and the actuatable article engagement device 1312 can include a blade member 1330 actuatable to move in at least one degree of freedom to interface with a rear surface RS of the target article TA. In addition, the article interface surface 114 can comprise at least one surface 1334 of the blade member 1330. In one aspect, the blade member 1330 can be positionable opposing the capture device 1306. The at least one surface 1334 of the blade member 1330 can be positionable opposing the capture device 1306. Thus, the blade member 1330 and the capture device 1306 can position the target article TA therebetween. An actuator 1338 can be coupled to the blade member 1330 to move the blade member 1330 vertically downwardly to position the at least one surface 1334 of the blade member 1330 to interface with the rear surface RS of the target article TA. The blade member 1330 can be actuated by the actuator 1338 between: 1) a raised position, as shown in FIG. 32A, and 2) a lowered position, as shown in FIG. 32B, with the at least one surface 1334 interfacing with the rear surface RS of the target article TA. The actuator 1338 can be a pneumatic/hydraulic piston/cylinder. The actuator can be an electric motor with a rack and pinion. The actuator can be a linear actuator.

In addition, the blade member 1330 can be inserted between the target article TA and another article SA behind the target article TA to separate the articles TA and SA. With the blade member 1330 lowered and with the at least one surface 1334 interfacing with the rear surface RS of the target article TA, the extendable arm 102, the article interface system 1310 and/or the actuatable article engagement device 1312 can displace the target article TA towards the capture device 1306. The article interface system 1310 can have a belt-type roller 116" or other rollers, as described herein, to move the target article TA towards the capture device 1306 with the blade member 1330 helping to separate the target article TA and other articles SA.

The blade member 1330 can have a thickness Tb aligned with the first support member 104A or actuatable arm 102, and a width Wb (FIG. 35) transverse to the first support member 104A greater than the thickness Tb of the blade member 1330. The thickness Tb of the blade member 1330 can be sized to be insertable between the target article TA and a proximal article, such as another article SA behind the target article TA.

The blade member 1330 can have an edge 1342 at a distal lower end of the blade member 1330. The edge 1342 can have a wedge-shaped profile with a narrower end to facilitate insertion between the target article TA and the proximal article, such as another article SA.

Figure 35:
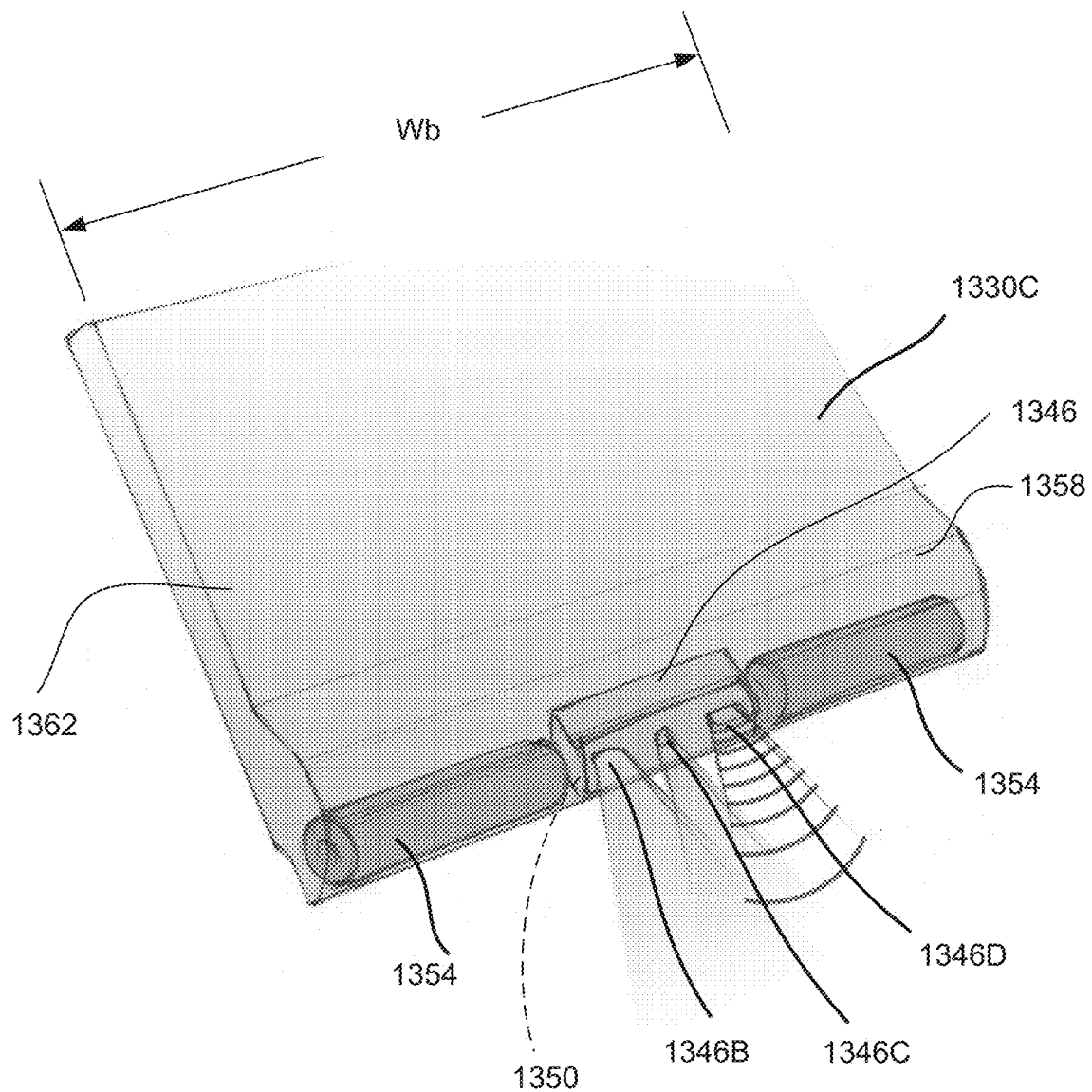
FIG. 35 illustrates a perspective view of the blade member of FIG. 34.

Referring to FIGS. 32A, 32B and 35, a detector 1346 can be carried by the blade member 1330 and 1330C to sense a location of the rear surface RS of the target article TA. FIG. 35 shows a perspective view of the blade member 1330C. The detector 1346 can be movable with the blade member 1330 and 1330C. The detector 1346 can be positioned at a distal lower end of the blade member 1330 and 1330C. The blade member 1330 and 1330C can have a pocket 1350 at the distal lower end 1358. The detector 1346 can be positioned in the pocket 1350. The detector 1346 can include or can be a camera 1346B, a light 1346C and/or an ultrasonic emitter 1346, as shown in FIG. 35.

Figure 33A:
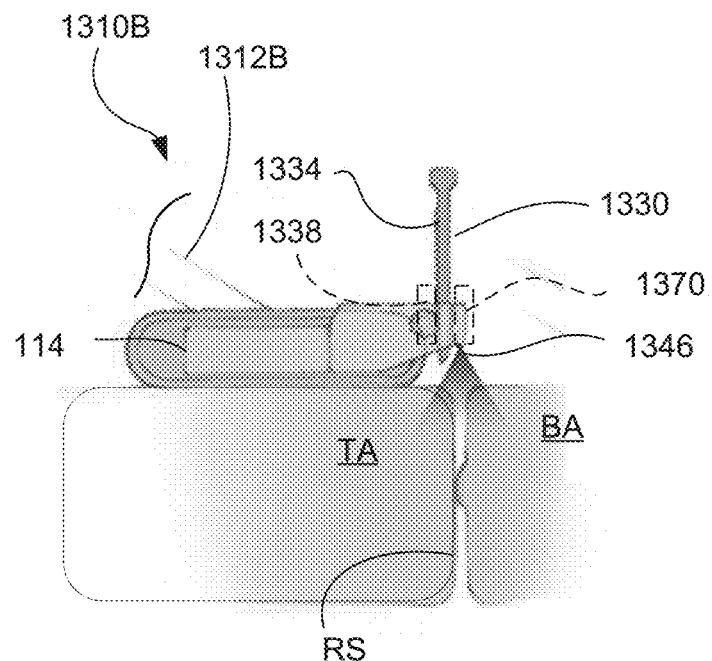
FIGS. 33A and 33B illustrate a process of acquiring a target article using an end effector in accordance with at least one example of the present disclosure.
Figure 33B:
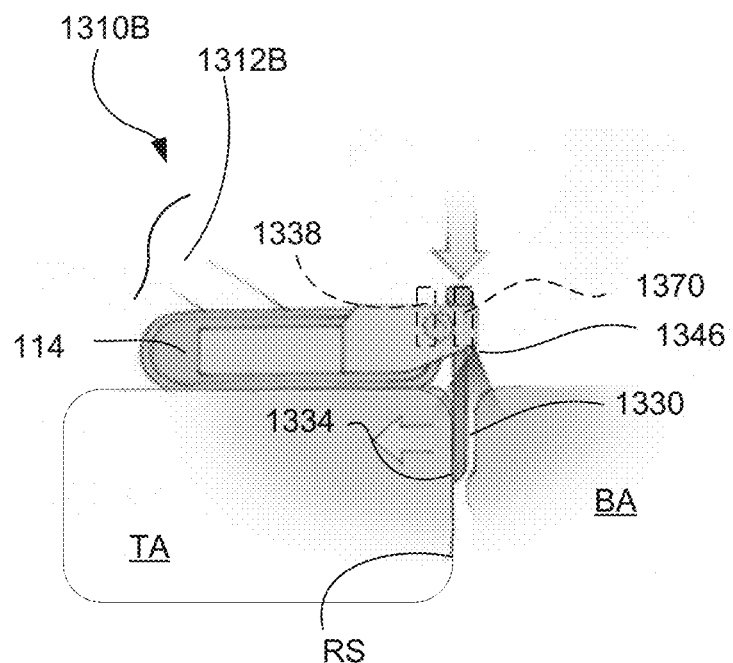

Referring to FIGS. 33A and 33B, the detector 1346 can be carried by and located on the article interface system 1310B or the article engagement device 1312B. FIGS. 32A and 32B each show a side view of the article interface system 1310B and the actuatable article engagement device 1312B.

Referring to FIGS. 34-37, the blade member can have at least one roller. FIGS. 34, 36 and 37 each show a side view of the blade member. FIG. 35 shows a perspective view of the blade member. As shown in FIGS. 34 and 35, the blade member 1330C can have a roller 1354 that is carried by the blade member 1330C. The roller 1354 can be positioned at the distal lower end 1358 of the blade member 1330C. In addition, the roller 1354 can be positioned on an inner side 1362 of the blade member 1330C. The roller 1354 can roll along the rear surface RS of the target article TA as the blade member 1330C is inserted behind the target article TA.

As shown in FIG. 36, the blade member 1330D can have at least two rollers 1354 carried by the blade member 1330D. As described above, the rollers 1354 can be positioned at the distal lower end 1358 of the blade member 1330D and can be positioned on the inner side 1362 of the blade member 1330D.

As shown in FIG. 37, the blade member 1330E can have at least two rollers carried by the blade member 1330E. A first roller 1354A can be positioned on the inner side 1362 of the blade member 1330E to roll along the rear surface RS of the target article TA. In addition, a second roller 1354B can be positioned on an outer side 1366, opposite the inner side 1362, of the blade member 1330E to roll along a surface PS of a proximate article or another article SA.

Referring again to FIGS. 32A and 32B, the article interface system 1310 can have a belt-type roller 116" or other rollers, as described herein, to move the target article TA towards the capture device 1306 with the blade member 1330 helping to separate the target article TA and other articles SA. The roller 116" can be a powered roller 116". The roller 116" can be moveably coupled to the first support member 104A of the extendable arm 102. In addition to the at least one surface 1334 and the inner surface 1362 of the blade member 1330-1330E, the article interface surface can further comprise at least one surface of the at least one powered roller 116". Both the blade member 1330-1330E and the powered roller 116" can be movable together by the article interface system 1310. In addition, the blade member 1330-1330E can be movable with respect to the powered roller 116". As described above, the detector 1346 can be carried by the powered roller 116", as shown in FIGS. 33A and 33B. The actuator 1338 can be coupled to and between the blade member 1330 and the powered roller 116" to move the blade member 1330 vertically downwardly with respect to the powered roller 116" to interface with the rear surface RS of the target article TA.

In another aspect, the article interface system 1310 can also have a vibrator 1370 coupled to the blade member 1330. The vibrator 1370 can be coupled to and between the blade member 1330 and the powered roller 116". The vibrator 1370 can vibrate the blade member 1330 with respect to the article interface system 1310 and the powered roller 116" to facilitate insertion of the blade member 1330 between the target article TA and a proximal article, such as another article SA behind the target article TA. In one aspect, the vibrator 1370 can comprise a motor with an off-axis load coupled to an output of the motor.

Figure 38A:
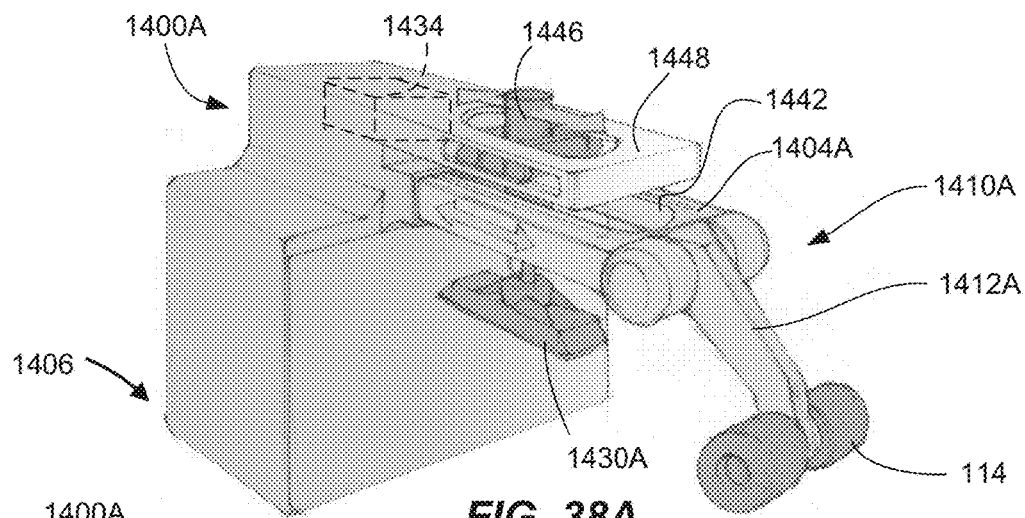
FIG. 38A illustrates a front elevation view of a robotic end effector in accordance with at least one example of the present disclosure.
Figure 38B:
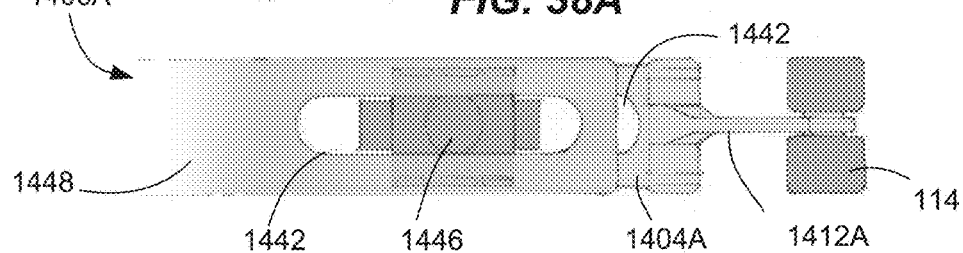
FIG. 38B illustrates a top view of the robotic end effector of FIG. 38A.
Figure 39A:
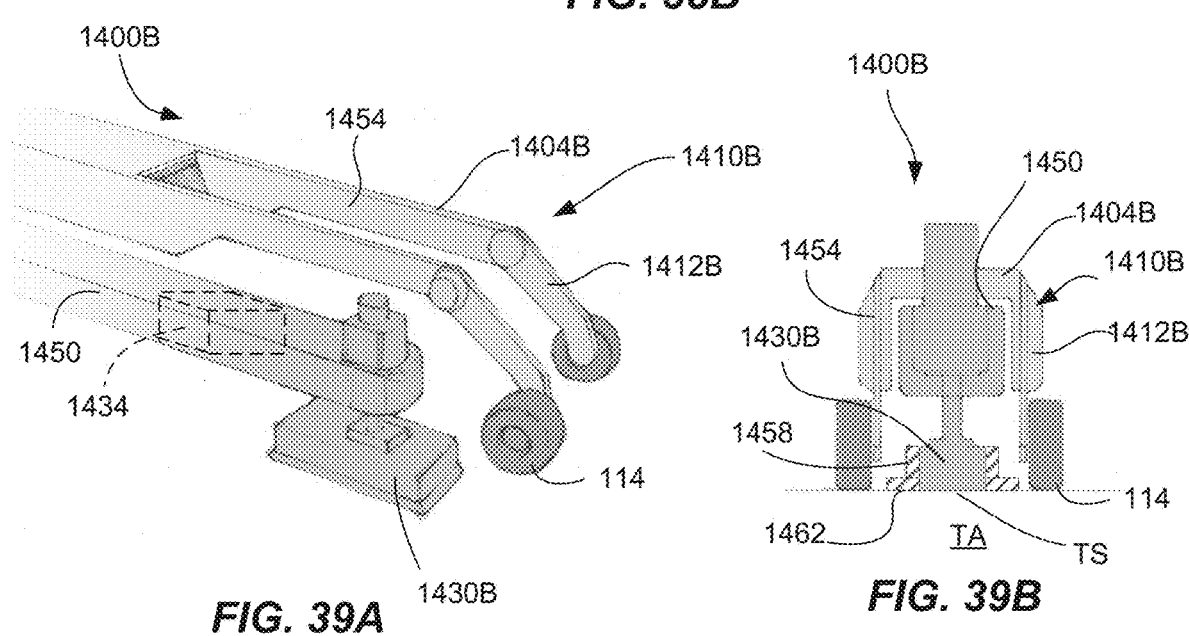
FIG. 39A illustrates a front elevation view of a robotic end effector in accordance with at least one example of the present disclosure.
Figure 39B:
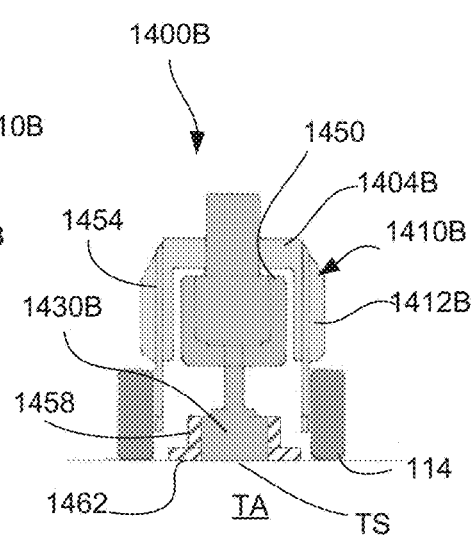
FIG. 39B illustrates a front view of the robotic end effector of FIG. 39A.
Figure 40A:
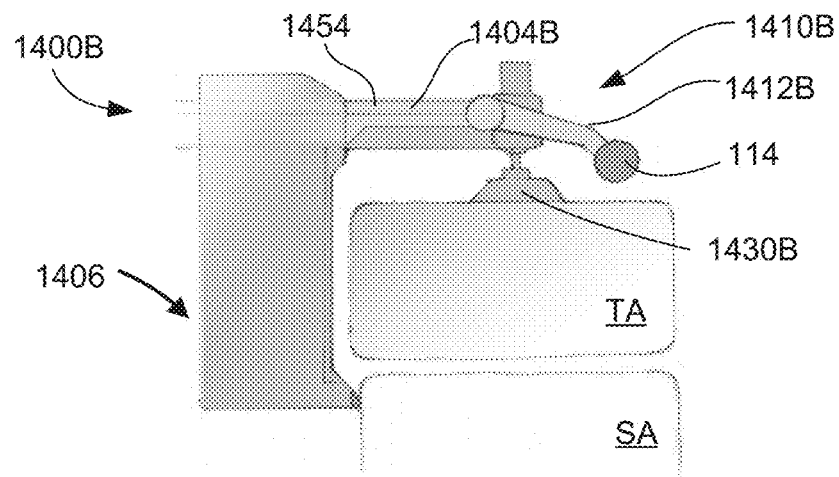
FIGS. 40A-40C illustrate a process of acquiring a target article using an end effector in accordance with at least one example of the present disclosure.
Figure 40B:
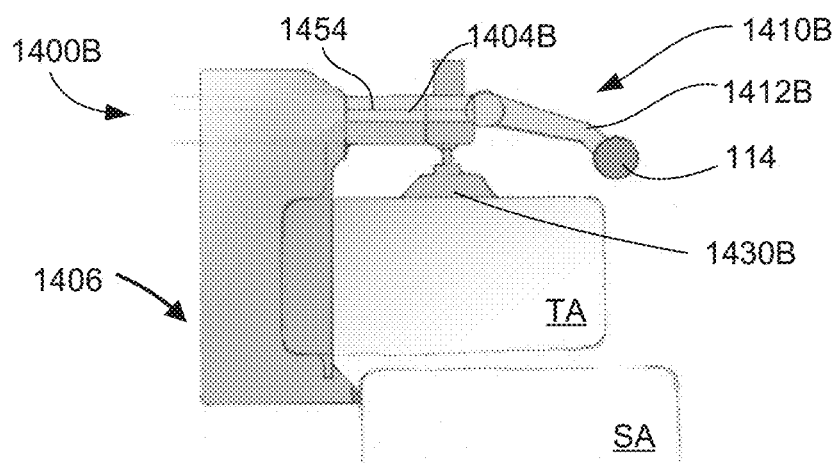
Figure 40C:
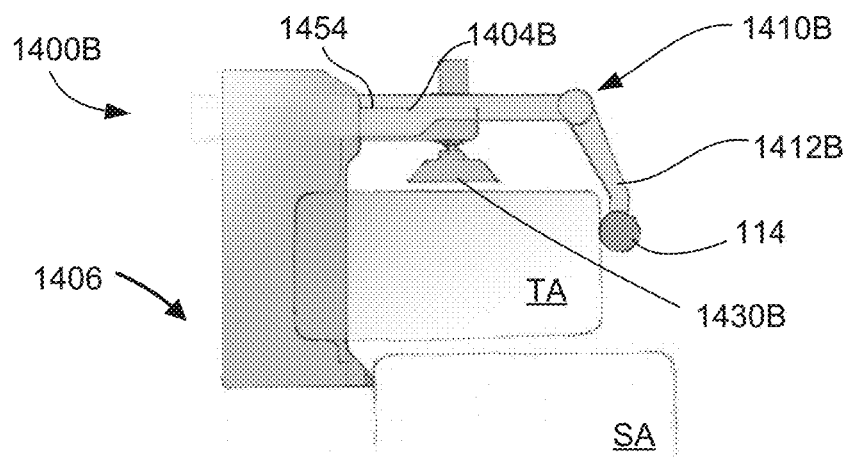

An alternative configuration of the end effector 1400A and 1400B is now described with reference to FIGS. 38A-40c. FIG. 38A shows a partial perspective view of the article interface system 1410A and the actuatable article engagement device 1412A. FIG. 38B shows a partial top view of the article interface system 1410A and the actuatable article engagement device 1412A. FIG. 39A shows a partial perspective view of the article interface system 1410B and the actuatable article engagement device 1412B. FIG. 39B shows a partial end view of the article interface system 1410B and the actuatable article engagement device 1412B. FIGS. 40A-C each show a partial cross-sectional side view of the article interface system 1410B and the actuatable article engagement device 1412B (e.g., taken along a line similar to line AA shown in FIG. 3). The end effector 1400A and 1400B can acquire and manage a target article TA similar to other end effectors described herein. The end effector 1400A and 1400B can include an article interface system 1410A and 1410B with an actuatable article engagement device 1412A and 1412B described in more detail below.

Similar as described with respect to other end effectors of this disclosure, the end effector 1400A and 1400B can include the article interface system 1410A and 1410B supported by the extendable arm. The article interface system 1410A and 1410B can include the actuatable article engagement device 1412A and 1412B that itself comprises an article interface surface 114. The actuatable article engagement device 1412A and 1412B can be operable to interface with the target article TA to facilitate movement of the target article TA toward the capture device 1406. As the functions of the extendable arm and the actuatable article engagement device 1412A and 1412B operate similarly as in other example end effectors described herein, the operation of these elements will not be repeated in detail here, but it is to be understood that operations described with respect to other examples of end effectors can also apply to end effector 1400. It is to be further understood that the article interface system 1410A and 1410B and the actuatable article engagement device 1412A and 1412B of the end effector 1400A and 1400B can be combined with any of the arms (e.g., extendable arms, telescoping arms, SCARA arms, or any other arms operable to perform a similar function) that are mentioned herein without any intended limitation. Similarly, as the functions and structure of the article interface system 1410A and 1410B and the actuatable article engagement device 1412A and 1412B are similar to other examples of article interface systems and actuatable article engagement devices described herein, the operation and structure of these elements will not be repeated in detail here, but it is to be understood that operations and structures described with respect to other examples of article interface systems and actuatable article engagement devices can also apply to the article interface system 1410A and 1410B and the actuatable article engagement device 1412A and 1412B. In addition, the end effector 1400A and 1400B, the article interface system 1410A and 1410B and the actuatable article engagement device 1412A and 1412B can be utilized with capture devices as described herein. Similarly, as the functions and structure of the capture device 1406 are similar to other examples of capture devices described herein, the operation and structure of these elements will not be repeated in detail here, but it is to be understood that operations and structures described with respect to other examples of capture devices can also apply to the capture device 1406.

As shown in FIGS. 38A and 38B, the article interface system 1410A and the actuatable article engagement device 1412A can include at least one vacuum gripper 1430A. The vacuum gripper 1430A can apply a negative pressure between the target article TA and the article interface system 1410A to assist in manipulating the target article and displacing the target article TA towards the capture device 1406. The negative pressure can create a force between the TA and the vacuum gripper 1430A to allow the vacuum gripper 1430A to lift or tilt the target article TA.

The vacuum gripper 1430A can be carried by the extendable arm similarly to the powered roller 116. The vacuum gripper 1430A can be coupled to a second support member 1448 and movable with respect to the first support member 1404A of the extendable arm. In addition, the vacuum gripper 1430A can be operatively coupled to a negative pressure source 1434. The negative pressure source 1434 can include a vacuum pump. Thus, the vacuum gripper 1430A can apply a suction force to the target article TA. The article interface surface 114 can include at least one surface of the vacuum gripper 1430. The vacuum gripper 1430A can interface with the top surface TS of the target article TA.

The vacuum gripper 1430A can be used in conjunction with at least one powered roller 116, as described herein. The article interface surface 114 can also include at least one surface of the powered roller 116. As described herein, the powered roller 116 can interface with a rear surface RS of the target article TA, a top surface TS of the target article TA, or both.

The powered roller 116 and the vacuum gripper 1430A can be movable independently with respect to one another. In one aspect, the first support member 1404A can have a slot 1442. A support 1446 can extend through the slot 1442 in the first support member 1404A. The vacuum gripper 1430A can be carried by the support 1446.

Referring to FIGS. 39A-40C, a second support 1450 member can be carried by the extendable arm. The vacuum gripper 1430B can be carried by the second support member 1450. The first support member 1404A can have a yoke 1454. The vacuum gripper 1430B can be aligned in the yoke 1454.

The vacuum gripper 1430B can be actuatable to move in at least one degree of freedom to interface with a top surface TS of the target article TA. The vacuum gripper 1430B can be vertically movable to lift and/or tilt the target article TA, as shown in FIGS. 40A-C.

In another aspect, the vacuum gripper 1430B can be horizontally movable to move the target article TA towards the capture device 1406, as shown in FIGS. 40B and 40C.

Referring to FIGS. 39B, the vacuum gripper 1430B can have a vertically oriented skirt 1458 surrounding a perimeter of the vacuum gripper 1430B and extending vertically therefrom. A horizontally oriented skirt 1462 can be positioned at a distal end of the vertically oriented skirt 1458. The horizontally oriented skirt 1462 can surround a perimeter of the vertically oriented skirt 1458 and can extend horizontally with respect to the vertically oriented skirt 1458. The horizontally oriented skirt 1462 can have a horizontal dimension greater than the vertically oriented skirt 1458. The skirts 1458 and/or 1462 can be flexible and resilient to conform to contours of the top surface TS of the target article TA. In one aspect, the skirts 1458 and/or 1462 can be formed of an air impermeable material. In another aspect, the skirts 1458 and/or 1462 can be formed of a open cell foam surrounded by a skin. In another aspect, the skirts 1458 and/or 1462 can be formed of one or more bladders.

Figure 41:
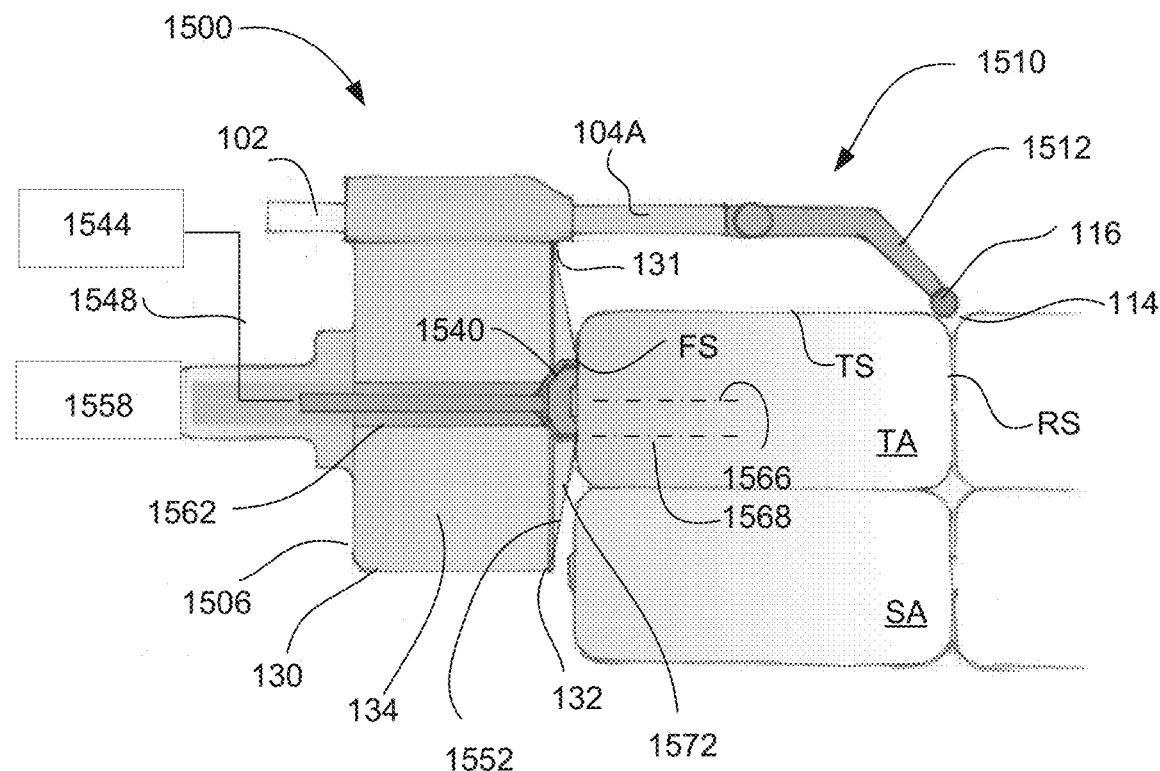
FIG. 41 illustrates a side elevation view of a robotic end effector in accordance with at least one example of the present disclosure.
Figure 42:
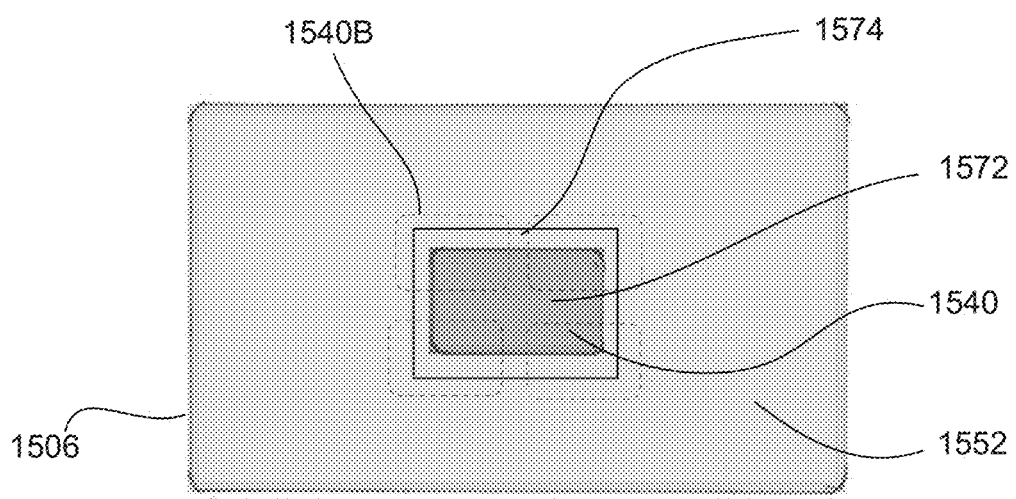
FIG. 42 illustrates a front elevation view of a capture device of the robotic end effector of FIG. 41.
Figure 43A:
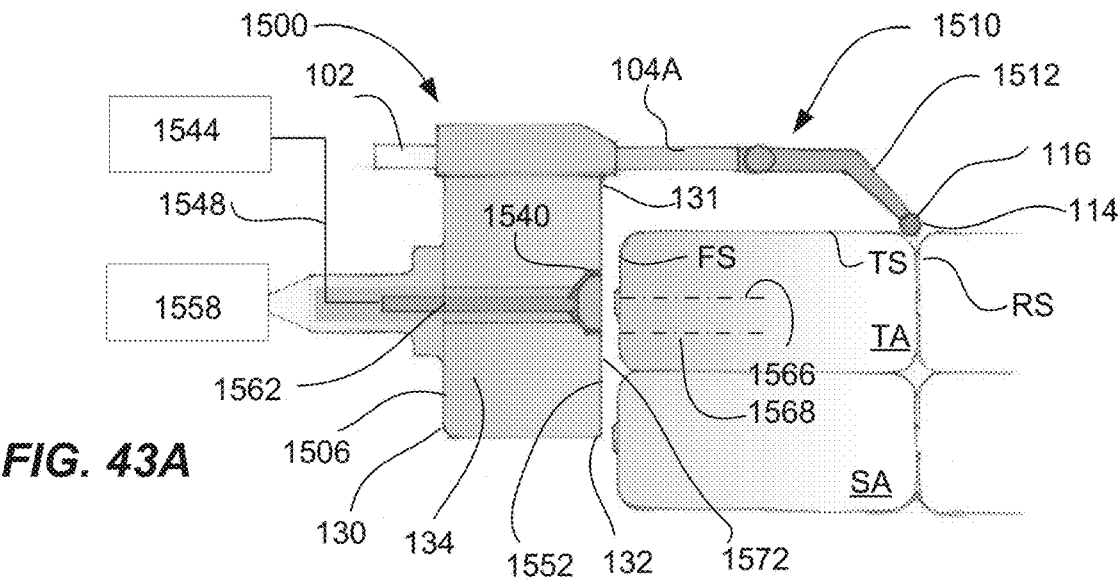
FIGS. 43A-43C illustrate a process of acquiring a target article using an end effector in accordance with at least one example of the present disclosure.
Figure 43B:
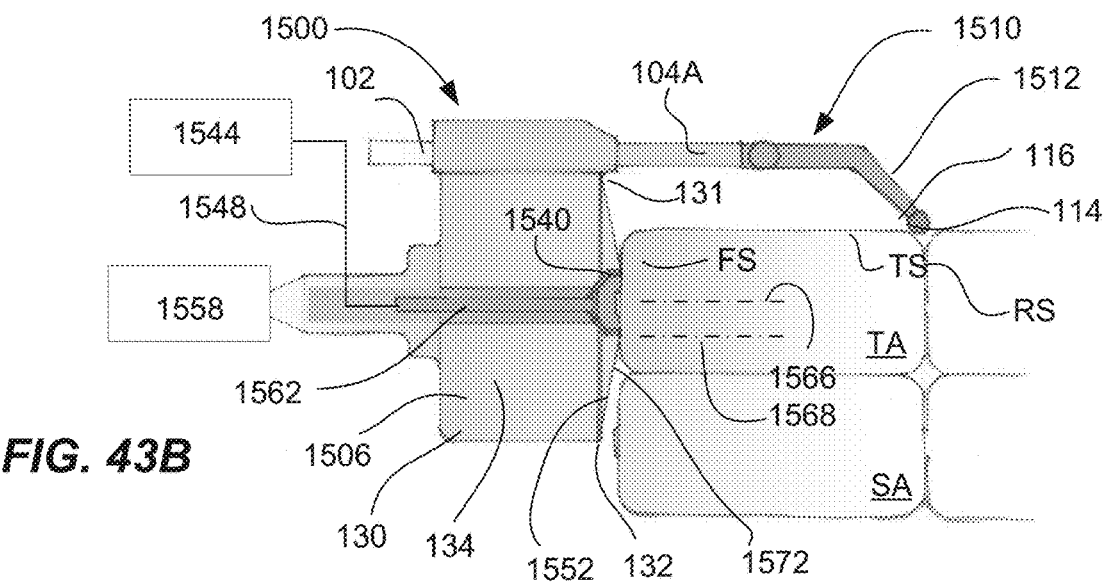
Figure 43C:
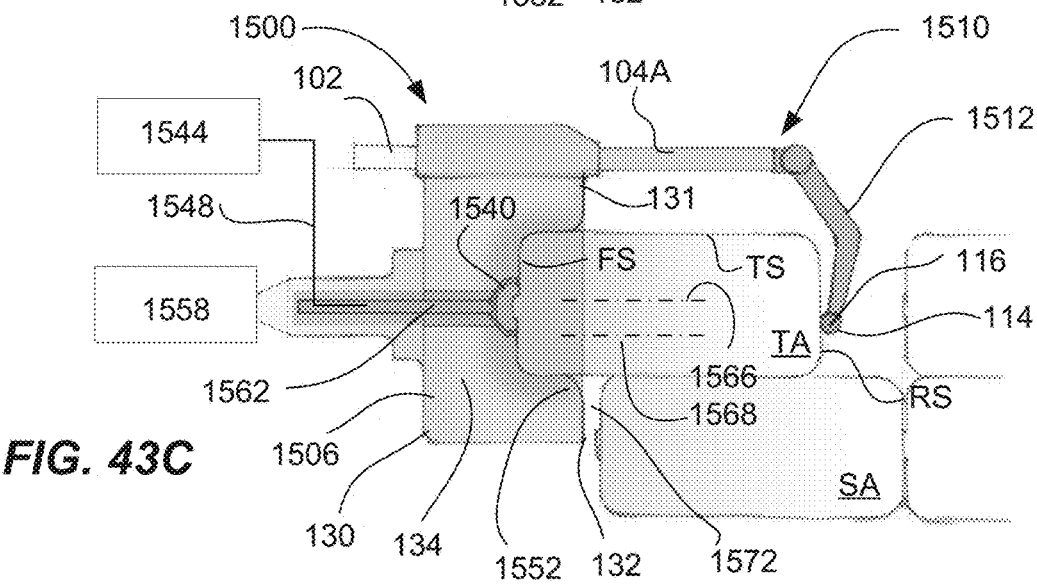

An alternative configuration of the end effector is now described with reference to FIGS. 41-45. Referring to FIGS. 41-43C, an end effector 1500 is described with a vacuum gripper 1540 to interface with the front surface FS of the target article TA. FIG. 41 shows a partial cross-sectional side view of the article interface system 1510, the actuatable article engagement device 1512, and the capture device 1506 (e.g., taken along a line similar to line AA shown in FIG. 3). FIG. 42 shows an end view of the capture device 1506. FIGS. 43A-43C each show a partial cross-sectional side view of the article interface system 1510, the actuatable article engagement device 1512, and the capture device 1506 (e.g., taken along a line similar to line AA shown in FIG. 3). The end effector 1500 can acquire and manage a target article TA similar to other end effectors described herein. The end effector 1500 can include an article interface system 1510 with an actuatable article engagement device 1512 and a capture device 1506, described in more detail below.

Similar as described with respect to other end effectors of this disclosure, the end effector 1500 can include the article interface system 1510 supported by the extendable arm 102. The article interface system 1500 can include the actuatable article engagement device 1512 that itself comprises an article interface surface 114. The actuatable article engagement device 1512 can be operable to interface with the target article TA to facilitate movement of the target article TA toward the capture device 1506. As the functions of the extendable arm and the actuatable article engagement device 1512 operate similarly as in other example end effectors described herein, the operation of these elements will not be repeated in detail here, but it is to be understood that operations described with respect to other examples of end effectors can also apply to end effector 1500. It is to be further understood that the article interface system 1510 and the actuatable article engagement device 1512 of the end effector 1500 can be combined with any of the arms (e.g., extendable arms, telescoping arms, SCARA arms, or any other arms operable to perform a similar function) that are mentioned herein without any intended limitation. Similarly, as the functions and structure of the article interface system 1510 and the actuatable article engagement device 1512 are similar to other examples of article interface systems and actuatable article engagement devices described herein, the operation and structure of these elements will not be repeated in detail here, but it is to be understood that operations and structures described with respect to other examples of article interface systems and actuatable article engagement devices can also apply to the article interface system 1510 and the actuatable article engagement device 1512. In addition, the end effector 1500, the article interface system 1510 and the actuatable article engagement device 1512 can be utilized with capture devices as described herein. Similarly, as the functions and structure of the capture device 1506 are similar to other examples of capture devices described herein, the operation and structure of these elements will not be repeated in detail here, but it is to be understood that operations and structures described with respect to other examples of capture devices can also apply to the capture device 1506.

As shown in FIGS. 41 and 42, the article interface system 1500 and the actuatable article engagement device 1512 can include a vacuum gripper 1540 to interface with the front surface FS of the target article TA. The vacuum gripper 1540 can work in conjunction with another actuatable article engagement device 1512, such as the rollers 116, as described herein. The vacuum gripper 1540 can interface with the front surface FS of the target article TA, while the rollers 116 can interface with the top surface TS and/or rear surface RS of the target article TA. The vacuum gripper 1540 can apply a suction force to the front surface FS of the target article TA. Thus, the vacuum gripper 1540 can be operatively or fluidically coupled to a vacuum source 1544 associated with and/or carried by the end effector 1500. The vacuum source 1544 can be a vacuum pump. The vacuum gripper 1540 can be carried by the capture device 1506. In one aspect, the vacuum gripper 1548 can be movable with respect to, and movably coupled to, the capture device 1506. A vacuum line 1548 can be coupled to and between the vacuum gripper 1540 and the negative pressure source 1544. In one aspect, at least a portion of the vacuum line 1548 can be movable with the vacuum gripper 1540, as described herein. The vacuum gripper 1540 can work in conjunction with the capture device 1506 to interface with the front surface FS and proximal end of the target article TA.

The vacuum gripper 1540 and the capture device 1506 can have a compliant diaphragm 1552. The compliant diaphragm 1552 can extend between the vacuum gripper 1540 and the capture device 1506. The compliant diaphragm 1552 can be carried by the capture device 1506, while the vacuum gripper 1540 can be carried by the compliant diaphragm 1552. In one aspect, the compliant diaphragm 1552 can be carried by a perimeter or the edge 131 of the wall 130 defining the volumetric interior 134 and the opening 132 of the capture device 1506. In another aspect, the compliant diaphragm 1552 can span the opening 132 of the capture device 1506. The compliant diaphragm 1552 can be flexible to stretch out and away from the capture device 1506 and into the volumetric interior 134 of the capture device 1506, as well as resilient to remain taut while flexing out and in.

The vacuum gripper 1540 can be operable to retract towards the capture device 1506 and extend away from the capture device 1506. Thus, the vacuum gripper 1540 can extend outwards away from the capture device 1506 to interface with the front surface FS of the target article TA, and retract back towards and into the volumetric interior 134 of the capture device 1506 with the front surface FS of the target article TA. An actuator 1558 can be coupled to the vacuum gripper 1540 and capable of extending the vacuum gripper 1540 away from the capture device 1506 and retracting the vacuum gripper 1540 towards and into the capture device 1506. The actuator 1558 can be a pneumatic/hydraulic piston/cylinder type actuator, a linear motor, a rotational motor with a rack and pinion, etc. The compliant diaphragm 1552 is operable to contract into the volumetric interior 134 and towards the capture device 1506 as the vacuum gripper 1540 retracts, and extend out of volumetric interior 134 and away from the capture device 1506 as the vacuum gripper 1540 extends.

The vacuum line 1548 can be coupled to and between the vacuum gripper 1540 and the negative pressure source 1544. In one aspect, at least a portion of the vacuum line 1548 can be movable with the vacuum gripper 1540. For example, at least a portion of the vacuum line 1548 can be flexible. As another example, the vacuum line 1548 can telescope. In another aspect, the actuator 1558 and the vacuum line 1548 can be coaxial. For example, the vacuum gripper 1540 can be carried on the end of a rigid tube 1562. The tube 1562 can be hollow and can form at least a portion of the vacuum line 1548. The tube 1562 can also be coupled to and between the actuator 1558 and the vacuum gripper 1540. The actuator 1558 can linearly displace the vacuum gripper 1540 with respect to the capture device 1506. Thus, the vacuum line 1548 and the actuator 1558 can be coaxial.

In one aspect, a position of the vacuum gripper 1540 on the compliant diaphragm 1552 is capable of displacing the vacuum gripper 1540 upward as the diaphragm 1552 contracts to lift a proximal end or the front surface FS of the target article TA. For example, the vacuum gripper 1540, or a centerline 1566 thereof, can be positioned above a centerline 1568 of the compliant diaphragm 1552 and the opening 132 of the capture device 1506. In one aspect, the vacuum gripper 1540 can be pivotally coupled to the end of the tube 1562 to allow for displacement and lift of the vacuum gripper 1540 and the target article TA with respect to the capture device 1206 as the target article TA is transitioned into the capture device 1206 and the compliant diaphragm 1552 displaces and lifts. In another aspect, the tube 1562 can be pivotally coupled to the actuator 1558 to allow for displacement and lift of the vacuum gripper 1540 and the target article TA. In another aspect, the vacuum gripper 1540 can be substantially centered with respect to the compliant diaphragm 1552 and the opening 132 of the capture device 1506.

The vacuum gripper 1540 can have an outermost surface 1572 to interface with the front surface FS the target article TA. In one aspect, the outermost surface 1572 of the vacuum gripper 1540 can be pliable or can have pliable lips 1574 to conform to surface contours of the front surface FS of the target article TA. The outermost surface 1572 or the lips 1574 of the vacuum gripper 1540 can substantially seal to the front surface FS of the target article TA sufficient to form a low pressure between the vacuum gripper 1540 and the front surface FS of the target article TA to create a vacuum force to pull the target article TA as the vacuum gripper 1540 retracts. In another aspect, the outermost surface 1572 of the vacuum gripper 1540 can be flush or co-planar with the compliant diaphragm 1552 or outer surface thereof. Thus, the compliant diaphragm 1552 can also help form a seal against the front surface FS of the target article TA along with the front surface 1572 or lips 1574 of the vacuum gripper 1540. An area of the vacuum gripper 1540 between the lips 1574 can be open to vacuum line 1548 and the vacuum source 1544 and can define the area where the low pressure is formed to create the vacuum force. In addition, the area of the vacuum gripper 1540 between the lips 1574 can form a cavity that can accommodate surface features of the target article TA, such as a handle.

The vacuum gripper 1540 and the compliant diaphragm 1552 can have at least two positions, including: 1) an extended position, as shown in FIGS. 41 and 43B, and 2) a retracted position, as shown in FIG. 43C. In the extended position, the vacuum gripper 1540 can be extended, such as to the front surface FS of the target article TA, and can have a negative pressure from the negative pressure source 1544 to create the negative force hold the vacuum gripper 1540 to the front surface FS of the target article TA. The vacuum gripper 1540 can be extended by the actuator 1558.

In the retracted position, the vacuum gripper 1540 can be retracted while maintaining the negative pressure from the negative pressure source to draw the target article TA with the vacuum gripper 1540. The vacuum gripper 1540 can be retracted by the actuator 1558, causing the vacuum gripper 1540 be drawn to and into the capture device 1506 along with the proximal end and the front surface FS of the target article TA. The article interface system 1510, the actuatable article engagement device 1512, and the rollers 116 can cooperate with the vacuum gripper 1540 and the compliant diaphragm 1552 to move the target article TA towards and into the capture device 1506. Thus, the actuatable article engagement device 1512, the article interface surface 114, such as the rollers 116, can interface with a distal end and the rear surface RS of the target article TA, while the vacuum gripper 1540 can interface with the proximal end and the front surface FS of the target article TA. The article interface surface 114, and the rollers 116, and the vacuum gripper 1540 can oppose one another and position the target article TA therebetween.

Figure 44:
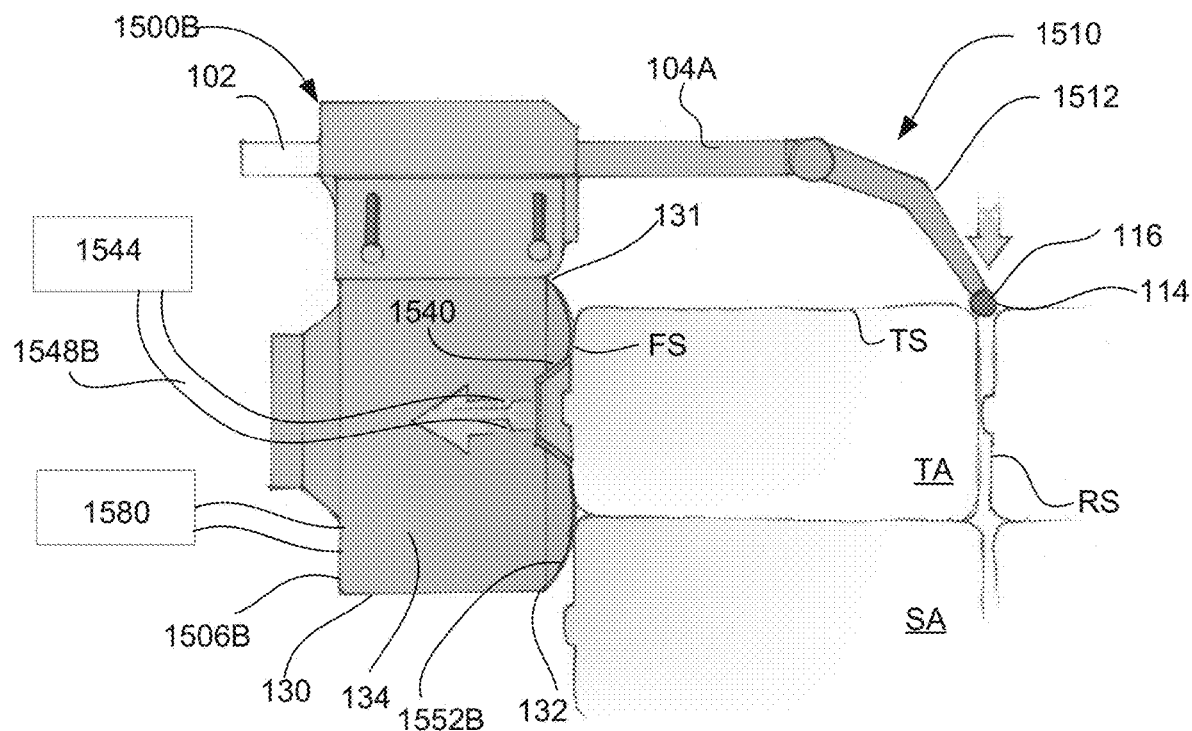
FIGS. 44 and 45 illustrate side elevation views of a robotic end effector in accordance with at least one example of the present disclosure.
Figure 45:
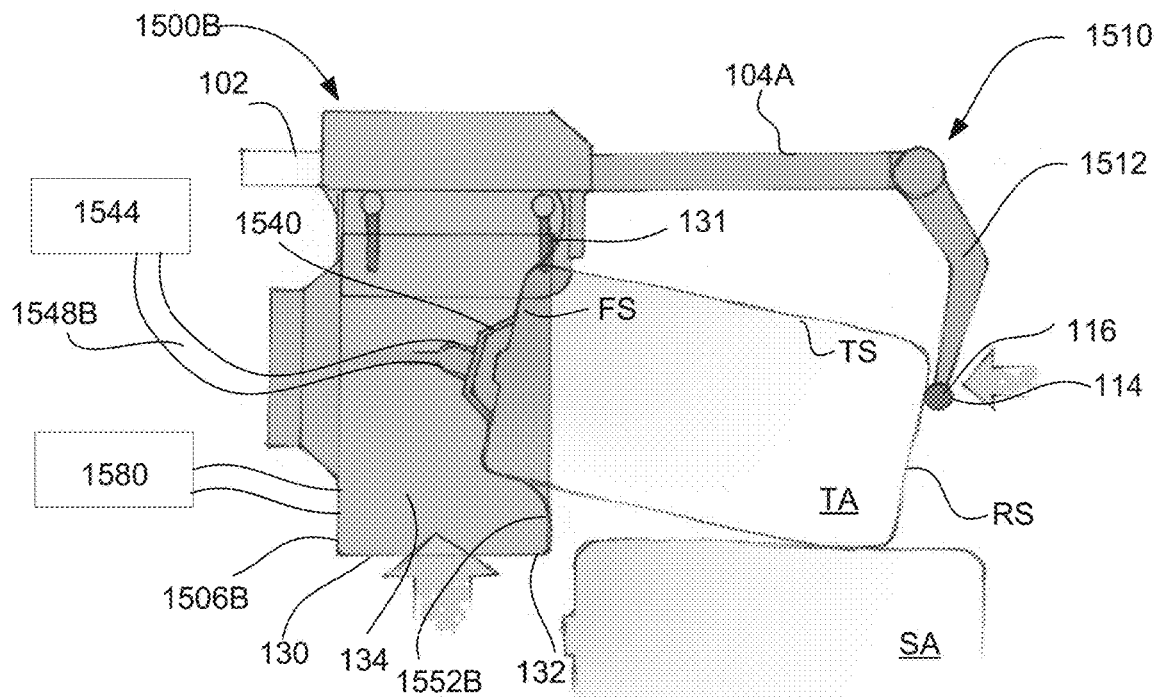

Referring to FIGS. 44 and 45, an end effector 1500B is described with a vacuum gripper 1540 to interface with the front surface FS of the target article TA, similar to that described above, and a capture device 1506B to actuate the vacuum gripper 1540 as well as capture the front surface FS of the target article TA. FIGS. 44 and 45 each show a partial cross-sectional side view of the article interface system 1510, the actuatable article engagement device 1512, and the capture device 1506B (e.g., taken along a line similar to line AA shown in FIG. 3). The end effector 1500B can acquire and manage a target article TA similar to other end effectors described herein. The end effector 1500B can include an article interface system 1510 with an actuatable article engagement device 1512 and a capture device 1506B, described in more detail below.

In one aspect, the compliant diaphragm 1552B can be sealed to the capture device 1506B. For example, the compliant diaphragm 1552B can be sealed about a perimeter thereof to the perimeter or the edge 131 of the wall 130 defining the volumetric interior 134 and the opening 132 of the capture device 1506B. In addition, the vacuum gripper 1540 can be sealed to the compliant diaphragm 1552B. The compliant diaphragm 1552B can circumscribe the vacuum gripper 1540. In one aspect, the volumetric interior 134 can be sealed or substantially sealed to maintain or substantially maintain an internal pressure, positive and/or negative.

A variable pressure source 1580 can be operatively and fluidically coupled to the capture device 1506B and the volumetric interior 134 thereof. The variable pressure source 1580 can operate to selectively and alternately supply positive and negative pressure to the volumetric interior 134 of the capture device 1506B. Thus, the capture device 1506B can be capable of being negatively pressurized to contract the compliant diaphragm 1552B, and positively pressurized to expand the compliant diaphragm 1552B. As the variable pressure source 1580 applies a negative pressure to the volumetric interior 134 of the capture device 1506B, the diaphragm 1552B contracts, and the vacuum gripper 1540 is retracted, as shown in FIG. 45. As the variable pressure source 1580 applies a positive pressure to the volumetric interior 134 of the capture device 1506B, the diaphragm 1552B expands, and the vacuum gripper 1540 is extended, as shown in FIG. 44.

The vacuum line 1548B can be coupled to and between the vacuum gripper 1540 and the negative pressure source 1544. At least a portion of the vacuum line 1548B can be movable with the vacuum gripper 1540 during displacement between retracted and extended positions, and as the compliant diaphragm 1552B contracts and expands. For example, at least a portion of the vacuum line 1548B can be flexible. A portion of the vacuum line 1548B can extend into the volumetric interior 134 of the capture device 1506B. Thus, the capture device 1506B can seal around the vacuum line 1548B at a junction.

The negative pressure source 1544 can selectively apply a negative pressure to the vacuum gripper 1540 to form the vacuum force when the vacuum gripper 1540 interfaces with the front surface FS of the target article TA. In addition, the variable pressure source 1580 can alternately apply positive and negative pressure to the vacuum gripper 1540 via the capture device 1506B and the compliant diaphragm 1552B to drive or actuate the vacuum gripper 1540 between extension and retraction.

The vacuum gripper 1540 and the compliant diaphragm 1552B can have at least two positions, including: 1) an extended position, as shown in FIG. 44, and 2) a retracted position, as shown in FIG. 45. In the extended position, the vacuum gripper 1540 can be extended, such as to the front surface FS of the target article TA, and can have a negative pressure from the negative pressure source 1544 to create the negative force to hold the vacuum gripper 1540 to the front surface FS of the target article TA. In addition, the compliant diaphragm 1552B can be extended and can be pressurized with positive pressure from the variable pressure source 1580, causing the vacuum gripper 1540 to interface with the front surface FS of the target article TA.

In the retracted position, the vacuum gripper 1540 can be retracted while maintaining the negative pressure from the negative pressure source 1544 to draw the target article TA with the vacuum gripper 1540. In addition, compliant diaphragm 1552B can be contracted with negative pressure from the variable pressure source 1580, causing the vacuum gripper 1540 be drawn to and into the capture device 1506B along with the proximal end and the front surface FS of the target article TA. The article interface system 1510, the actuatable article engagement device 1512, and the rollers 116 can cooperate with the vacuum gripper 1540 and the compliant diaphragm 1552B to move the target article TA towards and into the capture device 1506B. Thus, the actuatable article engagement device 1512, the article interface surface 114, such as the rollers 116, can interface with a distal end and the rear surface RS of the target article TA, while the vacuum gripper 1540 can interface with the proximal end and the front surface FS of the target article TA. The article interface surface 114, and the rollers 116, and the vacuum gripper 1540 can oppose one another and position the target article TA therebetween.

In another aspect, the vacuum gripper can comprise multiple discrete vacuum grippers 1540B (FIG. 42) that can be independently coupled to the negative pressure source and can operate independently with respect to one another. Thus, the multiple vacuum grippers may have a greater likelihood of successful interfacing, and forming a vacuum force, with a varied front surface FS of the target article TA.

In another aspect, the capture device 1506B may be movably coupled with respect to the end effector 1500B and actuated to lift the proximal end and the front surface FS of the target article TA, as described herein.

Figure 46A:
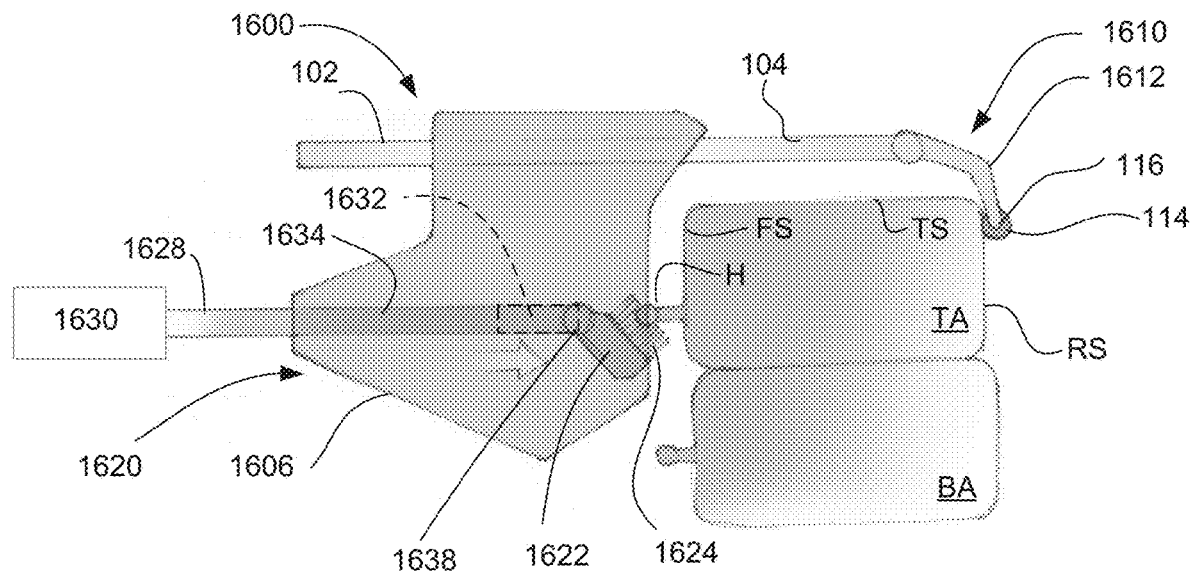
FIGS. 46A and 46B illustrate side elevation views of a robotic end effector in accordance with at least one example of the present disclosure.
Figure 46B:
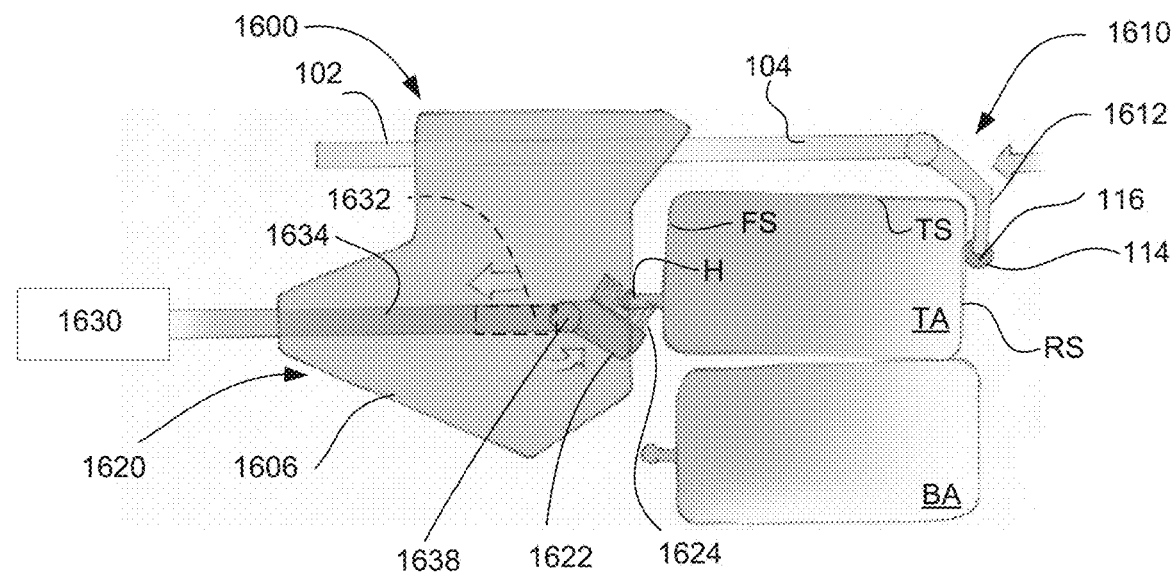

An alternative configuration of the end effector is now described with reference to FIGS. 46a-50c. Referring to FIGS. 46a and 46d, an end effector 1600 is described with a second article interface system 1620 to interface with the front surface FS of the target article TA. FIGS. 46a and 46b each show a partial cross-sectional side view of the second article interface system 1620, a second actuatable article engagement device 1622, and the capture device 1606 (e.g., taken along a line similar to line AA shown in FIG. 3). The end effector 1600 can acquire and manage a target article TA similar to other end effectors described herein. The end effector 1600 can include a second article interface system 1620 with a second actuatable article engagement device 1622, described in more detail below.

Similar as described with respect to other end effectors of this disclosure, the end effector 1600 can include the first article interface system 1610 supported by the extendable arm. The first article interface system 1610 can include a first actuatable article engagement device 1612 that itself comprises an article interface surface 114. The first actuatable article engagement device 1612 can be operable to interface with the top surface TS and or rear surface RS of the target article TA to facilitate movement of the target article TA toward the capture device 1606. As the functions of the extendable arm and the first actuatable article engagement device 1612 operate similarly as in other example end effectors described herein, the operation of these elements will not be repeated in detail here, but it is to be understood that operations described with respect to other examples of end effectors can also apply to end effector 1600. It is to be further understood that the second article interface system 1620 and the second actuatable article engagement device 1622 of the end effector 1600 can be combined with any of the arms (e.g., extendable arms, telescoping arms, SCARA arms, or any other arms operable to perform a similar function) that are mentioned herein without any intended limitation. Similarly, as the functions and structure of the first article interface system 1610 and the first actuatable article engagement device 1612 are similar to other examples of article interface systems and actuatable article engagement devices described herein, the operation and structure of these elements will not be repeated in detail here, but it is to be understood that operations and structures described with respect to other examples of article interface systems and actuatable article engagement devices can also apply to the first article interface system 1610 and the first actuatable article engagement device 1612. In addition, the end effector 1600, the second article interface system 1620 and the second actuatable article engagement device 1612 can be utilized with other capture devices as described herein. Similarly, as the functions and structure of the capture device 1606 are similar to other examples of capture devices described herein, the operation and structure of these elements will not be repeated in detail here, but it is to be understood that operations and structures described with respect to other examples of capture devices can also apply to the capture device 1606.

As shown in FIGS. 46A and 46B, the second article interface system 1620 can include the second article engagement system 1622 that itself comprises a second article interface surface 1624. The second actuatable article engagement device 1622 and the second article interface surface 1624 can be operable to interface with a handle H of the target article TA to facilitate movement of the target article TA toward the capture device 1606 and/or to lift the proximal end and the front surface FS of the target article TA with respect to another article BA and guide the target article TA towards the capture device 1606.

The first actuatable article engagement device 1612 and the second actuatable article engagement device 1622 can be configured to cooperate to facilitate movement of the target article TA toward the capture device 1606. The first actuatable article engagement device 1612 and the first article interface surface 114, such as rollers 116, can interface with the top surface TS and/or rear surface RS of the target article TA. The second article interface surface 1624 and the first article interface surface 114 can oppose one another and position the target article TA therebetween. As described above, the first article interface surfaced 114 can comprise at least one powered roller 116 moveably coupled to the first support member 104 of the extendable arm 102 via the first actuatable article engagement device 1612. The powered roller 116 can interface with the rear surface RS and/or the top surface TS of the target article TA.

The end effector 1600 can have a second extendable arm 1628 supporting the second article interface system 1620. A first actuator 1630 can be coupled to the second extendable arm 1620 and operable to move the second actuatable article engagement device 1622 in reciprocating forward and backward motion towards the target article TA and back towards the capture device 1606. In one aspect, the second extendable arm 1628 can extend from and through the capture device 1606. Thus, the first actuator 1630 can draw the target article TA towards the capture device 1606 via the second extendable arm 1628.

In addition, a second actuator 1632 can be coupled to the second actuatable article engagement device 1622 and can be operable to lift the second actuatable article engagement device 1622 and operable to lift the proximal end and the front surface FS of the of the target article TA. In one aspect, the second actuator 1632 can lift the second actuatable article engagement device 1622 by pivoting the second actuatable article engagement device 1622. The second actuatable article engagement device 1622 can be pivotally coupled to a distal end 1634 of the second extendable arm 1628 at a pivot or joint 1638. The pivot or joint 1638 and the second actuatable article engagement device 1622 can be operable to pivot the second article interface surface 1624 to interface with the handle H of the target article TA. The second actuator 1632 can be a rotational actuator and can be associated with the pivot or joint 1638.

Figure 47A:
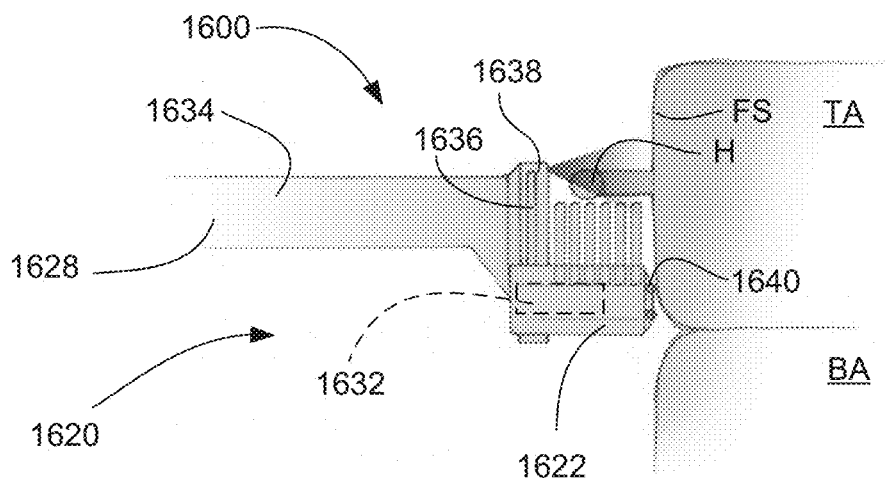
FIGS. 47A-47C illustrate side elevation views of a robotic end effector in accordance with at least one example of the present disclosure.
Figure 47B:
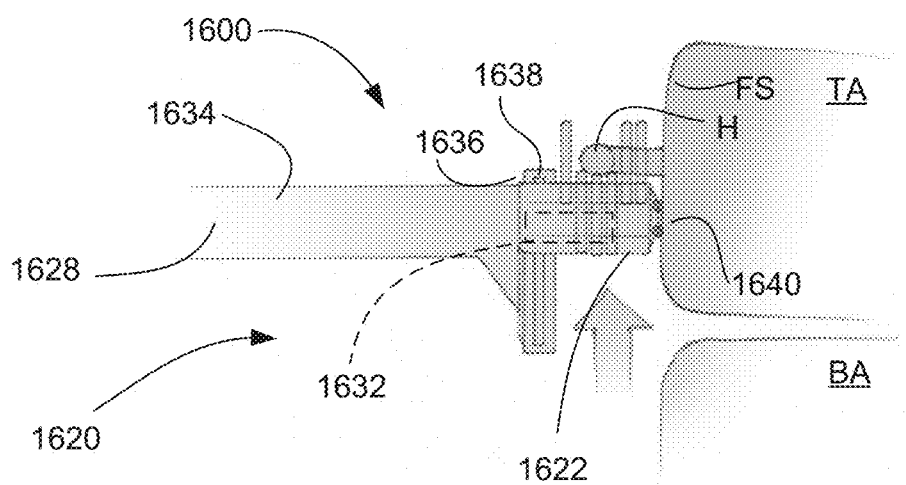

In another aspect, the second actuator 1632 can lift the second actuatable article engagement device 1622 by linearly and vertically displacing the second actuatable article engagement device 1622, as shown in FIGS. 47A-B. FIG. 47A-B each show a partial cross-sectional side view of the second article interface system 1620, a second actuatable article engagement device 1622, and the capture device 1606 (e.g., taken along a line similar to line AA shown in FIG. 3). The second actuatable article engagement device 1622 can be linearly coupled to the distal end 1634 of the second extendable arm 1628 to be vertically movable to interface with the handle H of the target article TA. A track or slide 1636 can be coupled to and between the distal end 1634 or the second extendable arm 1628 and the second actuatable article engagement device 1622. The second actuator 1632 can be a linear actuator coupled to and between the track or slide 1636 and the second actuatable article engagement device 1622 to displace the second actuatable article engagement device 1622 vertically.

In another aspect, the end effector 1600 and the article interface system 1620 can have a detector 1638 to facilitate operation of the second actuatable article engagement device 1622 and the second article interface surface 1624 to interface with the handle H of the target article TA. The detector 1638 can be carried by the distal end 1634 of the second extendable arm 1628. The detector 1638 can be or can comprise at least one of a camera, a light or an ultrasonic emitter. In another aspect, the detector can be carried and coupled to the second actuatable article engagement device 1622.

Figure 47C:
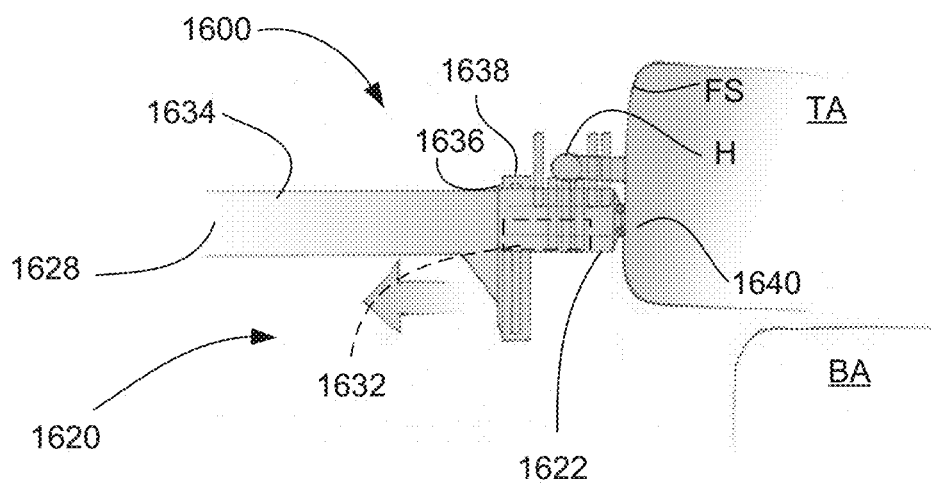
Figure 48A:
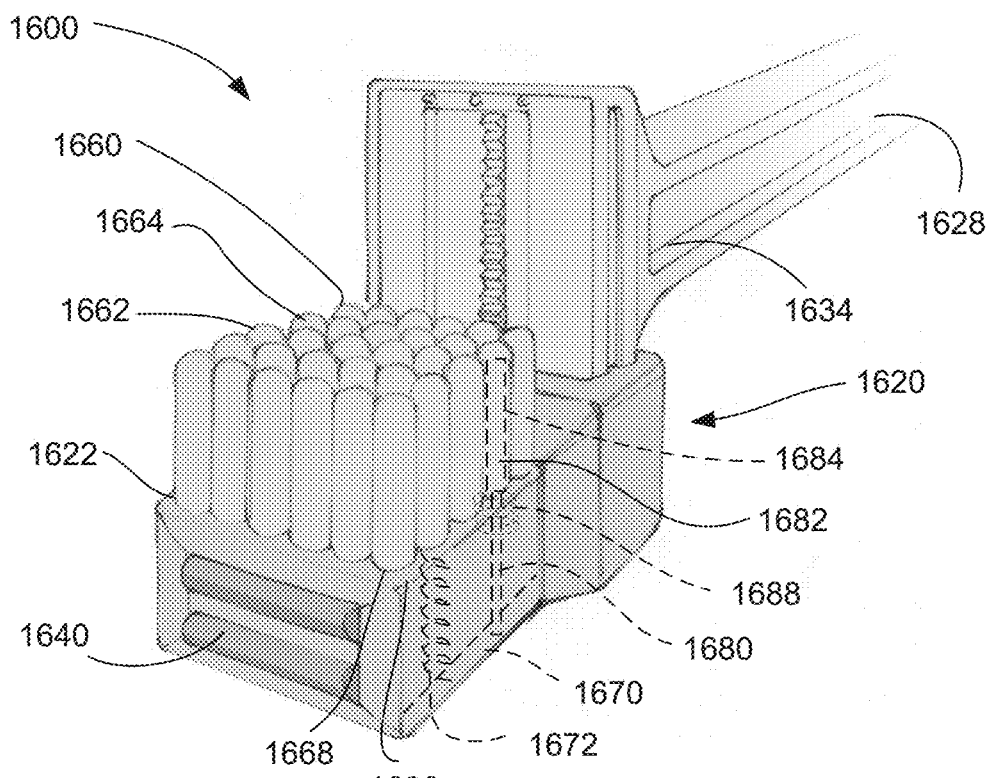
FIGS. 48A and 48B illustrate front elevation views of an article interface system of a robotic end effector of FIG. 47A.
Figure 48B:
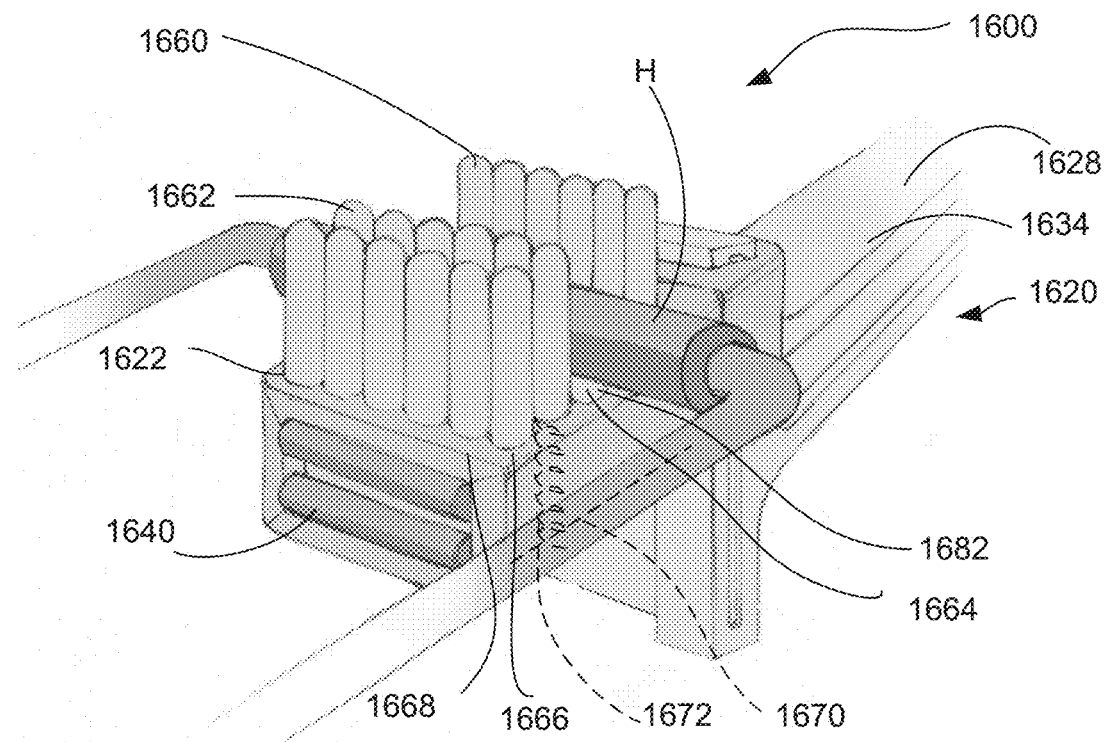

In another aspect, the end effector 1600, the second article interface system 1620, and/or the second actuatable article engagement device 1622 can have at least one roller 1640 to facilitate the second actuatable article engagement device 1622 interfacing with the front surface FS of the target article TA, as shown in FIGS. 48A-B. FIGS. 48A-B each show a partial perspective view of the second article interface system 1620 and the second actuatable article engagement device 1622. The rollers 1640 can be carried by the second actuatable article engagement device 1622 and positioned to roll along a front surface FS of the target article TA, as shown in FIGS. 47A-47C.

Figure 49A:
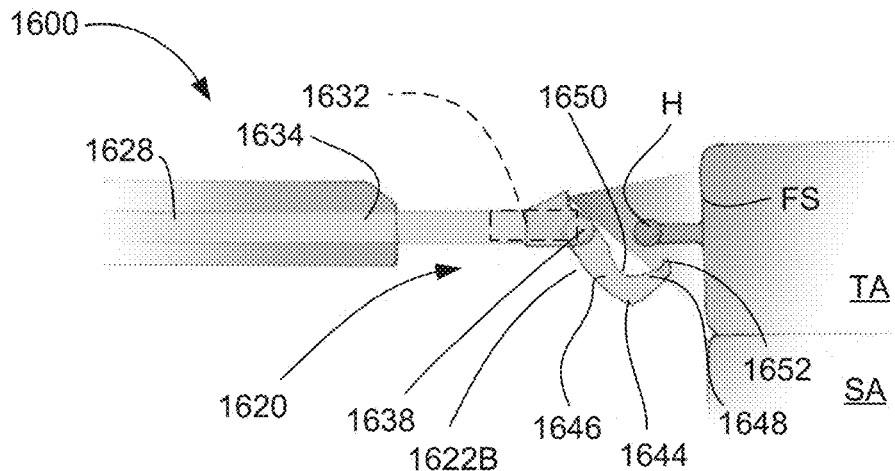
FIGS. 49A-49C illustrate side elevation views of a robotic end effector in accordance with at least one example of the present disclosure.
Figure 49B:
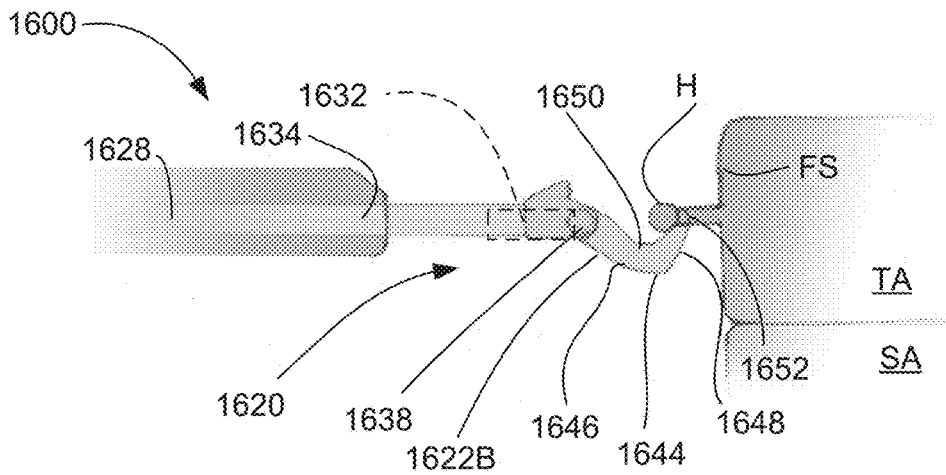
Figure 49C:
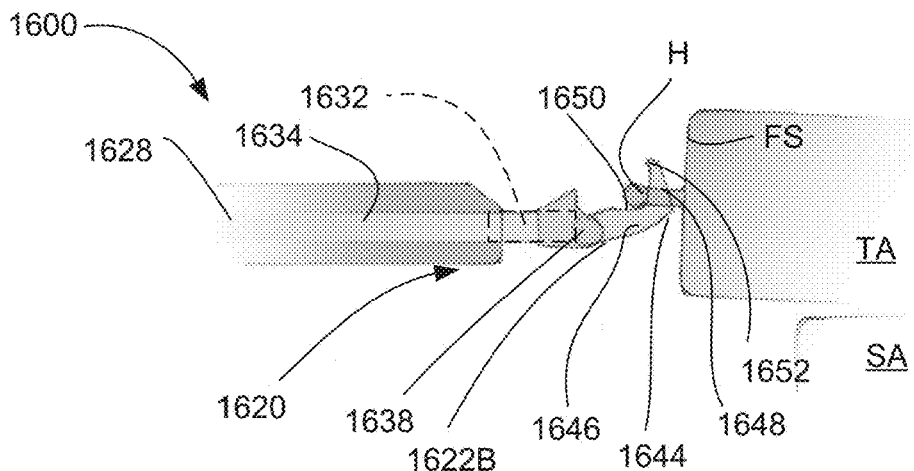

In one aspect, the second article interface surface 1624 can comprise a hook 1644, as shown in FIGS. 49A-C. FIGS. 49A-C each show a partial cross-sectional side view of the second article interface system 1620 and a second actuatable article engagement device 1622B (e.g., taken along a line similar to line AA shown in FIG. 3). The hook 1644 can have at least a pair of transverse branches, including a proximal branch 1646 coupled to the second extendable arm 1628, and a distal branch 1648 extending transverse with respect to the proximal branch 1646. Thus, the branches 1646 and 1648 of the hook 1644 can form an elbow. A notch 1650 can be formed between the proximal and distal branches 1646 and 1648. The notch 1650 can receive the handle H of the target article TA. The distal branch 1648 can have a tip 1652 that can be inserted between the handle H and the front surface FS of the target article TA. The hook 1644, and the tip 165 and the notch 1650 thereof can form at least part of the second article interface surface 1624.

In one aspect, the hook 1644 can be pivotally coupled to the distal end 1634 of the second extendable arm 1628 at the pivot or joint 1638. The pivot or joint 1638 and the hook 1644 of the second actuatable article engagement device 1622B can be operable to pivot the hook 1644 to interface with the handle H of the target article TA. The second actuator 1632 can be a rotational actuator and can be associated with the pivot or joint 1638. The second actuator 1632 can be operable to lift the hook 1644 of the second actuatable article engagement device 1622B and operable to lift the proximal end and the front surface FS of the of the target article TA.

Figure 50A:
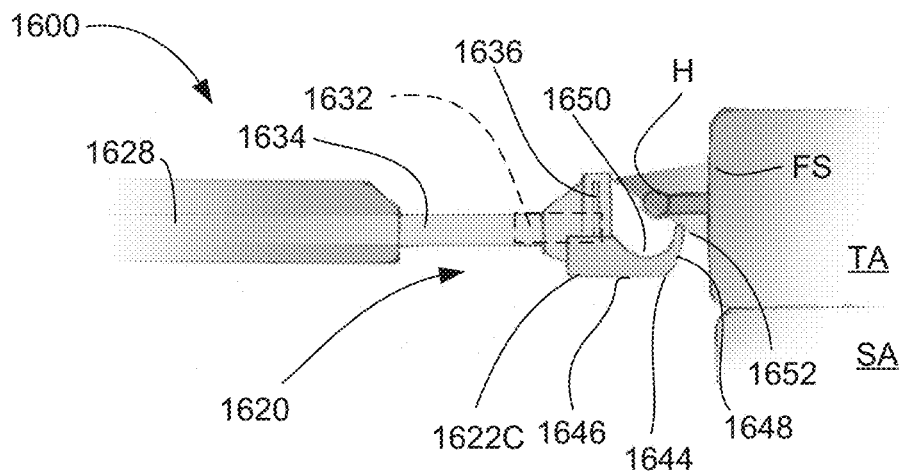
FIGS. 50A-50C illustrate side elevation views of a robotic end effector in accordance with at least one example of the present disclosure.
Figure 50B:
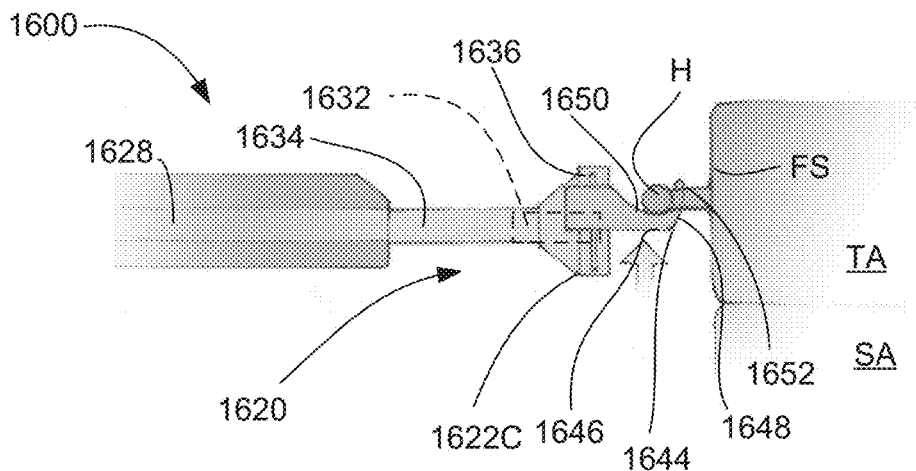
Figure 50C:
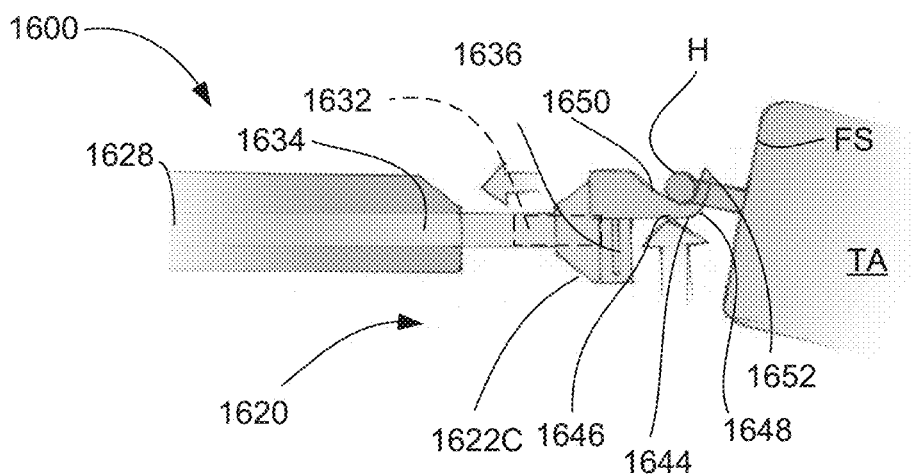

In another aspect, the hook 1644 can be linearly coupled to the distal end 1634 of the second extendable arm 1628, as shown in FIGS. 50A-C. FIGS. 50A-C each show a partial cross-sectional side view of the second article interface system 1620 and a second actuatable article engagement device 1622C (e.g., taken along a line similar to line AA shown in FIG. 3). The hook 1644 can be vertically movable to interface with the handle H of the target article TA. The track or slide 1636 can be coupled to and between the distal end 1634 or the second extendable arm 1628 and the hook 1644 of the second actuatable article engagement device 1622C. The second actuator 1632 can be a linear actuator coupled to and between the track or slide 1636 and the hook 1644 to displace the hook 1644 vertically to engage the handle H.

In another aspect, the second article interface surface 1624 can comprise a plurality of compliantly biased members or compliantly biased extensible/retractable members, such as an array of rods 1660, as shown in FIGS. 48A and 48B. The rods 1660 can be similar to those described herein with respect to the capture device. See for example FIGS. 14-22. For convenience, the compliantly biased, retractable, extensible, and/or compliantly biased members will be referred to as rods 1660. However, although they certainly can be, it is to be understood that the rods 1660 do not necessarily need to be specifically rod shaped, or have a specific configuration (e.g., circular or other cross-section), or be high aspect ratio structures, etc. It is intended that these can comprise a variety of different sizes, shapes, configurations, and cross-sectional areas. As such, the term "rod" is used herein to refer to any structurally configured member that is capable of being extendable, retractable, or otherwise displaceable or moveable by application or removal of a load (e.g., a load as applied by or from the acquisition of a target article TA). A rod 1660 can be a block or other mass of material, a high-aspect ratio structure, or any other structural configuration. In some examples, the rods 1660 can comprise an array of rods 1660 existing in any type of arrangement. In an example, the rods 1660 can be at least partially comprised of a rigid material. As recited herein, the rods 1660 can be extendable, retractable, or displaceable along an axis of the rod. The rods 1660 can be extendable, retractable, or displaceable in response to application and/or removal of a load individually. For example, each rod of a plurality of rods 1660 can be individually or separately (i.e., independently) biased by a biasing member. Or, two or more rods 1660 can be extendable, retractable, or displaceable together in response to application and/or removal of a load. For example, two or more rods 1660 can be biased by the same biasing member.

Each rod 1660 can have at least two positions, including: 1) an extended position, as shown in FIG. 48A, and 2) a displaced position, as shown in FIG. 48B. In the extended position, the rod 1660 can have a longer extension and a higher elevation. All of the rods 1660 can be in the extended position while the second article interface surface 1624 is in a lowered position, as shown in FIG. 48A. The array of rods 1660 can be biased in the extended position. In the displaced position, the rod 1660 can be at least partially retracted and can have a shorter extension and a lower elevation. The displaced position can correspond to abutment of the distal end of the rod 1660 to the handle H of the target article TA, as shown in FIG. 48B.

In one aspect, the array of rods 1660 can be arranged in at least two rows of rods, a distal row 1662 and a proximal row 1664. Each row 1662 and 1664 can be aligned perpendicularly to an axis of the second extendable arm 1628, and parallel with the handle H. The rods 1660 of the distal row 1662 can be fixed. Thus, the distal row 1662 or rods 1660 can be inserted between the handle H and the front surface FS of the target article TA. The distal row 1662 of rods 1660 can laterally abut to the handle H as the second extendable arm 1628 draws the target article TA towards the capture device (not shown). The rods 1660 of the proximal row 1664 can have the extended and displaced positions. Thus, the tips or distal ends of the rods 1660 of the proximal row 1664 can abut to the handle H and be displaced to the displaced position as the second actuatable article engagement device 1622 lifts the proximal end and the front surface FS of the target article TA.

In one aspect, the second actuatable article engagement device 1622 can have a guide member 1666 with an array of apertures 1668 extending through the guide member 1666 from a back surface to a front surface of the guide member 1666. The array of rods 1660 can be carried by the guide member 1666 with each rod 1660 disposed in a respective aperture of the array of apertures 1668. Each rod 1660 of the array of rods can be slidably supported so as to be operable to move relative to the guide member 1666. In the extended position, each rod 1660 can extend from a respective aperture 1668 of the guide member 1666. In the displaced position, each rod 1660 can be at least partially retracted into the respective aperture 1668 of the guide member 1666.

As described above, the rods 1660 can be biased in the extended position. In one aspect, the second actuatable article engagement device 1622 can further have a base 1670 and an array of compression springs 1672 with each spring extending between the base 1670 and a respective rod 1660. The compression spring 1672 can be any resilient member. Alternatively, the springs an be extension springs.

In another aspect, the second actuatable article engagement device 1622 can have a base 1670 with an array of stationary rods 1680 extending from the base 1670. An array of hollow, movable cylinders 1682 can be carried by the array of stationary rods 1680. Each cylinder 1682 can have a hollow 1684 receiving a respective rod 1680. The cylinders 1680 can be similar to the movable rods 1660 described above. The cylinders 1680 can have at least two positions, including an extended position and a displaced position. In the extended position, each cylinder 1682 can extend from a respective rod 1680 to have a longer extension and a higher elevation. In the displaced position, each cylinder 1682 can least partially retracted onto the respective rod 1680 to have a shorter extension and a lower elevation. The displaced position corresponds to abutment of the cylinder 1682 to the handle H of the target article TA. Again, the cylinders 1682 can be biased in the extended position. In another aspect, an extension spring 1688 can extend between a respective cylinder 1682 and a respective rod 1680. The extension spring 1688 can be any resilient member. Alternatively, the springs can be compression springs.

Referring again to FIGS. 46A-46B, the second actuatable article engagement device 1622 with the rods 1660 (and likewise with the cylinders 1682) can be pivotally coupled to the distal end 1634 of the second extendable arm 1628 at the pivot or joint 1638. The pivot or joint 1638 and the rods 1660 of the second actuatable article engagement device 1622 can be operable to pivot the rods 1660 to interface with the handle H of the target article TA. The second actuator 1632 can be a rotational actuator and can be associated with the pivot or joint 1638. The second actuator 1632 can be operable to lift the rods 1660 of the second actuatable article engagement device 1622 and operable to lift the proximal end and the front surface FS of the of the target article TA.

In another aspect, the rods 1660 can be linearly coupled to the distal end 1634 of the second extendable arm 1628, as shown in FIGS. 47A-C. The rods 1660 can be vertically movable to interface with the handle H of the target article TA. The track or slide 1636 can be coupled to and between the distal end 1634 or the second extendable arm 1628 and rods 1660 of the second actuatable article engagement device 1622. The second actuator 1632 can be a linear actuator coupled to and between the track or slide 1636 and the rods 1660 to displace the rods 1660 vertically to engage the handle H.

Figure 51A:
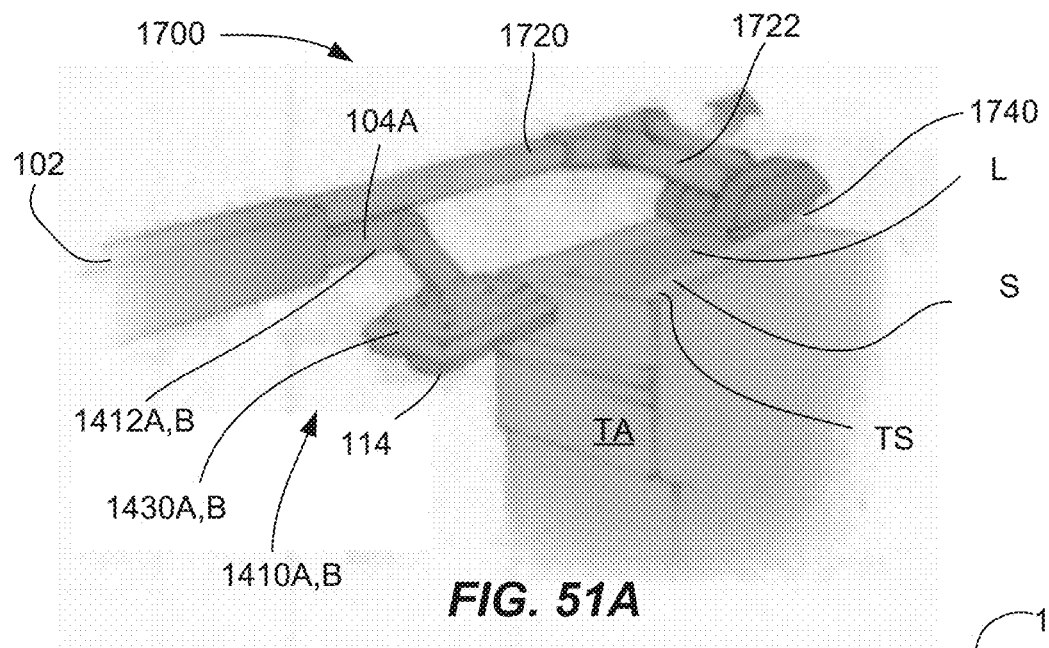
FIGS. 51A and 51B illustrate rear elevation views of a robotic end effector in accordance with at least one example of the present disclosure.

An alternative configuration of the end effector is now described with reference to FIGS. 51A-58. Referring to FIGS. 51A and 51B, an end effector 1700 is described with a second article interface system 1720 with an applicator 1740 to interface with a surface, e.g. the top surface TS, of the target article TA to apply a relatively air impermeable layer L to a relatively air permeable surface S of the target article TA, such as a cardboard box. FIGS. 51A and 51B each show a partial perspective view of the second article interface system 1720, a second actuatable article engagement device 1722, and the vacuum gripper 1430A or 1430B, as described herein. The end effector 1700 can acquire and manage a target article TA similar to other end effectors described herein. The end effector 1700 can include a second article interface system 1720 with a second actuatable article engagement device 1722, described in more detail below.

Similar as described with respect to other end effectors of this disclosure, the end effector 1700 can include the first article interface system 1410A and 1410B supported by the extendable arm 102, as described herein. The first article interface system 1410A and 1410B can include a first actuatable article engagement device 1412A and 1412B that itself comprises an article interface surface 114. As the functions of the extendable arm 102 and the first actuatable article engagement device 1412A and 1412B operate similarly as in other example end effectors described herein, the operation of these elements will not be repeated in detail here, but it is to be understood that operations described with respect to other examples of end effectors can also apply to end effector 1700. It is to be further understood that the second article interface system 1720 and the second actuatable article engagement device 1722 of the end effector 1700 can be combined with any of the arms (e.g., extendable arms, telescoping arms, SCARA arms, or any other arms operable to perform a similar function) that are mentioned herein without any intended limitation. Similarly, as the functions and structure of the first article interface system 1410A and 1410B and the first actuatable article engagement device 1412A and 1412B are similar to other examples of article interface systems and actuatable article engagement devices described herein, the operation and structure of these elements will not be repeated in detail here, but it is to be understood that operations and structures described with respect to other examples of article interface systems and actuatable article engagement devices can also apply to the first article interface system 1410A and 1410B and the first actuatable article engagement device 1412A and 1412B. In addition, the end effector 1700, the second article interface system 1720 and the second actuatable article engagement device 1722 can be utilized with capture devices as described herein. Similarly, as the functions and structure of the capture device are similar to other examples of capture devices described herein, the operation and structure of these elements will not be repeated in detail here, but it is to be understood that operations and structures described with respect to other examples of capture devices can also apply to the capture device.

As shown in FIGS. 51A and 51B, the article interface system 1410A or 1410B, the actuatable article engagement device 1412A or 1412B, and the article engagement surface 114 can include at least one vacuum gripper 1430A or 1430B, as described above. The vacuum gripper 1430A or 1430B can be carried by the extendable arm 102 and operatively coupled to a negative pressure source to apply a suction force to the target article TA, as described above.

The second article interface system 1720 and the second article engagement system 1722 can include an applicator 1740. The applicator 1740 can be associated with the robotic end effector 1700. In one aspect, the applicator 1740 can be supported by and coupled to the extendable arm 102. The applicator 1740 can be movably coupled to the extendable arm 102. In one aspect, the applicator 1740 can be movable independently of the first actuatable article engagement device 1412A or 1412B of the first article interface system 1410A or 1410B. In addition, the second article interface system 1720 and the second article engagement system 1722 can be movable independently of the first actuatable article engagement device 1412A or 1412B of the first article interface system 1410A or 1410B. In another aspect, the applicator 1740 can be movable with the actuatable article engagement device 1412A or 1412B.

The applicator 1740 can be operable to apply a relatively air impermeable layer L to a relatively air permeable surface S of the target article TA. The layer L can facilitate creation of a negative pressure between the vacuum gripper 1430A or 1430B and the surface S of the target article TA. The layer L can be less porous while the surface S of the target article TA can be more porous with respect to one another. For example, the target article TA can be a cardboard box and the surface can include cardboard. The surface S of the target article TA, e.g. the cardboard of the box, can be porous to air such that the vacuum source formed between the vacuum gripper 1430A or 1430B and the surface S is insufficient to lift the target article TA. Thus, the application of the air impermeable layer L by the applicator 1740 can provide a substantial seal between the vacuum gripper 1430A or 1430B and the layer L. The layer L can form a seal with the vacuum gripper 1430A or 1430B. The layer L can provide an outer surface that is different from the surface S of the target article TA and that can change an outermost attribute of the target article TA to enable vacuum capture by the vacuum gripper 1430A or 1430B. In another aspect, the layer L can have a size and a shape to match a size and a shape of the vacuum gripper 1430A or 1430B. In another aspect, the layer L can have a size larger than the size of the vacuum gripper 1430A or 1430B. In another aspect, the layer L can be temporary, and can be removed subsequent to use. In another aspect, the layer L can be inert and/or non-caustic; and thus is able to be applied to the surface S of the target article TA without marring or altering the surface S.

Figure 51C:
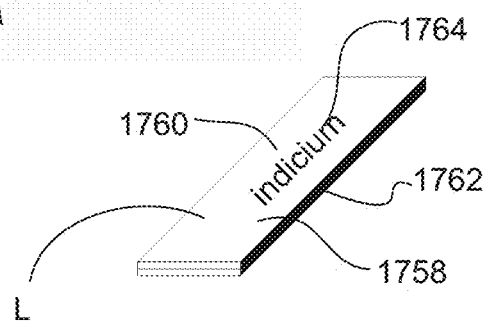
FIG. 51C illustrates a front elevation view of a layer applied by an applicator of the robotic end effector of FIG. 51A.
Figure 51B:
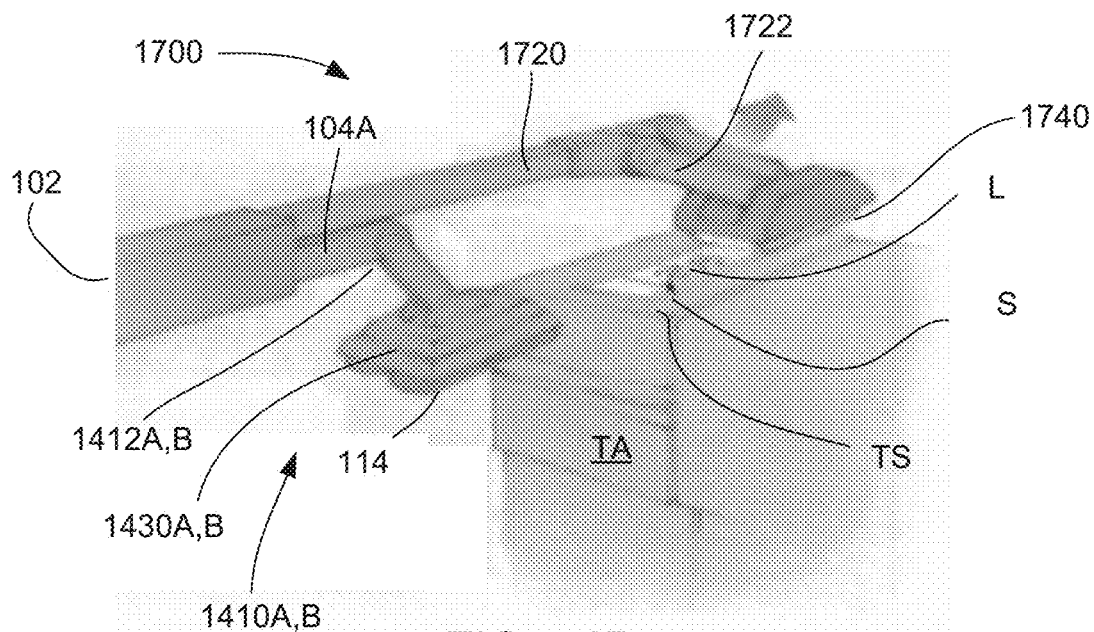

Referring to FIG. 51C, in one aspect, the layer L can comprise a laminate 1758 with facestock 1760 and an adhesive 1762 configured to adhere to the surface S of the article TA. FIG. 51C illustrates a perspective view of the laminate 1758 of the layer L. In another aspect, the layer 1758 can have indicium 1764 on the facestock 1760. In another aspect, the indicium 1764 can be machine readable and can have information or instructions associated with the target article TA. The information can include identification of the contents of the target article TA, a destination and/or origin of the target article TA, shipping information, etc.

Figure 52:
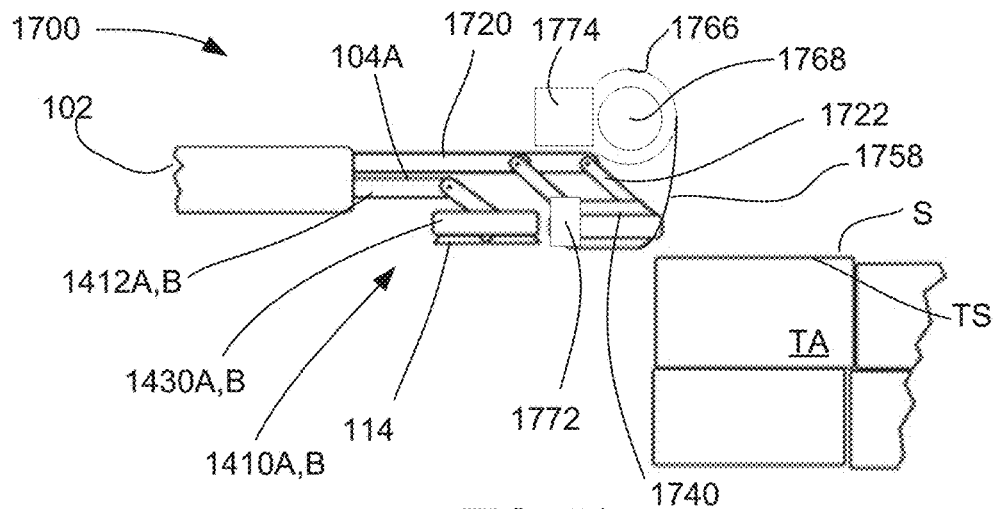
FIGS. 52 and 53 illustrate side elevation views of a robotic end effector in accordance with at least one example of the present disclosure.

Referring to FIG. 52, in another aspect, a spool 1766 can be carried by the end effector 102, such as the second article interface system 1720 or the second article engagement system 1722, and associated with the applicator 1740 to receive a roll 1768 of the laminate 1758. FIG. 52 shows a side view of the second article interface system 1720, a second actuatable article engagement device 1722, and the vacuum gripper 1430A or 1430B, as described herein. The roll 1768 of the laminate 1758 can be feed from the spool 1766 to the applicator 1740 to be applied to the surface S of the target article TA. In another aspect, the laminate 1758 can have a backing layer that can be pealed from the adhesive 1762 prior to be applied to the surface S. In another aspect, the facestock 1760 can contact the adhesive 1762 while in the roll 1768. In another aspect, the roll 1768 can be continuous and the applicator 1740 and/or the second article engagement system 1722 can have a cutter, such as a blade, to separate discrete layers L from the roll 1768. In another aspect, the roll 1768 can be perforated to form a parting line along which a discrete layer L can be separated from the roll 1768.

As described above with respect to FIG. 51C, in one aspect, the laminate 1758 can have the indicium 1764. Referring again to FIG. 52, in another aspect, the end effector 1700 can provide the indicium 1764 on the laminate 1758. A printer 1772 or 1774 can be carried by the end effector 1700, such as the second article interface system 1720 or the second article engagement system 1722 or the applicator 1740, and associated with the spool 1766 and configured to print indicia 1764 on the facestock 1760 of the laminate 1758 before or after the laminate 1758 is applied to the surface S of the target article TA. For example, a printer 1772 can be located behind the applicator 1740 to print on the facestock 1760 of the laminate 1758 after the applicator 1740 has applied the laminate 1758 to the surface S of the target article TA. As another example, a printer 1774 can be located before the applicator 1740, such as proximate the spool 1766, to print on the facestock 1760 of the laminate 1758 before the applicator 1740 has applied the laminate 1758 to the surface S of the target article TA.

Figure 53:
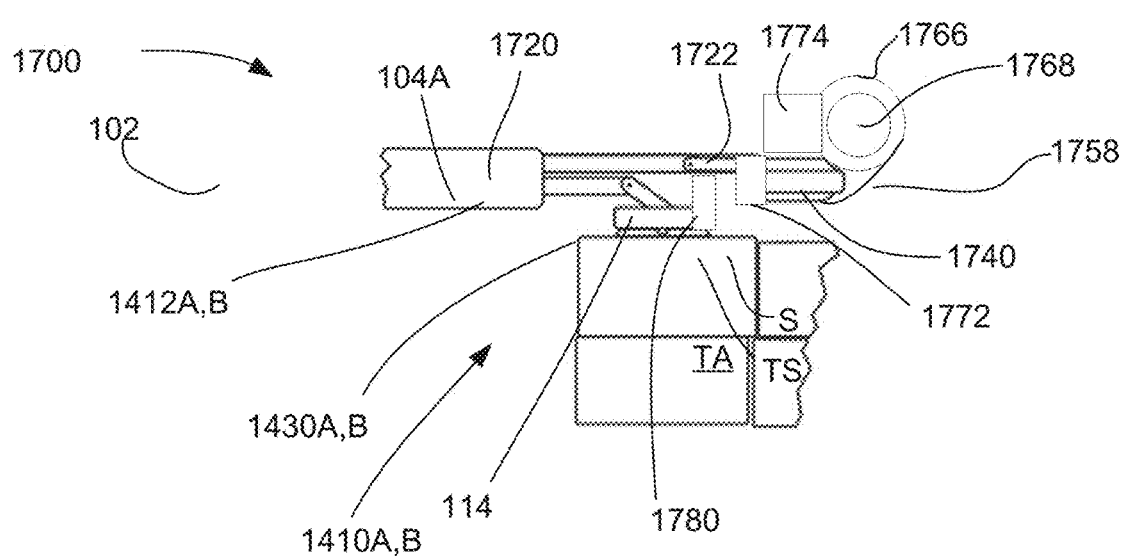

Referring to FIG. 53, in another aspect, a scanner 1780 can be carried by the end effector 1700, such as by the actuatable article engagement device 1412A or 1412B of the article interface system 1410A or 1410B or the vacuum gripper 1430A or 1430B, and can scan the indicium 1764 and can provide a signal for use by the robotic end effector. FIG. 53 shows a side view of the second article interface system 1720, a second actuatable article engagement device 1722, and the vacuum gripper 1430A or 1430B, as described herein. For example, a scanner 1780 can be located ahead of the vacuum gripper 1430A or 1430B to scan the indicium 1764 on the laminate 1758 before the vacuum gripper 1430A or 1430B contacts the laminate 1758. In another aspect, the scanner 1780 can be positioned in the vacuum gripper 1430A or 1430B to scan the indicium 1764 on the laminate 1758 while the vacuum gripper 1430A or 1430B contacts the laminate 1758.

In another aspect, the layer L can have at least two states, including: 1) an initial liquid state prior to application on the surface S of the target article TA, and 2) a subsequent solid state subsequent to application on the surface S of the target article TA. In another aspect, the initial liquid state of the layer can evaporate to dry and become the subsequent solid state after application to the surface S. In another aspect, the initial liquid state of the layer L can have two parts that cure. The initial liquid state of the layer can be thermally curable to become the subsequent solid state. The initial liquid state of the layer can be curable by application of light to become the subsequent solid state.

Figure 54:
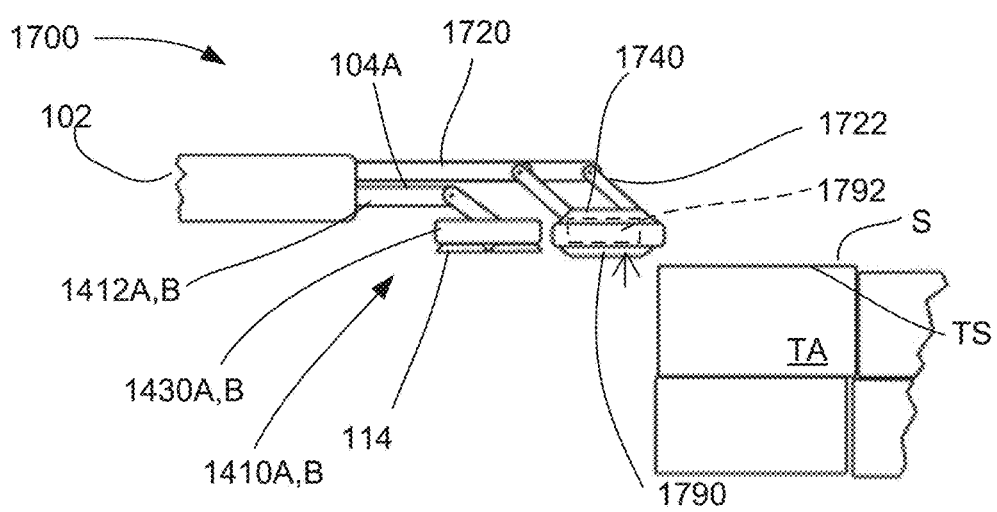
FIG. 54 illustrates a side elevation view of a robotic end effector in accordance with at least one example of the present disclosure.

Referring to FIG. 54, in another aspect, the applicator 1740 can comprise a sprayer 1790 capable of spraying the initial liquid state of the layer L onto the surface S of the target article TA to create a coated surface on the target article TA. FIG. 54 shows a side view of the second article interface system 1720, a second actuatable article engagement device 1722, and the vacuum gripper 1430A or 1430B, as described herein. The liquid state of the layer L can be contained in a reservoir 1792 coupled to the sprayer 1790.

Figure 55:
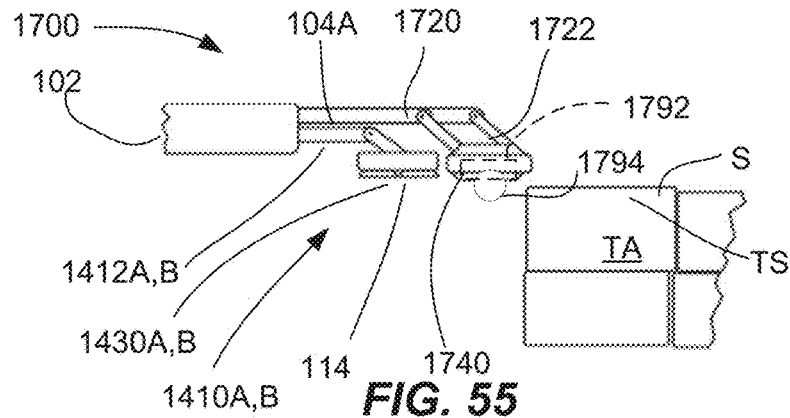
FIG. 55 illustrates a side elevation view of a robotic end effector in accordance with at least one example of the present disclosure.

Referring to FIG. 55, in another aspect, the applicator 1740 can further comprise a roller 1794 operatively coupled to the initial liquid state of the layer L, such as the reservoir 1792, and capable of contacting the surface S of the target article TA to apply the initial liquid state of the layer L to the surface S of the target article TA to create a coated surface on the target article TA. FIG. 55 shows a side view of the second article interface system 1720, a second actuatable article engagement device 1722, and the vacuum gripper 1430A or 1430B, as described herein.

Figure 56:
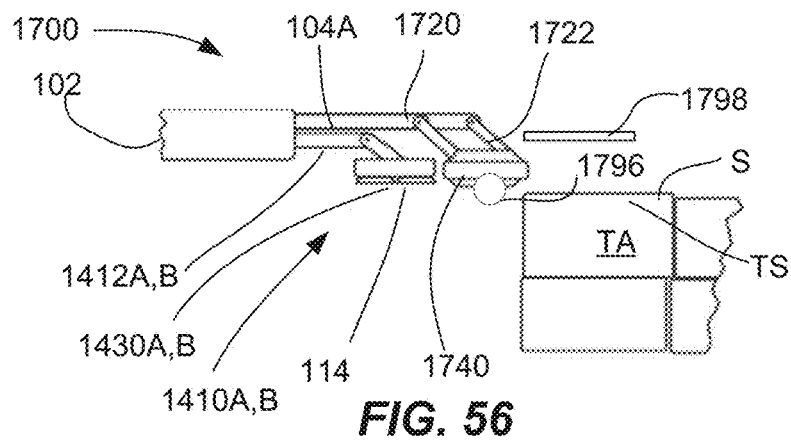
FIG. 56 illustrates a side elevation view of a robotic end effector in accordance with at least one example of the present disclosure.

Referring to FIG. 56, in another aspect, the applicator 1740 can further comprise a print head 1796 movable between a source containing the initial liquid state of the layer, such as an ink plate 1798, and the surface S of the target article TA and capable of transferring the initial liquid state of the layer to the surface S of the target article TA. FIG. 56 shows a side view of the second article interface system 1720, a second actuatable article engagement device 1722, and the vacuum gripper 1430A or 1430B, as described herein. Thus, the print head 1796 can be a transfer pad and the initial liquid state of the layer can be provided on a printing plate 1798.

Figure 57:
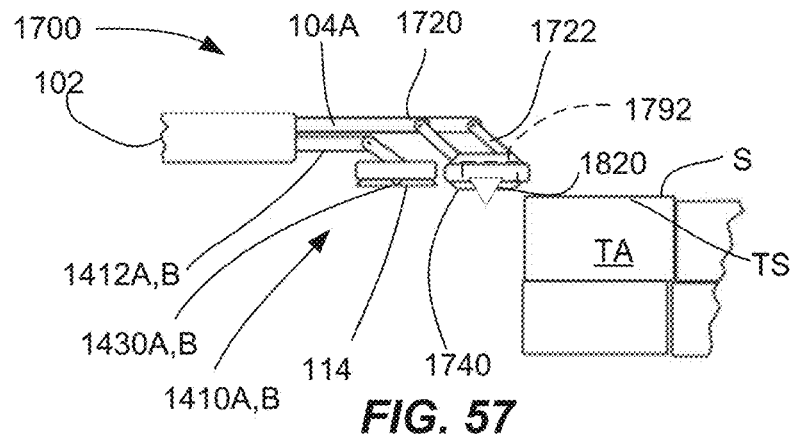
FIG. 57 illustrates a side elevation view of a robotic end effector in accordance with at least one example of the present disclosure.

In another aspect, the initial liquid state can have at least two different compositions. For example, the different compositions can comprise different pigments so that the layer can have at least two different colors. The subsequent solid state of the layer L can comprise indicium 1764 with different parts made of the at least two different compositions. Referring to FIG. 57, the applicator 1740 can further comprise a print head with nozzles 1820 operatively coupled to the initial liquid state of the layer and capable of spraying droplets of the initial liquid state of the layer onto the surface S of the target article TA. FIG. 57 shows a side view of the second article interface system 1720, a second actuatable article engagement device 1722, and the vacuum gripper 1430A or 1430B, as described herein.

Figure 58:
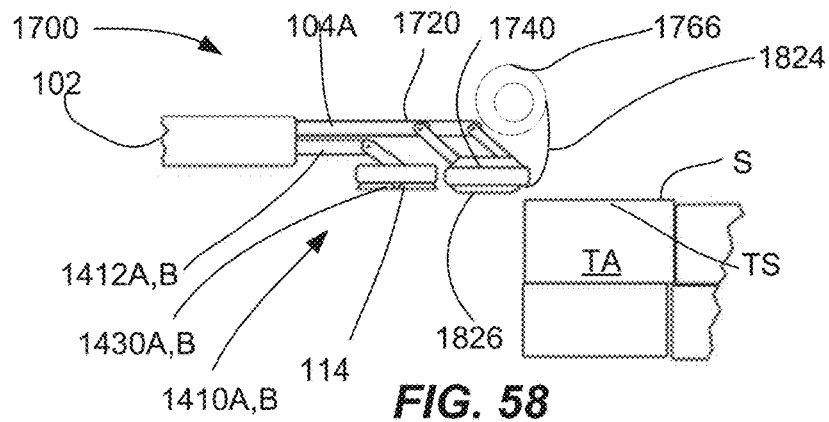
FIG. 58 illustrates a side elevation view of a robotic end effector in accordance with at least one example of the present disclosure.

Referring to FIG. 58, in another aspect, the layer L can comprise a flexible polymer or plastic film 1824. FIG. 58 shows a side view of the second article interface system 1720, a second actuatable article engagement device 1722, and the vacuum gripper 1430A or 1430B, as described herein. The applicator 1740 can comprise a heater 1826 carried by the end effector 102, such as the applicator 1740, and capable of heating the film 1824 to make the film more pliable. Thus, the pliable film 1824 can confirm to contours of the target article TA.

Figure 61:
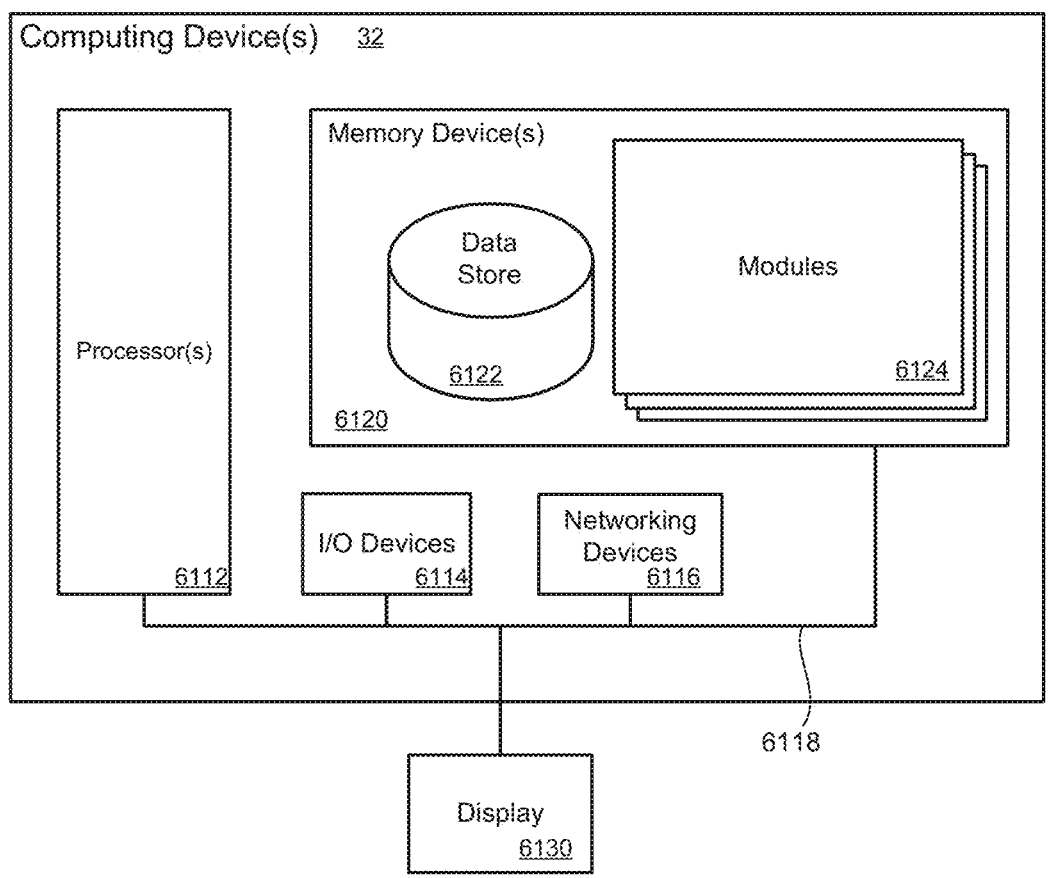
FIG. 61 illustrates a schematic diagram of a computing device in accordance with at least one example of the present disclosure.

With reference to FIGS. 1 and 61, illustrated are various computer, sensor(s), and other system components within a robotic article management system, such as the example robotic article management system 2. The system 2 can include one or more sensors 6, such as global positioning sensors (GPS), optical cameras, infra-red (IR) cameras or sensors, lidar sensors, pressure sensors, force sensors, inertial measurement unit sensors, rangefinders, and others, and any combination of these. In some examples, the sensors 6 can be mounted about the capture device in one or more different positions to facilitate aligning the capture device (e.g., any of capture devices 16, 106, 206, 306, 406, 506, 606, 706, 806, 1006, and/or 1106) and/or an arm (e.g., any of arms 12, 102, 402, and 602) with a target article. Similarly, any of the article interface systems and/or actuatable article engagement devices described herein can be caused to align with a target article in a manner to facilitate acquisition of the target article in the capture device. Based on the readings of the sensors 6, the end effector (e.g., end effector 10) can be moved by operation of mobility or drive mechanisms of the platform (e.g., platform 28) and/or the robotic positioning member (e.g., robotic positioning member 25) to properly position the end effector 10 in a position to acquire the target article.

Figure 59A:
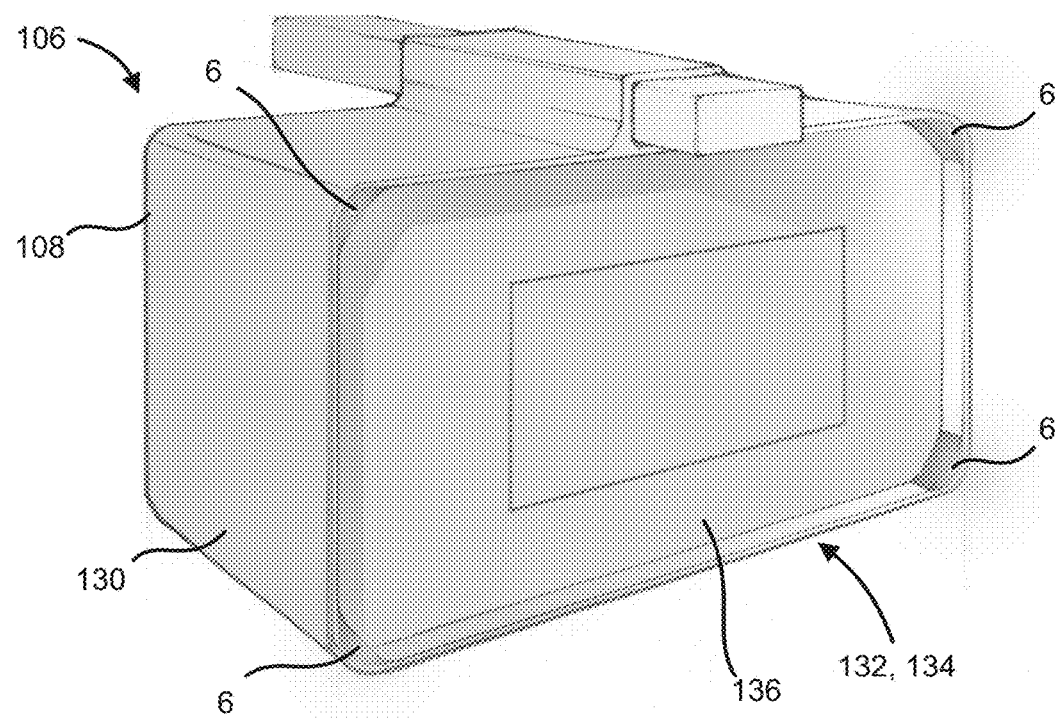
FIGS. 59A and 59B illustrate front elevation views of a capture device for a robotic end effector, in accordance with at least one example of the present disclosure.
Figure 59B:
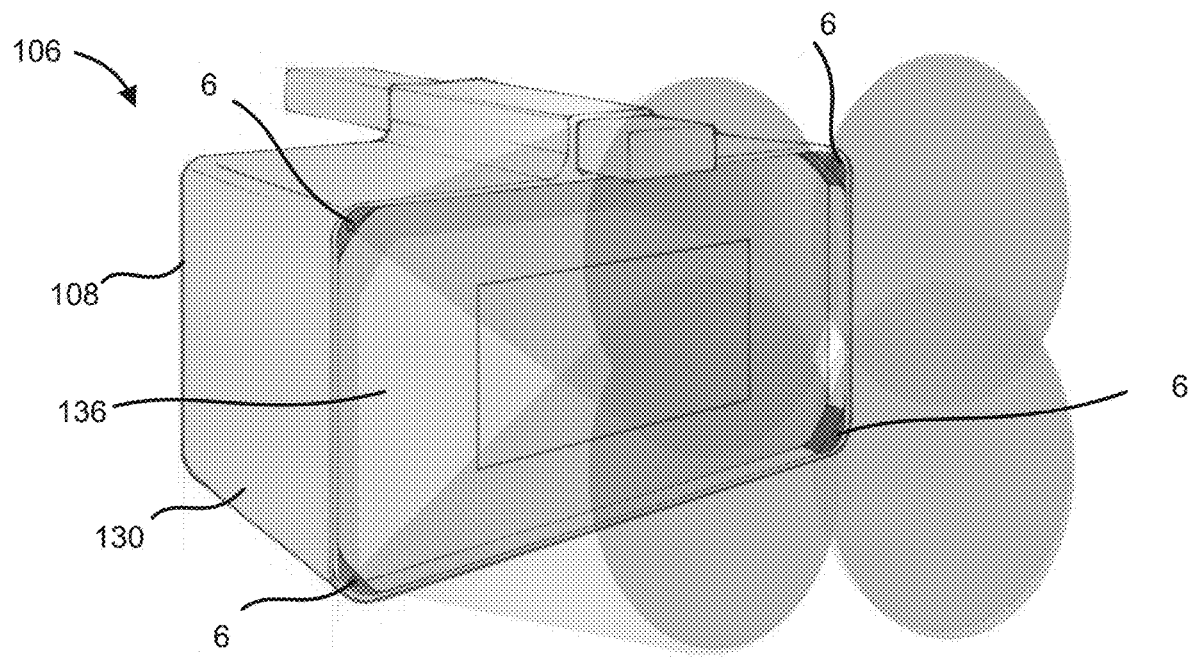
Figure 59C:
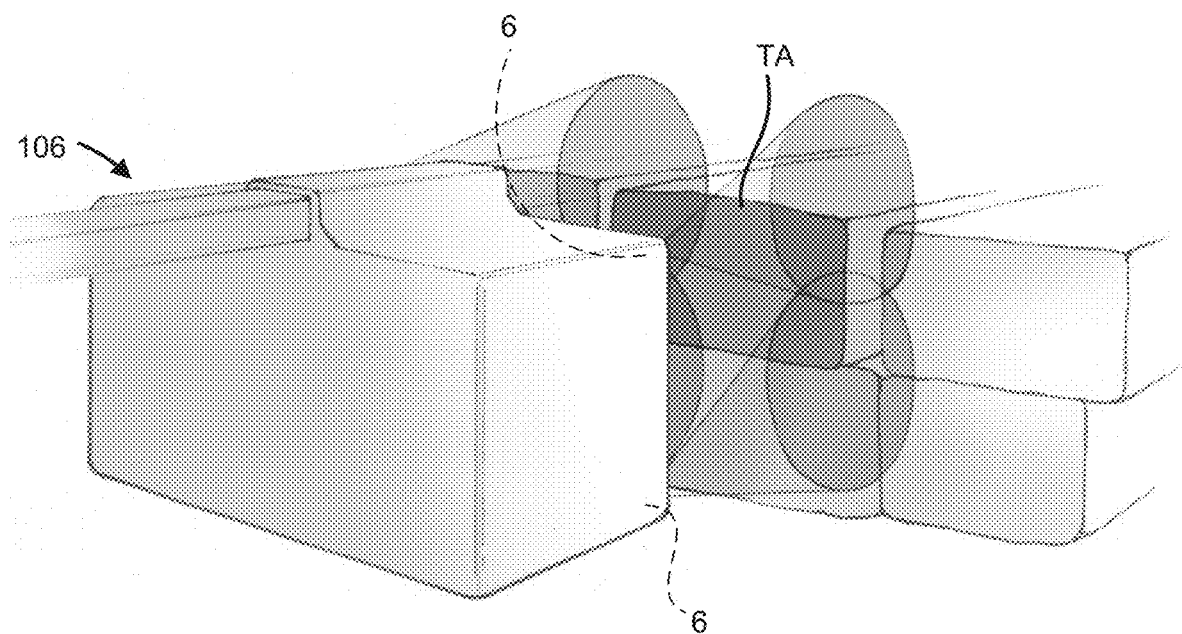
FIG. 59C illustrates a rear elevation view of the capture device of FIG. 59A.

Exemplary placements and operations of sensors (e.g., sensors 6) will now be described and illustrated with respect to FIGS. 59A-59C. FIGS. 59A-59C each show perspective views of an exemplary capture device 106. In some examples, some or all of the sensors (e.g., sensors 6) can be embedded into the capture device 106 with the system controller (e.g., system controller 4) being able to communicate with each of these and receive data therefrom. As shown in FIGS. 59A-59C, a plurality of sensors 6 can be embedded at spaced-out locations about the capture device 106.

Any of the robotic end effectors described herein (e.g., any of end effectors 10, 100, 800, and 1100), configured to include any of the capture devices described herein (e.g., any of capture devices 106, 206, 306, 406, 506, 606, 706, 806, 1006, and 1106), and/or configured to include any of the arms described herein (e.g., any of arms 12, 102, 402, and 602), can be used in any combination to execute a method 6000 of acquiring an article. The method 6000 is illustrated in FIG. 60. The method 6000 can include a step 6002 of moving an end effector with an article interface system into proximity with a target article TA by moving either the end effector and/or the target article. The method 6200 can further include a step 6004 of operating an article interface system (e.g., article interface system 110) supported by an arm (e.g., any of arms 12, 102, 402, and 602), the article interface system comprising an actuatable article engagement device (e.g., actuatable article engagement device 112) comprising an article interface surface (e.g., article interface surface 114), the actuatable article engagement device being operable to interface with an article to facilitate movement of the target article TA toward the capture device (e.g. including the array of rods).

Operating the article interface system can include a step 6006 of moving the actuatable article engagement device from an initial position to a first position relative to the target article in which the article interface surface engages with the target article. Operating the article interface system can further include a step 6008 of actuating the actuatable article engagement device to move the target article towards the capture device (and for example, against a compliant element) until a state of acquisition is achieved, in which the forces acting on the target article from the end effector are sufficient to counter collective forces acting on the target article. The method 6000 can further include a step 6010 of moving the target article TA with the robotic end effector to a desired location by moving the end effector. The method 6000 can further include a step 6012 of releasing the target article from the end effector at the desired location by operating the article interface system to release the target article TA. Operating the article interface system to release the target article TA can include operating any of the extendable arm 102, the article interface system 110, the articulating arm 118, the actuatable joint 105, the actuatable joint 122, the first support member 104 including the first link 104A and the second link 104B, and/or the powered rollers 116, or any similar mechanism operable to engage with the target article TA to drop, urge, or release the target article TA from the capture device of the end effector.

As shown in FIG. 1, the end effector 10 can include a computing device 32 in communication with the systems and devices of the end effector 10 (e.g., one or more of the arm 12, the actuator 14, the article interface system 18, the actuatable article engagement device 20, the actuator 24, the capture device 16, and/or the platform 28). The computing device 32 can operate to control movement and/or operation of one or more of the arm 12, the actuator 14, the article interface system 18, the actuatable article engagement device 20, the actuator 24, the capture device 16, and/or the platform 28. Additionally, the computing device 32 can operate the load sensor 30 and receive information, signals, or data from the load sensor 30 to aid in operation of the end effector 10. It is to be understood that any of the end effectors described in this disclosure, or any end effectors operating by principles described in this disclosure, can be operated by a computing device similar to the computing device 32.

FIG. 61 illustrates such a computing device 32 on which modules of this technology may execute to operate any of the end effectors described herein. The computing device 32 is shown at a high-level and may be used as a main robotic controller and/or a controller for a robotic component. The computing device 32 may include one or more processors 6112 that are in communication with memory devices 6120. The computing device 6110 may include a local communication interface 6118 for the components in the computing device. For example, the local communication interface 6118 may be a local data bus and/or any related address or control busses as may be desired.

The memory device 6120 may contain modules 6124 that are executable by the processor(s) 6112 and data for the modules 6124. In one example, the memory device 6120 can contain a main robotic controller module, a robotic component controller module, data distribution module, power distribution module, and other modules. The modules 6124 may execute the functions described earlier. A data store 6122 may also be located in the memory device 6120 for storing data related to the modules 6124 and other applications along with an operating system that is executable by the processor(s) 6112.

Other applications may also be stored in the memory device 6120 and may be executable by the processor(s) 6112. Components or modules discussed in this description that may be implemented in the form of software using high-level programming languages that are compiled, interpreted or executed using a hybrid of the methods.

The computing device 6110 may also have access to I/O (input/output) devices 6114 that are usable by the computing device 6110. In one example, the computing device 6110 may have access to a display 6130 to allow output of system notifications. Networking devices 6116 and similar communication devices may be included in the computing device. The networking devices 6116 may be wired or wireless networking devices that connect to the internet, a LAN, WAN, or other computing network.

The components or modules that are shown as being stored in the memory device 6120 may be executed by the processor(s) 6112. The term "executable" may mean a program file that is in a form that may be executed by a processor 6112. For example, a program in a higher-level language may be compiled into machine code in a format that may be loaded into a random-access portion of the memory device 6120 and executed by the processor 6112, or source code may be loaded by another executable program and interpreted to generate instructions in a random-access portion of the memory to be executed by a processor. The executable program may be stored in any portion or component of the memory device 6120. For example, the memory device 6120 may be random access memory (RAM), read only memory (ROM), flash memory, a solid-state drive, memory card, a hard drive, optical disk, floppy disk, magnetic tape, or any other memory components.

The processor 6112 may represent multiple processors and the memory device 6120 may represent multiple memory units that operate in parallel to the processing circuits. This may provide parallel processing channels for the processes and data in the system. The local communication interface 6118 may be used as a network to facilitate communication between any of the multiple processors and multiple memories. The local communication interface 6118 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine-readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

With reference to FIGS. 1 and 61, illustrated are various computer, sensor(s), and other system components within a robotic article management system, such as the example robotic article management system 2. In this example, the robotic article management system 2 can comprise components, such as the platform 28, the robotic positioning member 25, the robotic end effector 10, the optional external electrical object/system 29, a system computing device (i.e., a system controller) 4, and one or more sensors 6, such as global positioning sensors (GPS), optical cameras, infra-red (IR) cameras or sensors, lidar sensors, pressure sensors, force sensors, inertial measurement unit sensors, rangefinders, and others, and any combination of these. In some examples, each of the platform 28, the robotic positioning member 25, the robotic end effector 10 and the system controller 4 can include come or all of these types of sensors 6. In some examples, some or all of the sensors 6 are embedded into each of the platform 28, the robotic positioning member 25, and the robotic end effector 10 with the system controller 4 being able to communicate with each of these and receive data therefrom.

In this example, the platform 28 can include a computing device that can communicate with and control the platform 28 and its components to position the robotic positioning member 25 and the robotic end effector 10 in close proximity to an article to be acquired using macro positioning movements. For example, the platform 28 can comprise a mobile vehicle that can be manipulated (e.g., driven, steered, etc.) to bring and position the robotic positioning member 25 and the robotic end effector 10 in close proximity to an article to be acquired. In certain examples, the computing device within the platform 28 can use one or more of the sensors 6 to perceive the operating environment and locate critical landmarks, objects, etc., such as a stack of articles to be acquired and managed, other objects that might be impeding or blocking a route of the platform 28, etc. The computing device of the platform 28 can operate the platform 28 autonomously or receive inputs from a manual control interface to allow an operator to manually manipulate the platform 28.

In this example, as discussed above, the robotic end effector 10 can include a computing device 32 that can communicate with and control the various components of the robotic end effector 10, such as the arm 12, the capture device 16, the article interface system 18, and any sensors 30 to coordinate and control movement of these devices as a unit. The computing device 32 can also access or include at least some of the sensors 6 to evaluate the environment and manipulate one or more articles. In one example, the control system 32 can access and control optical cameras, IR cameras, LIDAR sensors, and any others to facilitate recognition and locating of one or more articles to be manages, such as a target article. For instance, the computing device 32 can receive a two dimensional (2D) image from an optical camera for processing to roughly locate an article (e.g., a target article), using common machine vision techniques, such as edge detection or blob analysis. The computing device 32 can also (or alternatively) receive three dimensional (3D) data from a stereo image provided by a pair of optical cameras configured to facilitate stereo imaging, or IR cameras. The data can be analyzed to map a precise location and orientation of the target article, as well as other articles, objects, etc. around the target article. The computing device 32 can operate as a perception system for the robotic end effector 10 to assist in acquiring a target article from a first location and releasing the target article in a specific position and orientation in a second location as discussed herein. The perception system (e.g., computing device 32 in this example) can access other sensors, such as a force sensor, a lidar sensor and/or a rangefinder sensor to provide additional 2D and 3D information about the surroundings and operation of the various components of the robotic end effector 10.

In this example, the robotic positioning member 25 can comprise a computing device that can communicate with and control the various components of the robotic positioning member 25, such as the articulated joints, moveable support members, and any other actuators or members, in order to position the end effector 10 to facilitate acquiring, manipulating and releasing a target article. The computing device of the robotic positioning member 25 can also access or include one or more of the sensors 6 to facilitate proper positioning, operation and control of the robotic positioning member 25 and the end effector 10.

Within the robotic article management system 2, the sensors 6 operate as perception sensors to assist one or more of the platform 28, the robotic positioning member 25 or the robotic end effector 10 in acquiring, managing (manipulating), moving, and releasing one or more articles. The system 2, for example one of the computing devices discussed above, can receive and process a combination of 2D and 3D sensor data to map the environment. For 2D sensing, high resolution color imagery can be captured with one or more optical cameras. The 2D data can then be correlated with concurrently captured 3D depth and point cloud data, captured from sensors such as multiple IR cameras, a lidar sensor, and/or rangefinder sensors (such as time-of-flight sensors). The 3D data can also include camera data captured by a pair of stereoscopic optical cameras, which allows for a processors to triangulate objects within an environment. As an example, detection of a target article in the form of a luggage bag can involve processing 2D image data for a large, often black, reflective rectangle using a blob analysis algorithm, and then employ an edge detection mechanism to project the sides and corners of the luggage bag. The 2D edge and corner data can then be correlated to the 3D data to project a plane for a top surface, a bottom surface, and/or a side surface of the luggage bag. Once a 3D desired plane is determined for the luggage bag, the end effector 10 can be positioned using this information to acquire the luggage bag. The perception system, operating within a computing device can use algorithms to detect the edges, corners, and other uniquely identifiably features of the target article, other articles or structures around the target article, a location or structure that is to receive the released target article, etc. to define the 3D representation of these. For instance, if the luggage bag is to be placed upon a conveyor, this allows determination of the 3D position and orientation of the conveyor with respect to the sensor(s), the robotic article management system 2, and also the acquired target article. This information can inform the end effector 10 how to move in order to place the luggage bag correctly with respect to the conveyor system and its position and orientation.

It is noted herein that any of the computing devices discussed and disclosed herein can comprise similar components and functionality as the computing device 32 illustrated in FIG. 61, and discussed above. It is also noted that any of the computing devices discussed and disclosed herein can be configured to communicate and control any of the elements of the robotic article management system 2, not just the particular components of the specific device or system in which the computing device resides. For example, the computing device of the platform 28 can also communicate and control the components of the robotic positioning member 25, and so forth. That being said, each of the various components of the robotic article management system 2, namely the platform 28, the robotic positioning member 25, the robotic end effector 10, the optional external electrical object/system 29, and the system computing device (i.e., a system controller) 4 will each comprise all of the necessary hardware and/or software components to facilitate the communication and control needed within whatever example robotic article management system is designed and implemented.

Figure 62:
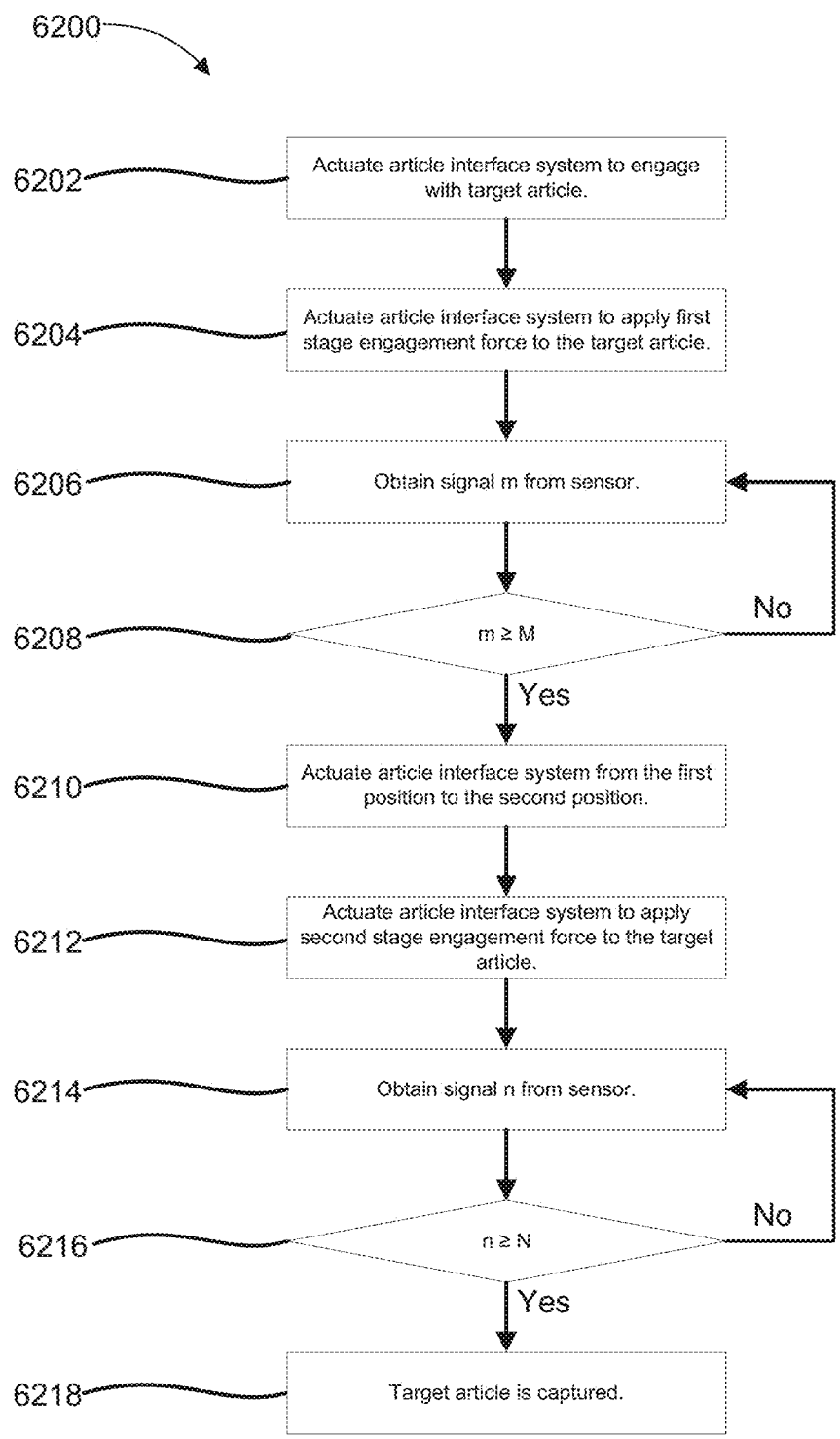
FIG. 62 illustrates a computer implemented method of acquiring an article using an end effector in accordance with at least one example of the present disclosure.

An exemplary computer-implemented method 6200, comprising instructions stored as a module 6124 in one or more of memory devices 6120 and executed by at least one processor 6112, is illustrated in flowchart form in FIG. 62. The method 6200 is control of the end effector to acquire an article. It is to be understood that the method 6200 can be executed on any of the end effectors described herein including a load, pressure, or position sensor. Each step shown in method 6200 can be carried out by a user inputting a user input at a desired time or can be carried out autonomously by the computing device 32.

At the beginning, the computer-implemented method 6200 can include a step 6202 of actuating the article interface system (e.g., article interface system 110 or any component thereof) to engage with the target article. The computer-implemented method 6200 can include a step 6204 of actuating the article interface system (e.g., article interface system 110 or any component thereof) to apply a first stage engagement force to the target article. The computer-implemented method 6200 can include a step 6206 of obtaining a reading or signal "m" from a sensor. The sensor can be a load sensor, pressure sensor, or position sensor as described above in this disclosure. The signal m can be indicative of a load acting between the target article, the extendable arm, and/or the capture device. The signal m can further be indicative of a position of a compliant element, such as a compliant material mass, compliant rod, or compliant diaphragm. The signal m can further be indicative of a pressure within a volumetric interior. In step 6208, the signal m can be compared to a predetermined threshold value M (e.g., the threshold first stage engagement force). If the signal m is less than M (e.g. No in the decision of step 6208) then the process returns to step 6206. If the signal m is greater than or equal to M (e.g. Yes in the decision of step 6208) then the process moves to step 6210.

In step 6210, the article interface system is actuated to move from the first position to the second position. In step 6212, the article interface system is actuated to apply a second stage engagement force to the target article. The computer-implemented method 6200 can include a step 6214 of obtaining a reading or signal "n" from a sensor. The sensor can be a load sensor, pressure sensor, or position sensor as described above in this disclosure. The signal n can be indicative of a load acting between the target article, the extendable arm, and/or the capture device. The signal n can further be indicative of a position of a compliant material mass, rod, or compliant diaphragm. The signal n can further be indicative of a pressure within a volumetric interior. In step 6216, the signal n can be compared to a predetermined threshold value N (e.g., the predetermined threshold of the second stage engagement force). If the signal n is less than N (e.g. No in the decision of step 6216) then the process returns to step 6214. If the signal n is greater than or equal to N (e.g. Yes in the decision of step 6216) then the process moves to step 6218 in which it is determined that the target article is acquired, captured, or supported with capture support sufficient to counter collective forces acting on the target article. The method 6200 can then end or the target article can then be moved or manipulated to a desired location and released by the end effector.

The following examples are further illustrative of various example embodiments of the present technology:

1. A robotic end effector for acquiring and managing an article, the robotic end effector comprising:
   an extendable arm comprising a first support member;
   a capture device comprising:
     a support base having a support surface;
     at least one wall extending away from the support base and defining an opening and a volumetric interior; and
     a compliant diaphragm coupled to the at least one wall proximate to the opening of the volumetric interior and at least partially enclosing the volumetric interior; and
   an article interface system supported by the extendable arm, and that itself comprises an actuatable article engagement device comprising an article interface surface, the actuatable article engagement device being operable to interface with an article to facilitate movement of the article toward the capture device.

2. The robotic end effector of example 1, wherein the compliant diaphragm at least partially comprises a compliant material of at least one of a latex, a rubber, elastomer, or polymer.

3. The robotic end effector of any preceding example, wherein the compliant diaphragm is coupled to the at least one wall to form an air tight seal at the opening of the capture device and to seal the volumetric interior from an environment outside of the volumetric interior.

4. The robotic end effector of any preceding example, wherein the volumetric interior of the capture device is in pneumatic communication with a pump operable to adjust an amount of gas within the volumetric interior by performing at least one of adding gas to the volumetric interior or removing gas from the volumetric interior.

5. The robotic end effector of any preceding example, wherein the pump is operable to add gas to the volumetric interior to cause the compliant diaphragm to extend away from the support base.

6. The robotic end effector of any preceding example, wherein the pump is operable to remove gas from the volumetric interior to cause the compliant diaphragm to move toward the support base.

7. The robotic end effector of any preceding example, wherein the pump is operable to adjust the amount of gas in the volumetric interior in conjunction with one or more movements of at least one of the extendable arm or the article interface system.

8. The robotic end effector of any preceding example, wherein the first support member of the extendable arm comprises a first link and a second link moveable relative to one another, and the extendable arm further comprises an actuatable joint operable to facilitate movement of the first link relative to the second link in a linear degree of freedom; and
   wherein the pump is operable to adjust the amount of gas in the volumetric interior in conjunction with operation of the actuatable joint to move the first link relative to the second link.

9. The robotic end effector of any preceding example, wherein the actuatable article engagement device further comprises one or more powered rollers moveably coupled to the first support member, and the article interface surface comprises at least one surface of the one or more powered rollers; and
   wherein the pump is operable to adjust the amount of gas in the volumetric interior in conjunction with operation of the one or more powered rollers on the first support member.

10. The robotic end effector of any preceding example, wherein the actuatable article engagement device comprises an articulating arm moveably coupled to the first support member of the extendable arm at a first actuatable joint, the first actuatable joint being operable to facilitate relative movement between the first support member and the articulating arm in at least one degree of freedom; and
    wherein the pump is operable to adjust the amount of gas in the volumetric interior in conjunction with operation of the first actuatable joint to create movement between the first support member and the articulating arm.

11. The robotic end effector of any preceding example, wherein the actuatable article engagement device further comprises one or more powered rollers moveably coupled to the articulating arm, and wherein the article interface surface comprises at least one surface of the one or more rollers; and
    wherein the pump is operable to adjust the amount of gas in the volumetric interior in conjunction with operation of the one or more powered rollers on the articulating arm.
12. The robotic end effector of any preceding example, wherein the article interface system further comprises an articulating arm moveably coupled to the first support member of the extendable arm at a first actuatable joint, the first actuatable joint being operable to facilitate movement of the articulating arm relative to the first support member in at least one degree of freedom, wherein the actuatable article engagement device is supported from the articulating arm.
13. The robotic end effector of any preceding example, wherein the articulating arm of the article interface system is positionable in a first position to facilitate displacement of the article to apply a first stage displacement force between the article and the capture device, and is positionable in a second position to facilitate displacement of the article to apply a second stage displacement force between the article and the capture device.
14. The robotic end effector of any preceding example, wherein the first position of the article interface system is along a top surface of the article, and wherein the second position is along a rear surface of the article.
15. The robotic end effector of any preceding example, wherein a state of acquisition of the article is achieved when the forces acting on the article from the end effector are sufficient to counter collective forces acting on the article.
16. The robotic end effector of any preceding example, further comprising one or more pressure sensors operable to measure a pressure within the volumetric interior to determine a displacement force acting on the article engaged with the capture device.
17. The robotic end effector of any preceding example, wherein the article interface system is configured to transition from the first position to the second position upon one or more of the pressure sensors measuring a threshold first stage displacement force as the article is caused to engage the capture device.
18. The robotic end effector of any preceding example, wherein a state of acquisition of the article is achieved upon one or more of the pressure sensors measuring a predetermined threshold of the second stage displacement force where the forces acting on the article from the end effector are sufficient to counter collective forces acting on the article.
19. The robotic end effector of any preceding example, wherein the extendable arm and the article interface system are configured to maintain the threshold first stage displacement force by causing the article engagement device to maintain contact with the article as the article interface system transitions from the first position to the second position.
20. The robotic end effector of any preceding example, wherein the article interface system is configured to transition from the first position to the second position upon one or more of the pressure sensors measuring a threshold first stage displacement force as the article is caused to engage the capture device.
21. The robotic end effector of any preceding example, wherein the article interface system is operable to transition from an initial position to the first position at a first velocity and is operable to transition from the first position to the second position at a second velocity that is greater than the first velocity.
22. The robotic end effector of any preceding example, wherein a state of acquisition of the article is achieved upon one or more of the pressure sensors measuring a predetermined threshold of the second stage displacement force where the forces acting on the article from the end effector are sufficient to counter collective forces acting on the article.
23. The robotic end effector of any preceding example, wherein the actuatable article engagement device comprises one or more powered rollers movably coupled to the articulating arm, and wherein the actuatable article engagement device is operable such that, upon transition from the first position to the second position, the one or more powered rollers are locked to prevent movement of the one or more powered rollers relative to the articulating arm.
24. The robotic end effector of any preceding example, wherein the actuatable article engagement device is operable such that, upon transition from the first position to the second position, the articulating arm is locked to prevent movement of the articulating arm about the first actuatable joint.
25. The robotic end effector of any preceding example, wherein the volumetric interior of the capture device is in pneumatic communication with a pump operable to adjust an amount of gas within the volumetric interior by performing at least one of adding gas to the volumetric interior or removing gas from the volumetric interior.
26. The robotic end effector of any preceding example, wherein a state of acquisition of the article is achieved upon one or more of the pressure sensors measuring a predetermined threshold of the second stage displacement force where the forces acting on the article from the end effector are sufficient to counter collective forces acting on the article;
    wherein the pump is operable to adjust an amount of gas within the volumetric interior in response to one or more of the pressure sensors measuring the predetermined threshold.
27. The robotic end effector of any preceding example, wherein the pump is operable to adjust an amount of gas within the volumetric interior in response to one or more of the pressure sensors measuring a threshold first stage displacement force as the article is caused to engage the capture device.
28. The robotic end effector of any preceding example, wherein the pump is operable to maintain the threshold first stage displacement force by adjusting an amount of gas within the volumetric interior in accordance with the pressure measured by one or more of the pressure sensors.
29. The robotic end effector of any preceding example, wherein the pump is operable to adjust an amount of gas within the volumetric interior in conjunction with one or more movements of at least one of the extendable arm or the article interface system and in accordance with the pressure measured by one or more of the pressure sensors.

30. A method for acquiring an article, the method comprising:
ensuring the article and a robotic end effector for acquiring and managing the article are in proximity with each other, the robotic end effector comprising an extendable arm having a first support member and a capture device, the capture device comprising:
a support base having a support surface;
at least one wall extending away from the support base and defining an opening and volumetric interior; and
a compliant diaphragm coupled to the at least one wall proximate to the opening of the volumetric interior and at least partially enclosing the volumetric interior; and
operating an article interface system supported by the extendable arm, the article interface system that itself comprises an actuatable article engagement device comprising an article interface surface, the actuatable article engagement device being operable to interface with an article to facilitate movement of the article toward the compliant diaphragm, wherein operating the article interface system comprises:
moving the actuatable article engagement device from an initial position to a first position relative to the article in which the article interface surface engages with the article;
actuating the actuatable article engagement device to move the article toward the compliant diaphragm until a state of acquisition is achieved, in which the forces acting on the article from the end effector are sufficient to counter collective forces acting on the article.

31. The method of any preceding example, further comprising extending the extendable arm toward the article by extending a first link of the extendable arm relative to a second link of the extendable arm in a linear degree of freedom, wherein the first link and the second link are couple to one another at a second actuatable joint.

32. The method of any preceding example, wherein the actuatable article engagement device comprises an articulating arm moveably coupled to the first support member of the extendable arm at a first actuatable joint, the first actuatable joint being operable to facilitate relative movement between the first support member and the articulating arm in at least one degree of freedom, and
the method further comprising operating the first actuatable joint to position the articulating arm relative to the first support member to position the article interface system in a first position.

33. The method of any preceding example, further comprising actuating the articulating arm to apply a first stage displacement force to the article with the article interface system in the first position.

34. The method of any preceding example, wherein the actuatable article engagement device further comprises one or more powered rollers movably coupled to the articulating arm, wherein the article interface surface comprises at least one surface of the one or more rollers, and the method further comprises driving the one or more powered rollers to apply the first stage displacement force to the article.

35. The method of any preceding example, further comprising operating the first actuatable joint to position the articulating arm relative to the first support member to position the article interface system in a second position.

36. The method of any preceding example, further comprising actuating the articulating arm to apply a second stage displacement force to the article with the article interface system in the second position.

37. The method of any preceding example, further comprising maintaining contact of the article interface surface with the article as the article interface system transitions from the first position to the second position.

38. The method of any preceding example, wherein the first position of the article interface system is along a top surface of the article, and wherein the second position is along a rear surface of the article.

39. The method of any preceding example, wherein the article interface system is operable to transition from the initial position to the first position at a first velocity and is operable to transition from the first position to the second position at a second velocity that is greater than the first velocity.

40. The method of any preceding example, wherein the actuatable article engagement device further comprises one or more powered rollers movably coupled to the articulating arm, wherein the article interface surface comprises at least one surface of the one or more rollers, and wherein the method further comprises locking in position the one or more powered rollers to prevent movement of the one or more powered rollers relative to the articulating arm upon transition from the first position to the second position.

41. The method of any preceding example, further comprising locking the articulating arm in position to prevent movement of the articulating arm about the first actuatable joint upon transition from the first position to the second position.

42. The method of any preceding example, further comprising operating a pump in pneumatic communication with the volumetric interior of the capture device to adjust an amount of gas within the volumetric interior by performing at least one of adding gas to the volumetric interior or removing gas from the volumetric interior.

43. The method of any preceding example, further comprising operating the pump to add gas to the volumetric interior to cause the compliant diaphragm to extend away from the support base.

44. The method of any preceding example, further comprising operating the pump to remove gas from the volumetric interior to cause the compliant diaphragm to move toward the support base.

45. The method of any preceding example, further comprising operating the pump to adjust the amount of gas in the volumetric interior in conjunction with one or more movements of at least one of the extendable arm or the article interface system.

46. The method of any preceding example, wherein the first support member of the extendable arm comprises a first link and a second link moveable relative to one another, and the extendable arm further comprises an actuatable joint operable to facilitate movement of the first link relative to the second link in a linear degree of freedom; and
the method further comprising operating the pump to adjust the amount of gas in the volumetric interior in conjunction with operation of the actuatable joint to move the first link relative to the second link.

47. The method of any preceding example, wherein the actuatable article engagement device further comprises one or more powered rollers moveably coupled to the first support member, and the article interface surface comprises at least one surface of the one or more powered rollers; and the method further comprising operating the pump to adjust the amount of gas in the volumetric interior in conjunction with operation of the one or more powered rollers on the first support member.

48. The method of any preceding example, further comprising: operating the pump to adjust the amount of gas in the volumetric interior in conjunction with operation of the first actuatable joint to create movement between the first support member and the articulating arm.

49. The method of any preceding example, wherein the actuatable article engagement device further comprises one or more powered rollers moveably coupled to the articulating arm, and wherein the article interface surface comprises at least one surface of the one or more rollers; and the method further comprising operating the pump to adjust the amount of gas in the volumetric interior in conjunction with operation of the one or more powered rollers on the articulating arm.

50. The method of any preceding example, further comprising measuring a displacement force acting on the article with one or more pressure sensors operable to measure pressure within the volumetric interior to determine the displacement force acting on the article engaged with the capture device.

51. The method of any preceding example, further comprising: operating the first actuatable joint to position the articulating arm relative to the first support member to transition the article interface system from the first position to the second position upon one or more of the pressure sensors registering a threshold first stage displacement force as the article is caused to engage capture device.

52. The method of any preceding example, further comprising: maintaining the threshold first stage displacement force measured by one or more of the pressure sensors by maintaining contact between the article interface surface and the article as the article interface system transitions from the first position to the second position.

53. The method of any preceding example, further comprising: determining a state of acquisition of the article is achieved, in which the forces acting on the article from the end effector are sufficient to counter collective forces acting on the article, upon one or more of the pressure sensors measuring a predetermined threshold of the second stage displacement force.

54. The method of any preceding example, wherein the volumetric interior of the capture device is in pneumatic communication with a pump operable to adjust an amount of gas within the volumetric interior by performing at least one of adding gas to the volumetric interior or removing gas from the volumetric interior.

55. The method of any preceding example, wherein a state of acquisition of the article is achieved upon one or more of the pressure sensors measuring a predetermined threshold of the second stage displacement force where the forces acting on the article from the end effector are sufficient to counter collective forces acting on the article;

the method further comprising operating the pump to adjust the amount of gas within the volumetric interior in response to the pressure sensor measuring the predetermined threshold.

56. The method of any preceding example, further comprising operating the pump to adjust the amount of gas within the volumetric interior in response to one or more of the pressure sensors measuring the threshold first stage displacement force as the article is caused to engage the capture device.

57. The method of any preceding example, further comprising operating the pump to adjust the amount of gas within the volumetric interior to maintain the threshold first stage displacement force in accordance with the pressure measured by one or more of the pressure sensors.

58. The method of any preceding example, further comprising operating the pump to adjust the amount of gas within the volumetric interior in conjunction with one or more movements of at least one of the extendable arm or the article interface system and in accordance with the pressure measured by the pressure sensor.

59. A robotic system for acquiring and managing an article, the robotic system comprising:

a robot comprising a robotic end effector interface; and
the robotic end effector of any preceding example supported on the robotic end effector interface of the robot.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein can be combined with other embodiments or features described herein, this disclosure should be read to describe any such combinations that would be practicable by one of ordinary skill in the art. The use of "or" in this disclosure should be understood to mean non-exclusive or, e.g., "and/or," unless otherwise indicated herein.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A robotic end effector for acquiring and managing an article, the robotic end effector comprising:

an extendable arm comprising a first support member;
a capture device comprising:
  a support base having a support surface;
  at least one wall extending away from the support base and defining an opening and a volumetric interior; and
  a compliant diaphragm coupled to the at least one wall proximate to the opening of the volumetric interior and at least partially enclosing the volumetric interior; and
an article interface system supported by the extendable arm, and that itself comprises an actuatable article engagement device comprising an article interface surface, the actuatable article engagement device being operable to interface with an article to facilitate movement of the article toward the capture device.

2. The robotic end effector of claim 1, wherein the compliant diaphragm at least partially comprises a compliant material of at least one of a latex, a rubber, elastomer, or polymer.

3. The robotic end effector of claim 1, wherein the compliant diaphragm is coupled to the at least one wall to form an air tight seal at the opening of the capture device and to seal the volumetric interior from an environment outside of the volumetric interior.

4. The robotic end effector of claim 1, wherein the volumetric interior of the capture device is in pneumatic communication with a pump operable to adjust an amount of gas within the volumetric interior by performing at least one of adding gas to the volumetric interior or removing gas from the volumetric interior.

5. The robotic end effector of claim 4, wherein the pump is operable to add gas to the volumetric interior to cause the compliant diaphragm to extend away from the support base.

6. The robotic end effector of claim 4, wherein the pump is operable to remove gas from the volumetric interior to cause the compliant diaphragm to move toward the support base.

7. The robotic end effector of claim 4, wherein the pump is operable to adjust the amount of gas in the volumetric interior in conjunction with one or more movements of at least one of the extendable arm or the article interface system.

8. The robotic end effector of claim 7, wherein the first support member of the extendable arm comprises a first link and a second link moveable relative to one another, and the extendable arm further comprises an actuatable joint operable to facilitate movement of the first link relative to the second link in a linear degree of freedom; and
  wherein the pump is operable to adjust the amount of gas in the volumetric interior in conjunction with operation of the actuatable joint to move the first link relative to the second link.

9. The robotic end effector of claim 7, wherein the actuatable article engagement device further comprises one or more powered rollers moveably coupled to the first support member, and the article interface surface comprises at least one surface of the one or more powered rollers; and
  wherein the pump is operable to adjust the amount of gas in the volumetric interior in conjunction with operation of the one or more powered rollers on the first support member.

10. The robotic end effector of claim 7, wherein the actuatable article engagement device comprises an articulating arm moveably coupled to the first support member of the extendable arm at a first actuatable joint, the first actuatable joint being operable to facilitate relative movement between the first support member and the articulating arm in at least one degree of freedom; and
  wherein the pump is operable to adjust the amount of gas in the volumetric interior in conjunction with operation of the first actuatable joint to create movement between the first support member and the articulating arm.

11. The robotic end effector of claim 7, wherein the actuatable article engagement device further comprises one or more powered rollers moveably coupled to the articulating arm, and wherein the article interface surface comprises at least one surface of the one or more rollers; and
  wherein the pump is operable to adjust the amount of gas in the volumetric interior in conjunction with operation of the one or more powered rollers on the articulating arm.

12. The robotic end effector of claim 1, wherein the article interface system further comprises an articulating arm moveably coupled to the first support member of the extendable arm at a first actuatable joint, the first actuatable joint being operable to facilitate movement of the articulating arm relative to the first support member in at least one degree of freedom, wherein the actuatable article engagement device is supported from the articulating arm.

13. The robotic end effector of claim 12, wherein the articulating arm of the article interface system is positionable in a first position to facilitate displacement of the article to apply a first stage displacement force between the article and the capture device, and is positionable in a second position to facilitate displacement of the article to apply a second stage displacement force between the article and the capture device.

14. The robotic end effector of claim 13, wherein the first position of the article interface system is along a top surface of the article, and wherein the second position is along a rear surface of the article.

15. The robotic end effector of claim 13, wherein a state of acquisition of the article is achieved when the forces acting on the article from the end effector are sufficient to counter collective forces acting on the article.

16. The robotic end effector of claim 13, further comprising one or more pressure sensors operable to measure a pressure within the volumetric interior to determine a displacement force acting on the article engaged with the capture device.

17. The robotic end effector of claim 16, wherein the article interface system is configured to transition from the first position to the second position upon one or more of the pressure sensors measuring a threshold first stage displacement force as the article is caused to engage the capture device.

18. The robotic end effector of claim 16, wherein a state of acquisition of the article is achieved upon one or more of the pressure sensors measuring a predetermined threshold of the second stage displacement force where the forces acting on the article from the end effector are sufficient to counter collective forces acting on the article.

19. The robotic end effector of claim 16, wherein the extendable arm and the article interface system are configured to maintain the threshold first stage displacement force by causing the article engagement device to maintain contact with the article as the article interface system transitions from the first position to the second position.

20. The robotic end effector of claim 16,
  wherein the article interface system is configured to transition from the first position to the second position upon one or more of the pressure sensors measuring a threshold first stage displacement force as the article is caused to engage the capture device.

21. The robotic end effector of claim 16, wherein the article interface system is operable to transition from an initial position to the first position at a first velocity and is operable to transition from the first position to the second position at a second velocity that is greater than the first velocity.

22. The robotic end effector of claim 16, wherein a state of acquisition of the article is achieved upon one or more of the pressure sensors measuring a predetermined threshold of the second stage displacement force where the forces acting on the article from the end effector are sufficient to counter collective forces acting on the article.

23. The robotic end effector of claim 16, wherein the volumetric interior of the capture device is in pneumatic communication with a pump operable to adjust an amount of gas within the volumetric interior by performing at least one of adding gas to the volumetric interior or removing gas from the volumetric interior.

24. The robotic end effector of claim 23, wherein a state of acquisition of the article is achieved upon one or more of the pressure sensors measuring a predetermined threshold of the second stage displacement force where the forces acting on the article from the end effector are sufficient to counter collective forces acting on the article;
wherein the pump is operable to adjust an amount of gas within the volumetric interior in response to one or more of the pressure sensors measuring the predetermined threshold.

25. The robotic end effector of claim 24, wherein the pump is operable to adjust an amount of gas within the volumetric interior in conjunction with one or more movements of at least one of the extendable arm or the article interface system and in accordance with the pressure measured by one or more of the pressure sensors.

26. The robotic end effector of claim 23, wherein the pump is operable to adjust an amount of gas within the volumetric interior in response to one or more of the pressure sensors measuring a threshold first stage displacement force as the article is caused to engage the capture device.

27. The robotic end effector of claim 23, wherein the pump is operable to maintain the threshold first stage displacement force by adjusting an amount of gas within the volumetric interior in accordance with the pressure measured by one or more of the pressure sensors.

28. The robotic end effector of claim 13, wherein the actuatable article engagement device comprises one or more powered rollers movably coupled to the articulating arm, and wherein the actuatable article engagement device is operable such that, upon transition from the first position to the second position, the one or more powered rollers are locked to prevent movement of the one or more powered rollers relative to the articulating arm.

29. The robotic end effector of claim 13, wherein the actuatable article engagement device is operable such that, upon transition from the first position to the second position, the articulating arm is locked to prevent movement of the articulating arm about the first actuatable joint.

30. A robotic system for acquiting and managing an article, the robotic system comprising:
a robot comprising a robotic end effector interface; and
the robotic end effector of claim 1 supported on the robotic end effector interface of the robot.

* * * * *